US012647242B2

(12) United States Patent
Kim

(10) Patent No.: US 12,647,242 B2
(45) Date of Patent: Jun. 2, 2026

(54) METHOD AND APPARATUS FOR SUBBAND FULL DUPLEXING IN MOBILE WIRELESS COMMUNICATION SYSTEM

(71) Applicant: SETLAB Co., LTD., Gyeonggi-do (KR)

(72) Inventor: Soenghun Kim, Gyeonggi-do (KR)

(73) Assignee: SETLAB Co., LTD., Gyeonggi-do (KR)

( * ) Notice: Subject to any disclaimer, the term of this patent is extended or adjusted under 35 U.S.C. 154(b) by 0 days.

(21) Appl. No.: 19/329,916

(22) Filed: Sep. 16, 2025

(65) Prior Publication Data

US 2026/0128848 A1 May 7, 2026

(30) Foreign Application Priority Data

Nov. 7, 2024    (KR) ......................... 10-2024-0157524
Sep. 11, 2025   (KR) ......................... 10-2025-0129961

(51) Int. Cl.
| | |
|---|---|
| *H04L 5/14* | (2006.01) |
| *H04L 5/00* | (2006.01) |
| *H04W 52/14* | (2009.01) |
| *H04W 52/24* | (2009.01) |
| *H04W 52/36* | (2009.01) |
| *H04W 72/231* | (2023.01) |

(52) U.S. Cl.
CPC .............. *H04L 5/14* (2013.01); *H04L 5/0094* (2013.01); *H04W 52/146* (2013.01); *H04W 52/242* (2013.01); *H04W 52/365* (2013.01); *H04W 72/231* (2023.01)

(58) Field of Classification Search
CPC ...... H04L 5/14; H04W 52/14; H04W 52/146; H04W 52/24; H04W 52/242; H04W 52/243; H04W 52/36; H04W 52/365; H04W 72/23; H04W 72/231
See application file for complete search history.

(56) References Cited

U.S. PATENT DOCUMENTS

2024/0214943 A1*  6/2024  Rudolf ................ H04W 72/232
2025/0168845 A1*  5/2025  Abotabl ............ H04W 72/1268
2025/0234301 A1*  7/2025  Ardah ................. H04W 52/243
2025/0254624 A1*  8/2025  Jang .................... H04W 52/242

FOREIGN PATENT DOCUMENTS

WO         2024/023984 A1     2/2024

OTHER PUBLICATIONS

3GPP, "3rd Generation Partnership Project; Technical Specification Group Radio Access Network; NR; Multiplexing and channel coding (Release 18)", Sep. 2024, 294 pages, 3GPP TS 38.212 V18.4.0.

(Continued)

*Primary Examiner* — Pao Sinkantarakorn

(74) *Attorney, Agent, or Firm* — Nicholas Park

(57) ABSTRACT

A method and apparatus to support sub-band full duplex is provided. The method comprises receiving a DCI; updating PUSCH power control adjustment states for NSUR and SUR based on specific blocks in the DCI; performing PUSCH transmission on NSUR based on PUSCH power control adjustment state for NSUR; and performing PUSCH transmission on SUR based on PUSCH power control adjustment state for SUR.

7 Claims, 41 Drawing Sheets

(56)     References Cited

OTHER PUBLICATIONS

3GPP, "3rd Generation Partnership Project; Technical Specification Group Radio Access Network; NR; Physical layer procedures for control (Release 18)", Sep. 2024, 312 pages, 3GPP TS 38.213 V18.4.0.

3GPP, "3rd Generation Partnership Project; Technical Specification Group Radio Access Network; NR; Physical layer procedures for data (Release 18)", Sep. 2024, 301 pages, 3GPP TS 38.214 V18.4.0.

3GPP, "3rd Generation Partnership Project; Technical Specification Group Radio Access Network; NR; Medium Access Control (MAC) protocol specification (Release 18)", Sep. 2024, 335 pages, 3GPP TS 38.321 V18.3.0.

3GPP, "3rd Generation Partnership Project; Technical Specification Group Radio Access Network; NR; Radio Resource Control (RRC) protocol specification (Release 18)", Sep. 2024, 1694 pages, 3GPP TS 38.331 V18.3.0.

Korean Office Action for KR Application No. 10-2025-0129961 dated Dec. 22, 2025, (Office Action in Korean with Machine Translated English translation), 5 pages.

Moderator (CATT), R1-2304029, Summary #2 of subband non-overlapping full duplex, 3GPP TSG RAN WG1 #112bis-E, 3GPP (Apr. 21, 2023).

* cited by examiner

User Plane Protocol Stack
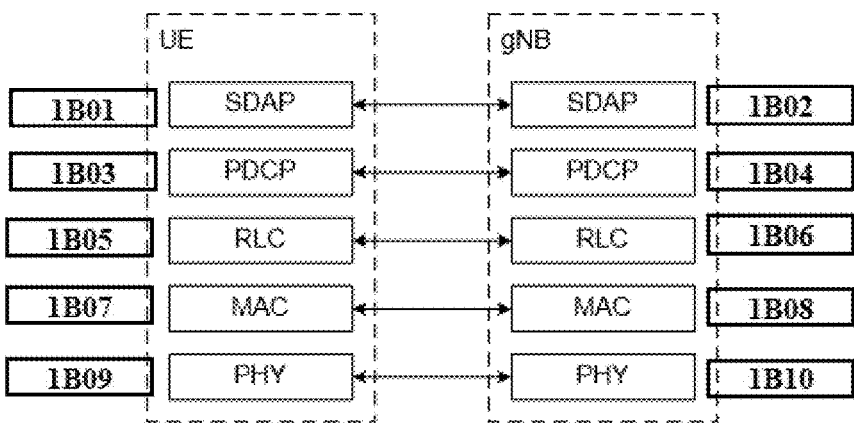
Control Plane Protocol Stack
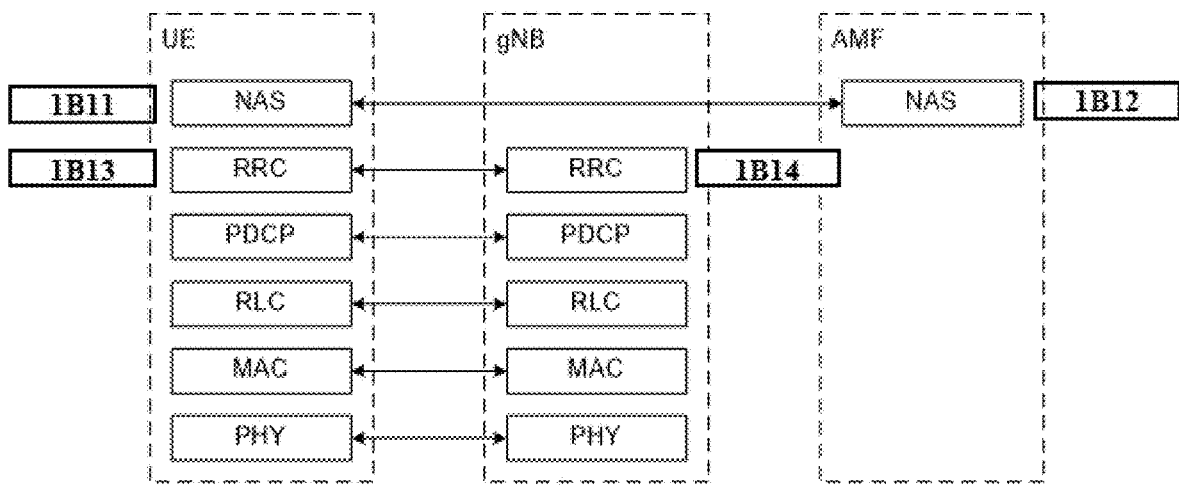
FIG.2

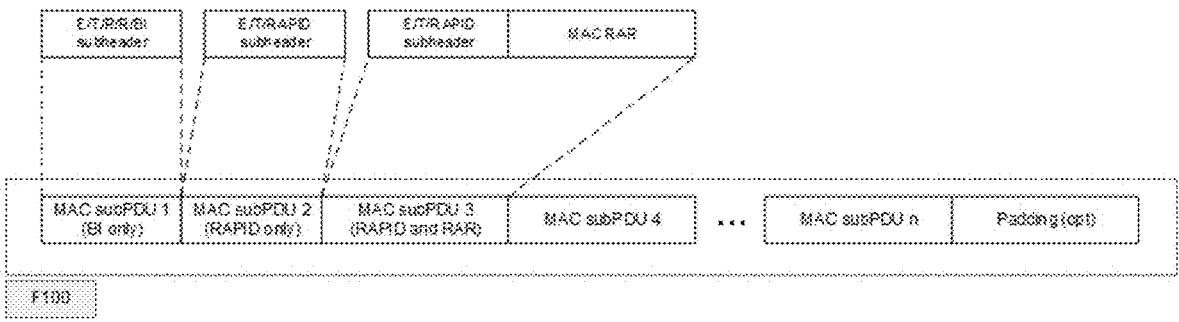
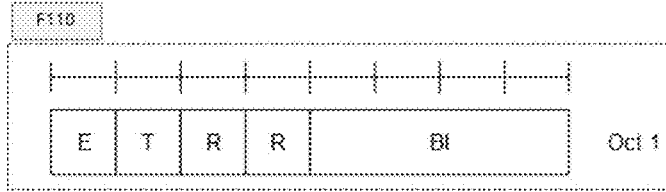
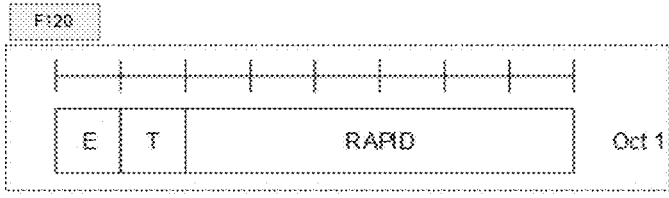
FIG.18

U100  receiving from a base station a system information

U200  receiving from the base station a RRCReconfiguration

U300  receiving from the base station a DCI that causes BWP switching.

U400  determining symbols available for reception and symbols available for transmission.

U500  performing reception on symbols for reception and transmission on symbols for transmission.

U600    receiving from a base station a system information

U700    receiving from the base station a RRCReconfiguration

U800    determining set of symbols for periodic uplink transmission based on RRC reconfiguration message U900    performing periodic uplink transmission based on determination

Figure 35:
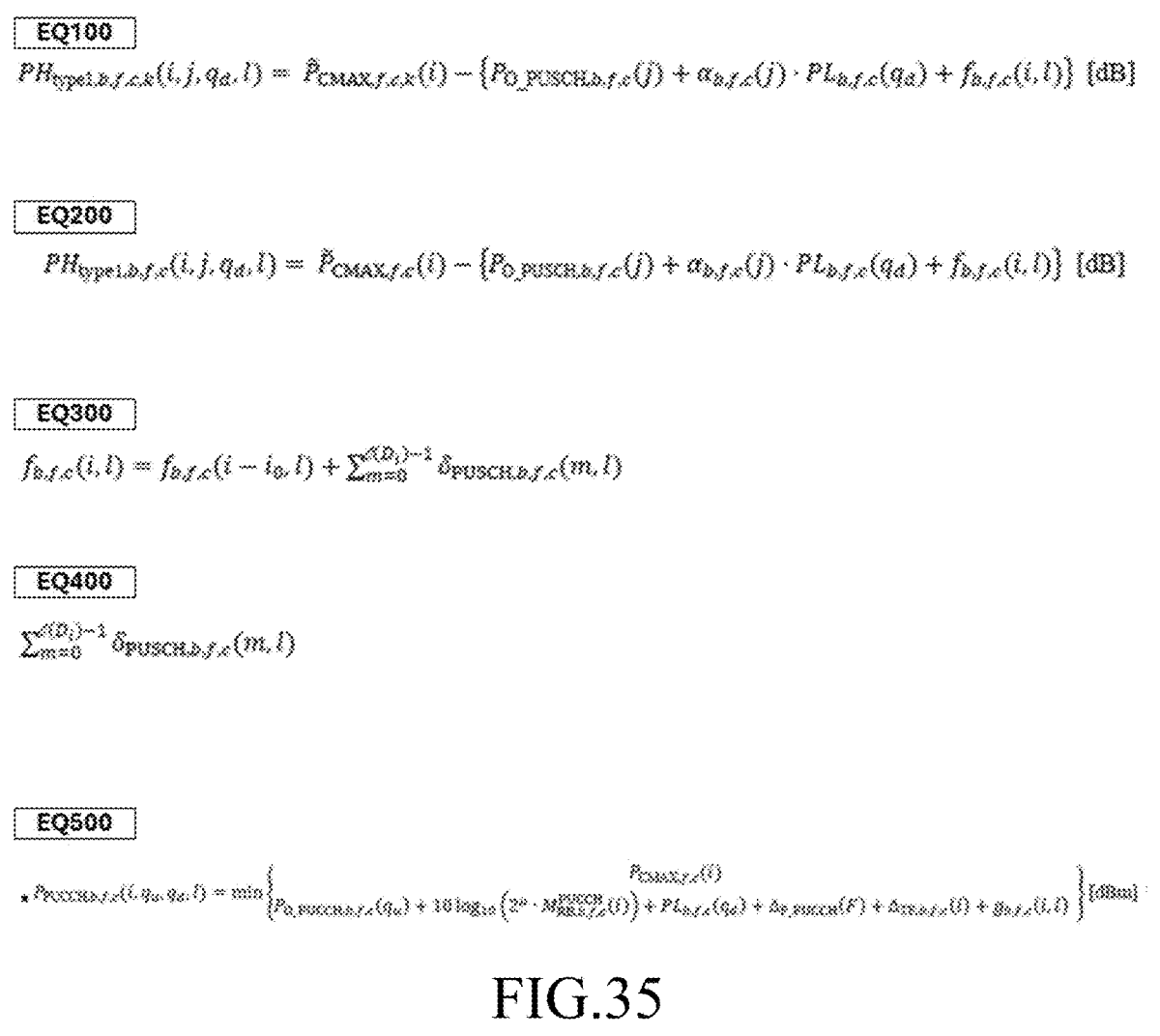

EQ100

$$PH_{type1,b,f,c,x}(i,j,q_d,l) = \hat{P}_{CMAX,f,c,x}(i) - \{P_{O\_PUSCH,b,f,c}(j) + \alpha_{b,f,c}(j) \cdot PL_{b,f,c}(q_d) + f_{b,f,c}(i,l)\} \text{ [dB]}$$

EQ200

$$PH_{type1,b,f,c}(i,j,q_d,l) = \hat{P}_{CMAX,f,c}(i) - \{P_{O\_PUSCH,b,f,c}(j) + \alpha_{b,f,c}(j) \cdot PL_{b,f,c}(q_d) + f_{b,f,c}(i,l)\} \text{ [dB]}$$

EQ300

$$f_{b,f,c}(i,l) = f_{b,f,c}(i - i_0, l) + \sum_{m=0}^{(D_i)-1} \delta_{PUSCH,b,f,c}(m,l)$$

EQ400

$$\sum_{m=0}^{(D_i)-1} \delta_{PUSCH,b,f,c}(m,l)$$

EQ500

$$P_{CCCMX,f,c}(i, q_d, q_d, l) = \min\left\{ P_{O\_PUSCH,b,f,c}(q_d) + 10\log_{10}\left(2^\mu \cdot M_{RB,f,c}^{PUSCH}(i)\right) + PL_{b,f,c}(q_d) + \Delta_{TF,PUSCH}(i) + \Delta_{TC,b,f,c}(i) + g_{b,f,c}(i,l) \right\} \text{ [dBm]}$$

Figure 36:
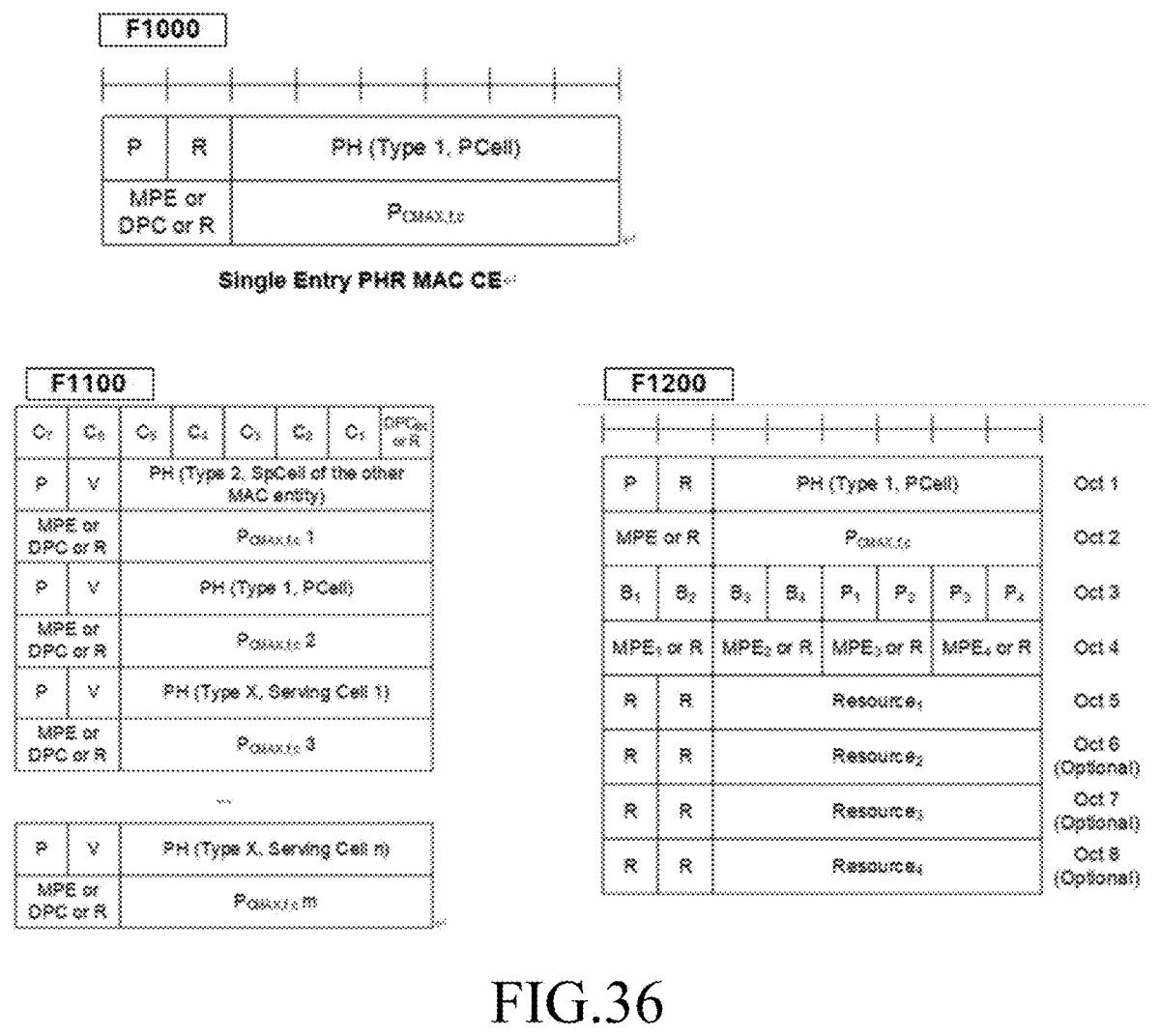

| P | R | PH (Type 1, PCell) |
|---|---|---|
| MPE or DPC or R | | $P_{CMAX,f,c}$ |

Single Entry PHR MAC CE

F1100

| $C_7$ | $C_6$ | $C_5$ | $C_4$ | $C_3$ | $C_2$ | $C_1$ | DPC or R |
|---|---|---|---|---|---|---|---|
| P | V | PH (Type 2, SpCell of the other MAC entity) | | | | | |
| MPE or DPC or R | | $P_{CMAX,f,c}$ 1 | | | | | |
| P | V | PH (Type 1, PCell) | | | | | |
| MPE or DPC or R | | $P_{CMAX,f,c}$ 2 | | | | | |
| P | V | PH (Type X, Serving Cell 1) | | | | | |
| MPE or DPC or R | | $P_{CMAX,f,c}$ 3 | | | | | |

...

| P | V | PH (Type X, Serving Cell n) |
|---|---|---|
| MPE or DPC or R | | $P_{CMAX,f,c}$ m |

F1200

| P | R | PH (Type 1, PCell) | | | | | | Oct 1 |
|---|---|---|---|---|---|---|---|---|
| MPE or R | | $P_{CMAX,f,c}$ | | | | | | Oct 2 |
| $B_1$ | $B_2$ | $B_3$ | $B_4$ | $P_1$ | $P_2$ | $P_3$ | $P_4$ | Oct 3 |
| $MPE_1$ or R | | $MPE_2$ or R | | $MPE_3$ or R | | $MPE_4$ or R | | Oct 4 |
| R | R | Resource$_1$ | | | | | | Oct 5 |
| R | R | Resource$_2$ | | | | | | Oct 6 (Optional) |
| R | R | Resource$_3$ | | | | | | Oct 7 (Optional) |
| R | R | Resource$_4$ | | | | | | Oct 8 (Optional) |

| C7 | C6 | C5 | C4 | C3 | C2 | C1 | R |
|---|---|---|---|---|---|---|---|
| P | V | PH (Type 2, SpCell of the other MAC entity) | | | | | |
| MPE or R | | $P_{CMAX,c}$ 1 | | | | | |
| P | V | PH (Type 1, PCell) | | | | | |
| MPE or R | | $P_{CMAX,c}$ 2 | | | | | |
| B1 | B2 | B3 | B4 | P1 | P2 | P3 | P4 |
| MPE1 or R | MPE2 or R | MPE3 or R | | MPE4 or R | | | |
| R | R | Resource1 | | | | | |
| R | R | Resource2 | | | | | |
| R | R | Resource3 | | | | | |
| R | R | Resource4 | | | | | |
| P | V | PH (Type X, Serving Cell 1) | | | | | |
| MPE or R | | $P_{CMAX,c}$ 3 | | | | | |
| B1 | B2 | B3 | B4 | P1 | P2 | P3 | P4 |
| MPE1 or R | MPE2 or R | MPE3 or R | | MPE4 or R | | | |
| R | R | Resource1 | | | | | |
| R | R | Resource2 | | | | | |
| R | R | Resource3 | | | | | |
| R | R | Resource4 | | | | | |
| ... | | | | | | | |
| P | V | PH (Type X, Serving Cell n) | | | | | |
| MPE or R | | $P_{CMAX,c}$ m | | | | | |
| B1 | B2 | B3 | B4 | P1 | P2 | P3 | P4 |
| MPE1 or R | MPE2 or R | MPE3 or R | | MPE4 or R | | | |
| R | R | Resource1 | | | | | |
| R | R | Resource2 | | | | | |
| R | R | Resource3 | | | | | |

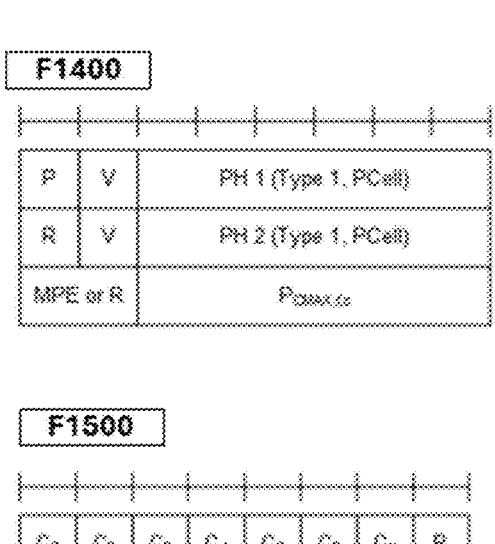

F1400

| P | V | PH 1 (Type 1, PCell) |
|---|---|---|
| R | V | PH 2 (Type 1, PCell) |
| MPE or R | | $P_{CMAX,c}$ |

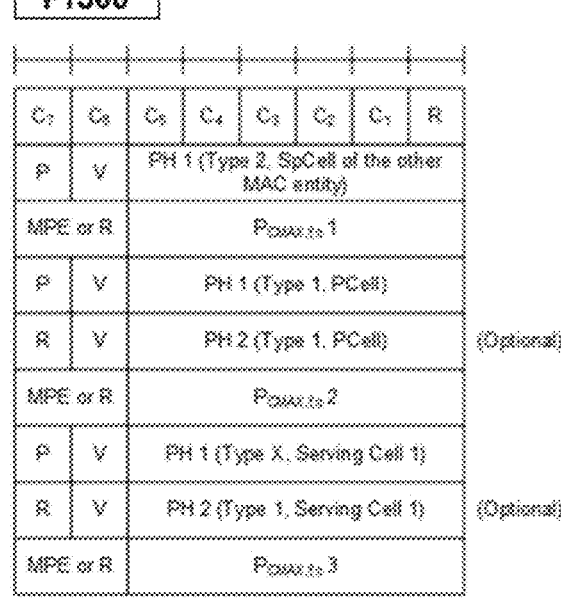

F1500

| C7 | C6 | C5 | C4 | C3 | C2 | C1 | R | |
|---|---|---|---|---|---|---|---|---|
| P | V | PH 1 (Type 2, SpCell of the other MAC entity) | | | | | | |
| MPE or R | | $P_{CMAX,c}$ 1 | | | | | | |
| P | V | PH 1 (Type 1, PCell) | | | | | | |
| R | V | PH 2 (Type 1, PCell) | | | | | | (Optional) |
| MPE or R | | $P_{CMAX,c}$ 2 | | | | | | |
| P | V | PH 1 (Type X, Serving Cell 1) | | | | | | |
| R | V | PH 2 (Type 1, Serving Cell 1) | | | | | | (Optional) |
| MPE or R | | $P_{CMAX,c}$ 3 | | | | | | |

...

| P | V | PH 1 (Type X, Serving Cell n) |
|---|---|---|
| R | V | PH 2 (Type 1, Serving Cell n) |
| MPE or R | | $P_{CMAX,c}$ m |

(Optional)

FIG.37

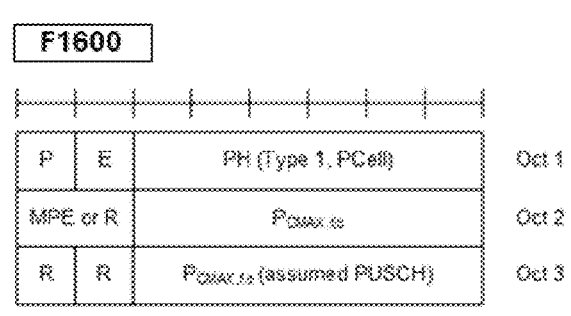
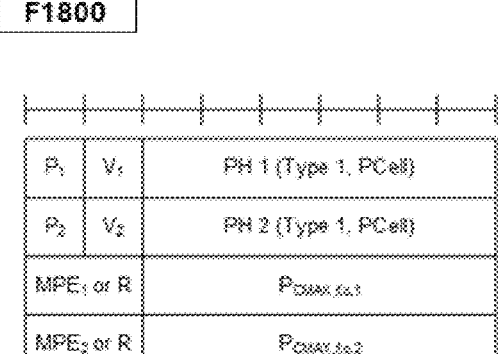
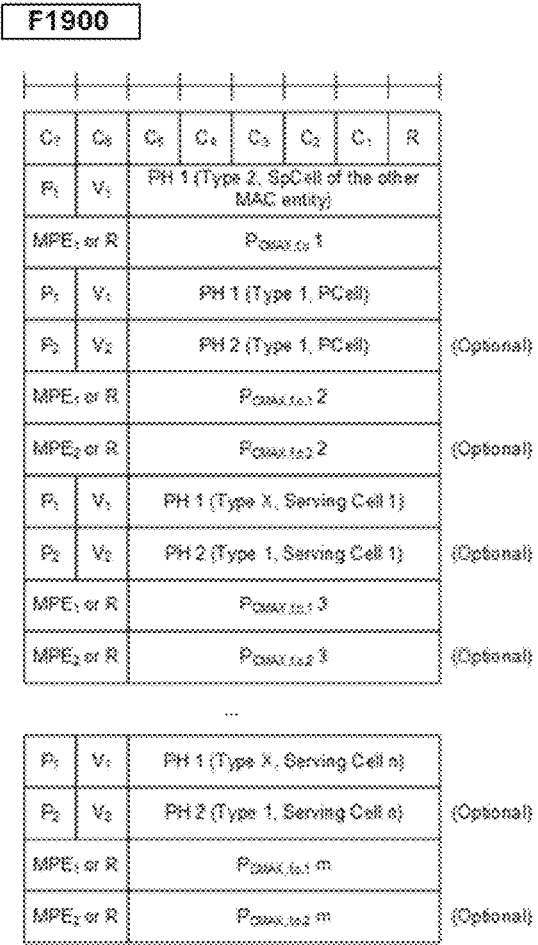
FIG.38

T1000: Power Headroom levels for PHR

| PH | Power Headroom Level |
|----|----------------------|
| 0 | POWER_HEADROOM_0 |
| 1 | POWER_HEADROOM_1 |
| 2 | POWER_HEADROOM_2 |
| 3 | POWER_HEADROOM_3 |
| … | … |
| 60 | POWER_HEADROOM_60 |
| 61 | POWER_HEADROOM_61 |
| 62 | POWER_HEADROOM_62 |
| 63 | POWER_HEADROOM_63 |

T1100: Nominal UE transmit power level for PHR

| $P_{CMAX,f,c}$ | Nominal UE transmit power level |
|----------------|----------------------------------|
| 0 | PCMAX_C_00 |
| 1 | PCMAX_C_01 |
| 2 | PCMAX_C_02 |
| … | … |
| 61 | PCMAX_C_61 |
| 62 | PCMAX_C_62 |
| 63 | PCMAX_C_63 |

T1200: Effective power reduction for MPE P-MPR

| MPE | Measured P-MPR value |
|-----|----------------------|
| 0 | P-MPR_00 |
| 1 | P-MPR_01 |
| 2 | P-MPR_02 |
| 3 | P-MPR_03 |

T1300: Delta power class for DPC

| DPC | Measured DPC value |
|-----|--------------------|
| 0 | reserved |
| 1 | DPC_00 |
| 2 | DPC_03 |
| 3 | DPC_06 |

FIG.39

U1000   Receiving a DCI

U1100   Updating PUSCH power control adjustment states for NSUR and SUR based on specific blocks in the DCI U1200   Performing PUSCH transmission on NSUR based on PUSCH power control adjustment state for NSUR U1300   Performing PUSCH transmission on SUR based on PUSCH power control adjustment state for SUR

METHOD AND APPARATUS FOR SUBBAND FULL DUPLEXING IN MOBILE WIRELESS COMMUNICATION SYSTEM

CROSS-REFERENCE TO RELATED APPLICATION

This application claims priority to and the benefit of Korean Patent Application Nos. 10-2024-0157524, filed on Nov. 7, 2024, and 10-2025-0129961, filed on Sep. 11, 2025.

Each of the above documents is hereby incorporated herein by reference in its entirety.

BACKGROUND

Technical Field

The present disclosure relates to sub-band full duplexing in wireless mobile communication system.

Related Art

TDD is widely used in commercial NR deployments. In TDD, the time domain resource is split between downlink and uplink. Allocation of a limited time duration for the uplink in TDD would result in reduced coverage, increased latency and reduced capacity. As a possible enhancement, simultaneous existence of downlink and uplink, a.k.a. full duplex, or more specifically, subband non-overlapping full duplex (SBFD) at the gNB side within a conventional TDD band can be considered.

SUMMARY

A method and apparatus to support sub-band full duplex is provided. The method comprises receiving a DCI; updating PUSCH power control adjustment states for NSUR and SUR based on specific blocks in the DCI; performing PUSCH transmission on NSUR based on PUSCH power control adjustment state for NSUR; and performing PUSCH transmission on SUR based on PUSCH power control adjustment state for SUR.

BRIEF DESCRIPTION OF THE DRAWINGS

FIG. 2 is a diagram illustrating wireless protocol architecture in 5G system.

FIG. 18 illustrates MAC PDU format.

FIG. 35 illustrates various equations related to uplink transmission power.

FIG. 36 illustrates various formats of PHR MAC CE.

FIG. 37 illustrates various formats of PHR MAC CE.

FIG. 38 illustrates various formats of PHR MAC CE.

FIG. 39 illustrates mapping information for various fields in PHR MAC CE.

DETAILED DESCRIPTION

Hereinafter, embodiments of the present disclosure will be described in detail with reference to the accompanying drawings. In addition, in the description of the present disclosure, if it is determined that a detailed description of a related known function or configuration may unnecessarily obscure the gist of the present disclosure, the detailed description thereof will be omitted. In addition, the terms to be described later are terms defined in consideration of functions in the present disclosure, which may vary according to intentions or customs of users and operators. Therefore, the definition should be made based on the content throughout this specification.

The terms used, in the following description, for indicating access nodes, network entities, messages, interfaces between network entities, and diverse identity information is provided for convenience of explanation. Accordingly, the terms used in the following description are not limited to specific meanings but may be replaced by other terms equivalent in technical meanings.

In the following descriptions, the terms and definitions given in the 3GPP standards are used for convenience of explanation. However, the present disclosure is not limited by use of these terms and definitions and other arbitrary terms and definitions may be employed instead.

In the present disclosure, followings are used interchangeably:

Terminal and UE and wireless device;

Information Element (IE) and set of parameters;

Parameter and field and IE;

Base station and GNB.

Figure 1:
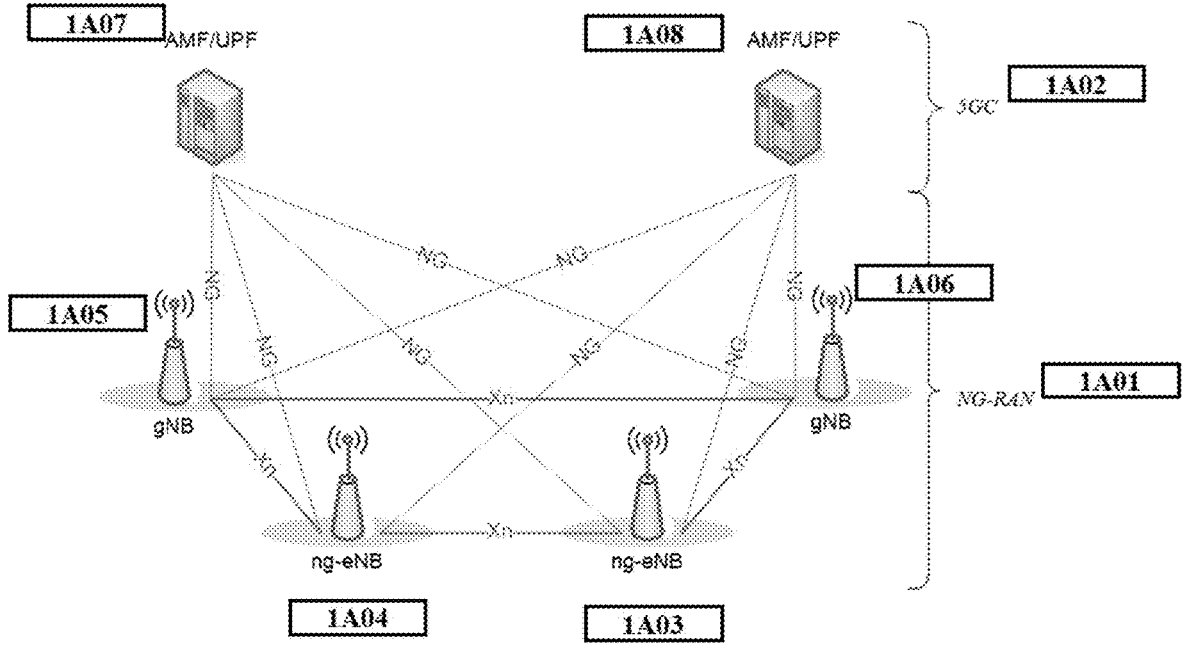
FIG. 1 is a diagram illustrating the architecture of 5G system and NG-RAN.

FIG. 1 is a diagram illustrating the architecture of an 5G system and a NG-RAN to which the disclosure may be applied.

5G system consists of NG-RAN 1A01 and 5GC 1A02. An NG-RAN node is either:

>1: a gNB, providing NR user plane and control plane protocol terminations towards the UE; or >1: an ng-eNB, providing E-UTRA user plane and control plane protocol terminations towards the UE.

The gNBs 1A05 or 1A06 and ng-eNBs 1A03 or 1A04 are interconnected with each other by means of the Xn interface. The gNBs and ng-eNBs are also connected by means of the NG interfaces to the 5GC, more specifically to the AMF (Access and Mobility Management Function) and to the UPF (User Plane Function). AMF 1A07 and UPF 1A08 may be realized as a physical node or as separate physical nodes.

A gNB 1A05 or 1A06 or an ng-eNBs 1A03 or 1A04 hosts the various functions listed below.

>1: Functions for Radio Resource Management such as Radio Bearer Control, Radio Admission Control, Connection Mobility Control, Dynamic allocation of resources to UEs in uplink, downlink and sidelink (scheduling); and >1: IP and Ethernet header compression, uplink data decompression and encryption of user data stream; and >1: Selection of an AMF at UE attachment when no routing to an MME can be determined from the information provided by the UE; and >1: Routing of User Plane data towards UPF; and >1: Scheduling and transmission of paging messages; and >1: Scheduling and transmission of broadcast information (originated from the AMF or O&M); and >1: Measurement and measurement reporting configuration for mobility and scheduling; and >1: Session Management; and >1: QoS Flow management and mapping to data radio bearers; and >1: Support of UEs in RRC_INACTIVE state; and The AMF 1A07 hosts the functions such as NAS signaling, NAS signaling security, AS security control, SMF selection, Authentication, Mobility management and positioning management.

The UPF 1A08 hosts the functions such as packet routing and forwarding, transport level packet marking in the uplink, QoS handling and the downlink, mobility anchoring for mobility etc.

FIG. 2 is a diagram illustrating a wireless protocol architecture in an 5G system to which the disclosure may be applied.

User plane protocol stack consists of SDAP 2B01 or 2B02, PDCP 2B03 or 2B04, RLC 2B05 or 2B06, MAC 2B07 or 2B08 and PHY 2B09 or 2B10. Control plane protocol stack consists of NAS 2B11 or 2B12, RRC 2B13 or 2B14, PDCP, RLC, MAC and PHY.

Each protocol sublayer performs functions related to the operations listed below.

NAS: authentication, mobility management, security control etc.

RRC: System Information, Paging, Establishment, maintenance and release of an RRC connection, Security functions, Establishment, configuration, maintenance and release of Signalling Radio Bearers (SRBs) and Data Radio Bearers (DRBs), Mobility, QoS management, Detection of and recovery from radio link failure, NAS message transfer etc.

SDAP: Mapping between a QoS flow and a data radio bearer, Marking QoS flow ID (QFI) in both DL and UL packets.

PDCP: Transfer of data, Header compression and decompression, Ciphering and deciphering, Integrity protection and integrity verification, Duplication, Reordering and in-order delivery, Out-of-order delivery etc.

RLC: Transfer of upper layer PDUs, Error Correction through ARQ, Segmentation and re-segmentation of RLC SDUs, Reassembly of SDU, RLC re-establishment etc.

MAC: Mapping between logical channels and transport channels, Multiplexing/demultiplexing of MAC SDUs belonging to one or different logical channels into/from transport blocks (TB) delivered to/from the physical layer on transport channels, Scheduling information reporting, Priority handling between UEs, Priority handling between logical channels of one UE etc.

PHY: Channel coding, Physical-layer hybrid-ARQ processing, Rate matching, Scrambling, Modulation, Layer mapping, Downlink Control Information, Uplink Control Information etc.

Between RRC_CONNECTED and RRC_INACTIVE, a state transition occurs by the exchange of the Resume message and the Release message containing the Suspend IE.

A state transition occurs between RRC_CONNECTED and RRC_IDLE through RRC connection establishment and RRC connection release.

The UE supports three RRC states.

In RRC_IDLE, UE has no RRC connection with RAN. The UE monitors paging channel and idle mode mobility (UE based mobility). As name implies, in RRC_IDLE state, data transmission/reception is not possible and power consumption is minimal. To perform data transfer, UE is required to transition to RRC_CONNECTED state.

In RRC_CONNECTED, UE has valid RRC connection with RAN. The UE establishes radio bearer configured for data transmission/reception. UE mobility is handled by network-controlled handover. RRC_CONNECTED state is most power-consuming state. To minimize power consumption during this state, C-DRX and other technique can be applied.

In RRC_INACTIVE, UE has suspended RRC connection with RAN. Before performing full scale data transfer, the UE and the base station resume the suspended RRC connection. UE mobility is handled by idle mode mobility within RAN defined area. If UE is capable of and configured by the base station, data transfer in limited scale can be performed in RRC_INACTIVE state, which is called small data transmission procedure.

RRC_IDLE state can be characterized with followings:

>1: PLMN selection; Broadcast of system information;

>1: Cell re-selection mobility;

>1: Paging for mobile terminated data is initiated by 5GC;

>1: DRX for CN paging configured by NAS.

RRC_INACTIVE state can be characterized with followings:

>1: PLMN selection; Broadcast of system information;

>1: Cell re-selection mobility;

>1: Paging is initiated by NG-RAN (RAN paging);

>1: RAN-based notification area (RNA) is managed by NG-RAN;

>1: DRX for RAN paging configured by NG-RAN;

>1: 5GC-NG-RAN connection (both C/U-planes) is established for UE;

>1: The UE AS context is stored in NG-RAN and the UE;

>1: NG-RAN knows the RNA which the UE belongs to.

RRC_CONNECTED state can be characterized with followings:

>1: 5GC-NG-RAN connection (both C/U-planes) is established for UE;

>1: The UE AS context is stored in NG-RAN and the UE;

>1: NG-RAN knows the cell which the UE belongs to;

>1: Transfer of unicast data to/from the UE;

>1: Network controlled mobility including measurements.

Figure 3:
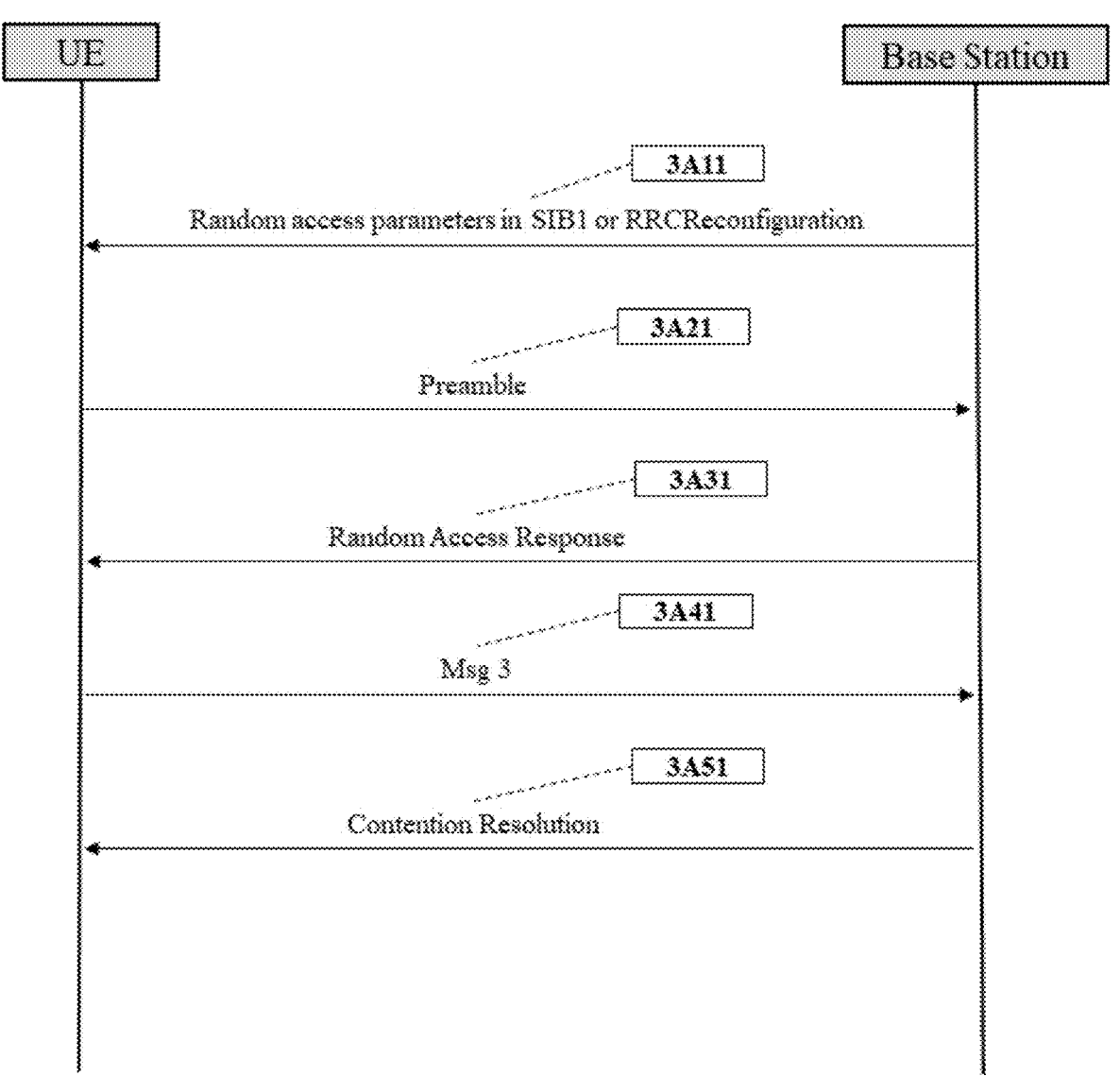
FIG. 3 illustrates random access procedure.

FIG. 3 illustrates random access procedure.

Random access procedure enables the UE to align uplink transmission timing, and indicate the best downlink beam, and transmit a MAC PDU that may contain CCCH SDU (e.g. RRCSetupRequest).

Random access procedure includes preamble transmission 3A21, random access response reception 3A31, Msg 3 transmission 3A41 and contention resolution 3A51.

Parameters for random access procedure are provided in SIB1 (in case of initial access) or in RRCReconfiguration (in case of handover) 3A11.

Random access procedure may be triggered by a number of events such as initial access from RRC_IDLE (e.g. RRC connection establishment procedure), DL or UL data arrival, request by RRC upon synchronous reconfiguration (e.g. handover) and RRC Connection Resume procedure from RRC_INACTIVE etc.

When the random access procedure is initiated, the UE may perform following actions in order:

>1: flush the buffer for Msg 3;

>1: initialize the counters for preamble transmission and power ramping;

>1: select the uplink carrier for performing the random access procedure based on a rsrp threshold (e.g. rsrp-ThresholdSSB-SUL);

>1: select the set of Random Access resources applicable to the current Random Access procedure;

>1: select a SSB based on a rsrp threshold (e.g. rsrp-ThresholdSSB); a SSB corresponds to a downlink beam;

>1: select a random access preamble group based on the pathloss of the selected SSB and the potential Msg3 size and various parameters (e.g. ra-Msg3SizeGroupA, preambleReceivedTargetPower, msg3-DeltaPreamble, messagePowerOffsetGroupB etc); Preamble group selection enables the UE to request bigger uplink grant for Msg 3 transmission if channel condition is good enough and the potential Msg 3 size is above a certain threshold;

>1: select a random access preamble randomly with equal probability from the random access preambles associated with the selected SSB and the selected random access preamble group;

>1: determine the next available PRACH occasion from the PRACH occasions corresponding to the selected SSB;

>1: determine the transmission power of the preamble;

>>2: preamble transmission power=pathloss+preambleReceivedTargetPower+DELTA_PREAMBLE+ (PREAMBLE_POWER_RAMPING_COUNTER−1)×

PREAMBLE_POWER_RAMPING_STEP+ POWER_OFFSET_2STEP_RA

>1: transmit the preamble in the determined PRACH occasion with the determined transmission power;

>1; start ra-ResponseWindow;

>1: monitor the PDCCH of the SpCell for Random Access Response(s) identified by the RA-RNTI while the ra-ResponseWindow is running;

>1: receive Random Access Response contains a MAC subPDU with Random Access Preamble identifier corresponding to the transmitted preamble;

>1: process the received Timing Advanced Command and the received UL grant;

>1: transmit a Msg 3 based on the received UL grant;

>>2: Msg 3 may contain e.g. CCCH SDU such as RRCSetupRequest or RRCResumeRequest;

>1: start ra-ContentionResolutionTimer;

>1: monitor the PDCCH while the ra-ContentionResolutionTimer is running;

>1: consider Contention Resolution successful when MAC PDU containing a UE Contention Resolution Identity MAC CE is received;

>1: consider the Random Access procedure successfully completed.

Sub-Band Full Duplex (SBFD) operation is supported for a TDD carrier, enabling simultaneous downlink transmission and uplink reception at the gNB on their respective sub-bands. From UE perspective, full duplex is not supported. The configurations of cell-specific SBFD time and frequency resources are provided through SIB1 or dedicated signalling.

If the GNB is SBBF capable, then GNB provides the configuration information for I-BWP and UL-DL-TDD configuration (time pattern information) in legacy signaling fields and provides the configuration information for SBFD in new signaling fields that only SBFD capable UE (herein after SBFD-UE) can comprehend.

Figure 4:
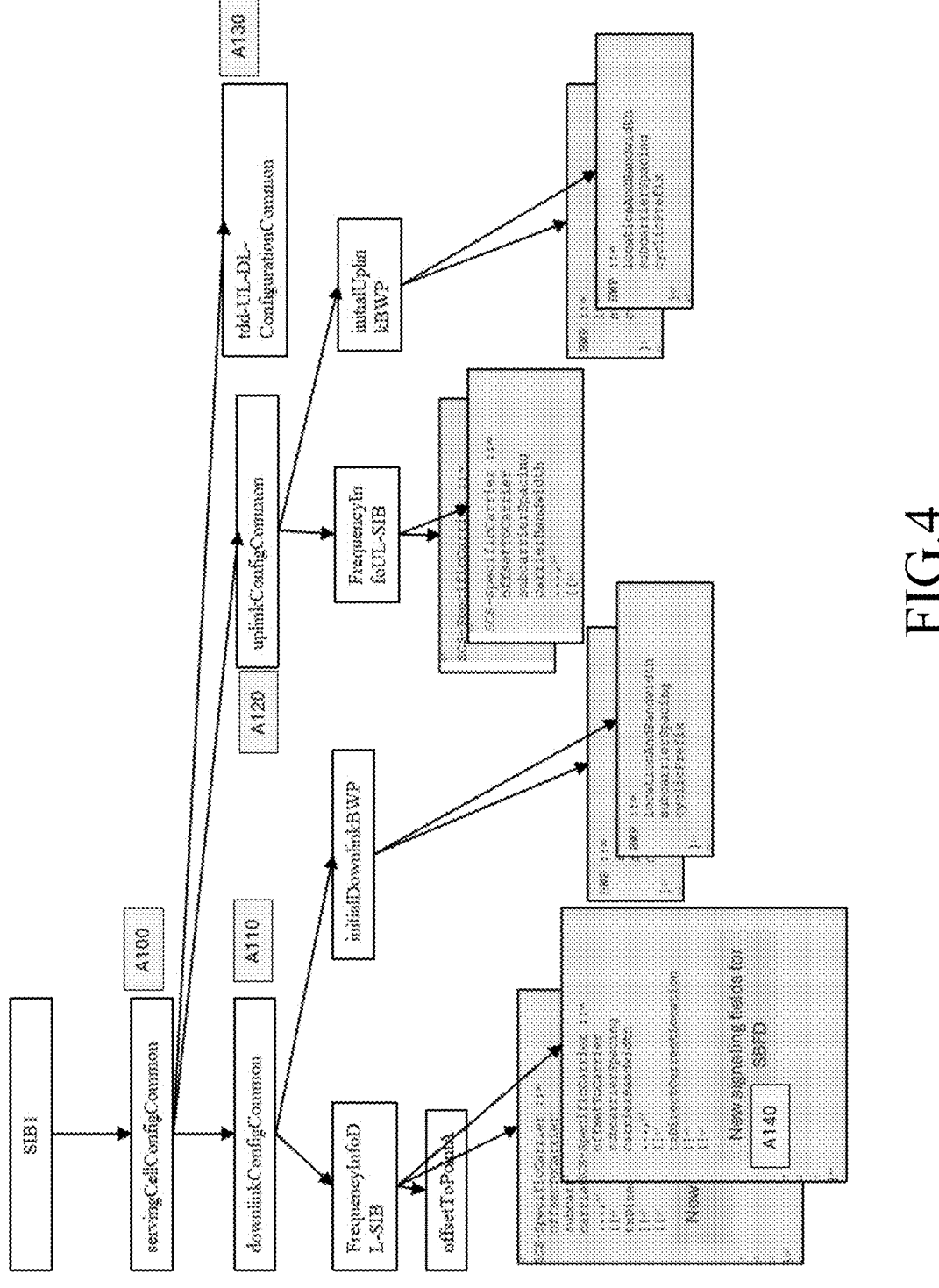
FIG. 4 is a diagram illustrating ASN.1 structure of SIB1 with regards to frequency domain resource.

FIG. 4 shows signaling structure of SIB1 for frequency resource structure of a cell.

servingCellCofnigCommon (A100) includes the IE ServingCellConfigCommonSIB that is used to configure cell specific parameters of a UE's serving cell in SIB1.

downlinkConfigCommon (A110) includes the IE DownlinkConfigCommonSIB that provides common downlink parameters of a cell.

UplinkConfigCommon (A120) includes the IE UplinkConfigCommonSIB that provides common uplink parameters of a cell.

tdd-UL-DL-ConfigurationCommon (A130) includes the IE TDD-UL-DL-ConfigCommon that determines the cell specific Uplink/Downlink TDD configuration.

The IE FrequencyInfoDL-SIB provides basic parameters of a downlink carrier and transmission.

```
FrequencyInfoDL-SIB ::=    SEQUENCE {
    frequencyBandList        MultiFrequencyBandListNR-SIB,
    offsetToPointA           INTEGER (0..2199),
    scs-SpecificCarrierList  SEQUENCE (SIZE (1..maxSCSs))
                             OF SCS-
SpecificCarrier
}
``` offsetToPointA field represents the offset to Point A. offset to Point A provides the reference point for SCS-specific carrier list. Point A serves as a common reference point for resource block grids.

scs-SpecificCarrierList field indicates a set of carriers for different subcarrier spacings (numerologies). In case that the cell is configured with more than one SCS, a SCS-Specific-Carrier IE is provided per SCS.

The IE SCS-SpecificCarrier provides parameters determining the location and width of the actual carrier or the carrier bandwidth of given direction. It is defined specifically for a numerology (subcarrier spacing (SCS)) and in relation (frequency offset) to Point A.

```
SCS-SpecificCarrier ::=          SEQUENCE {
    offsetToCarrier              INTEGER (0..2199),
    subcarrierSpacing            SubcarrierSpacing,
    carrierBandwidth                                  INTEGER
(1..maxNrofPhysicalResourceBlocks),
    ...,
    [[
    txDirectCurrentLocation                 INTEGER (0..4095)
OPTIONAL        -- Need S
    ]]
    }
``` carrierBandwidth field indicates width of this carrier in number of PRBs (using the subcarrierSpacing defined for this carrier).

offsetToCarrier field indicates offset in frequency domain between Point A (lowest subcarrier of common RB 0) and the lowest usable subcarrier on this carrier in number of PRBs (using the subcarrierSpacing defined for this carrier).

subcarrierSpacing field indicates subcarrier spacing of this carrier. It is used to convert the offsetToCarrier into an actual frequency.

The IE SCS-SpecificCarrier for downlink carrier (e.g. SCS-SpecificCarrier in FrequencyInfoDL-SIB) further includes new signaling fields for SBFD time/frequency resource.

The IE SCS-SpecificCarrier for uplink carrier (e.g. SCS-SpecificCarrier in FrequencyInfoUL-SIB) further includes new signaling fields for SBFD time/frequency resource (A140).

initialDownlinkBWP field includes a BWP IE that is specific to initial downlink BWP.

The IE BWP is used to configure generic parameters of a bandwidth part.

```
BWP ::=                          SEQUENCE {
    locationAndBandwidth         INTEGER (0..37949),
    subcarrierSpacing            SubcarrierSpacing,
```

-continued

```
    cyclicPrefix                             ENUMERATED { extended }
OPTIONAL    -- Need R
    }
``` cyclicPrefix field indicates whether to use the extended cyclic prefix for this bandwidth part. If not set, the UE uses the normal cyclic prefix.

locationAndBandwidth field indicates frequency domain location and bandwidth of this bandwidth part. The value of the field shall be interpreted as resource indicator value (RIV). A RIV indicates a set of consecutive PRBs. The first PRB is a PRB determined by subcarrierSpacing of this BWP and offsetToCarrier associated with this subcarrier spacing. In case of TDD, a BWP-pair (UL BWP and DL BWP with the same bwp-Id) must have the same center frequency.

subcarrierSpacing field indicates subcarrier spacing to be used in this BWP for all channels and reference signals unless explicitly configured elsewhere.

Figure 5:
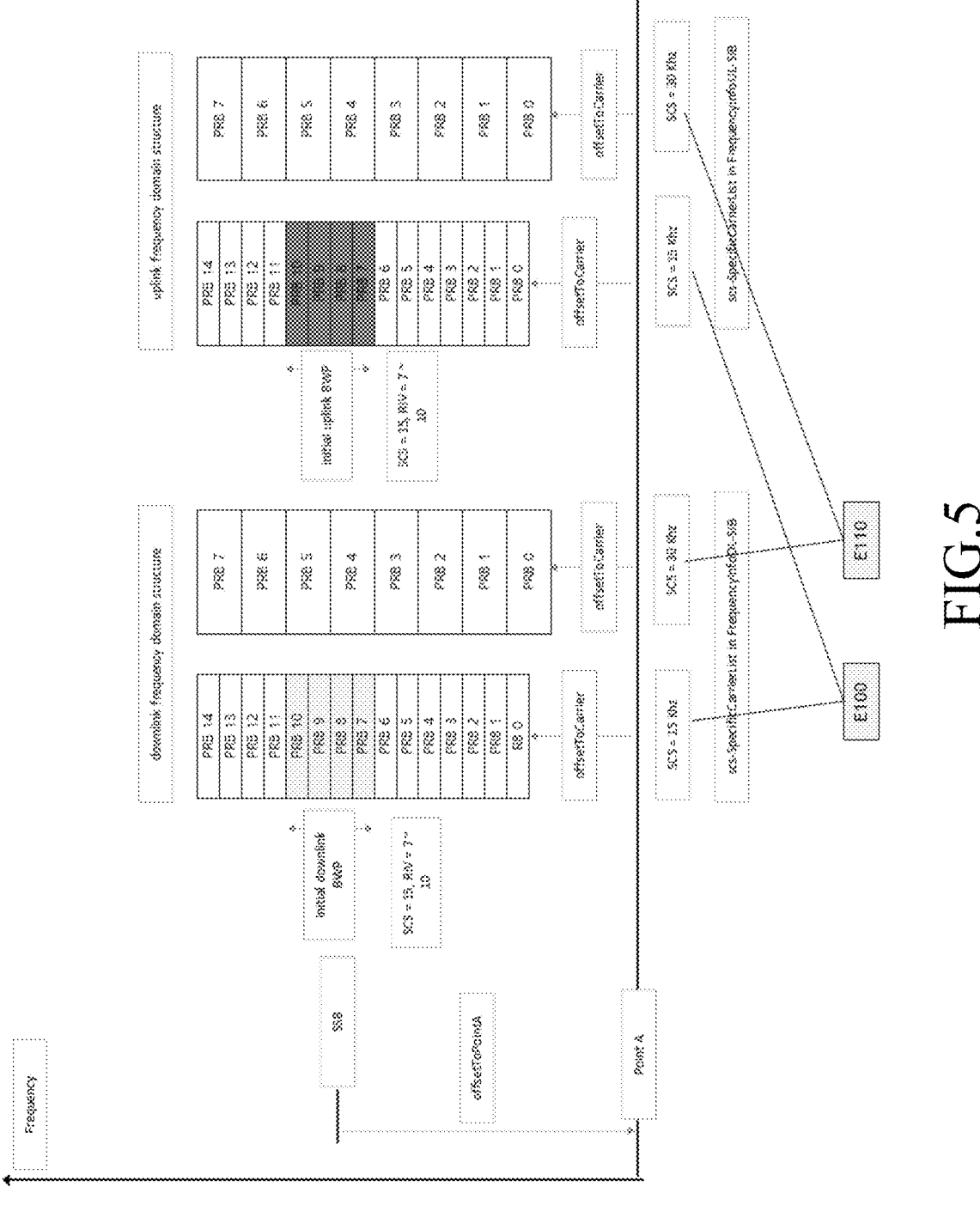
FIG. 5 illustrates an example of frequency domain resource structure.

FIG. 5 shows an example of frequency domain structure.

One can understand that SCS-SpecificCarrier for 15 KHz (E100) indicates the overall frequency domain structure of the concerned link based on 15 KHz SCS (e.g. 1 PRB=12*15 KHz) and SCS-SpecificCarrier for 30 KHz (E110) indicates the overall frequency domain structure of the concerned link based on 30 KHz SCS (e.g. 1 PRB=12*30 KHz).

UE determines the PRBs to be used for transmission/reception based on the SCS of the active BWP.

UE determines location and bandwidth (e.g. frequency domain structure) of the initial bandwidth parts based on BWP IE and SCS-SpecificCarrier IE of which SCS is same as the initial bandwidth parts.

Figure 6:
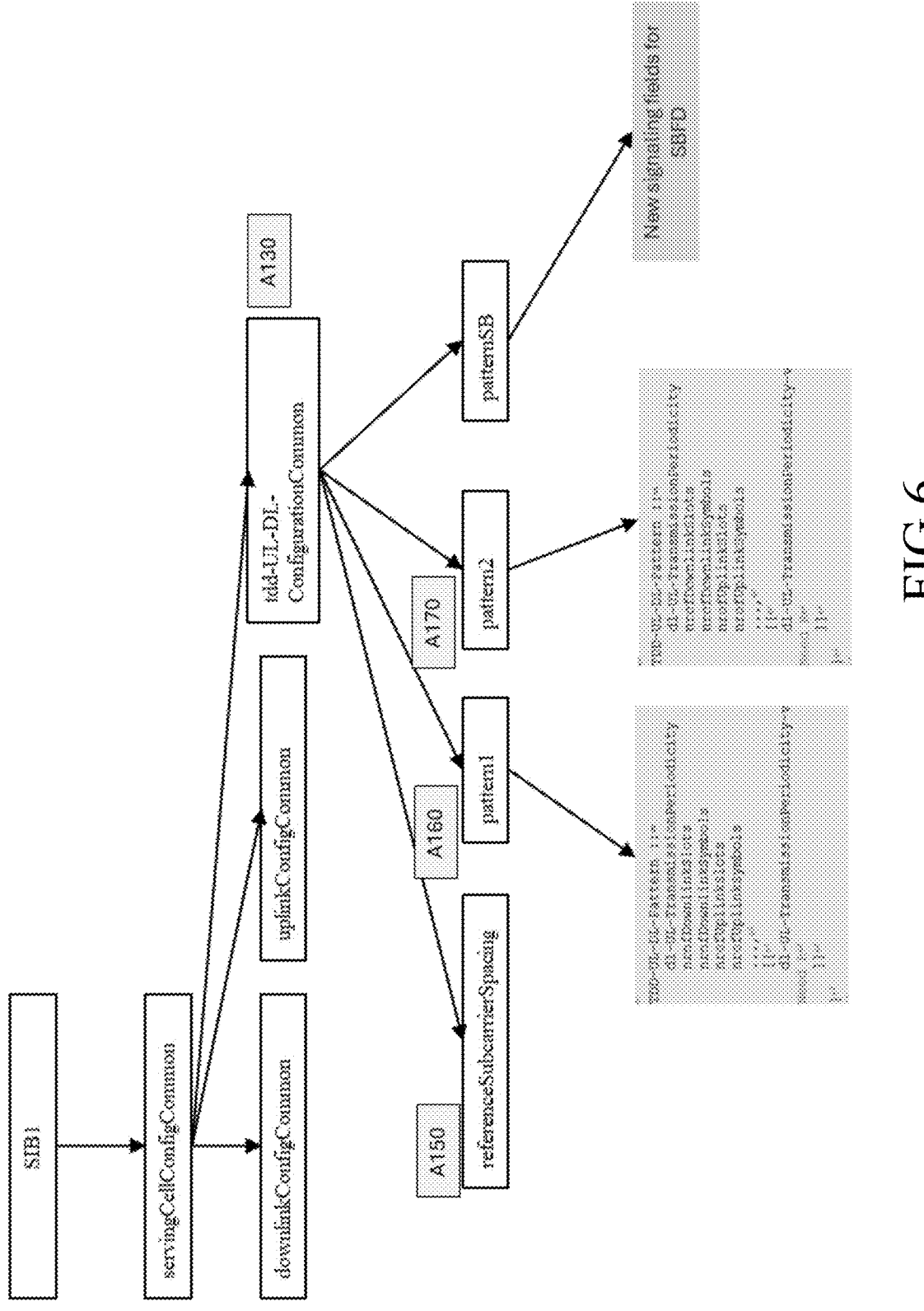
FIG. 6 is a diagram illustrating ASN.1 structure of SIB1 with regards to time domain resource.
Figure 7:
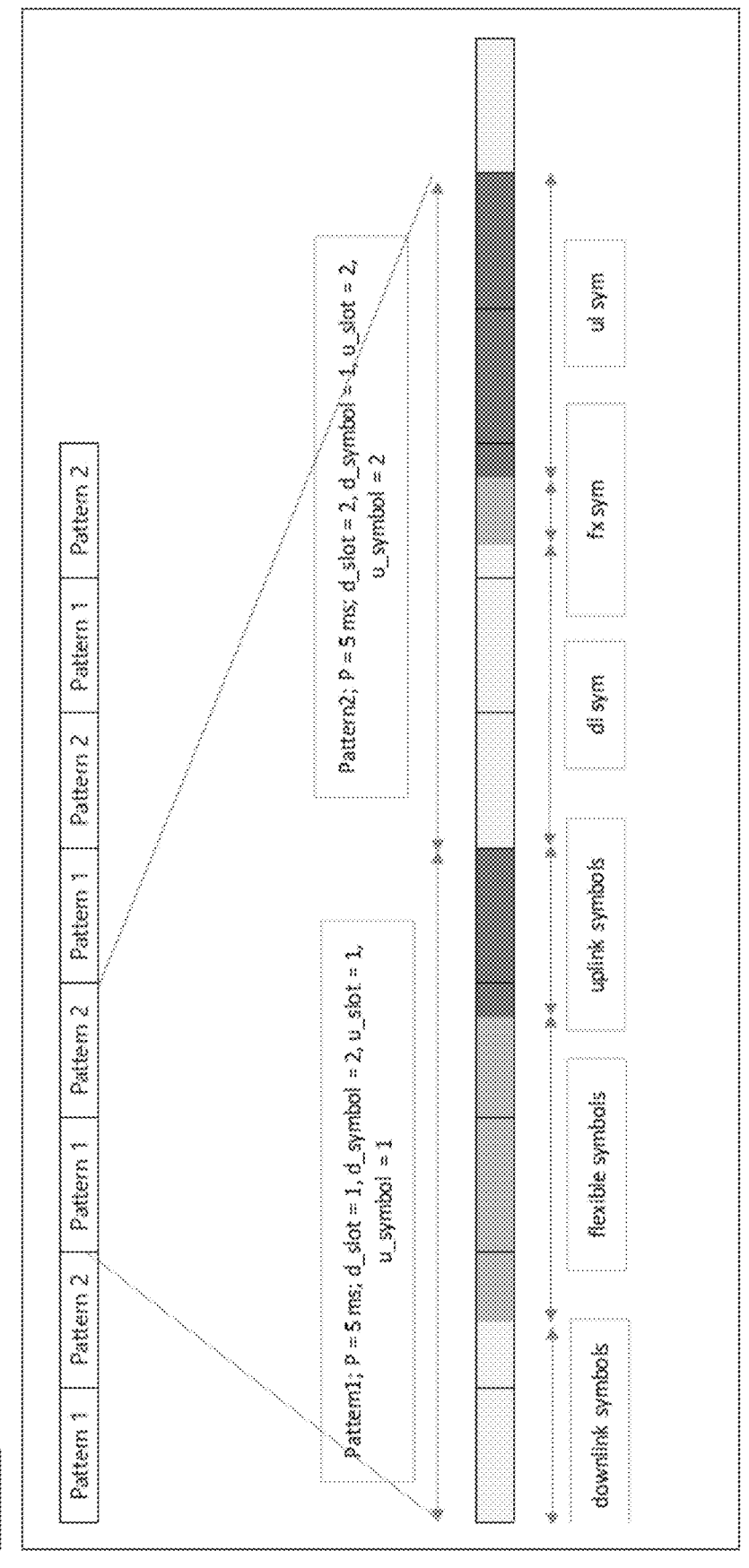
FIG. 7 illustrates an example of time domain structure.
Figure 8:
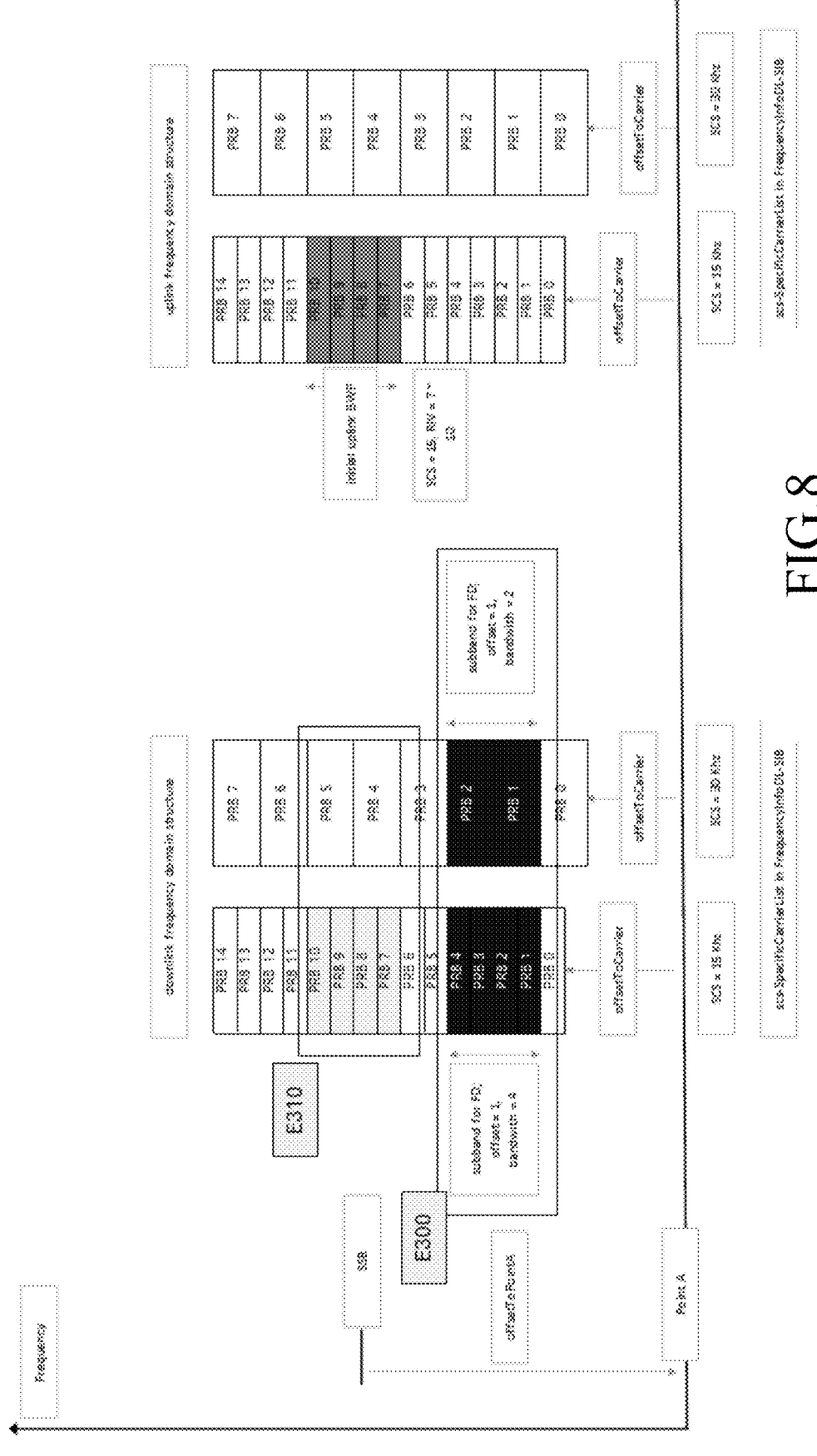
FIG. 8 illustrates another example of frequency domain structure.
Figure 9:
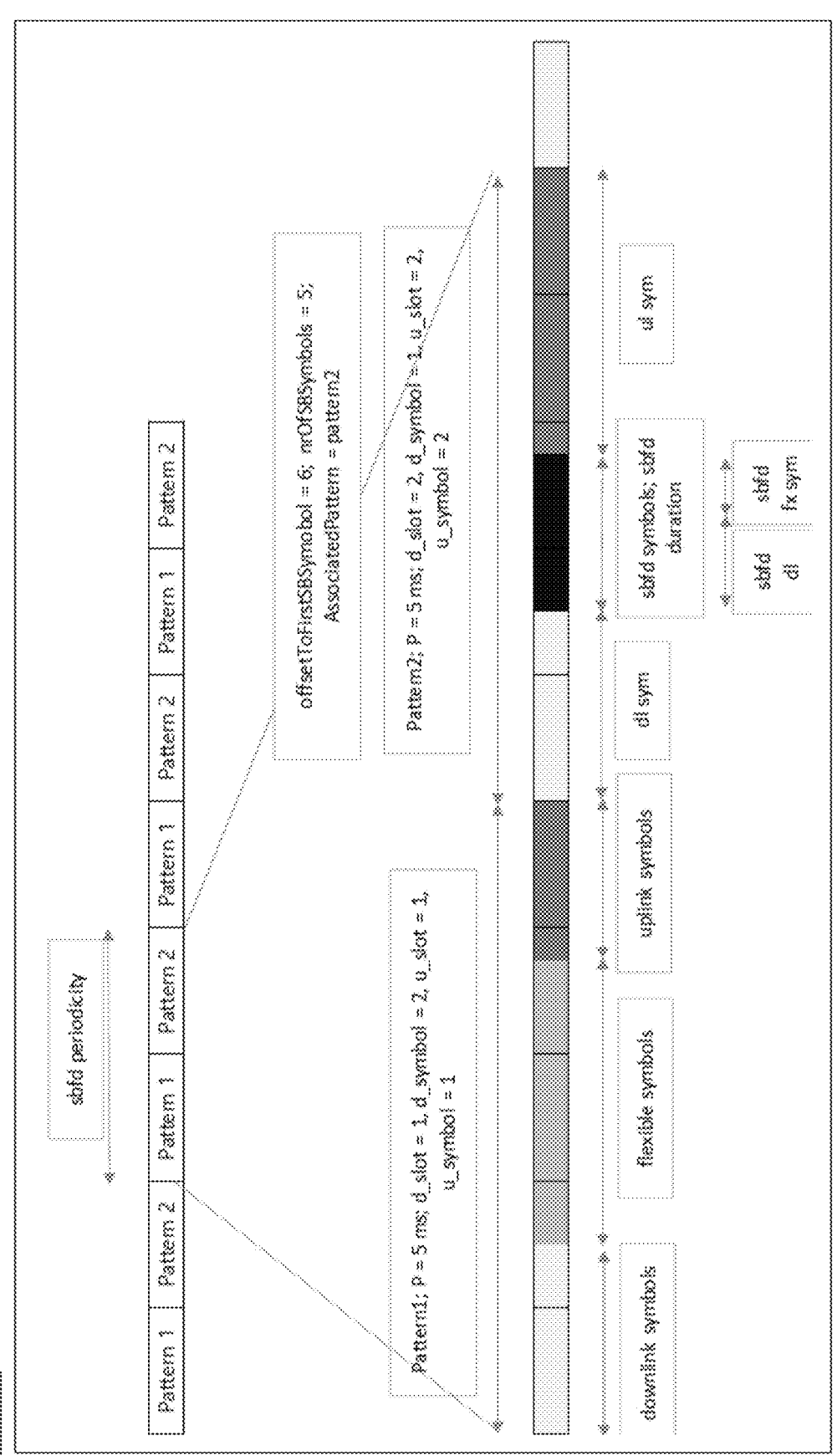
FIG. 9 illustrates another example of time domain structure.
Figure 10:
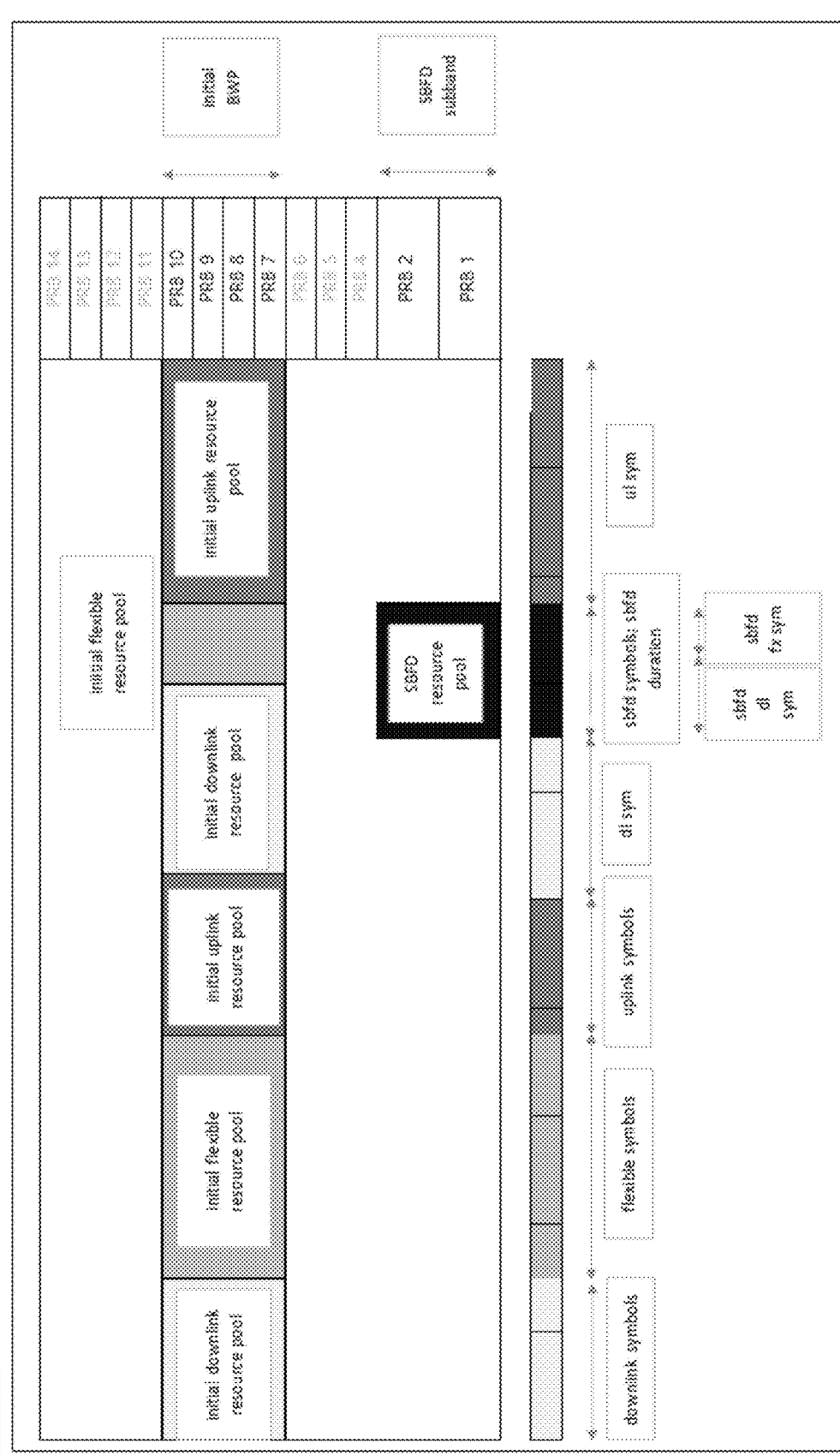
FIG. 10 illustrates an example of resource pools.
Figure 11:
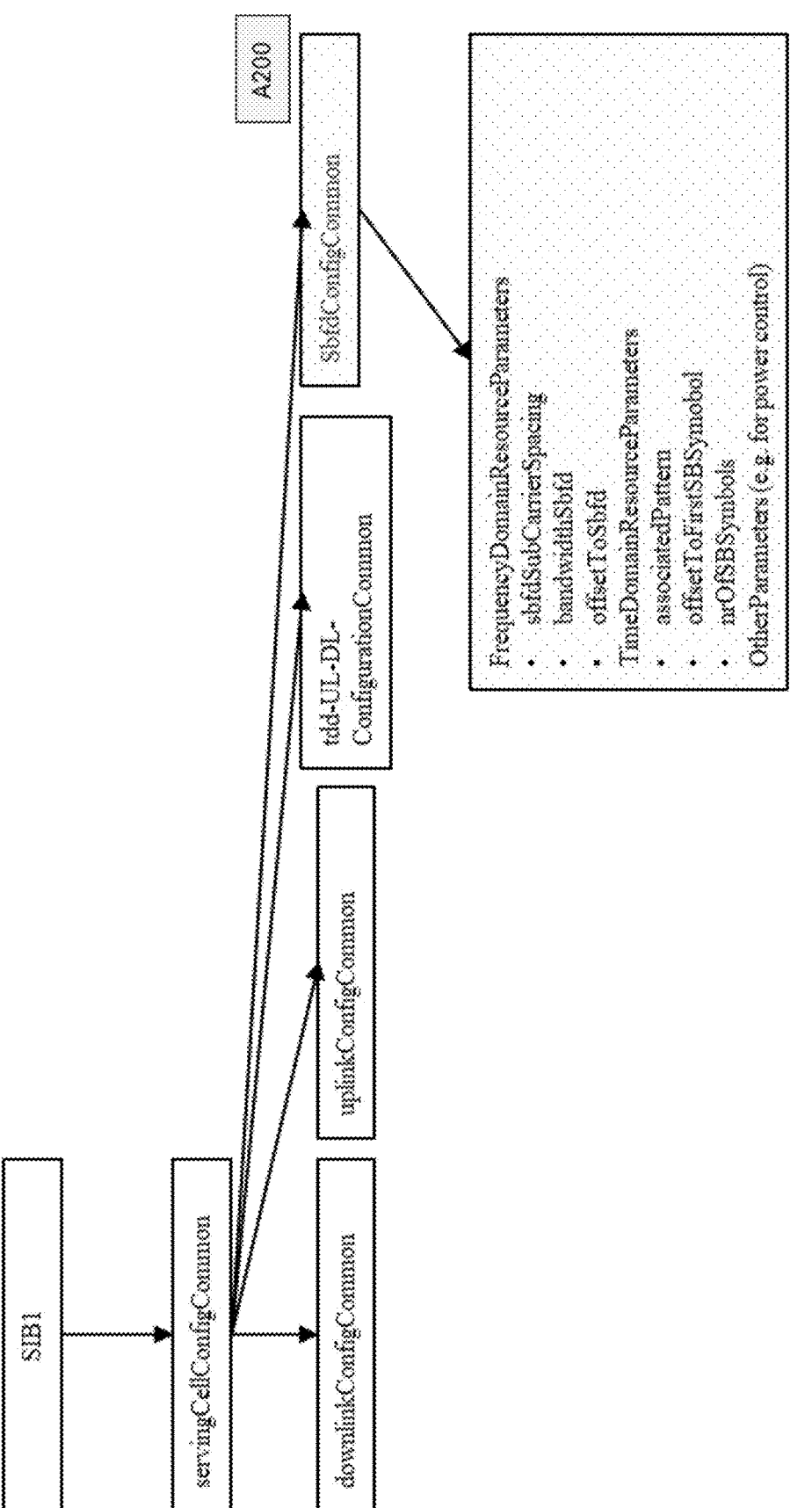
FIG. 11 is a diagram illustrating ASN.1 structure of SIB1 with regards to SBFD configuration.

FIG. 6 shows signaling structure of SIB1 for time resource structure of a cell.

tdd-UL-DL-ConfigCommon field (A130) includes the IE TDD-UL-DL-ConfigCommon that determines the cell specific Uplink/Downlink TDD configuration.

ReferenceSubcarrierSpacing field (A150) indicates a subcarrier spacing that is reference SCS used to determine the time domain boundaries in the UL-DL pattern which must be common across all subcarrier specific carriers, i.e., independent of the actual subcarrier spacing using for data transmission. It is necessary because slot length is SCS specific (1 ms in case of 15 KHz SCS, 0.5 ms in case of 30 KHz, 0.25 ms in case of 60 KHz and so on) and a cell may have multiple SCSs.

pattern1 field (A160) and pattern2 field (A170) include TDD-UL-DL-Pattern IE.

```
TDD-UL-DL-Pattern ::=                    SEQUENCE {
    dl-UL-TransmissionPeriodicity            ENUMERATED {ms0p5, ms0p625, ms1,
ms1p25, ms2, ms2p5, ms5, ms10},
    nrofDownlinkSlots                            INTEGER (0..maxNrofSlots),
    nrofDownlinkSymbols                              INTEGER (0..maxNrofSymbols-1),
    nrofUplinkSlots                          INTEGER (0..maxNrofSlots),
    nrofUplinkSymbols                                INTEGER (0..maxNrofSymbols-1),
    ...,
    [[
    dl-UL-TransmissionPeriodicity-v1530              ENUMERATED {ms3, ms4}
OPTIONAL -- Need R
    ]]
    }
``` dl-UL-TransmissionPeriodicity field indicates periodicity of the DL-UL pattern (hereafter periodicity of DL-UL pattern, periodicity of Pattern and slot configuration period are used interchangeably).

nrofDownlinkSlots field indicates number of consecutive full DL slots at the beginning of each DL-UL pattern.

nrofDownlinkSymbols field indicates number of consecutive DL symbols in the beginning of the slot following the last full DL slot (as derived from nrofDownlinkSlots). The value 0 indicates that there is no partial-downlink slot.

nrofUplinkSlots field indicates number of consecutive full UL slots at the end of each DL-UL pattern.

nrofUplinkSymbols fields indicates number of consecutive UL symbols in the end of the slot preceding the first full UL slot (as derived from nrofUplinkSlots).

Based on pattern1 and pattern 2, UE determines DL symbols and UL symbols and flexible symbols.

A slot format includes downlink symbols, uplink symbols, and flexible symbols.

If a UE is provided tdd-UL-DL-ConfigurationCommon, the UE sets the slot format per slot over a number of slots as indicated by tdd-UL-DL-ConfigurationCommon.

The tdd-UL-DL-ConfigurationCommon provides
>: a reference SCS by referenceSubcarrierSpacing
>: a pattern1.
The pattern1 provides
>: a slot configuration period of P msec by dl-UL-TransmissionPeriodicity
>: a number of slots d_slot with only downlink symbols by nrofDownlinkSlots
>: a number of downlink symbols d_sym by nrofDownlinkSymbols
>: a number of slots u_slots with only uplink symbols by nrofUplinkSlots
>: a number of uplink symbols u_sym by nrofUplinkSymbols A slot configuration period of P msec includes S=P*slot_scs slots. With reference SCS being 15 Khz, slot_scs=1. With reference SCS being 30 Khz, slot_scs=2. With reference SCS being 60 Khz, slot_scs=4. With reference SCS being 120 Khz, slot_scs=8. From the slots, a first d_slots slots include only downlink symbols and a last u_slots slots include only uplink symbols. The d_sym symbols after the first d_slots slots are downlink symbols. The u_sym symbols before the last u_slots slots are uplink symbols. The remaining symbols are flexible symbols.

The first symbol every 20/P periods is a first symbol in an even frame.

If tdd-UL-DL-ConfigurationCommon provides both pattern1 and pattern2, the UE sets the slot format per slot over a first number of slots as indicated by pattern1 and the UE sets the slot format per slot over a second number of slots as indicated by pattern2.

E200 shows an example where Pattern1 and Pattern2 alternates.

In short, for frequency domain cell structure:
>: offsetToCarrier and carrierBandwidth in SCS-SpecificCarrier IE in FrequencyInfoDL-SIB defines frequency domain PRB structure of downlink carrier of the cell.
>: offsetToCarrier and carrierBandwidth in SCS-SpecificCarrier IE in FrequencyInfoUL-SIB defines frequency domain PRB structure of uplink carrier of the cell.
For time domain cell structure:
>: dl-UL-TransmissionPeriodicity, nrofDownlinkSlots, nrofDownlinkSymbols, nrofUplinkSlots and nrofUplinkSymbols defines downlink symbols, flexible symbols and uplink symbols of the cell.

To define SBFD time/frequency structure in conjunction with the existing cell time/frequency structure, new parameters are introduced.

To allow non-SBFD terminals to operate in the cell, SBFD frequency resource (E300) shall not be overlapped with initial downlink BWP (E310). Base station may allocate SBFD frequency resource in consecutive RBs that may cause least cross link interference. It could be achieved by placing SBFD frequency resource/location most apart from SSB of the cell (either CD-SSB or NCD-SSB). It could be achieved by placing SBFD frequency resource/location apart from important reference signal such as PRS or CSI-RS. To ensure such deployment, signaling flexibility shall be ensured. In addition, since SBFD structure is carried in system information, the size is also important (smaller better).

A Cell may be deployed with more than one subcarrier spacings (e.g. SCS x in upper part and SCS y in lower part). In such case, more than one SCS-SpecificCarrier IEs are included in the system information. SBFD frequency resource information shall be indicated in at least one of more than one SCS-SpecificCarrier. The information may indicate offset and bandwidth. Since SBFD frequency resource is utilized for uplink transmission, guard band may need to be inserted between SBFD resource and non-SBFD resource. However, this information does not need to be broadcast in the system information because downlink reception is limited to initial downlink BWP for idle/active UE. Guard band information may be informed to connected mode UE via RRC signaling.

For each SCS-SpecificCarrier IE for downlink, following fields are added in extension part.
>: BandwidthSbfd field indicates width of the SBFD subband (e.g. subband for opposite direction) in number of PRBs (using the subcarrierSpacing defined for this carrier). One PBR occupies 180 KHz in 15 KHz SCS, 360 in 30, 720 in 60 and 1440 in 120.
>: offsetToSbfd field indicates offset in frequency domain between the lowest usable subcarrier on this carrier and the lowest usable subcarrier of the SBFD subband in number of PRBs (using the subcarrierSpacing defined for this carrier).
>: sbfdSCSInd field indicates that SCS corresponding to this SCS-SpecificCarrier IE is the SCS for SBFD subband.

Alternatively, offsetToSub and BandwidthSub are signaled/configured only for a specific SCS, wherein the specific SCS is the SCS that is used on the SBFD subband. For example, if 30 KHz SCS is applied to SBFD subband while 15 KHz SCS is applied to initial downlink BWP, SCS-SpecificCarrier IE for 30 KHz includes SBFD specific fields while SCS-SpecificCarrier IE for 15 KHz does not.

Since the purpose of the SBFD is to allow more uplink opportunities, UL symbols are not subject to SBFD operation. Number of SBFD symbols occurs during a SBFD duration. A SBFD duration occurs every SBFD periodicity.

A downlink symbol is a symbol where downlink signal (no uplink signal, no sidelink signal) is transmitted on entire PRBs of the cell.

An uplink symbol is a symbol where:
>: uplink signal is transmitted on first PRBs of the cell; and
>: sidelink signal is transmitted on second PRBs of the cell, wherein union/sum of first PRBs and second PRBs are entire PRBs of the cell.

A flexible symbol is a symbol, depending on scheduling/configuration, where:

>: either downlink signal is transmitted on entire PRBs of the cell; or

>: uplink signal on first PRBs and sidelink signal on second PRBs are transmitted.

A SBFD symbol is a symbol, depending on scheduling/configuration by the base station, where:

>: downlink signal is transmitted on third PRBs of the cell; and

>: uplink signal is transmitted on fourth PRBs of the cell, wherein union/sum of third PRBs and fourth PRBs are entire PRBs of the cell.

E400 shows an example where sbfd symbols are configured.

Followings can be noted.

>: In case that only pattern1 is configured:

>>: A single SBFD duration occurs every P1 (tdd-UL-DL-ConfigurationCommon of pattern1); SBFD periodicity=P1;

>>: A SBFD duration consists of:

>>>: consecutive downlink symbols; or

>>>: consecutive downlink symbols and flexible symbols, wherein starting from a specific downlink symbol and ending at a specific flexible symbol; or >>>: consecutive flexible symbols.

>: In case that both pattern1 and pattern2 are configured:

>>: A single SBFD duration occurs every P1+P2 (tdd-UL-DL-ConfigurationCommon of pattern2); SBFD periodity=P1+P2;

>>: A SBFD duration starts and ends during the pattern1 or during the pattern2 (first SBFD symbol and last SBFD symbol are within the same pattern).

>>: A SBFD duration consists of:

>>>: consecutive downlink symbols of pattern1; or

>>>: consecutive downlink symbols of pattern2; or

>>>: consecutive downlink symbols of pattern1 and consecutive flexible symbols of pattern1; or >>>: consecutive downlink symbols of pattern2 and consecutive flexible symbols of pattern2; or >>>: consecutive flexible symbols of pattern1.

>>>: consecutive flexible symbols of pattern2.

If SBFD is configured, TDD-UL-DL-ConfigCommon IE may include following fields in addition to the existing fields.

>: offsetToFirstSBSymobol: This field indicates the offset to the first SBFD symbol during a SBFD periodicity.

>>: includes an integer; INTEGER (0..maxNrofSymbolsPerSbfdPeriodicity)

>>: the integer indicates number of symbols between the first symbol of the associated pattern (or the first symbol of the slot configuration period) and first symbol of SBFD duration (or first SBFD symbol);

>>: maxNrofSymbolsPerSbfdPeriodicity is determined based on SBFD periodicity and SCS indicated by referenceSubcarrierSpacing field.

>>>: maxNrofSymbolsPerSbfdPeriodicity=SBFD periodicity*SCS_symbol;

SCS_symbol=14*SCS_coefficient; SCS_coefficient=1 (SCS 15 KHz) or 2 (SCS 30 KHz) or 4 (SCS 60 KHz) or 8 (SCS 120 KHz)

>>>: SBFD periodicity=P1 if only pattern1 is configured and P1+P2 if both pattern1 and pattern2 are configured.

>: nrOfSBSymbols: This field indicates the number of consecutive SBFD symbols during a SBFD periodicity (or of a SBFD duration).

>>: includes an integer; INTEGER (0..maxNrofSbfdSymbols)

>>: the integer indicates number of symbols within the SBFD duration;

>>: maxNrofSbfdSymbols is determined based on slot configuration period (P1 or P2) and SCS indicated by referenceSubcarrierSpacing field.

>>>: maxNrofSbfdSymbols=slot configuration period*SCS_symbol;

>>>: slot configuration period=P1 if SBFD duration is associated with pattern1 and P2 if SBFD duration is associated with pattern2.

>: associatedPattern: This field indicates which pattern between pattern1 and pattern2 the SBFD duration resides in (associated to). If this field is absent, SBFD duration is associated with pattern1.

Based on SBFD frequency domain structure and time domain structure, the overall structure is determined as below (e.g. the combination of the frequency domain location and time domain location).

In IDLE/INACTIVE UE perspective:

>: Downlink resource is:

>>: PRBs of initial BWP during downlink symbols; and

>>: PRBs of initial BWP during SBFD_downlink symbols.

>: Uplink resource is:

>>: PRBs of initial BWP during uplink symbols; and

>>: PRBs of SBFD subband during SBFD duration/SBFD symbols (both SBFD_downlink symbols and SBFD_flexible symbols);

>: Flexible resource is:

>>: PRBs of initial BWP during flexible symbols; and

>>: PRBs of initial BWP during SBFD_flexible symbols

SBFD_downlink symbol is a symbol which is downlink symbol according to parameters in TDD-UL-DL-Pattern and SBFD symbol according to parameters in SBFD-Pattern.

SBFD_flexible symbol is a symbol which is flexible symbol according to parameters in TDD-UL-DL-Pattern and SBFD symbol according to parameters in SBFD-Pattern.

E500 shows an example of SBFD frequency domain structure and time domain structure.

Alternatively, those fields related to SBFD resources are contained in a single/new IE (A200) to minimize the impact to the legacy UEs.

Figure 12:
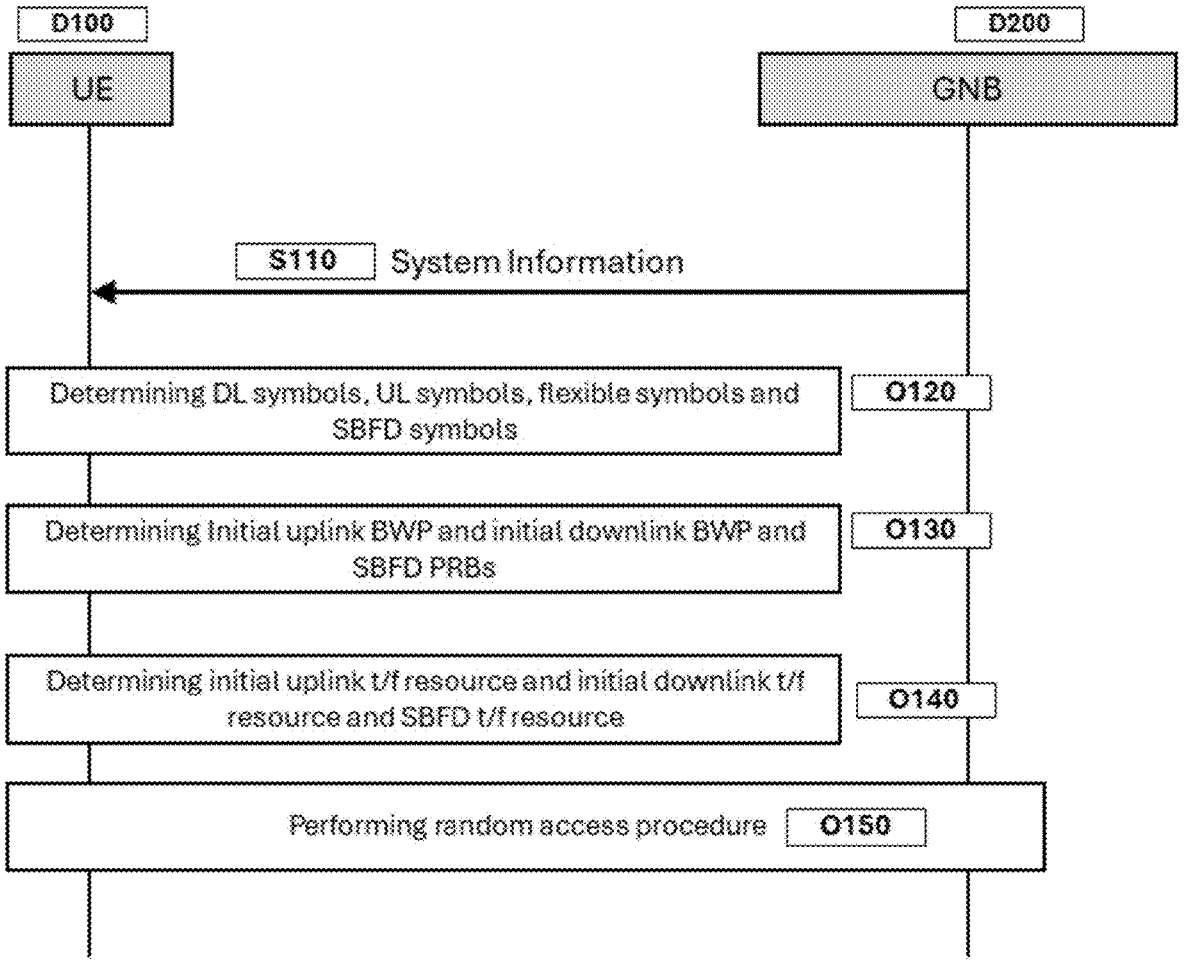
FIG. 12 illustrates overall operation of the UE and GNB.

FIG. 12 illustrates operations of UE and GNB.

At S110, UE (D100) receives from GNB (D200) system information.

The system information includes:

>: information on initial downlink BWP;

>: information on initial uplink BWP;

>: information on uplink carrier for a first SCS;

>: information on uplink carrier for a second SCS;

>: information on downlink carrier for the first SCS;

>: information on downlink carrier for the second SCS;

>: information on uplink-downlink slot configuration;

At O120, UE determines DL symbols and UL symbols and flexible symbols and SBFD symbols based on relevant information.

The information on uplink-downlink slot configuration includes a first set of parameters for slot configuration and a second set of parameters for slot configuration. The UE determines downlink symbols and flexible symbols and uplink symbols based on the first set of parameters for slot configuration. The UE determines SBFD symbols from the downlink symbols and flexible symbols based on the second set of parameters for slot configuration.

>: Downlink Symbol is a symbol that is:

>>: downlink symbol according to the first set of parameters for slot configuration; and >>: not SBFD symbol according to the second set of parameters for slot configuration;

>: Flexible Symbol is a symbol that is:

>>: flexible symbol (neither downlink symbol nor uplink symbol) according to the first set of parameters for slot configuration; and >>: not SBFD symbol according to the second set of parameters for slot configuration;

>: SBFD Symbol is a symbol that is:

>>: downlink symbol according to the first set of parameters for slot configuration; and SBFD symbol according to the second set of parameters for slot configuration; OR >>: flexible symbol according to the first set of parameters for slot configuration; and SBFD symbol according to the second set of parameters for slot configuration;

>: Uplink Symbol is a symbol that is:

>>: uplink symbol according to the first set of parameters for slot configuration.

At O130, UE determines PRBs for initial uplink BWP and PRBs for initial downlink BWP and SBFD PRBs based on relevant information.

The information on downlink carrier for the first SCS includes set of parameters for SBFD frequency location specific to the first SCS. The information on downlink carrier for the second SCS includes set of parameters for SBFD frequency location specific to the second SCS.

UE determines the PRB structure of the uplink carrier specific to the first SCS based on the information on uplink carrier for the first SCS. UE determines the PRB structure of the uplink carrier specific to the second SCS based on the information on uplink carrier for the second SCS.

UE determines the PRB structure of the downlink carrier specific to the first SCS based on the information on downlink carrier for the first SCS. UE determines the PRB structure of the downlink carrier specific to the second SCS based on the information on downlink carrier for the second SCS.

UE determines the SBFD PRBs specific to the first SCS based on the set of parameters for SBFD frequency location specific to the first SCS. UE determines the SBFD PRBs specific to the second SCS based on the set of parameters for SBFD frequency location specific to the second SCS.

UE determines SCS of the initial uplink BWP based on subcarrierSpacing field of BWP IE for initial downlink BWP.

UE determines SCS of SBFD PRBs based on sbfdSCSInd field or sbfdSubCarrierSpacing field or specific SCS-SpecificCarrier. SCS of SBFD PRBs are applied to uplink transmission in SBFD resources.

UE determines PRBs for initial uplink BWP based on information on initial uplink BWP and information on uplink carrier for a specific SCS. The specific SCS is SCS indicated in the information on initial downlink BWP.

UE determines PRBs for initial downlink BWP based on information on initial downlink BWP and information on downlink carrier for a specific SCS. The specific SCS is SCS indicated in the information on initial downlink BWP.

UE determines PRBs for SBFD resources based on information on downlink carrier for a second specific SCS. The second specific SCS is the SCS of SBFD PRBs determined based on sbfdSCSInd field or sbfdSubCarrierSpacing field or specific SCS-SpecificCarrier IE. PRBs for SBFD resources are used for uplink transmission.

At O140, UE determines initial uplink resource pool and initial downlink resource pool and SBFD resource pool based on determined symbols and PRBs.

At O150, UE performs random access procedure based on initial uplink resource pool and initial downlink resource pool or based on SBFD resource pool and initial downlink resource pool.

Initial downlink resource pool is set of downlink resources where IDLE/INACTIVE UE performs initial access (e.g. RAR reception and PDCCH monitoring for Msg 3 retransmission and Msg 4 reception) and paging reception and system information reception. An initial downlink resource is pair of a PRB of initial downlink BWP and downlink-specific symbols.

Initial uplink resource pool is set of uplink resources where IDLE/INACTIVE UE performs initial access (e.g. PRACH preamble transmission and PUSCH transmission for Msg 3 and HARQ ACK transmission for Msg 4). An initial uplink resource is pair of a PRB of initial uplink BWP and uplink-specific symbols.

SBFD resource pool is set of SBFD resource where IDLE/INACTIVE UE performs initial access (e.g. PRACH preamble transmission and PUSCH transmission for Msg 3 and HARQ ACK transmission for Msg 4). An SBFD resource is pair of a SBFD PRB and SBFD symbol.

Downlink-specific symbol is either:

>: downlink symbol; or

>: flexible symbol that belongs to:

>>: CORESET associated with searchSpaceSIB1 or SearchSpaceOtherSystem or ra-SearchSpace or pagingSearchSpace.

Uplink-specific symbol is either:

>: uplink symbol; or

>: flexible symbol that belongs to RACH occasion (according to PRACH-configIndex of RACH-ConfigComon for initial Uplink BWP)

UE performs random access procedure with GNB based on the determination O160.

UE performs preamble transmission either on the initial uplink resources or on SBFD resources.

UE performs RAR reception on initial downlink resources.

UE performs Msg 3 transmission either on initial uplink time/frequency resources or on SBFD time/frequency resources.

UE performs Msg 4 reception on initial downlink resources.

UE performs random access procedures for various purposes. Latency/delay to complete the random access procedure affects user experiences. For example, when random access is triggered for initial access, longer random access delay leads to longer latency for service initiation. When random access is triggered for handover, longer random access delay leads to longer service interruption.

A RACH Occasion (RO) is an area specified in time and frequency domain (or time-frequency resource) that are available for the reception/transmission of a RACH preamble.

In a cell, a plurality of ROs are configured. One can understand number of ROs during a time unit is RO density. RO density has significant impact to random access delay since UE first wait until the first available RO occurs. In TDD system, it is not possible to densify ROs because RO cannot be configured in downlink symbols. This limitation can be alleviated to some extent by applying SBFD to random access procedure.

The basic idea is to configure ROs in SBFD resources as well. Since SBFD resource and initial uplink resource are discrete in frequency domain (and time domain as well), preamble transmission better be limited to either on legacy ROs or on SBFD ROs. Since legacy UEs are not able to transmit preamble on SBFD ROs, GNB should make sure that signaling related to SBFD random access (SBFD RA) are put into proper place such that only SBFD UEs decode them. GNB should also ensure that parameters that are common to SBFD RA and SBHD (sub-band half duplex; random access performed based on RO in initial uplink/ flexible resources) RA are signaled only once.

Figure 13:
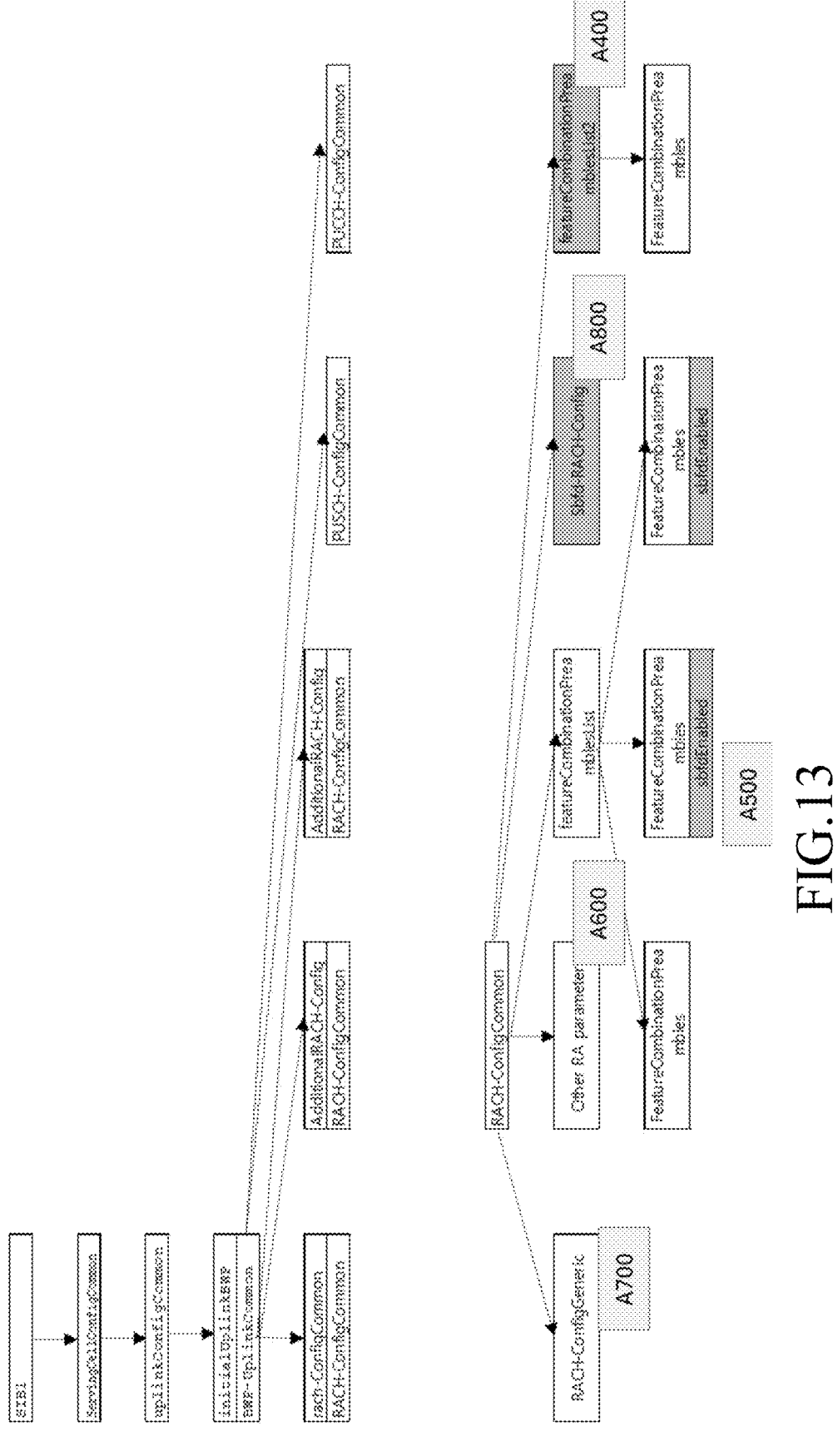
FIG. 13 is a diagram illustrating ASN.1 structure of SIB1 with regards to RACH configuration.

FIG. 13 illustrates signaling structure for random access of INACTIVE UEs.

Conventional INACTIVE UE performs random access (RA) in initial uplink BWP (first frequency region) and initial downlink BWP (second frequency region). Parameters for RA are contained in containers called RACH-ConfigCommon (IE for RACH configuration). BWP-UplinkCommon (uplink BWP common configurations; IE for first frequency region) for the initial uplink BWP may comprise one or more RACH-ConfigCommon to support PRACH partitioning for various feature combinations. It is to enable GNB to know which feature (or feature combination) triggers the random access as early as possible (e.g. when preamble is received). Each of RACH-ConfigCommon may comprise RA parameters for feature combinations.

One can consider defining more RACH-ConfigCommon that are specific to SBFD-RA. This approach complicates the signaling structure and increases signaling overhead since 1) many parameters are commonly applied to SBHD RA and SBFD RA and 2) SBFD-RA specific RACH-ConfigCommon may need to be configured for each feature combinations. In this disclosure, SBFD specific RA parameters are added in extended part (that is not decoded by legacy UE) in such way that signaling overhead is minimal.

RACH-ConfigCommon comprises RACH-ConfigGeneric (IE for RA generic configuration) and featureCombinationPreamblesList and other RA parameters. In addition, Sbfd-RACH-Config IE (IE for RA on second frequency region) is added in extended part of RACH-ConfigCommon.

A RACH-ConfigCommon provides parameters for a set of ROs and preambles. The set of ROs associated with the RACH-ConfigCommon are defined by parameters in RACH-ConfigGeneric. Additional set of ROs are provided by Sbfd-RACH-Config IE. The set of ROs defined by RACH-ConfigGeneric is default-RO-set. The additional set of ROs defined by Sbfd-RACH-Config IE is sbfd-RO-set. A RO of default-RO-set is default-RO. A RO of sbfd-RO-set is sbfd-RO.

RA triggered for a specific feature combination uses specific subset of ROs determined from the set of ROs and specific subset of preambles. Those specific subset of ROs and specific subset of preambles are determined based on corresponding FeatureCombinationPreambles IE and other IEs.

The specific subset of ROs may comprise only default-RO(s) or only sbfd-RO(s) or both default-RO(s) and sbfd-RO(s).

For FeatureCombinationPreambles in featureCombinationPreambleList:
>: If sbdfEnabled (A500) is comprised in the corresponding FeatureCombinationPreambles, both default-RO(s) and sbfd-RO(s) are available for the RA.
>: If sbdfEnabled is not comprised in the corresponding FeatureCombinationPreambles, only default-RO(s) are available for the RA.

For FeatureCombinationPreambles in featureCombinationPreambleList2 (A900), only sbfd-RO(s) are available for the RA.

Table 1~4 explain parameters in the RACH-ConfigCommon.

TABLE 1

| Other RA parameters (A600) | |
| --- | --- |
| totalNumberOfRA-Preambles | Total number of preambles used for contention based and contention free 4-step or 2-step random access in the RACH resources defined in RACH-ConfigCommon, excluding preambles used for other purposes (e.g. for SI request). If the field is absent, all 64 preambles are available for RA. The setting should be consistent with the setting of ssb-perRACH-OccasionAndCB-PreamblesPerSSB, i.e. it should be a multiple of the number of SSBs per RACH occasion. |
| ssb-perRACH-OccasionAndCB-PreamblesPerSSB | The meaning of this field is twofold: the CHOICE conveys the information about the number of SSBs per RACH occasion. Value oneEighth corresponds to one SSB associated with 8 RACH occasions, value oneFourth corresponds to one SSB associated with 4 RACH occasions, and so on. The ENUMERATED part indicates the number of Contention Based preambles per SSB. Value n4 corresponds to 4 Contention Based preambles per SSB, value n8 corresponds to 8 Contention Based preambles per SSB, and so on. The total number of CB preambles in a RACH occasion is given by CB-preambles-per-SSB * max(1, SSB-per-rach-occasion). |
| ra-ContentionResolutionTimer | The initial value for the contention resolution timer |
| msg1-SubcarrierSpacing | Subcarrier spacing of PRACH for default-RO(s) |
| FeatureCombinationPreambles | The IE FeatureCombinationPreambles associates a set of preambles with a feature combination. |
| msg3-transformPrecoder | Enables the transform precoder for Msg3 transmission. If the field is absent, the UE disables the transformer precoder. |
| groupBconfigured | set of parameters for group B based random access. |
| prach-RootSequenceIndex | PRACH root sequence index. It indicates index for either L = 839 or L = 139. |
| prach-RootSequenceIndex-r16 | PRACH root sequence index. It indicates index for either L = 571 or L = 1151. |

TABLE 2

| RACH-ConfigGeneric (A700) | |
| --- | --- |
| prach-ConfigurationIndex | PRACH configuration index. |
| msg1-FDM | The number of PRACH transmission occasions FDMed in |

TABLE 2-continued

RACH-ConfigGeneric (A700)

| | |
|---|---|
| | one time instance. |
| msg1-FrequencyStart | Offset of lowest PRACH transmission occasion in frequency domain with respective to PRB 0. The value is configured so that the corresponding RACH resource is entirely within the bandwidth of the UL BWP. |
| preambleReceivedTargetPower | The target power level at the network receiver side |
| preambleTransMax | Max number of RA preamble transmission performed before declaring a failure |
| powerRampingStep | Power ramping steps for PRACH |
| ra-ResponseWindow | Msg2 (RAR) window length in number of slots. |

TABLE 3

FeatureCombinationPreambles

| | |
|---|---|
| DeltaPreamble | Power offset between msg3 or msgA-PUSCH and RACH preamble transmission. If configured, this parameter overrides msg3-DeltaPreamble or msgA-DeltaPreamble, |
| featureCombination | Indicates which combination of features that the preambles indicated by this IE are associated with. The UE ignores a RACH resource defined by this FeatureCombinationPreambles if any feature within the featureCombination is not supported by the UE or if any of the spare fields within the featureCombination is set to true. |
| numberOfPreamblesPerSSB-ForThisPartition | It determines how many consecutive preambles are associated to the Feature Combination starting from the starting preamble(s) per SSB. |
| ssb-SharedRO-MaskIndex | Indicates a subset of ROs where preambles are allocated for this feature combination. |
| startPreambleForThisPartition | It defines the first preamble associated with the Feature Combination. |
| sbfdEnabled | Indicates whether SBFD resources can be used for RA associated with the feature combination. If this field is absent, SBFD resource is not allowed for RA associated with the feature combination. |
| ssb-SharedRO-MaskIndex | Indicates a subset of ROs where preambles are allocated for this feature combination. |
| groupBconfigured | set of parameters for group B based random access. |

TABLE 4

Sbfd-Config (A800)

| | |
|---|---|
| prach-ConfigurationIndex-sbfd | PRACH configuration index for SBFD RA. If absent, relevant parameter in RACH-ConfigGeneric is applied. |
| msg1-FDM-sbfd | The number of PRACH transmission occasions FDMed in |

TABLE 4-continued

Sbfd-Config (A800)

| | |
|---|---|
| | one time instance for SBFD RA. If absent, relevant parameter in RACH-ConfigGeneric is applied. |
| msg1-FrequencyStart-sbfd | Offset of lowest PRACH transmission occasion in frequency domain with respective to PRB 0 of SBFD. The value is configured so that the corresponding RACH resource is entirely within the bandwidth of the SBFD sub-band. |
| preambleReceivedTargetPower-sbfd | The target power level at the network receiver side; If absent, the value in RACH-ConfigGenric is applied. |
| preambleTransMax-sbfd | Max number of RA preamble transmission performed before declaring a failure for SBFD RA. If absent, the value in RACH-ConfigGenric is applied. |
| powerRampingStep-sbfd | Power ramping steps for PRACH. If absent, the value in RACH-ConfigGenric is applied. |
| ra-ResponseWindow-sbfd | Msg2 (RAR) window length in number of slots (determined based on SCS of initial DL BWP). If absent, the value in RACH-ConfigGenric is applied. |
| ssb-perRACH-OccasionAndCB-PreamblesPerSSB-sbfd | indicates the number of SSBs per SBFD RACH occasion and the number of contention based preambles per SSB. If absent, ssb-perRACH-OccasionAndCB-PreamblesPerSSB is applied |
| msg1-SubcarrierSpacing-sbfd | Subcarrier spacing of PRACH for SBFD RA. If this field is absent, msg1-SubcarrierSpacing is applied. |
| groupBconfigured-sbfd | set of parameters for group B based random access for SBFD RA. If this field is absent, groupBconfigured-sbfd is applied. |
| prach-RootSequenceIndex-sbfd | PRACH root sequence index. It indicates index for either L = 839 or L = 139 or L = 571 or L = 1151. If this field is absent and prach-RootSequenceIndex-r16 is present in the RACH-ConfigCommon, prach-RootSequenceIndex-r16 is applied. If this field is absent and prach-RootSequenceIndex-r16 is absent and prach-RootSequenceIndex is present, prach-RootSequenceIndex is applied. |

Figure 14:
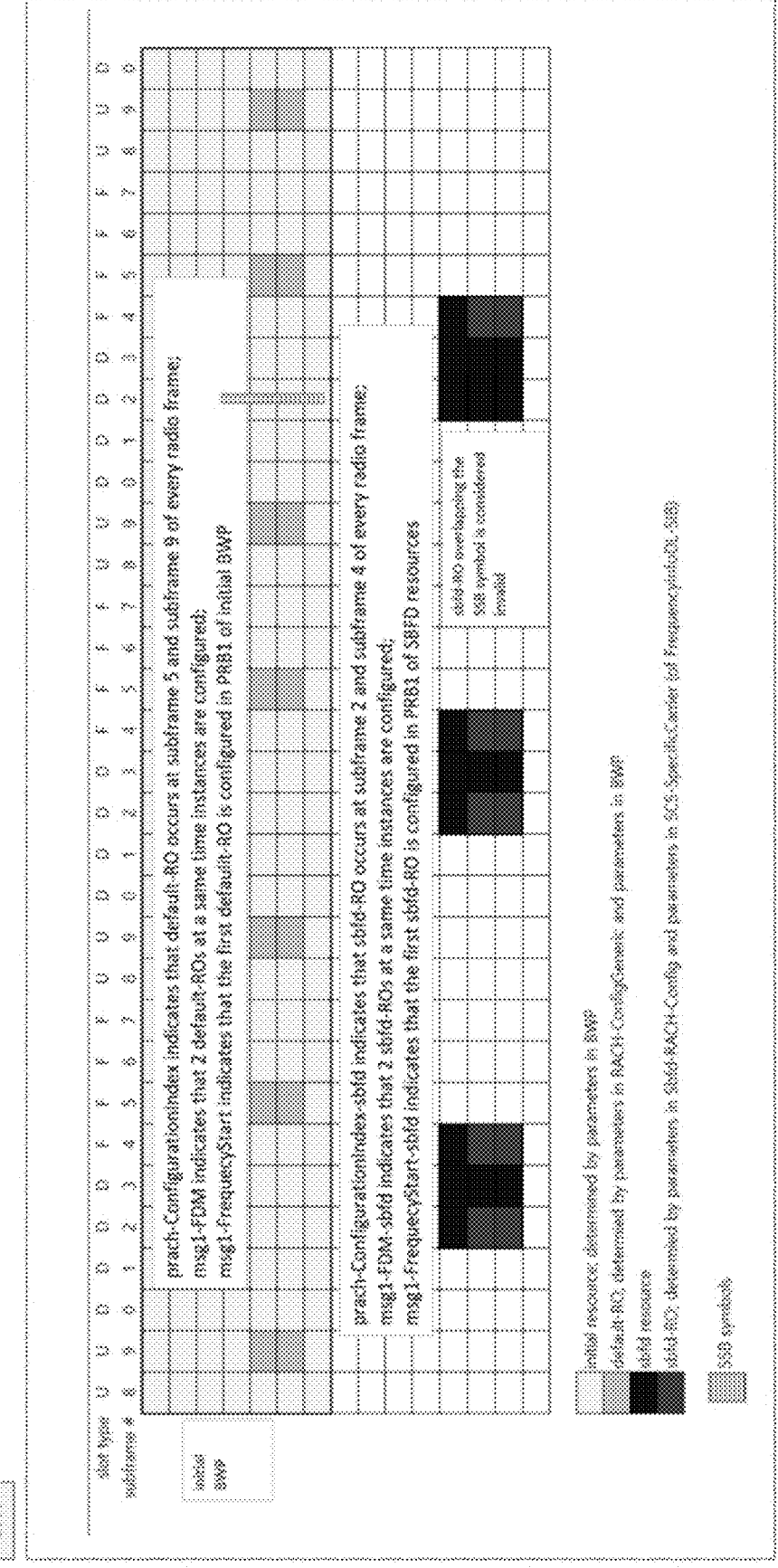
FIG. 14 illustrates an example of RACH occasions.

FIG. 14 illustrates an example of default-ROs and sbfd-ROs.

E600 illustrates example of default-ROs and sbfd-ROs in the following configurations:

>: prach-ConfigurationIndex indicates that default-RO occurs at subframe 5 and subframe 9 of every radio frame;

>: msg1-FDM indicates that 2 default-ROs at a same time instances are configured;

>: msg1-FrequecyStart indicates that the first default-RO is configured in PRB1 of initial BWP >: prach-ConfigurationIndex-sbfd indicates that sbfd-RO occurs at subframe 2 and subframe 4 of every radio frame;

>: msg1-FDM-sbfd indicates that 2 sbfd-ROs at a same time instances are configured;

>: msg1-FrequecyStart-sbfd indicates that the first sbfd-RO is configured in PRB1 of SBFD resources sbfd-RO overlapping the SSB symbol is considered invalid Based on the existing signaling and new signaling, INACTIVE UE capable of SBFD performs random access procedure.

Figure 15:
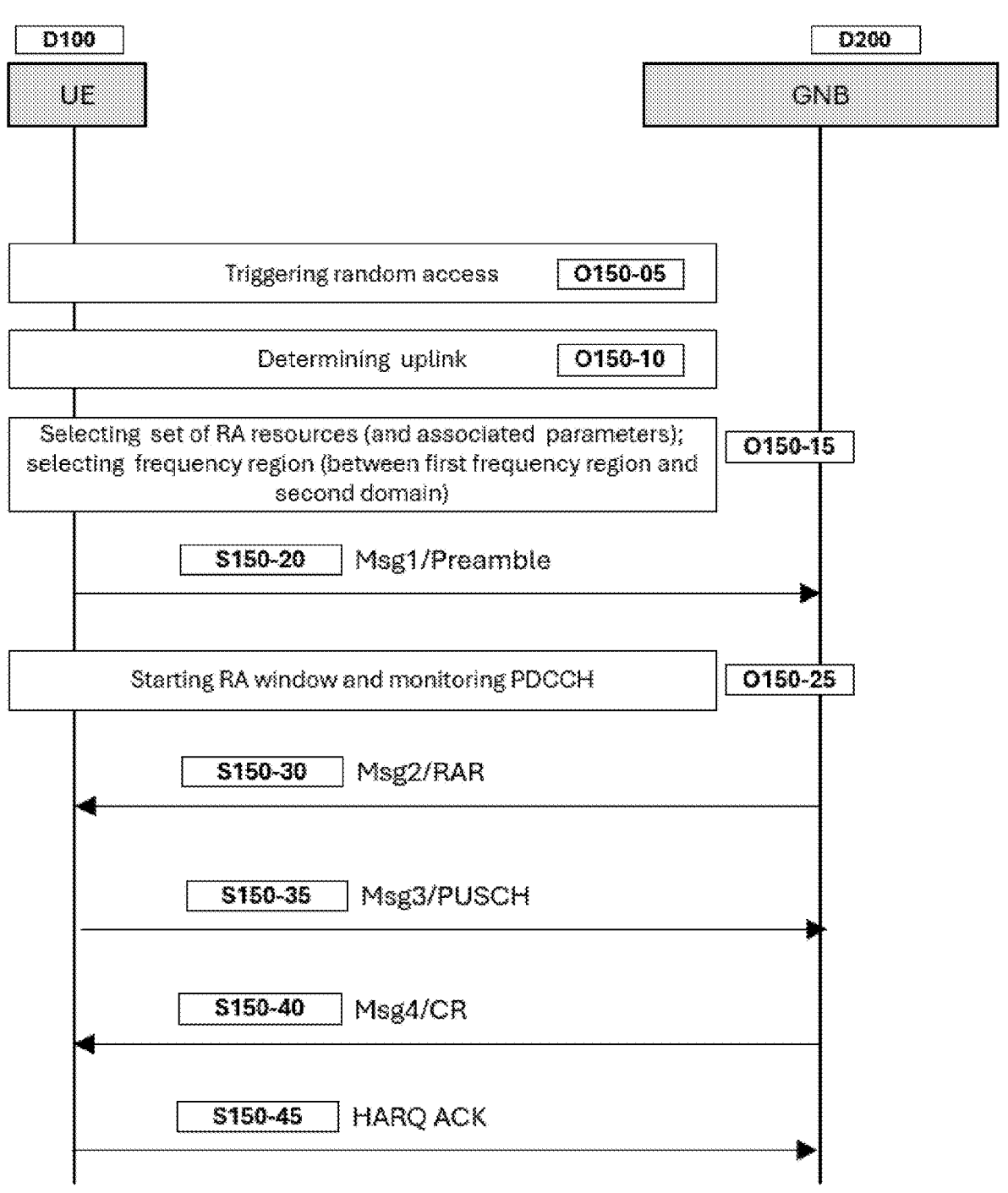
FIG. 15 illustrates RACH operation based on SBFD.

FIG. 15 illustrates random access procedure.

At O150-05, UE triggers a RA. RA can be triggered for a feature combination or by a PDCCH order or for handover or for mobility management.

At O150-10, UE determines uplink between SUL and NUL. This step can be skipped if serving cell is not configured with supplementary uplink. If the RSRP of the downlink pathloss reference is less than rsrp-ThresholdSSB-SUL (indicated in RACH-ConfigCommon), UE selects the SUL carrier for performing Random Access procedure. If the RSRP of the downlink pathloss reference is more than or equal to rsrp-ThresholdSSB-SUL, UE selects the NUL carrier for performing Random Access procedure.

At O150-15, UE selects set of RA resources and frequency regions. UE performs followings:

>: UE determines whether Msg3 repetition is applicable based on rsrp-ThresholdMsg3 and other relevant parameters;

>: UE determines whether Msg1 repetition is applicable and number of repetitions (if applicable) based on rsrp-ThresholdMsg1-RepetitionNum8 and rsrp-ThresholdMsg1-RepetitionNum4 and rsrp-Threshold-Msg1-RepetitionNum2 and other relevant parameters;

>: UE selects a set of Random Access resources based on availability of features;

>: UE selects frequency region based on the set of Random Access resources selected for this random access procedure.

For UE to determine whether Msg3 repetition is applicable, UE:

>: if the BWP selected for Random Access procedure (if IE for RACH configuration of initial uplink BWP) is configured with both set(s) of Random Access resources with msg3-Repetitions set to true and set(s) of Random Access resources without msg3-Repetitions set to true and the RSRP of the downlink pathloss reference is less than rsrp-ThresholdMsg3; or >: if the BWP selected for Random Access procedure (if IE for RACH configuration of initial uplink BWP) is only configured with the set(s) of Random Access resources with msg3-Repetitions set to true:

>>: considers Msg3 repetition is applicable for the current Random Access procedure.

>: else:

>>: consider Msg3 repetition is not applicable for the current Random Access procedure.

For UE to determine whether Msg1 repetition is applicable and, if applicable, number of repetitions, UE:

>: if contention-free Random Access Resources have been provided for this Random Access procedure and a Msg1 repetition number is indicated in rach-ConfigDedicated:

>>: consider Msg1 repetition is applicable and Msg1 repetition number applicable for the current Random Access procedure is the Msg1 repetition number indicated in rach-ConfigDedicated.

>: else if contention free Random Access Resources have not been provided for this Random Access procedure and the BWP selected for the Random Access procedure (and IE for RACH configuration of initial uplink BWP) is configured with set(s) of Random Access resources with msg1-Repetitions set to true and set(s) of Random Access resources without msg1-Repetitions set to true:

>>: if the BWP selected for the Random Access procedure (if IE for RACH configuration of initial uplink BWP) is configured with set(s) of Random Access resources associated with Msg1 repetition number 8 and the RSRP of the downlink pathloss reference is less than rsrp-ThresholdMsg1-RepetitionNum8:

>>>: consider Msg1 repetition is applicable and Msg1 repetition number applicable for the current Random Access procedure includes 8.

>>: if the BWP selected for the Random Access procedure (if IE for RACH configuration of initial uplink BWP) is configured with set(s) of Random Access resources associated with Msg1 repetition number 4 and the RSRP of the downlink pathloss reference is less than rsrp-ThresholdMsg1-RepetitionNum4:

>>>: consider Msg1 repetition is applicable and Msg1 repetition number applicable for the current Random Access procedure includes 4.

>>: if the BWP selected for the Random Access procedure (if IE for RACH configuration of initial uplink BWP) is configured with set(s) of Random Access resources associated with Msg1 repetition number 2 and the RSRP of the downlink pathloss reference is less than rsrp-ThresholdMsg1-RepetitionNum2:

>>>: consider Msg1 repetition is applicable and Msg1 repetition number applicable for the current Random Access procedure includes 2.

>>: else if the RSRP of the downlink pathloss reference is not less than any configured rsrp-ThresholdMsg1-RepetitionNumX:

>>>: consider Msg1 repetition is not applicable for the current Random Access procedure.

>: else if the BWP selected for Random Access procedure (else if IE for RACH configuration of initial uplink BWP) is configured only with Random Access resources with msg1-Repetitions set to true:

>>: consider Msg1 repetition is applicable for the current Random Access procedure;

>>: if at least one of rsrp-ThresholdMsg1-RepetitionNumX is configured:

>>>: if rsrp-ThresholdMsg1-RepetitionNum8 is configured and the RSRP of the downlink pathloss reference is less than rsrp-ThresholdMsg1-RepetitionNum8;

>>>>>: consider Msg1 repetition number applicable for the current Random Access procedure includes 8.

>>>: if rsrp-ThresholdMsg1-RepetitionNum4 is configured and the RSRP of the downlink pathloss reference is less than rsrp-ThresholdMsg1-RepetitionNum4:

>>>>>: consider Msg1 repetition number applicable for the current Random Access procedure includes 4.

>>>: if rsrp-ThresholdMsg1-RepetitionNum2 is configured and the RSRP of the downlink pathloss reference is less than rsrp-ThresholdMsg1-RepetitionNum2:

>>>>>: consider Msg1 repetition number applicable for the current Random Access procedure includes 2.

>>>: else if the RSRP of the downlink pathloss reference is not less than any configured rsrp-ThresholdMsg1-RepetitionNumX:

>>>>>: consider Msg1 repetition number applicable for the current Random Access procedure is the lowest Msg1 repetition number configured for this BWP.

>>: else (none of rsrp-ThresholdMsg1-RepetitionNumX is configured):

>>>: consider Msg1 repetition number applicable for the current Random Access procedure is the Msg1 repetition number that configured for this BWP.

For UE to select a set of Random Access resources based on availability of features, the UE:

>: if neither contention-free Random Access Resources nor Random Access Resources for SI request have been provided for this Random Access procedure and one or more of the features including (e)RedCap and/or Slicing and/or SDT and/or MSG3 repetition and/or MSG1 repetition is applicable for this Random Access procedure:

>>: if none of the sets of Random Access resources are available for any feature applicable to the current Random Access procedure:

>>>: select the set(s) of Random Access resources that are not associated with any feature indication for this Random Access procedure.

>>: else if there is one set of Random Access resources available which can be used for indicating all features triggering this Random Access procedure:

>>>: select this set of Random Access resources for this Random Access procedure.

>>: else if there are more than one set of Random Access resources available which can be used for indicating all features triggering this Random Access procedure and Msg1 repetition is applicable for this Random Access procedure:

>>>: select the set of Random Access resources that associated with highest repetition number among the sets of Random Access resources.

>>: else (i.e. there are one or more sets of Random Access resources available that are configured with indication(s) for a subset of all features triggering this Random Access procedure):

>>>: select a set of Random Access resources from the available set(s) of Random Access resources based on the priority order indicated by upper layers as specified in clause 5.1.1d for this Random Access Procedure.

>: else if contention-free Random Access Resources with Msg1 repetition have been provided for this Random Access procedure and Msg1 repetition number is indicated in rach-ConfigDedicated, and RedCap is applicable for the current Random Access procedure:

>>: select the set of Random Access resources that is only configured with RedCap indication and Msg1 repetition indication and associated with the indicated Msg1 repetition number for this Random Access procedure.

>: else if contention-free Random Access Resources with Msg1 repetition have been provided for this Random Access procedure and Msg1 repetition number is indicated in rach-ConfigDedicated, and eRedCap is applicable for the current Random Access procedure:

>>: select the set of Random Access resources that is only configured with eRedCap indication and Msg1 repetition indication and associated with the indicated Msg1 repetition number for this Random Access procedure.

>: else if contention-free Random Access Resources have been provided for this Random Access procedure and RedCap is applicable for the current Random Access procedure and there is one set of Random Access resources available that is only configured with RedCap indication; or >: if contention-free Random Access Resources have been provided for this Random Access procedure and eRedCap is applicable for the current Random Access procedure and there is one set of Random Access resources available that is only configured with eRedCap indication; or >: if contention-free Random Access Resources have been provided for this Random Access procedure and eRedCap is applicable for the current Random Access procedure and there is no set of Random Access resources available that is only configured with eRedCap indication and there is one set of Random Access resources available that is only configured with RedCap indication:

>>: select this set of Random Access resources for this Random Access procedure.

>: else:

>>: if the Random Access procedure is initiated by PDCCH order with DCI PRACH association indicator field set to 1 and SSB-MTC-AdditionalPCI is configured by upper layers:

>>>: select the set of Random Access resources corresponding to the active additionalPCI.

>>: else if the Random Access procedure is initiated by PDCCH order for an LTM candidate cell:

>>>: select the set of Random Access resources corresponding to the field Cell indicator in PDCCH order.

>>: else if contention-free Random Access Resources with Msg1 repetition have been provided for this Random Access procedure, and Msg1 repetition number is indicated in rach-ConfigDedicated:

>>>: select the set of Random Access resources that is only configured with Msg1 repetition indication and associated with the indicated Msg1 repetition number for this Random Access procedure.

>>: else if the Random Access procedure was initiated for SI request and Random Access Resources associated with Msg1 repetition for SI request and Msg1 repetition number have been provided for this Random Access procedure:

>>>: select the set of Random Access resources that is only configured with Msg1 repetition indication and associated with the indicated Msg1 repetition number for this Random Access procedure.

>>: else:

>>>: select the set of Random Access resources that are not associated with any feature indication for the current Random Access procedure.

For UE to determine whether a set of random access resources is available, UE:

>: if eRedCap is set to true for a set of Random Access resources:

>>: consider the set of Random Access resources as not available for a Random Access procedure for which eRedCap is not applicable.

>: if redCap is set to true for a set of Random Access resources configured for 4-step RA type, but not for 2-step RA type:

>>: consider the set of Random Access resources as not available for a Random Access procedure for which RedCap is not applicable.

\>: if redCap is set to true for a set of Random Access resources configured for 2-step RA type regardless of whether it is also configured for 4-step RA type:

\>>: consider the set of Random Access resources as not available for a Random Access procedure for which (e)RedCap is not applicable;

\>>: consider eRedCap as both eRedCap and RedCap in the following procedure in clause 5.1.1c and 5.1.1d.

\>: if smallData is set to true for a set of Random Access resources:

\>>: consider the set of Random Access resources as not available for the Random Access procedure which is not triggered for RA-SDT by MO-SDT.

\>: if NSAG-List is configured for a set of Random Access resources:

\>>: consider the set of Random Access resources as not available for the Random Access procedure unless it is triggered for any one of the NSAG-ID(s) in the NSAG-List.

\>: if msg3-Repetitions is set to true for a set of Random Access resources:

\>>: consider the set of Random Access resources as not available for the Random Access procedure if Msg3 repetition is not applicable.

\>: if msg1-Repetitions is set to true for a set of Random Access resources:

\>>: if Msg1 repetition is not applicable to the current Random Access procedure; or \>>: if the set of Random Access resources is not associated with any of the Msg 1 repetition number that is applicable to the current Random Access procedure:

\>>>: consider the set of Random Access resources as not available for the Random Access procedure.

\>: if a set of Random Access resources is not configured with FeatureCombination:

\>>: consider the set of Random Access resources to not associated with any feature.

As a consequence of selecting set of random access resource, UE determines, for the random access procedure, a specific RACH-ConfigCommon and a specific feature-CombinationPreambles. Based on the selected RACH-ConfigCommon and selected featureCombinationPreambles, UE determines ROs for preamble transmission.

Figure 16:
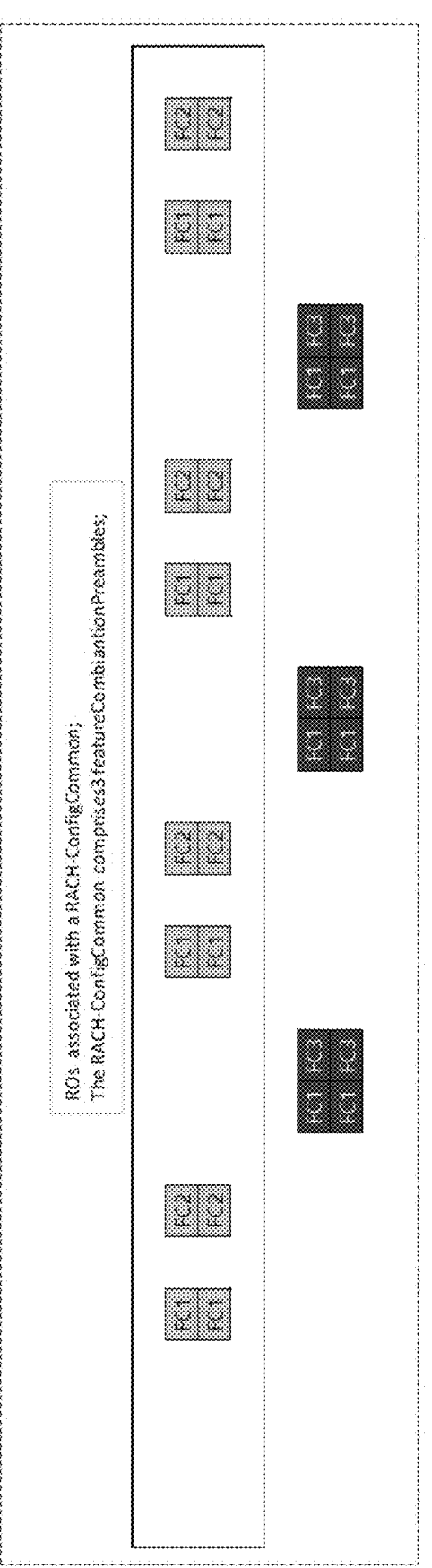
FIG. 16 illustrates an example of RACH occasions and feature combinations.

FIG. 16 illustrates an example.

Each rectangular represents a RO. In case that the RACH-ConfigCommon comprises3 featureCombiantionPreambles, ROs associated with feature combinations occur as in E700.

\>: In case that:

\>>: the specific RACH-ConfigCommon is associated with additional-ROs (e.g. sbfd-RACH-Config is comprised); and \>>: the specific featureCombinationPreamble is allowed to use both default-ROs and additional-ROs (e.g. sbfdEnabled is comprised), \>: both additional-ROs and default-ROs are available for the set of random access resources (available for random access procedure for which the set of random access resources are selected). FC1 in the figure corresponds to this case.

\>: In case that:

\>>: the specific RACH-ConfigCommon is associated with additional-ROs (e.g. sbfd-RACH-Config is comprised); and \>>: the specific featureCombinationPreamble is not allowed to use additional-ROs (e.g. sbfdEnabled is not comprised), \>: only default-ROs are available for the set of random access resources (available for random access procedure for which the set of random access resources are selected). FC2 in the figure corresponds to this case.

\>: In case that:

\>>: the specific RACH-ConfigCommon is associated with additional-ROs (e.g. sbfd-RACH-Config is comprised); and \>>: the specific featureCombinationPreamble is not allowed to use default-ROs (or allowed to use only additional ROs) (e.g. featureCombinationPreambles in the new list), \>: only additional-ROs are available for the set of random access resources (available for random access procedure for which the set of random access resources are selected). FC3 in the figure corresponds to this case. UE.

\>: If both default-ROs and additional-ROs are available for the random access procedure, UE determines one of them for preamble transmission.

\>: In case that:

\>>: the associated feature combination comprises (if selected set of random access resource is associated with) Msg1 repetition; and \>>: Msg1 repetition is allowed across the RA-region (e.g. a specific new indication is comprised in the corresponding featureCombinationPreambles), \>: UE performs preamble transmission both in the default-RA-region and the additional-RA-region.

\>: In case that:

\>>: the associated feature combination does not comprise Msg1 repetition; or

\>>: Msg1 repetition is not allowed across the RA-region,

\>: UE selects one of default-RA-region and additional-RA-region, and performs preamble transmission in the selected RA-region. UE selects the RA-region where the RO corresponding to the selected SSB comes first.

At S150-20, UE transmits Msg1/Preamble on a specific RO of the determined RA-region.

To determine the specific RO, UE may, for SSB selection:

\>: if at least one of the SSBs with SS-RSRP above rsrp-ThresholdSSB is available:

\>>: select an SSB with SS-RSRP above rsrp-ThresholdSSB.

\>: else:

\>>: select any SSB.

for Preamble group selection:

\>: if Random Access Preambles group B is configured:

\>>: if the potential Msg3 size (UL data available for transmission plus MAC subheader(s) and, where required, MAC CEs) is greater than ra-Msg3SizeGroupA and the pathloss is less than PCMAX (of the Serving Cell performing the Random Access Procedure)−preambleReceivedTargetPower−msg3-DeltaPreamble−messagePowerOffsetGroupB; or \>>: if the Random Access procedure was initiated for the CCCH logical channel and the CCCH SDU size plus MAC subheader is greater than ra-Msg3SizeGroupA:

\>>>: select the Random Access Preambles group B.

\>>: else:

\>>>: select the Random Access Preambles group A.

\>: else:

\>>: select the Random Access Preambles group A.

for RO determination:

>: if the set of Random Access resources associated with Msg1 repetition is selected for this Random Access procedure:

>>: determine the next available set of PRACH occasions (as specified in TS 38.213 [6]) for the Msg1 repetition number applicable for this Random Access procedure corresponding to the selected SSB, permitted by the restrictions given by the ra-ssb-OccasionMaskIndex if configured, or ssb-SharedRO-MaskIndex if configured. The set of PRACH occasions may comprises only default-ROs (if default-RA-region is selected) or only additional-ROs (if additional-RA-region is selected) or both default-ROs and additional-ROs (or repetition across RA-region is allowed).

>: else:

>>: determine the next available PRACH occasion from the PRACH occasions corresponding to the selected SSB permitted by the restrictions given by the ra-ssb-OccasionMaskIndex if configured, or ssb-SharedRO-MaskIndex if configured, or indicated by PDCCH, or indicated by the LTM Cell Switch Command MAC CE. The PRACH occasions for retransmission is default-ROs if initial transmission is performed in a default-RO. PRACH occasions for retransmission is additional-ROs if initial transmission is performed in an additional-RO.

At O150-25, UE starts RA window and monitors PDCCH to receive RAR.

After PRACH/preamble transmission, the UE attempts to detect a DCI format 1_0 with CRC scrambled by a corresponding RA-RNTI during a RAR window.

UE monitors PDCCH to detect the DCI. UE monitors PDCCH based on specific resources of initial downlink resource pool during while the RAR window is running. The specific resource is determined by a specific SearchSpace.

In FDD system, for random access procedure in a serving cell, UE performs:

>: preamble transmission on a resource of a first frequency region (initial uplink BWP of NUL) or on a resource of a fourth frequency region (initial uplink BWP of SUL); and >: RAR reception on a resource of a third frequency region (initial downlink BWP).

In FDD system,

>: the first frequency region is determined based on:

>>: a first reference resource block (PointA for normal uplink of the serving cell; determined based on absoluteFrequencyPointA field within FrequencyInfoUL-SIB IE within uplinkConfigCommon field);

>>: an offset from the first reference resource block to the normal uplink carrier (determined based on offsetToCarrier field within a specific SCS-SpecificCarrier within FrequencyInfoUL-SIB IE within uplinkConfigCommon field); and >>: a location and bandwidth of the first frequency region (determined based on locationAndBandwidth field within initialUplinkBWP field within uplinkConfigCommon field).

>: The fourth frequency region is determined based on:

>>: a second reference resource block (PointA for supplementary uplink of the serving cell; determined based on absoluteFrequencyPointA field within FrequencyInfoUL-SIB IE within supplementaryUplink field);

>>: an offset from the second reference resource block to the supplementary uplink carrier (determined based on offsetToCarrier field within a specific SCS-SpecificCarrier within FrequencyInfoUL-SIB IE within supplementaryUplink field); and >>: a location and bandwidth of the fourth frequency region (determined based on locationAndBandwidth field within initialUplinkBWP field within supplementaryUplink field).

>: The third frequency region is determined based on:

>>: a third reference block (PointA for downlink of the serving cell; determined based on offsetToPointA field within FrequencyInfoDL-SIB IE within downlinkConfigCommon field);

>>: an offset from the third reference resource block to the downlink carrier (determined based on offsetToCarrier field within a specific SCS-SpecificCarrier within FrequencyInfoDL-SIB IE within downlinkConfigCommon field); and >>: a location and bandwidth of the third frequency region (determined based on locationAndBandwidth field within initialDownlinkBWP field within downlinkConfigCommon field).

In TDD system, for random access procedure in a serving cell, UE performs:

>: preamble transmission on a resource of:

>>: a first frequency region (initial uplink BWP of NUL);

>>: a fourth frequency region (initial uplink BWP of SUL); or

>>: a second frequency region (SBFD of NUL);

>: RAR reception on a resource of a third frequency region (initial downlink BWP).

In TDD system, the first frequency region is determined based on:

>>: a first reference resource block (PointA for normal uplink of the serving cell; determined based on absoluteFrequencyPointA field within FrequencyInfoDL-SIB IE within downlinkConfigCommon field);

>>: an offset from the first reference resource block to the normal uplink carrier (determined based on offsetToCarrier field within a specific SCS-SpecificCarrier within FrequencyInfoUL-SIB IE within uplinkConfigCommon field); and >>: a location and bandwidth of the first frequency region (determined based on locationAndBandwidth field within initialUplinkBWP field within uplinkConfigCommon field).

>: The fourth frequency region is determined based on:

>>: a second reference resource block (PointA for supplementary uplink of the serving cell; determined based on absoluteFrequencyPointA field within FrequencyInfoUL-SIB IE within supplementaryUplink field);

>>: an offset from the second reference resource block to the supplementary uplink carrier (determined based on offsetToCarrier field within a specific SCS-SpecificCarrier within FrequencyInfoUL-SIB IE within supplementaryUplink field); and >>: a location and bandwidth of the fourth frequency region (determined based on locationAndBandwidth field within initialUplinkBWP field within supplementaryUplink field).

>: The third frequency region is determined based on:

>>: the first reference block (Point A for downlink of the serving cell; determined based on offsetToPointA field within FrequencyInfoDL-SIB IE within downlinkConfigCommon field);

>>: an offset from the third reference resource block to the downlink carrier (determined based on offsetToCarrier field within a specific SCS-SpecificCarrier within FrequencyInfoDL-SIB IE within downlinkConfigCommon field); and >>: a location and bandwidth of the third frequency region (determined based on locationAndBandwidth field within initialDownlinkBWP field within downlinkConfigCommon field).

>: The second frequency region is determined based on:

>>: the offset from the first reference resource block to the normal uplink carrier (determined based on offsetToCarrier field within a specific SCS-SpecificCarrier within FrequencyInfoUL-SIB IE within uplinkConfigCommon field); and >>: an offset between the lowest subcarrier of the normal uplink carrier and the lowest subcarrier of the second frequency region; and >>: a bandwidth of the second frequency region.

For example, the first PRB and number of PRBs of each frequency region are determined from corresponding locationAndBandwidth. The position of the first PRB of each frequency region is determined from corresponding offsetToCarrier and corresponding absoluteFrequencyPointA.

UE receives Msg2/RAR S150-30.

UE performs PUSCH transmission for Msg 3 S150-35.

UE receives Msg4 for contention resolution S150-40.

UE transmits HARQ ACK for Msg4 S150-45.

UE determines SCS of first frequency region indirectly based on subcarrierSpacing field within IE for third frequency region.

UE determines SCS of second frequency region directly based on a specific field (subcarrierSpacing field or other fields) within downlink carrier specific IE associated with the second frequency region.

Figure 17:
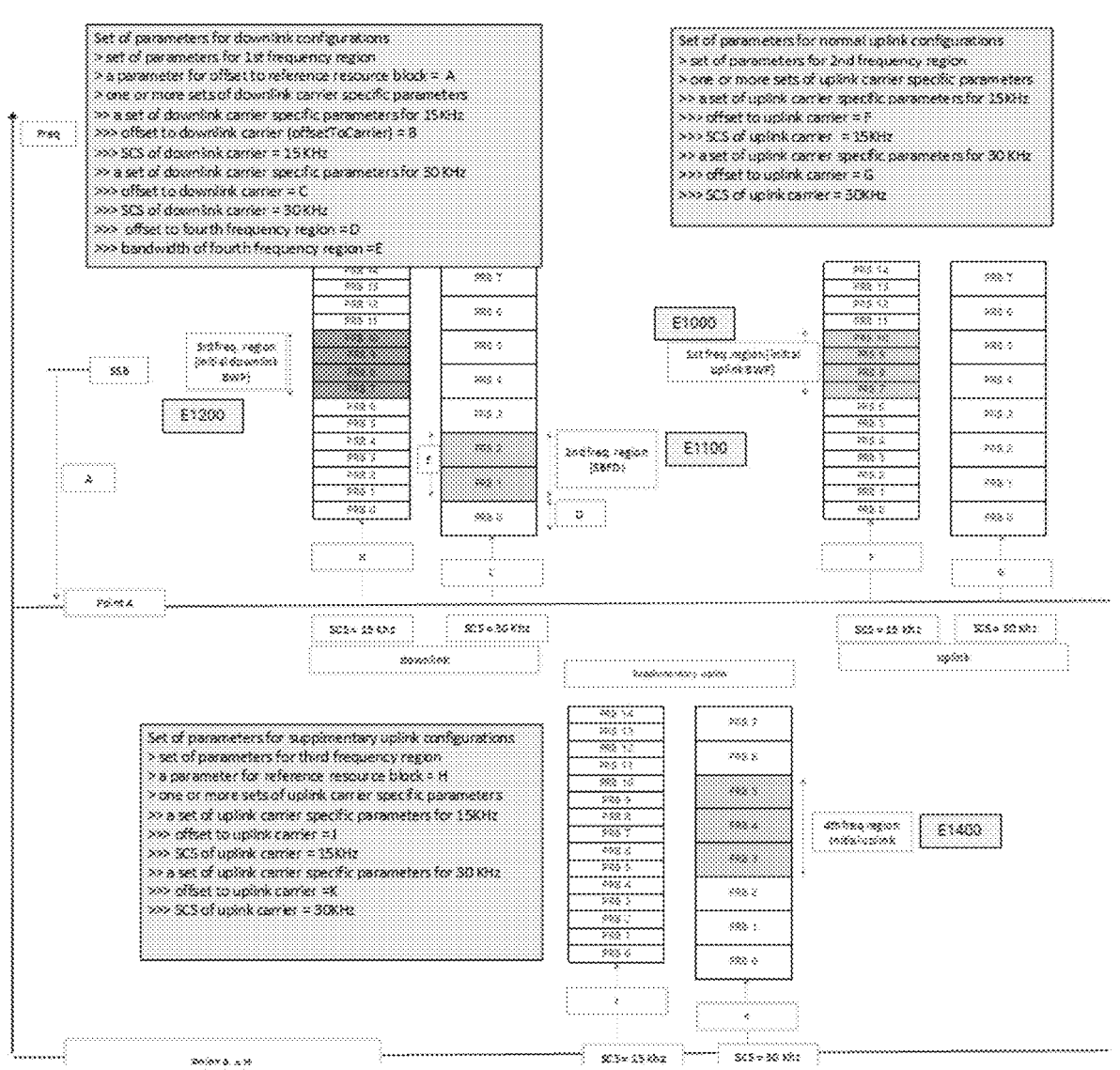
FIG. 17 illustrates another example of frequency domain structure.
Figure 19:
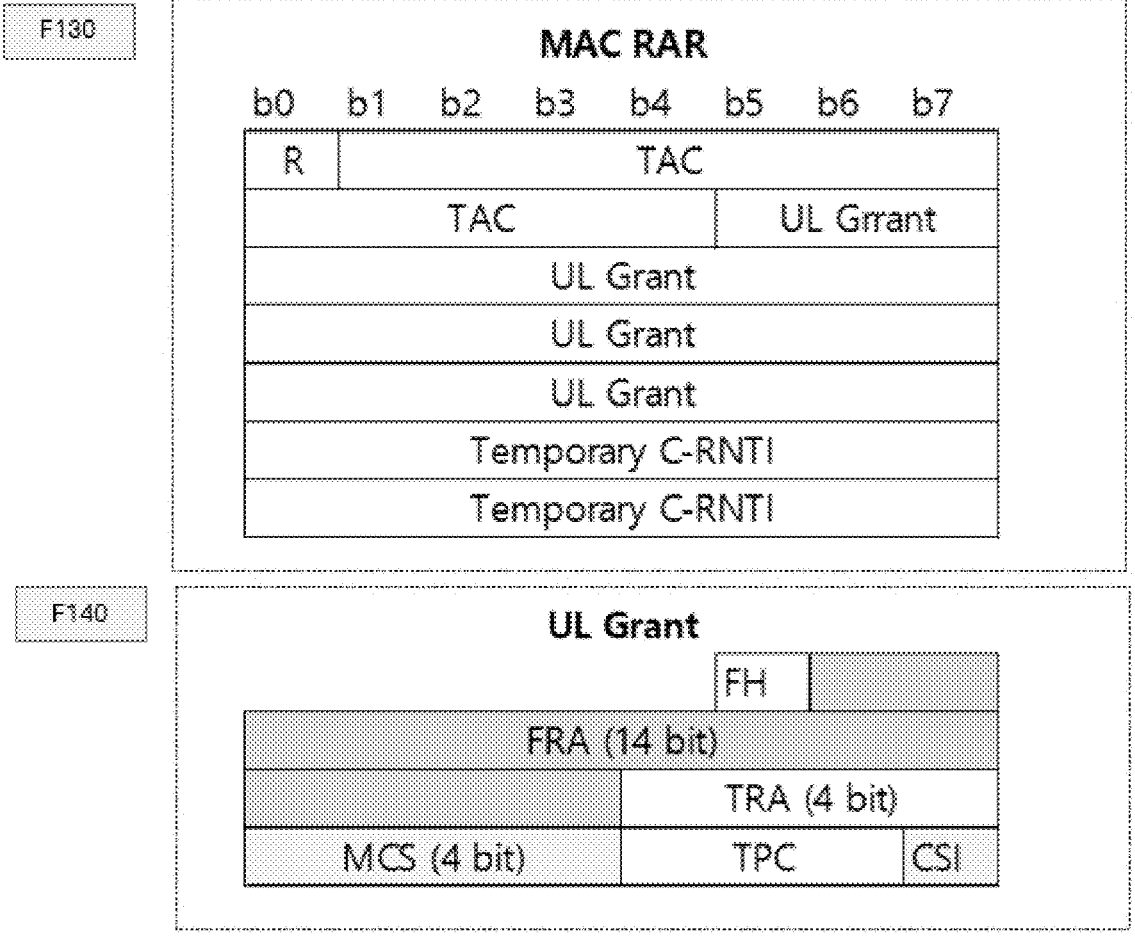
FIG. 19 illustrates format of random access response.
Figure 20:
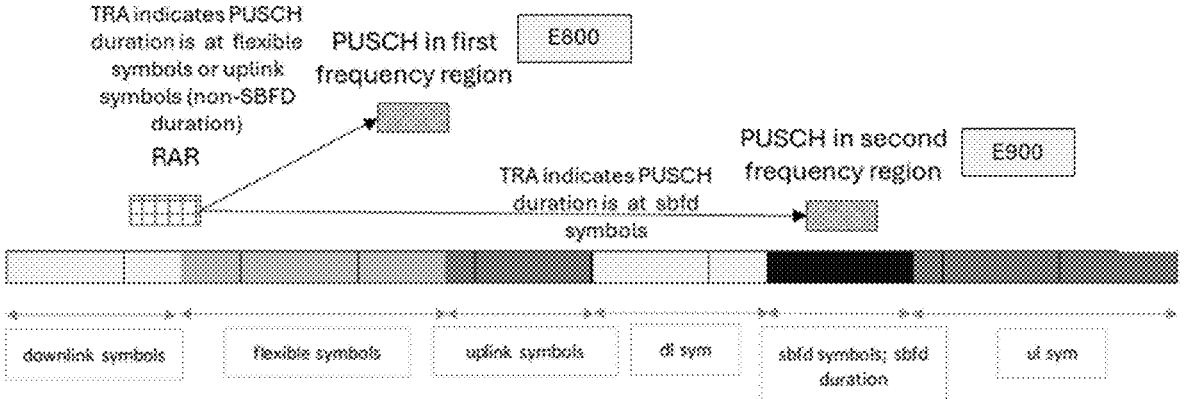
FIG. 20 illustrates an example of PUSCH resource selection.
Figure 21:
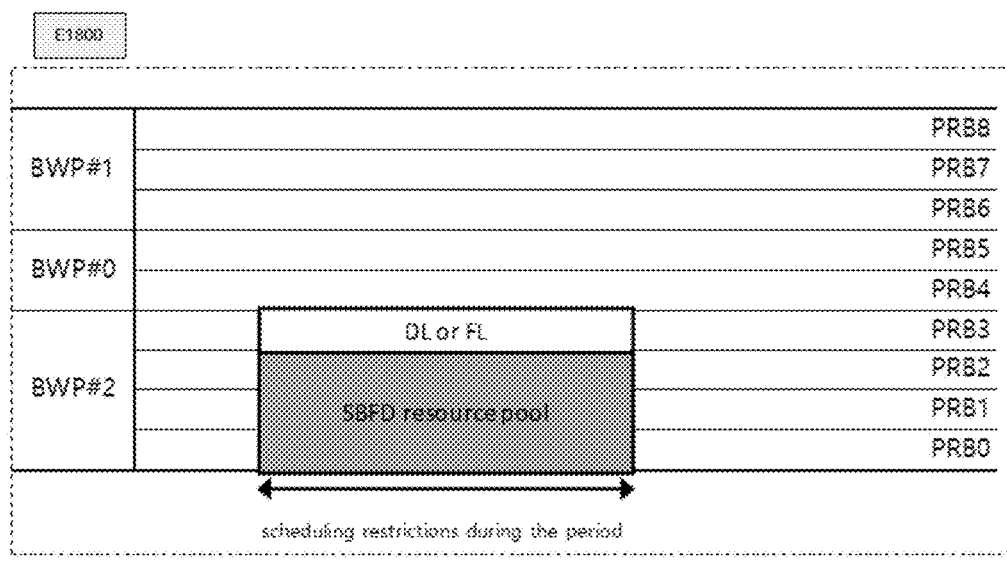
FIG. 21 illustrates an example of BWPs of a cell.

FIG. 17 illustrates an example of frequency regions.

The first frequency region (E1000), the second frequency region (E1100), the third frequency region (E1200) and the fourth frequency region (E1300) are configured based on corresponding parameters.

UE performs the following for preamble transmission and response reception.

>: UE receives a SSB in a cell;

>: UE receives a system information in the cell;

>: UE triggers a random access in the cell;

>: UE transmits a preamble in the cell for the random access; and

>: UE receives a response to the preamble in the cell,

The preamble is transmitted in a first frequency resource [resource in initial uplink BWP in NUL] or a second frequency resource [SBFD] or a fourth frequency resource [resource in initial UL BWP in SUL].

The response to the preamble is received in a third frequency resource wherein:

>: the first frequency resource belongs to a first frequency region [initial UL BWP in NUL];

>: the second frequency resource belongs to a second frequency region [SBFD];

>: the third frequency resource belongs to a third frequency region [initial DL BWP]; and >: the fourth frequency resource belongs to a fourth frequency region [initial UL BWP in SUL], wherein:

>: the first frequency region and the second frequency region and the fourth frequency region are for uplink transmission; and >: the third frequency region is for downlink reception, UE transmits the preamble in the fourth frequency resource in case that a RSRP of downlink pathloss reference is smaller than a specific threshold [rsrp-ThresholdSSB-SUL], UE transmits the preamble in the first frequency resource in case that:

>: the RSRP of downlink pathloss reference (a downlink reference signal such as SSB) is greater than or equal to the specific threshold; and >: a set of parameters for the second frequency region is not comprised in a set of parameters for downlink configuration, wherein UE transmits the preamble in the second frequency resource in case that:

>: the RSRP of downlink pathloss reference is greater than or equal to the specific threshold; and >: the set of parameters for the second frequency region is not comprised in a set of parameters for downlink configuration.

UE performs the followings for preamble transmission and response reception.

>: UE receives system information, wherein the system information comprises various information elements (IEs);

>: UE triggers a random access (RA) procedure;

>: UE determines a set of RA resources based on availability of one or more features; and >: UE performs the RA procedure based on the set of RA resources, wherein the set of RA resources comprises a first set of ROs and a second set of ROs in case that the system information comprises:

>: a parameter for offset to second frequency region [OffsetToSbfd] within an IE for downlink configuration; and >: an IE for RA on second frequency region [sbfd-RACH-Config] within an IE for uplink configuration, The first set of ROs are determined based on:

>: a first frequency region;

>: a first time region;

>: a parameter for start frequency [msg1-frequencyStart] within an IE for RA generic configuration [RACH-ConfigGeneric]; and >: a parameter for frequency division multiplexing (FDD) [FDMed] within the IE for RA generic configuration; and The second set of ROs are determined based on:

>: a second frequency region;

>: a second time region;

>: the parameter for start frequency within an IE for RA on second frequency region; and >: the parameter for FDD within the IE for RA on second frequency region;

The first frequency region is determined based on:

>: an IE for first frequency region within the IE for uplink configuration; and

>: a parameter for offset to uplink carrier within the IE for uplink configuration; and >: a parameter for offset to reference resource block within the IE for downlink configuration; and.

The second frequency region is determined based on:

>: a parameter for offset to second frequency region within the IE for downlink configuration;

>: a parameter for bandwidth of second frequency region within the IE for downlink configuration;

>: the parameter for offset to downlink carrier within the IE for downlink configuration; and >: the parameter for offset to reference resource block within the IE for downlink configuration; and The first time region is determined based on:

>: a parameter for prach configuration index within the IE for RA generic configuration; and >: one or more first symbols; and The second time region is determined based on:

>: the parameter for prach configuration index within the IE for RA on second frequency region; and >: one or more second symbols, The one or more first symbols comprise:

>: one or more downlink symbols determined based on an IE for tdd uplink downlink configuration; and >: one or more flexible symbols determined based on the IE for tdd uplink downlink configuration, The second symbol is a symbols that:

>: is determined based on a parameter for sub-band time region [offsetToFirstSBSymobol] within the IE for tdd uplink downlink configuration; and >: is not the first symbol (to ensure that if a symbol is colliding between the first time region and the second time region, first time region is prioritized).

The system information comprises:

>: a set of parameters for downlink configuration;

>: a set of parameters for uplink configuration;

>: a set of parameters for supplementary uplink configuration; and

>: a set of parameters for tdd uplink downlink configuration,

Set of parameters and IE are used interchangeably.

DownlinkConfigCommonSIB

The set of parameters for downlink configuration [DownlinkConfigCommonSIB] comprises:

>: a set of parameters for third frequency region [initial downlink bandwidth parts];

>: a parameter for offset to reference resource block [offsetToPointA]; and

>: one or more sets of downlink carrier specific parameters;

UplinkConfigCommonSIB

The set of parameters for uplink configuration [UpinkConfigCommonSIB] comprises:

>: a set of parameters for first frequency region [initial uplink bandwidth parts];

>: one or more sets of uplink carrier specific parameters,

The set of parameters for supplementary uplink configuration comprises:

>: a set of parameters for fourth frequency region;

>: a parameter for reference resource block [absoluteFrequencyPointA]; and

>: one or more sets of uplink carrier specific parameters;

Carrier Specific Parameter

Each of one or more sets of downlink carrier specific parameters comprises:

>: a parameter for offset to downlink carrier;

>: a parameter for subcarrier spacing of downlink carrier;

>: a parameter for bandwidth of downlink carrier

Each of one or more sets of uplink carrier specific parameters comprises:

>: a parameter for offset to uplink carrier;

>: a parameter for subcarrier spacing of uplink carrier;

>: a parameter for bandwidth of uplink carrier.

Frequency Region

The set of parameters for third frequency region [initial DL BWP] comprises:

>: a parameter indicating location and bandwidth of third frequency region; and

>: a parameter indicating subcarrier spacing of third frequency region.

Initial DL BWP

The third frequency region [initial downlink bandwidth parts] is determined based on:

>: the set of parameters for third frequency region;

>: the parameter for offset to reference resource block; and

>: a specific set of downlink carrier specific parameters, and

Followings are same:

>: subcarrier spacing indicated by the specific set of downlink carrier specific parameters; and >: subcarrier spacing indicated by the set of parameters for third frequency region.

Initial UL BWP in NUL

The first frequency region [initial uplink bandwidth parts of NUL] is determined based on:

>: the set of parameters for first frequency region;

>: the parameter for offset to reference resource block; and

>: a specific set of uplink carrier specific parameters within the set of parameters for uplink configuration, and The followings are same:

>: subcarrier spacing indicated by the specific set of uplink carrier specific parameters within the set of parameters for uplink configuration; and >: subcarrier spacing indicated by the set of parameters for first frequency region.

Initial UL BWP in SUL

The fourth frequency region [initial uplink bandwidth parts of SUL] is determined based on:

>: the set of parameters for fourth frequency region [BWP];

>: the parameter for reference resource block; and

>: a specific set of uplink carrier specific parameters within the set of parameters for supplementary uplink configuration, and The followings are same:

>: subcarrier spacing indicated by the specific set of uplink carrier specific parameter within the set of parameters for supplementary uplink configuration; and >: subcarrier spacing indicated by the set of parameters for fourth frequency region SBFD The second frequency region [SBFD frequency region] is determined based on:

>: the parameter for offset to reference resource block;

>: the parameter for offset to downlink carrier;

>: a parameter for offset to second frequency region; and

>: a parameter for bandwidth of second frequency region, and

>: the second frequency region comprises n consecutive PRBs starting from a specific PRB;

The specific PRB is determined based on:

>: the parameter for offset to second frequency region; and

>: the parameter for offset to reference resource block.

n is determined based on the parameter for bandwidth of second frequency region.

Followings are comprised in a specific set of downlink carrier specific parameters:

>: the parameter for offset to second frequency region;

>: the parameter for bandwidth of second frequency region; and

>: the parameter for offset to downlink carrier,

>: subcarrier spacing indicated by the specific set of downlink carrier specific parameters is applied to uplink transmission (msg3 transmission).

Common Parameters

The parameter for offset to reference resource block is commonly used to determine the third frequency region and the first frequency region and the second frequency region.

The parameter for offset to downlink carrier within a specific set of downlink carrier specific parameters is commonly used to determine the downlink carrier and the second frequency region.

The parameter for subcarrier spacing within the specific set of downlink carrier specific parameters is commonly used to determine the subcarrier spacing of the downlink carrier and subcarrier spacing of the second frequency region.

SIB1 Version 2

The system information comprises:
>: an IE for downlink configuration;
>: an IE for uplink configuration; and
>: an IE for tdd uplink downlink configuration.

DownlinkConfigCommonSIB

The IE for downlink configuration comprises:
>: an IE for third frequency region [initial DL BWP];
>: a parameter for offset to reference resource block [offsetToPointA];
>: a parameter for offset to downlink carrier [offsetTo-Carrier]; and
>: a parameter for offset to second frequency region UplinkConfigCommon/RACH-ConfigCommon The IE for uplink configuration comprises:
>: an IE for first frequency region [initial UL BWP]; and
>: a parameter for offset to uplink carrier, The IE for first frequency region comprises:
>: a parameter for SCS; and
>: one or more IEs for random access channel (RACH) configuration;

Each IE for RACH configuration [RACH-ConfigCommon]comprises:
>: an IE for RA generic configuration;
>: an IE for RA on second frequency region; and
>: one or more IEs for feature combination preambles, The IE for RA generic configuration comprises:
>: a parameter for frequency start; and
>: a parameter for prach configuration index, The IE for RA on second frequency region comprises:
>: the parameter for frequency start; and
>: the parameter for prach configuration index, The parameter for frequency start in the IE for RA generic configuration indicates number of PRBs in SCS indicated by the parameter for SCS in the IE for first frequency region.

The parameter for frequency start in the IE for RA on second frequency region indicates number of PRBs in SCS of fourth frequency region.

Miscellaneous

The first RO of the second set of ROs locates at a specific frequency point [the first LO that is FDMed].

The specific frequency point is apart upward from a first reference point [lowest PRB of SBFD] by amount indicated by the parameter for start frequency within the IE for RA on second frequency region.

The first reference point is apart upward from a second reference point [lowest PRB of downlink carrier] by amount indicated by the parameter for offset to second frequency region within the IE for downlink configuration.

The second reference point is apart upward from a third reference point [PointA] by amount indicated by a parameter for offset to downlink carrier [offsetToCarrier] within the IE for downlink configuration.

The third reference point is apart downward from a fourth reference point [lowest subcarrier of SSB] by amount indicated by parameter for offset to reference resource block [offsetToPointA] within the IE for downlink configuration.

The fourth reference point is the lowest subcarrier of SSB.

When sets of RA resources are configured both in the first frequency region and in the second frequency region, the base station needs a mean to distribute the RA load over the frequency regions. Legacy UEs that does not understand SBFD/second frequency region perform RA procedure in the first frequency region. SBFD UE may perform RA procedure by default in the second frequency region. For finer control, a new parameter can be considered. The new parameter indicates whether SBFD UE is allowed to perform RA procedure (even when RA procedure in the second RA region is possible) and the probability of selecting the first frequency region.

UE performs the following to select a set of RA resources:
>: UE receives system information, wherein the system information comprises various information elements (IEs);
>: UE triggers a random access (RA) procedure;
>: UE determines first set of features that are applicable for the RA procedure;
>: UE determines a set of RA resources based on availability of a third set of features; and
>: UE performs the RA procedure based on the set of RA resources, A set of RA resources that are not associated with any feature is selected in case that none of sets of RA resources are available for any feature applicable for the RA procedure (second set of features).

The UE determines, based on a specific parameter [Sbfd-Selectiona], a specific set of RA resources that are not associated with any feature is selected based on a parameter for in case that:
>: none of sets of RA resources are available for any feature applicable for the RA procedure; and
>: a set of RA resources that are not associated with any feature is available in the first frequency region; and
>: a set of RA resources that are not associated with any feature is available in the second frequency region.

The first set of features for a RA comprises msg3-Repetition and/or msg1-Repetition that are determined applicable for the RA based on RSRP of downlink pathloss reference.

The second set of features comprises one or more NSAG-IDs that are determined applicable for the RA by upper layers.

The third set of features is the union of the first set of features and the second set of features.

UE determines a msg3-Repetition feature is:
>: applicable for the RA procedure in case that:
>>: at least one set of RA resources with msg3-Repetition set to true is available either for the first frequency region or for the second frequency region; and
>>: RSRP of the downlink pathloss reference is less than rsrp-ThresholdMsg3;
>: not applicable for the RA procedure in case that:
>>: at least one set of RA resources with msg3-Repetition set to true is available either for the first frequency region or for the second frequency region; and >>: RSRP of the downlink pathloss reference is more than rsrp-ThresholdMsg3; and >: not applicable for the RA procedure in case that:

>>: set of RA resources with msg3-Repetition set to true is available neither for the first frequency region nor for the second frequency region.

UE determines a msg1-Repetition feature is:

>: applicable for the RA procedure in case that:

>>: all sets of RA resources for the first frequency region are configured with msg1-Repetitions set to true; and >>: all sets of RA resources for the second frequency region are configured with msg1-Repetitions set to true;

>: not applicable for the RA procedure in case that:

>>: none of sets of RA resources for the first frequency region are configured with msg1-Repetitions set to true; and >>: none of sets of RA resources for the second frequency region are configured with msg1-Repetitions set to true;

>: applicable for the RA procedure in case that:

>>: one or more sets of RA resources for the first frequency region are configured with msg1-Repetitions set to true or one or more sets of RA resources for the second frequency region are configured with msg1-Repetitions set to true; and >>: RSRP of the downlink pathloss reference is less than at least one of rsrp-ThresholdMsg1-RepetitionNumX;

>: not applicable for the RA procedure in case that:

>>: one or more sets of RA resources for the first frequency region are configured with msg1-Repetitions set to true or one or more sets of RA resources for the second frequency region are configured with msg1-Repetitions set to true; and >>: RSRP of the downlink pathloss reference is more than all of rsrp-ThresholdMsg1-RepetitionNumX.

>: SbfdSelection:

>>: indicates the probability that UE selects a set of RA resource for a specific set of features in case that set of RA resources indicating same set of features is available in both the first frequency region and in the second frequency region;

>>: is comprised in initialUpliknBWP field (or corresponding IE in the field); and >>: indicates an integer between a lowest value (1) and a highest value (100);

>: UE draws a random number between the lowest value and the highest value;

>: UE selects the set of RA resources:

>>: in the first frequency region in case that the random number is equal to or less than the integer; and >>: in the second frequency region in case that the random is higher than the integer or SbfdSelection is not comprised in the initialUplinkBWP field;

>: SbfdSelection:

>>: is comprised in initialUpliknBWP field (or corresponding IE in the field); and >>: enumerated with a single value indicating enabled;

>: UE selects the set of RA resources:

>>: either in the second frequency region or in the first frequency region with same probability in case that the SbfdSelection is present in initialUpliknBWP field (or corresponding IE in the field); and >>: in the second frequency region in case that the SbfdSelection is not present in initialUplinkBWP field (or corresponding IE in the field).

default-RO, non-sbfd-RO and first RO are used interchangeably, additional-RO, sbfd-RO and second RO are used interchangeably.

The format of RAR is illustrated below. RAR is carried within a MAC PDU (F100).

A MAC PDU for RAR consists of one or more MAC subPDUs and optionally padding. Each MAC subPDU consists one of the following:

>: a MAC subheader with Backoff Indicator only;

>: a MAC subheader with RAPID only (i.e. acknowledgment for SI request);

>: a MAC subheader with RAPID and MAC RAR.

A MAC subheader with Backoff Indicator (F110) consists of five header fields E/T/R/R/BI.

A MAC subPDU with Backoff Indicator only is placed at the beginning of the MAC PDU, if included.

'MAC subPDU(s) with RAPID only' and 'MAC subPDU(s) with RAPID and MAC RAR' can be placed anywhere between MAC subPDU with Backoff Indicator only (if any) and padding (if any).

A MAC subheader with RAPID (F120) consists of three header fields E/T/RAPID.

The MAC RAR (F130) is of fixed size and consists of the following fields:

>: R: Reserved bit, set to 0;

>: Timing Advance Command: The Timing Advance Command field indicates the index value TA used to control the amount of timing adjustment that the MAC entity has to apply in TS 38.213 [6]. The size of the Timing Advance Command field is 12 bits;

>: UL Grant: The Uplink Grant field indicates the resources to be used on the uplink in TS 38.213 [6]. The size of the UL Grant field is 27 bits;

>: Temporary C-RNTI: The Temporary C-RNTI field indicates the temporary identity that is used by the MAC entity during Random Access. The size of the Temporary C-RNTI field is 16 bits.

UL Grant (F140) has following fields:

>: Frequency hopping flag (FH);

>: PUSCH frequency resource allocation (FRA);

>: PUSCH time resource allocation (TRA);

>: MCS;

>: TPC command for PUSCH; and

>: CSI request.

value m of TAR field in the RAR UL grant provides/ indicates a row index m+1 to a resource allocation table. The resource allocation table is either pusch-TimeDomainAllocationList provided in pusch-Config-Common or Default A table (if TimeDomainAllocationList provided in pusch-ConfigCommon is not provided in pusch-ConfigCommon of the selected uplink carrier).

pusch-TimeDomainAllocationList comprises one or more pusch-TimeDomainAllocation IEs Each of pusch-TimeDomainAllocation comprises following fields:

>: k2 field that indicates the time domain offset between UL grant and PUSCH transmission. If this field is absent, the UE applies the value 1 when PUSCH SCS is 15/30 kHz; the value 2 when PUSCH SCS is 60 kHz, and the value 3 when PUSCH SCS is 120 kHz;

>: mappingType field that indicates either typeA or typeB,

>: startSymbolAndLength that indicates an index giving valid combinations of start symbol and length (jointly encoded) as start and length indicator (SLIV).

The first pusch-TimeDomainAllocation corresponds to row index 1, the second to row index 2 and so on.

The indexed row defines the slot offset K2, the start symbol S and the allocation length L and the PUSCH mapping type, the number of slots used for TBS determination (if numberOfSlotsTBoMS is present in the resource allocation table).

Table 5 below shows the Default A table. j is a variable of which value is determined based on the PUSCH SCS.

TABLE 5

| Row index | PUSCH mapping type | $K_2$ | S | L |
|---|---|---|---|---|
| 1 | Type A | j | 0 | 14 |
| 2 | Type A | j | 0 | 12 |
| 3 | Type A | j | 0 | 10 |
| 4 | Type B | j | 2 | 10 |
| 5 | Type B | j | 4 | 10 |
| 6 | Type B | j | 4 | 8 |
| 7 | Type B | j | 4 | 6 |
| 8 | Type A | j + 1 | 0 | 14 |
| 9 | Type A | j + 1 | 0 | 12 |
| 10 | Type A | j + 1 | 0 | 10 |
| 11 | Type A | j + 2 | 0 | 14 |
| 12 | Type A | j + 2 | 0 | 12 |
| 13 | Type A | j + 2 | 0 | 10 |
| 14 | Type B | j | 8 | 6 |
| 15 | Type A | j + 3 | 0 | 14 |
| 16 | Type A | j + 3 | 0 | 10 |

TABLE 6

| PUSCH SCS | j |
|---|---|
| 15 KHz | 1 |
| 30 KHz | 1 |
| 60 KHz | 2 |
| 120 KHz | 3 |
| 240 KHz | 11 |
| 480 KHz | 21 |

FRA field indicates a set of contiguously allocated non-interleaved virtual resource blocks within the first frequency region or within the second frequency region. FRA field comprises a resource indication value (RIV) corresponding to a starting virtual resource block (RB_start) and a length in terms of contiguously allocated resource blocks L_RBs. The RIV is defined:

>: if (L_RBs−1) is smaller than or equal to floor (N_frequencyRegion_size/2), RIV is equal to N_frequencyRegion_size*(L_RBs−1)+RB_start; and >: if (L_RBs−1) is greater than floor (N_frequencyRegion_size/2), RIV is equal to N_frequencyRegion_size*(N_frequencyRegion_size−L_RBs+1)+(N_frequencyRegion_size−1−RB_start).

N_frequencyRegion_size is number of RBs of a specific frequency region.

Once the Random Access Preamble is transmitted and regardless of the possible occurrence of a measurement gap, UE starts the ra-ResponseWindow.

UE monitors the PDCCH of the SpCell for Random Access Response(s) identified by the RA-RNTI while the ra-ResponseWindow is running.

UE monitors different RA-RNTIs depending on which frequency region the preamble has been transmitted. UE monitors a first RA-RNTI for RAR reception in case that the preamble related to the RAR is transmitted in the first frequency region. UE monitors a second RA-RNTI for RAR reception in case that the preamble related to the RAR is transmitted in the second frequency region. The first RA-RNTI and the second RA-RNTI are different. The first RA-RNTI belongs to the first set of RA-RNTIs. The second RA-RNTI belongs to the second set of RA-RNTIs. Each RA-RNTI of the first set of RA-RNTIs is associated with a default-RO. Each RA-RNTI of the second set of RA-RNTIs is associated with a sbfd-RO.

>: In case that:

>>: a valid downlink assignment has been received on the PDCCH for the RA-RNTI and the received TB is successfully decoded; and >>: the Random Access Response contains a MAC sub-PDU with Random Access Preamble identifier corresponding to the transmitted preamble, >: UE performs:

>>: processing the received Timing Advance Command;

>>: determining uplink transmission power based on preambleReceivedTargetPower and the amount of power ramping applied to the latest Random Access Preamble transmission (i.e. (PREAMBLE_POWER_RAMPING_COUNTER−1)× PREAMBLE_POWER_RAMPING_STEP); and >>: determining time domain resource and frequency domain resource for PUSCH transmission based on the UL grant in the RAR.

For PUSCH transmission at S150-35, UE performs the following. UE determines time domain resource and frequency domain resource based on the contents of UL Grant and the frequency region where the preamble is transmitted. UE performs PUSCH transmission either in the first frequency region or in the second frequency region based on the determination.

For frequency region determination, UE performs followings.

>: If TRA field in the UL grant indicates:

>>: the first symbol of the PUSCH transmission occurs in a SBFD duration (in SBFD symbol);

>>: the whole PUSCH transmission duration occurs during the SBFD duration (in SBFD symbols); or >>: at least part of the PUSCH transmission duration occurs during the SBFD duration (in SBFD symbols), >: UE determines the PUSCH transmission to be performed in the second frequency region (E700).

>: If TRA field in the UL grant indicates:

>>: the first symbol of the PUSCH transmission duration occurs in non-SBFD duration (in a flexible symbol or in an uplink symbol); or >>: the whole PUSCH transmission duration occurs in non-SBFD duration (in flexible symbols or in uplink symbols);

>>: at least part of the PUSCH transmission duration occurs in non-SBFD duration (flexible symbols or in uplink symbols), >: UE determines the PUSCH transmission to be performed in the first frequency region (E800).

Non-SBFD Duration:

>: is time period that is not SBFD duration;

>: consists of:

>>: uplink symbols according to first part of tdd-UL-DL-ConfigurationCommon (referenceSubcarrierSpacing; patten 1; pattern 2);

>>: set of symbols that are flexible symbols according to first part of tdd-UL-DL-ConfigurationCommon and are not sbfd symbols according to second part of tdd-UL-DL-ConfigurationCommon (offsetToFirstSBSymobol; nrOfSBSymbols); and >>: set of symbols that are uplink symbols according to first part of tdd-UL-DL-ConfigurationCommon and are not sbfd symbols according to second part of tdd-UL-DL-ConfigurationCommon (offsetToFirstSBSymobol; nrOfSBSymbols);

>: resides both in the pattern 1 and in the pattern 2.

SBFD Duration:

>: consists of:

>>: set of symbols that are flexible symbols according to first part of tdd-UL-DL-ConfigurationCommon and are sbfd symbols according to second part of tdd-UL-DL-ConfigurationCommon (offsetToFirstSBSymobol; nrOfSBSymbols); and >>: set of symbols that are downlink symbols according to first part of tdd-UL-DL-ConfigurationCommon and are sbfd symbols according to second part of tdd-UL-DL-ConfigurationCommon (offsetToFirstSBSymobol; nrOfSBSymbols);

>: resides either in the pattern 1 or in the pattern 2.

PUSCH transmission is performed on consecutive symbols. PUSCH transmission duration is the set of symbols where the PUSCH transmission occurs.

UE determines the starting slot of the PUSCH transmission duration (e.g. UE determines frequency region) based on:

>: a K2 (or j) that is determined form the PUSCH SCS of the first frequency region when determining whether PUSCH duration belongs to time domain resource of initial uplink BWP (e.g., whether TRA indicates uplink symbol or flexible symbol); and >: a K2 (or j) that is determined form the PUSCH SCS of the second frequency region when determining whether PUSCH duration belongs to SBFD duration (e.g., whether TRA indicates SBFD symbol).

Alternatively, UE performs followings for frequency resource determination.

UE performs the PUSCH transmission in the second frequency region in case that:

>: the preamble transmission has been performed in the second frequency region; and >: puschSbfdAllowed (one bit indication) is comprised in uplinkConfigCommon of the system information.

UE performs the PUSCH transmission in the first frequency region in case that:

>: the preamble transmission has been performed in the first frequency region; or >: puschSbfdAllowed (one bit indication) is not comprised in uplinkConfigCommon of the system information.

UE determines the PRBs for PUSCH transmission based on FRA and the determined frequency region.

If the first frequency region is selected for PUSCH transmission, UE determines a set of continuously allocated resource blocks of the first frequency region based on:

>: N_frequencyRegion_size of the first frequency region; and

>: FRA in the UL grant.

If the second frequency region is selected for PUSCH transmission, UE determines a set of continuously allocated resource blocks of the second frequency region based on:

>: N_frequencyRegion_size of the second frequency region; and

>: FRA in the UL grant.

UE performs the PUSCH transmission based on the determinations above.

When UE receives Msg4 for contention resolution at S150-40, UE performs the following.

Once Msg3 is transmitted UE performs following:

>: starting or restarting the ra-ContentionResolutionTimer in the first symbol after the end of the Msg3 transmission; and >: monitoring the PDCCH while the ra-ContentionResolutionTimer is running regardless of the possible occurrence of a measurement gap.

>: In case that:

>>: notification of a reception of a PDCCH transmission of the SpCell is received from lower layers;

>>: the MAC PDU is successfully decoded;

>>: the MAC PDU contains a UE Contention Resolution Identity MAC CE; and

>>: the UE Contention Resolution Identity in the MAC CE matches the CCCH SDU transmitted in Msg3, >: UE stops ra-ContentionResolutionTimer and consider this Random Access procedure successfully completed.

To transmit HARQ ACK for Msg4 at S150-45, UE performs the following.

In response to a PUSCH transmission scheduled by a RAR UL grant when a UE has not been provided a C-RNTI, the UE attempts to detect a DCI format 1_0 with CRC scrambled by a corresponding TC-RNTI scheduling a PDSCH that includes a UE contention resolution identity. In response to the PDSCH reception with the UE contention resolution identity, the UE transmits HARQ-ACK information in a PUCCH. The PUCCH transmission is within the first frequency resource (if PUSCH and/or preamble was transmitted in the first frequency region) or within the second frequency region (if PUSCH and/or preamble was transmitted in the second frequency region and if the second set of parameters for PUCCH resource for the second frequency region is provided in the system information).

UE performs HARQ-ACK transmission in the first frequency region based on:

>: a first set of parameters for PUCCH resource;

>: a second set of parameters for PUCCH resource for the first frequency region;

>: a set of uplink carrier specific parameters; and

>: a set of parameters for the first frequency region.

UE performs HARQ-ACK transmission in the second frequency region based on:

>: the first set of parameters for PUCCH resource;

>: the second set of parameters for PUCCH resource for the second frequency region;

>: a set of downlink carrier specific parameters; and

>: a set of parameters for the second frequency region.

The first set of parameters for PUCCH resources and the second set of parameters for PUCCH resource for the first frequency region are contained in a single IE.

The second set of parameters for PUCCH resource for the second frequency region is contained in the single IE or in a different IE (e.g. IE for SBFD RA configuration).

The first set of parameters for PUCCH resources is applied to HARQ ACK transmission in the first frequency region and to HARQ ACK transmission in the second frequency region.

The second set of parameters for PUCCH resource for the first frequency region is applied to HARQ ACK transmission in the first frequency region.

The second set of parameters for PUCCH resource for the second frequency region is applied to HARQ ACK transmission in the second frequency region.

The second set of parameters for PUCCH resource comprises:

>: pucch-ResourceCommon field; and

>: nrofPRBs field.

The first set of parameters for PUCCH resource comprises:

>: p0-nominal field; and

>: pucch-GroupHopping field.

pucch-GroupHopping field indicates configuration of group- and sequence hopping for all the PUCCH formats 0, 1, 3 and 4. Value 'neither' implies neither group or sequence hopping is enabled. Value 'enable' enables group hopping and disables sequence hopping. Value 'disable' disables group hopping and enables sequence hopping.

p0-nominal field provides power control parameter P0 for PUCCH transmissions.

nrofPRBs field indicates the number of PRBs used per PUCCH resource for PUCCH format 0 (TS 38.213, clause 9.2.1)

pucch-ResourceCommon field indicates an entry into a 16-row table where each row configures a set of cell-specific PUCCH resources/parameters. (TS 38.213, clause 9.2). Each entry is associated with PUCCH format, time resource and starting PRB of frequency resource.

RAR is received in the second frequency region.

RAR reception is essential to complete RA procedure. Since the PRACH preamble can be transmitted either in the first frequency region or in the second frequency region, a mean to determine whether a RAR is for PRACH preamble transmission in the first frequency region or in the second frequency region.

UE performs followings for RAR reception:

>: UE receives system information, wherein the system information comprises various information elements (IEs);

>: UE triggers a random access (RA) procedure;

>: UE transmits a PRACH preamble on a first RO in first frequency region or on a second RO in second frequency region;

>: UE monitors a PDCCH of a specific RA-RNTI during a specific duration in the third frequency region;

>: UE receives RAR containing a MAC subPDU with Random Access Preamble identifier corresponding to the PRACH preamble; and >: UE performs PUSCH transmission based on the UL grant in the RAR, The specific RA-RNTI is selected from:

>: a first set of RA-RNTIs in case that the PRACH preamble is transmitted in the first frequency region; and >: a second set of RA-RNTIs in case that the PRACH preamble is transmitted in the second frequency region.

The specific RA-RNTI is determined/computed, in case that the PRACH preamble is transmitted in the first frequency region, based on:

>: the parameter for frequency starts in the IE for RA generic configuration;

>: SCS-SpecificCarrier in uplink configuration;

>: the parameter for prach configuration index in the IE for RA generic configuration;

>: the first TDD-UL-DL-Pattern IE in tdd-UL-DL-ConfigCommon; and

>: the second TDD-UL-DL-Pattern IE in tdd-UL-DL-ConfigCommon.

The specific RA-RNTI is determined/computed, in case that the PRACH preamble is transmitted in the second frequency region, based on:

>: the parameter for frequency starts in the IE for RA on second frequency region;

>: SCS-SpecificCarrier in downlink configuration;

>: the parameter for prach configuration index in the IE for RA second frequency region;

>: the first TDD-UL-DL-Pattern IE in tdd-UL-DL-ConfigCommon or the second TDD-UL-DL-Pattern IE in tdd-UL-DL-ConfigCommon; and >: associatedPattern field in tdd-UL-DL-ConfigCommon;

>: offsetToFirstSBSymbol field in tdd-UL-DL-ConfigCommon; and

>: nrOfSBSymbols field in tdd-UL-DL-ConfigCommon.

The RA-RNTI associated with the PRACH occasion in which the Random Access Preamble is transmitted or the RA-RNTI associated with the last valid PRACH occasion in the set of PRACH occasions for Msg1 repetition, is computed as:

$$RA\text{-}RNTI=1+s\_id+14\times t\_id+14\times 80\times f\_id+14\times 80\times 8\times ul\_carrier\_id+SBFD\_RA\_RNTI\_OFFSET$$

where:

>: s_id is the index of the first OFDM symbol of the PRACH occasion ($0 \leq s\_id < 14$);

>: t_id is the index of the first slot of the PRACH occasion in a system frame ($0 \leq t\_id < 80$), where the subcarrier spacing to determine t_id is based on the value of $\mu$ (SCS index) for $\mu=\{0, 1, 2, 3\}$, and for $\mu=\{5, 6\}$, t_id is the index of the 120 kHz slot in a system frame that contains the PRACH occasion ($0 \leq t\_id < 80$);

>: f_id is the index of the PRACH occasion in the frequency domain ($0 \leq f\_id < 8$), and ul_carrier_id is the UL carrier used for Random Access Preamble transmission (0 for NUL carrier, and 1 for SUL carrier).

In case that the PRACH occasion (RO) in which the Random Access Preamble is transmitted or the RA-RNTI associated with the last valid PRACH occasion in the set of PRACH occasions for Msg1 repetition is non-SBFD RO (non-SBFD symbols):

>: s_id and t_id are determined based on:

>>: SCS-SpecificCarrier in uplink configuration;

>>: the parameter for prach configuration index for non-SBFD RO in the IE for RA generic configuration;

>>: the first TDD-UL-DL-Pattern IE in tdd-UL-DL-ConfigCommon; and

>>: the second TDD-UL-DL-Pattern IE in tdd-UL-DL-ConfigCommon.

>: f_id is determined based on:

>>: FDM related parameters (msg1-FDM, msg1-FrequencyStart) in RA generic configuration >: SBFD_RA_RNTI_OFFSET is equal to zero.

In case that the PRACH occasion (RO) in which the Random Access Preamble is transmitted or the RA-RNTI associated with the last valid PRACH occasion in the set of PRACH occasions for Msg1 repetition is SBFD RO (SBFD symbols):

>: s_id and t_id are determined based on:

>>: SCS-SpecificCarrier in downlink configuration;

>>: the parameter for prach configuration index for SBFD RO in the sbfd-Config IE;

>>: the first TDD-UL-DL-Pattern IE in tdd-UL-DL-ConfigCommon;

>>: the second TDD-UL-DL-Pattern IE in tdd-UL-DL-ConfigCommon;

>>: offsetToFirstSBSymbol field in tdd-UL-DL-ConfigCommon; and

>>: nrOfSBSymbols field in tdd-UL-DL-ConfigCommon;

>: f_id is determined based on:

>>: FDM related parameters (msg1-FDM-sbfd-sbfd, msg1-FrequencyStart-sbfd) in sbfd-config IE >: SBFD_RA_RNTI_OFFSET is equal to a specific value. The specific value may be preconfigured or indicated in the system information.

When SBFD/second frequency region is configured in a serving cell, it is beneficial that GNB has control on which frequency region Msg 3 is transmitted. GNB uses TRA field in the RAR to indicates the frequency region for Msg 3 transmission.

UE performs the following for Msg 3 transmission:

>: UE receives system information, wherein the system information comprises various information elements (IEs);

>: UE triggers a random access (RA) procedure;

>: UE transmits a PRACH preamble on a first RO in first frequency region or on a second RO in second frequency region;

>: UE monitors a PDCCH of a specific RA-RNTI during a specific duration in the third frequency region;

>: UE receives RAR containing a MAC subPDU with Random Access Preamble identifier corresponding to the PRACH preamble; and >: UE performs PUSCH transmission based on the TAR field and FAR field in the RAR, PUSCH transmission based on RAR is performed:

>: in the first frequency region in case that TAR field indicates that PUSCH transmission is performed during a first time period; and >: in the second frequency region in case that TAR field indicates that PUSCH transmission is performed during a second time period, PRBs for PUSCH transmission is determined based on FRA field in the RAR and:

>: number of PRBs of the first frequency region in case that PUSCH transmission is performed during the first time period; and >: number of PRBs of the second frequency region in case that PUSCH transmission is performed during the second time period.

UE performs the following for contention resolution and HARQ ACK transmission:

>: UE receives system information, wherein the system information comprises various information elements (IEs);

>: UE triggers a random access (RA) procedure;

>: UE transmits a PRACH preamble on a first RO in first frequency region or on a second RO in second frequency region;

>: UE monitors a PDCCH of a specific RA-RNTI during a specific duration in the third frequency region;

>: UE receives RAR containing a MAC subPDU with Random Access Preamble identifier corresponding to the PRACH preamble;

>: UE performs PUSCH transmission based on the TAR field and FAR field in the RAR;

>: UE performs PDSCH reception for contention resolution; and

>: UE performs HARQ ACK transmission.

wherein HARQ ACK transmission is performed either in the first frequency region or in the second frequency region.

The Bandwidth Part (BWP) is an essential feature of the 5G NR system that enables efficient allocation of the available bandwidth. The BWP provides flexibility in the allocation of the bandwidth to the users based on their specific requirements. In RRC_IDLE/INACTIVE state, UE performs transmission and reception in an initial BWP. Since data transfer activity during RRC_IDLE/INACTIVE state is limited, there is no need for additional BWP. Unlink in RRC_IDLE/INACTIVE state, UE in RRC_CONNECTED state can be configured with more than one BWPs. UE may switch back and forth between BWPs to maximize the efficiency of data transfer and minimize the battery consumption.

Initial BWP is common to UEs in the cell. The configuration of the initial BWP is provided in the system information. BWPs configured for the UE (e.g. dedicated BWPs) are UE specific. The configuration of dedicate BWPs is provided via RRC message.

If the UE is operating in a SBFD cell, some BWPs of the UE may overlap with the SBFD resource pool as shown in E800. If a BWP (e.g. BWP #2) is partly overlaps with the SBFD frequency region, scheduling in the BWP becomes inefficient and complex. During the overlapped period, UE may need to determine the priority between downlink operation (in DL/FL resource) and uplink operation (in SBFD resource). Moreover, the basic principle regarding center frequency (downlink center frequency and uplink center frequency of a BWP is same) does not hold, which may impact hardware design of the terminal.

In this disclosure, base station configures dedicate BWPs such that entire SBFD resource pool exactly fit into a BWP (e.g. all PRBs of the BWP are SBFD PRBs and all PRBs of other BWP are not SBFD PRBs).

BWP that contains entire SBFD resource pool is called SBFD-BWP (S-BWP). S-BWP (E900) consists only with non-SBFD resource pool during a period and only with SBFD resource during other period. All PRBs of the S-BWP are SBFD PRBs. One bit indication (indicating all PRBs of the BWP are SFD PRBBs) is present in S-BWP configuration information.

BWP that does not contain SBFD resource pool is called legacy-BWP (L-BWP). L-BWP (E1000) consists only with non-SBFD resource pool all the time. All PRBs of the L-BWP are non-SBFD PRBs.

That Active BWP being L-BWP is equivalent to that UE is scheduled within a set of PRBs for L-BWP.

That Active BWP being S-BWP is equivalent to that UE is scheduled within a set of PRBs for S-BWP.

Figure 22:
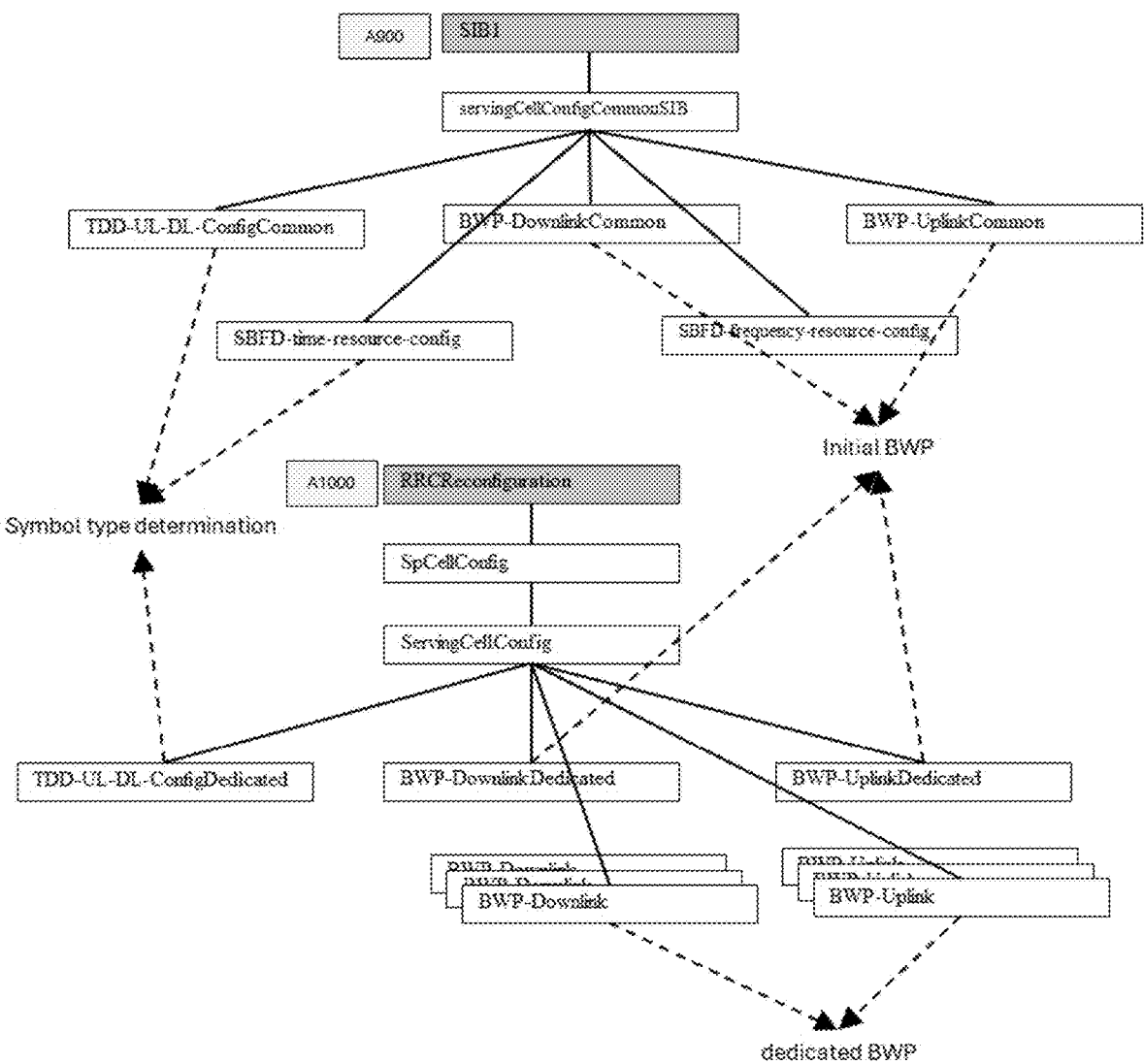
FIG. 22 is a diagram illustrating ASN.1 structure of SIB1 and RRCReconfiguration.
Figure 23:
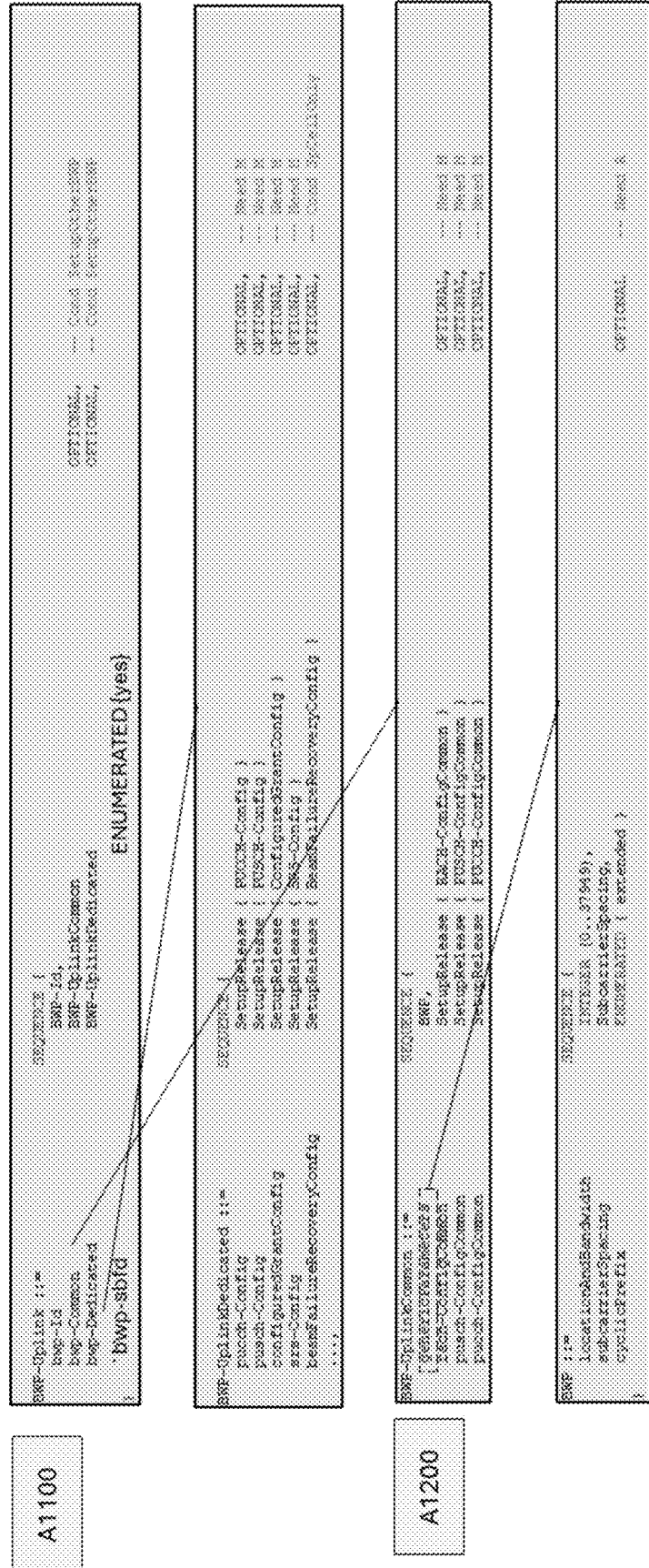
FIG. 23 is a diagram illustrating ASN.1 structure of BWP configuration information.
Figure 24:
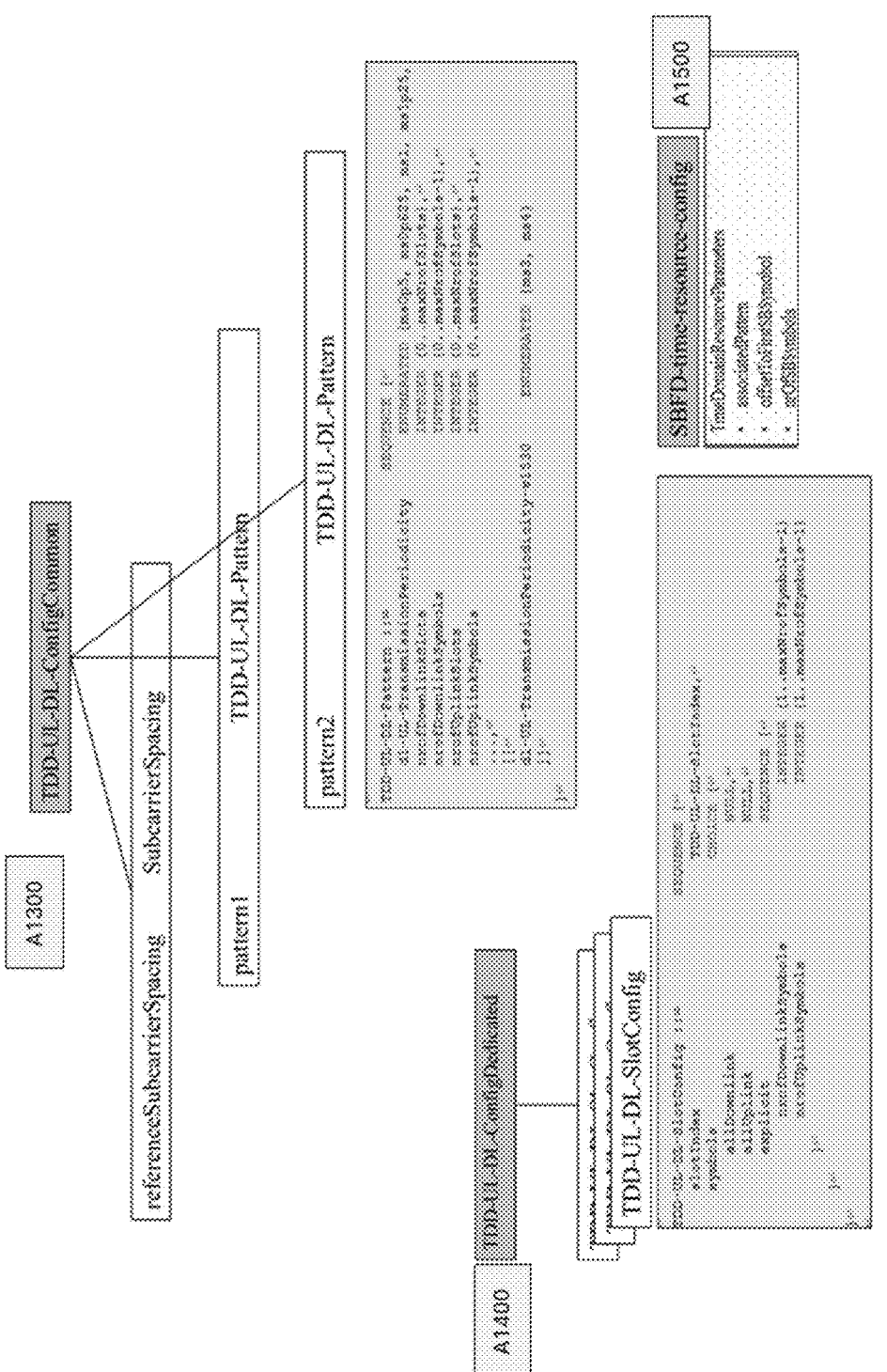
FIG. 24 is a diagram illustrating ASN.1 structure of TDD uplink downlink configuration.
Figure 25:
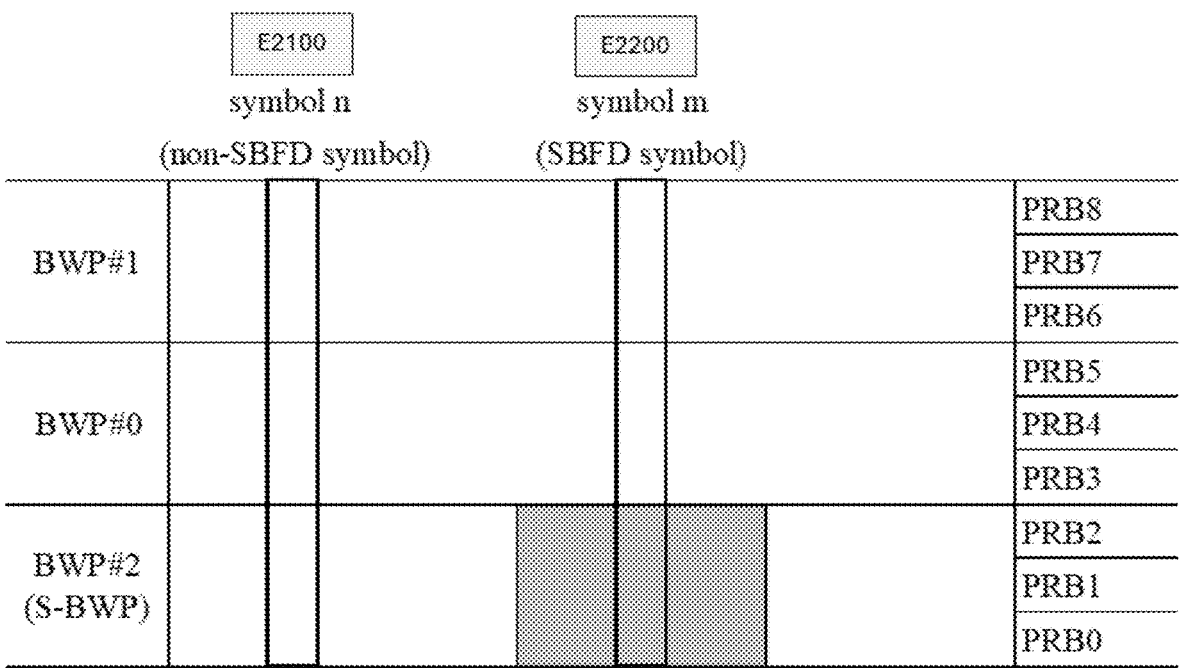
FIG. 25 illustrates an example of S-BWP and L-BWP of a cell.
Figure 26:
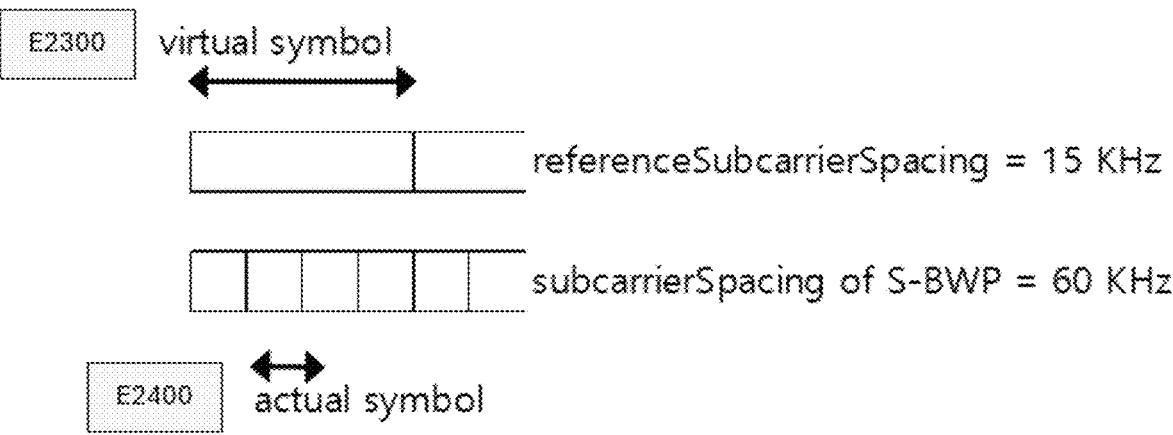
FIG. 26 illustrates an example of virtual symbol and actual symbol.

FIG. 22 illustrates the signaling structure for symbol type determination and BWP configuration.

For UE in RRC_CONNECTED, following BWPs are configured:

>: An initial downlink BWP;

>: An initial uplink BWP;

>: One or more dedicated downlink BWPs; and

>: One or more dedicated uplink BWPs.

The initial downlink BWP is configured by BWP-DownlinkCommon IE (in initialDownlinkBWP field) in SIB1 (A900) and BWP-DownlinkDedicated IE (in initialDownlinkBWP field) in RRCReconfiguration (A1000).

The initial uplink BWP is configured by BWP-UplinkCommon IE (in initialUplinkBWP field) in SIB1 (A900) and BWP-UplinkDedicated IE (in initialUplinkBWP field) in RRCReconfiguration (A1000).

One or more dedicated downlink BWPs are configured by one or more BWP-Downlink IEs in RRCReconfiguration (A1000).

One or more dedicated uplink BWPs are configured by one or more BWP-Uplink IEs in RRCReconfiguration (A1000).

SBFD resource pool is configured in one of the one or more dedicated uplink BWPs.

bwp-sbfd field in BWP-Uplink IE (A1100) indicates the uplink BWP where SBFD resource pool (or SBFD PRBs) is configured. UE determines S-BWP based on the bwp-sbfd field. UE determines the location and bandwidth of the S-BWP based on locationAndBandwidth field in the corresponding BWP-UplinkCommon IE (A1200). UE determines SBFD PRBs based on the locationAndBandwidth field since the whole bandwidth of the S-BWP is SBFD PRB.

Alternatively, UE determines that a BWP is S-BWP as following:

>: the SBFD resource pool is determined based on received system information; and >: BWP where SBFD resource pool resides is S-BWP.

SBFD-PRBs are available for:

>: downlink reception during a first symbol (that is indicated as downlink by TDD-UL-DL-Configuration-Common and indicated as not SBFD symbol by SBFD-time-resource-configuration);

>: uplink transmission during a second symbol (that is indicated as downlink by TDD-UL-DL-Configuration-Common and indicated as SBFD symbol by SBFD-time-resource-configuration); and >: uplink transmission during a third symbol (that is indicated as uplink by TDD-UL-DL-Configuration-Common or by TDD-UL-DL-ConfigurationDedicated).

Non SBFD-PRBs are available for:

>: downlink reception during the first symbol (that is indicated as downlink by TDD-UL-DL-Configuration-Common and indicated as not SBFD symbol by SBFD-time-resource-configuration);

>: downlink reception during the second symbol (that is indicated as downlink by TDD-UL-DL-Configuration-Common and indicated as SBFD symbol by SBFD-time-resource-configuration); and >: uplink transmission during the third symbol (that is indicated as uplink by TDD-UL-DL-Configuration-Common or by TDD-UL-DL-ConfigurationDedicated).

PRB in initial BWP is not configured as SBFD-PRB.

PRB in non-initial BWP is configured as SBFD-PRB.

In unpaired spectrum (i.e. TDD), a direction/type of specific spectrum (e.g. PRB2 in E1000) changes over time (or changes symbol by symbol). A symbol is either a downlink symbol or an uplink symbol or a flexible symbol. In TDD, one UL BWP and one DL BWP are activated at a time. The UL BWP and the DL BWP having the same bwp-Id are activated together. The UL BWP and the DL BWP having the same bwp-Id are paired BWPs. GNB configures the paired BWPs to have same center frequency and to have same bandwidth.

When activated BWPs are L-BWPs:

>: the DL BWP occurs at downlink symbol; and

>: the UL BWP occurs at uplink symbol.

When activated BWPs are S-BWPs:

>: the DL BWP occurs at downlink symbol; and

>: the UL BWP occurs at uplink symbol and SBFD symbol.

When activated BWPs are L-BWPs, UE in RRC_CONNECTED determines symbol type based on:

>: parameters in TDD-UL-DL-ConfigCommon; and

>: parameters in TDD-UL-DL-ConfigDedicated.

When activated BWPs are S-BWPs, UE in RRC_CONNECTED determines symbol type based on:

>: parameters in TDD-UL-DL-ConfigCommon;

>: parameters in SBFD-time-resource-config; and

>: parameters in TDD-UL-DL-ConfigDedicated.

TDD-UL-DL-ConfigCommon (A1300) comprises referenceSubcarrierSpacing field and pattern1 field and pattern2 field.

TDD-UL-DL-ConfigDedicated (A1400) comprises one or more TDD-UL-DL-SlotConfig IEs.

SBFD-time-resource-config IE (A1500) comprises Time-DomainResourceParameters IE.

For L-BWPs:

>: Based on TDD-UL-DL-ConfigCommon, UE determines downlink symbols and uplink symbols and flexible symbols during a pattern period;

>: Based on TDD-UL-DL-ConfigDedicated, UE determines downlink symbols and uplink symbols that are indicated as flexible symbols in TDD-UL-DL-Config-Common;

For S-BWPs:

>: Based on TDD-UL-DL-ConfigCommon, UE determines downlink symbols and uplink symbols and flexible symbols during a pattern period;

>: Based on SBFD-time-resource-config, UE determines SBFD symbols and non-SBFD symbols during the pattern period; and >: Based on TDD-UL-DL-ConfigCommon, UE determines downlink symbols and uplink symbols that are indicated as flexible symbols in TDD-UL-DL-Config-Common and indicated as non-SBFD symbols in SBFD-time-resource-config.

symbol_rx denotes a symbol available for reception. symbol_tx denotes a symbol available for transmission.

For L-BWP:

>: A UE considers symbols in a slot indicated as downlink by tdd-UL-DL-ConfigurationCommon, or tdd-UL-DL-ConfigurationDedicated to be available for receptions and considers symbols in a slot indicated as uplink by tdd-UL-DL-ConfigurationCommon, or by tdd-UL-DL-ConfigurationDedicated to be available for transmissions.

For S-BWP:

>: A UE considers a symbol to be available for reception in case that:

>>: the symbol is indicated as downlink by tdd-UL-DL-ConfigurationCommon or tdd-UL-DL-Configuration-Dedicated; and >>: the symbol is not indicated as sbfd symbol by SBFD-time-resource-config.

A UE considers a symbol to be available for transmission in case that the symbol is indicated as uplink by tdd-UL-DL-ConfigurationCommon or tdd-UL-DL-Configuration-Dedicated.

A UE considers a symbol to be available for transmission in case that:

>: the symbol is indicated as downlink by tdd-UL-DL-ConfigurationCommon or tdd-UL-DL-Configuration-Dedicated; and >: the symbol is indicated as sbfd symbol by SBFD-time-resource-config.

A UE considers a symbol to be available for transmission in case that:

>: the symbol is indicated as flexible by tdd-UL-DL-ConfigurationCommon and tdd-UL-DL-Configura-tionDedicated; and >: the symbol is indicated as sbfd symbol by SBFD-time-resource-config.

Alternatively, UE determines whether a symbol is available for reception or for transmission as below.

TABLE 7

| In common* indicated as | In SBFD*, indicated as | In dedicate* indicated as | Active BWP is L-BWP | Active BWP is S-BWP |
|---|---|---|---|---|
| downlink | SBFD symbol | downlink | available for reception | available for transmission |
| downlink | non-SBFD symbol | downlink | available for reception | available for reception |
| flexible | SBFD symbol | downlink | available for reception | available for transmission |
| flexible | SBFD symbol | flexible | available for either | available for transmission |
| flexible | SBFD symbol | uplink | available for transmission | available for transmission |
| flexible | non-SBFD symbol | downlink | available for reception | available for reception |
| flexible | non-SBFD symbol | flexible | available for either | available for either |
| flexible | non-SBFD symbol | uplink | available for transmission | available for transmission |
| uplink | non-SBFD symbol | uplink | available for transmission | available for transmission | common*: tdd-UL-DL-ConfigurationCommon
SBFD*: SBFD-time-resource-config
dedicated*: tdd-UL-DL-ConfigurationDedicated A symbol available for either direction is available either for transmission or for reception depending on uplink/downlink signal configuration or dynamic scheduling.

For L-BWP:
\>: A symbol is configured as
\>\>: downlink (e.g. available for reception), or uplink (available for transmission), as indicated by tdd-UL-DL-ConfigurationCommon or tdd-UL-DL-ConfigurationDedicated
\>\>: uplink, if the symbol is flexible (e.g. available for either) and the UE is configured to transmit SRS, PUCCH, PUSCH, or PRACH on the symbol
\>\>: downlink (e.g. available for reception), if the symbol is flexible and the UE is configured to receive PDCCH, PDSCH or CSI-RS on the symbol.

For S-BWP:
\>: A symbol is configured as
\>\>: downlink (e.g. available for reception), or uplink (available for transmission), based on combination of tdd-UL-DL-ConfigurationCommon and tdd-UL-DL-ConfigurationDedicated and SBFD-time-resource-config;
\>\>: uplink (available for transmission), if the symbol is flexible (e.g. available for either) and the UE is configured to transmit SRS, PUCCH, PUSCH, or PRACH on the symbol; and
\>\>: downlink (e.g. available for reception), if the symbol is flexible (e.g. available for either) and the UE is configured to receive PDCCH, PDSCH or CSI-RS on the symbol.

That UE is configured to transmit SRS on the symbol in a BWP is equivalent to that:
\>: SRS-Config is configured for the BWP; and
\>: SRS occasion occurs on the symbol.

The UE transmits SRS on the symbol in the BWP in case that:
\>: the UE is configured to transmit SRS on the symbol; and
\>: the symbol is available for transmission.

That UE is configured to transmit PUCCH on the symbol in a BWP is equivalent to that:
\>: PUCCH-Config is configured for the BWP; and
\>: PUCCH occasion occurs on the symbol.

The UE transmits PUCCH on the symbol in the BWP in case that:
\>: the UE is configured to transmit PUCCH on the symbol; and
\>: the symbol is available for transmission.

That UE is configured to transmit PUSCH on the symbol in a BWP is equivalent to that:
\>: ConfiguredGrantConfig is configured for the BWP; and
\>: an activated configured grant occurs on the symbol.

The UE transmits PUSCH on the symbol in the BWP in case that:
\>: the UE is configured to transmit PUSCH on the symbol; and
\>: the symbol is available for transmission.

That UE is configured to transmit PRACH on the symbol in a BWP is equivalent to that:
\>: RACH-ConfigCommon is configured for the BWP; and
\>: a PRACH occasion occurs on the symbol.

The UE transmits PRACH on the symbol in the BWP in case that:
\>: the UE is configured to transmit PRACH on the symbol; and
\>: the symbol is available for transmission.

That UE is configured to receive PDCCH on the symbol in a BWP is equivalent to that:
\>: A SearchSpace is configured for the BWP (e.g. associated CORESET is configured within the BWP); and
\>: The SearchSpace occurs on the symbol.

The UE receives PDCCH on the symbol in the BWP in case that:
\>: the UE is configured to receive PDCCH on the symbol; and
\>: the symbol is available for reception.

That UE is configured to receive PDSCH on the symbol in a BWP is equivalent to that:
\>: SPS-Config is configured for the BWP; and
\>: an activated configured assignment occurs on the symbol.

The UE receives PDSCH on the symbol in the BWP in case that:
\>: the UE is configured to receive PDSCH on the symbol; and
\>: the symbol is available for reception.

That UE is configured to receive CSI-RS on the symbol in a BWP is equivalent to that:
\>: A CSI-ResourceConfig is associated with the BWP; and
\>: The CSI-Resource is activated and occurs on the symbol.

The UE receives CSI-RS on the symbol in the BWP in case that:
\>: the UE is configured to receive CSI-RS on the symbol; and
\>: the symbol is available for reception.

A symbol is either in L-BWP or in S-BWP.

When the symbol is non-SBFD symbol (e.g. symbol n), the type/direction of the symbol is same across the BWPs (E2100).

When the symbol is SBFD symbol (e.g. symbol m), the type/direction of the symbol may be different between the L-BWP and S-BWP (E2200). For example, symbol m is DL symbol (available for reception) in BWP #1 and BWP #0 while is SBFD symbol (available for transmission) in BWP #2.

When a symbol is SBFD symbol:

>: the symbol is available for reception in L-BWP and available for transmission in S-BWP in case that the symbol is indicated:

>>: as downlink by tdd-UL-DL-ConfigurationCommon or tdd-UL-DL-ConfigurationDedicated; and >>: as sbfd symbol by SBFD-time-resource-config.

>: the symbol is available for reception in L-BWP and available for transmission in S-BWP in case that the symbol is indicated:

>>: as flexible by tdd-UL-DL-ConfigurationCommon and tdd-UL-DL-ConfigurationDedicated; and >>: as sbfd symbol by SBFD-time-resource-config; and >>: the UE is configured to receive PDCCH, PDSCH or CSI-RS on the symbol.

>: Let a symbol be:

>>: n-th symbol within a slot configuration period of P+P_2 msec; and

>>: k-th symbol of m-th slot within the slot configuration period P+P_2 msec.

>: The symbol is indicated as downlink by tdd-UL-DL-ConfigurationCommon in case that:

>>: $d\_slot*number\_of\_symbols\_per\_slot+d\_sym>=n$; or

>>: $P*number\_of\_symbols\_per\_subframe<n<=P*number\_of\_symbols\_per\_subframe+d\_slot2*number\_of\_symbols\_per\_slot+d\_sym2$; and >: The symbol is indicated as uplink by tdd-UL-DL-ConfigurationCommon in case that:

>>: $P*number\_of\_symbols\_per\_subframe-(u\_slot*number\_of\_symbols\_per\_slot+u\_slot)<n<=P*number\_of\_symbols\_per\_subframe$; or >>: $(P+P\_2)*number\_of\_symbols\_per\_subframe-(u\_slot2*number\_of\_symbols\_per\_slot+u\_slot2)<n<=(P+P\_2)*number\_of\_symbols\_per\_subframe$; and >: The symbol is indicated as flexible by tdd-UL-DL-ConfigurationCommon in case that:

>>: $d\_slot*number\_of\_symbols\_per\_slot+d\_sym<n=<P*number\_of\_symbols\_per\_subframe-(u\_slot*number\_of\_symbols\_per\_slot+u\_slot)$; or >>: $P*number\_of\_symbols\_per\_subframe+d\_slot2*number\_of\_symbols\_per\_slot+d\_sym2<n=<(P+P\_2)*number\_of\_symbols\_per\_subframe-(u\_slot2*number\_of\_symbols\_per\_slot+u\_slot2)$;

>: The symbol is indicated as downlink by tdd-UL-DL-ConfigurationDedicated in case that:

>>: The symbol is indicated as flexible by tdd-UL-DL-ConfigurationCommon; and

>>: nrofDownlinkSymbols of m-th slot>=k;

>: The symbol is indicated as uplink by tdd-UL-DL-ConfigurationDedicated in case that:

>>: The symbol is indicated as flexible by tdd-UL-DL-ConfigurationCommon; and

>>: number_of_symbol_per_slot−nrofUplinkSymbols of m-th slot<k;

>> The symbol is indicated as sbfd symbol in case that:

>>: the SBFD resource pool is associated with pattern 1 and offsetToFirstSBSymobol=<n<offsetToFirstSBSymobol+nrOfSBSymbols; or >>: the SBFD resource pool is associated with pattern 2 and P1*number_of_symbols_per_slot+offsetToFirstSBSymobol=<n<P1*number_of_symbols_per_slot+offsetToFirstSBSymobol+nrOfSBSymbols.

In determining types of symbols, two subcarrier spacings are involved. UE first determines types of virtual symbols (E1300) based on subcarrier spacing indicated in the referenceSubcarrierSpacing field in the TDD-UL-DL-Config-Common. UE determines types of actual symbols (E1400) based on subcarrier spacing indicated in subcarrierSpacing field in BWP IE of BWP-UplinkConfigCommon for the S-BWP.

UE determines the boundary of virtual symbols based on referenceSubcarrierSpacing. UE determines the number of actual symbols associated with a virtual symbol based on the referenceSubcarrierSpacing of the serving cell and the subcarrierSpacing of the S-BWP.

Types of virtual symbol applies to the set of actual symbols associated with the virtual symbol.

For example, if a virtual symbol is indicated as SBFD symbol, then set of actual symbols mapped to the virtual symbol are indicated as SBFD symbols.

TABLE 8

| SCS1 | SCS2 | No* | SCS1 | SCS2 | No* |
|---|---|---|---|---|---|
| 15 | 15 | 1 | 30 | 60 | 2 |
| 15 | 30 | 2 | 60 | 15 | 0.25 |
| 15 | 60 | 4 | 60 | 30 | 0.5 |
| 30 | 15 | 0.5 | 60 | 60 | 1 |
| 30 | 30 | 1 | | | |

Figure 27:
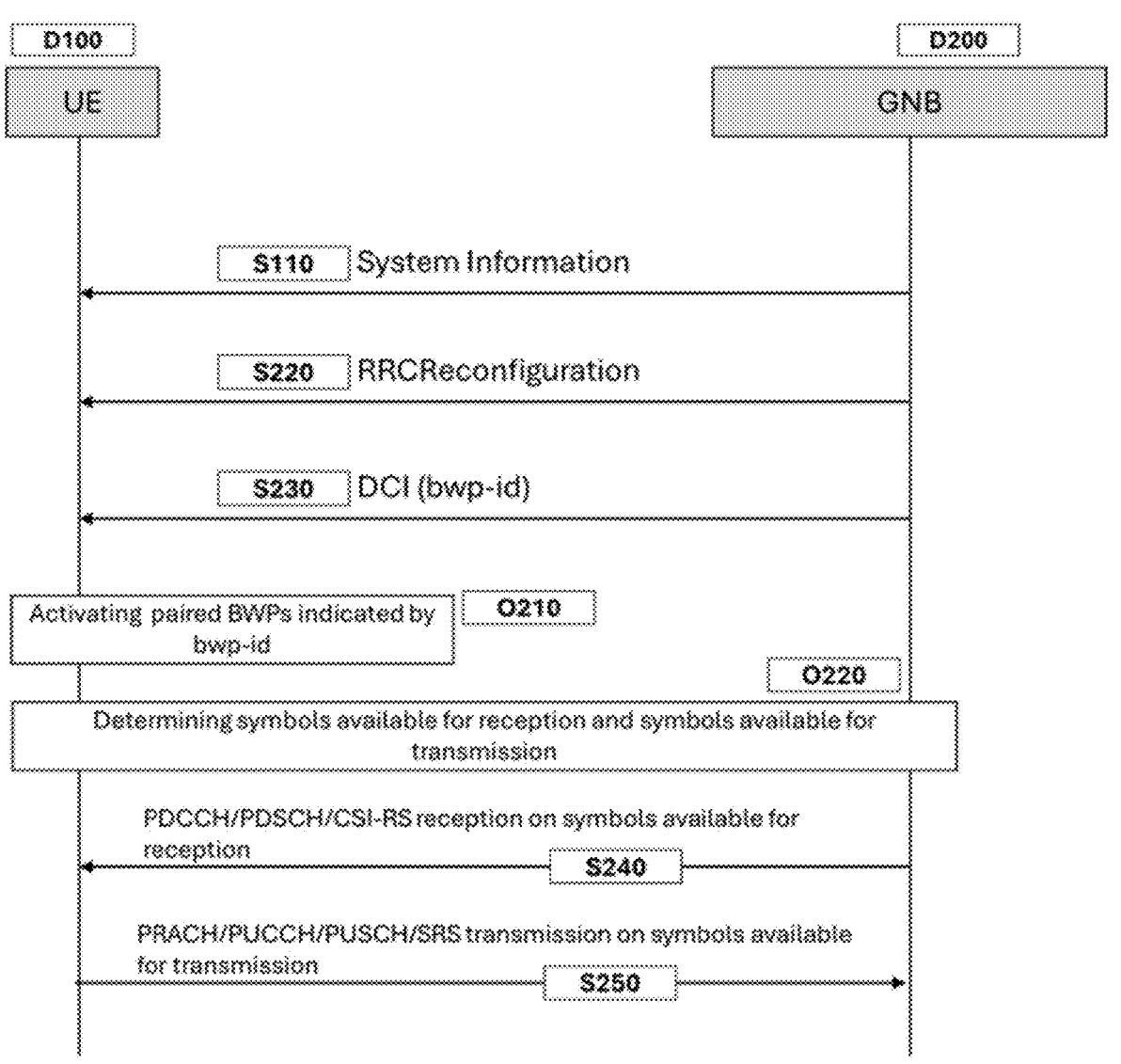
FIG. 27 illustrates operation of UE and GNB.

SCS1: referenceSubcarrierSpacing
SCS2: subcarrierSpacing of the S-BWP
No*: number of actual symbols per virtual symbol FIG. 27 illustrates operations of UE and GNB.

At S110, UE (D100) receives from GNB (D200) system information.

Based on the system information, UE determines whether UE can access the cell. At some point of time, when RRC connection establishment is required for e.g. user service, UE performs RRC connection establishment procedure with GNB. The RRC connection establishment procedure is performed in initial BWP. After RRC connection is established, UE reports its radio capability to the GNB. Based on the reported capability, GNB determines radio resource control configuration for the UE.

At S220, GNB transmits to the UE RRCReconfiguration. The RRCReconfiguration message comprises various configuration information for the UE.

GNB schedules the UE based on the configuration information provided by the RRCReconfiguration.

At some point of time, GNB decides to switch BWP of the UE. At S230, BWP switching is instructed by bwp-id field in a DCI transmitted by GNB to the UE.

At O210, UE deactivates the currently active BWPs and activates the paired BWPs indicated by bwp-id.

At O220, UE determines symbols available for reception and symbols available for transmission. UE considers whether the activated BWP is S-BWP or L-BWP in determining the symbols for reception and symbols for transmission.

At S240, UE performs PDCCH/PDSCH/CSI-RS reception on symbols available for reception.

At S250, UE performs PRACH/PUCCH/PUSCH/SRS transmission on symbols available for transmission.

UE in RRC_CONNECTED performs the following.

>: UE receives system information, wherein the system information comprises various information elements/fields:

>>: referenceSubcarrierSpacing;

>>: TDD-UL-DL-Pattern for pattern 1;

>>: TDD-UL-DL-Pattern for pattern 2; and

>>: SBFD-time-resource-config;

>: UE receives RRC reconfiguration message, wherein the RRC reconfiguration message comprises various information elements/fields:

>>: one or more BWP configuration IEs for one or more dedicate BWPs; and

>>: TDD-UL-DL-ConfigDedicated;

>: UE activates a paired BWPs based on a bwp-Id in DCI;

>: UE determines set of first symbols (symbols available for reception) and set of second symbols (symbols available for transmission); and >: UE performs transmission and reception based on the determination, >: In case that the bwp-Id indicates a first BWP (L-BWP), the set of first symbols and the set of second symbols are determined based on:

>>: TDD-UL-DL-Pattern received in the system information; and

>>: TDD-UL-DL-ConfigDedicated received in the RRC message.

>: In case that the bwp-Id indicates a second BWP (S-BWP), the set of first symbols and the set of second symbols are determined based on:

>>: TDD-UL-DL-Pattern received in the system information;

>>: SBFD-time-resource-config received in the system information (or received in the RRC message);

>>: TDD-UL-DL-ConfigDedicated received in the RRC message.

A specific field related to SBFD (e.g. SBFD indication or list of PRBs associated with SBFD operation) is not present in configuration information of the first BWP.

The specific field related to SBFD is present in configuration information of the second BWP.

UE in RRC connected state performs the following.

>: UE receives system information, wherein the system information comprises various information elements/fields;

>: UE receives RRC reconfiguration message, wherein the RRC reconfiguration message comprises various information elements/fields;

>: UE determines whether a symbol is available for reception or available for transmission; and >: UE performs transmission and reception based on the determination;

The symbol is available for reception for a first set of PRBs (PRBs configured for L-BWP) and available for transmission for a second set of PRBs (PRBs configured for S-BWP) in case that:

>: the symbol is indicated as first type (downlink) by either tdd-UL-DL-ConfigurationCommon or tdd-UL-DL-ConfigurationDedicated; and >: the symbol is indicated as second type (SBFD) by SBFD-time-resource-config, The symbol is available for reception for a first set of PRBs (PRBs configured for L-BWP) and available for transmission for a second set of PRBs (PRBs configured for S-BWP) in case that:

>: the symbol is indicated as third type (flexible) by both tdd-UL-DL-ConfigurationCommon and tdd-UL-DL-ConfigurationDedicated;

>: the symbol is indicated as second type (SBFD) by SBFD-time-resource-config; and >: the UE is configured to receive PDSCH on the symbol in at least one of first set of PRBs.

Figure 28:
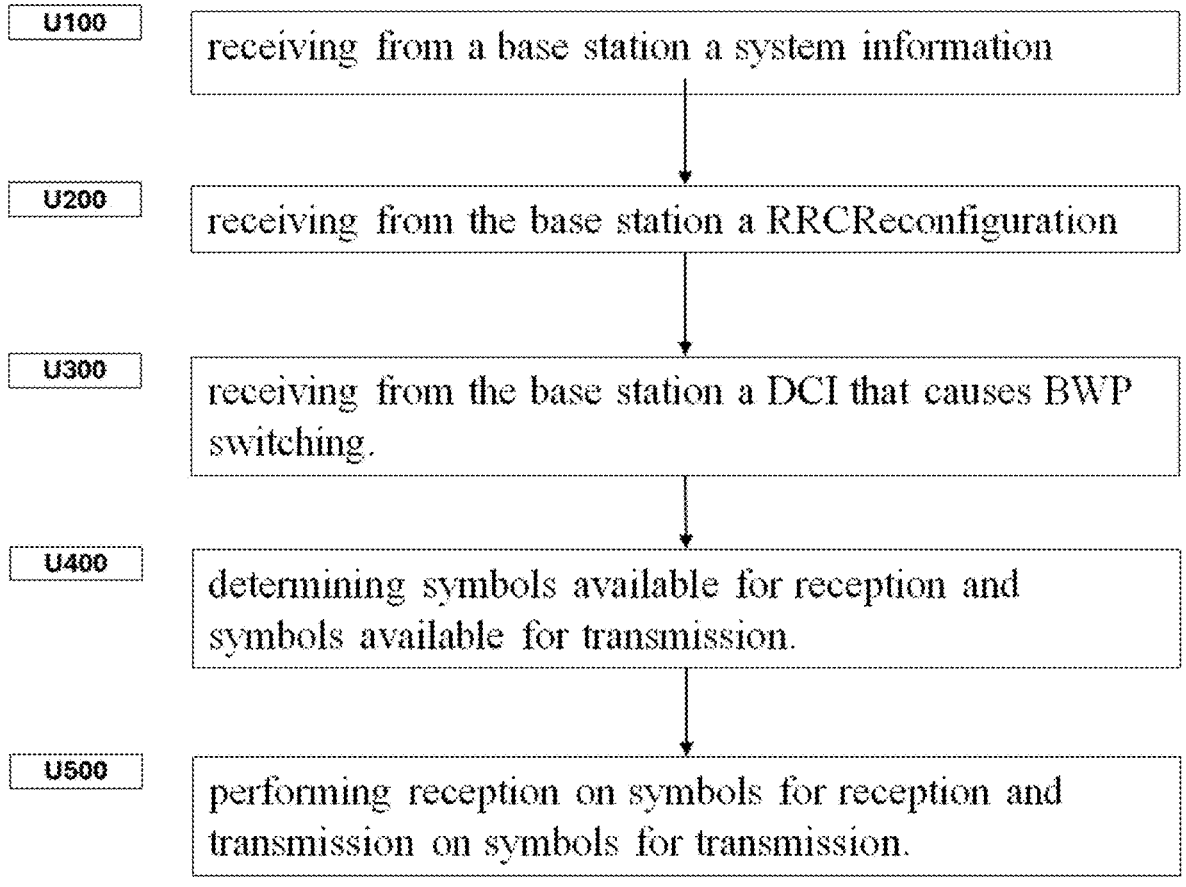
FIG. 28 is a flow diagram illustrating operation of a terminal.

FIG. 28 illustrates UE operations.

At U100, UE receives from a base station a system information.

At U200, UE receives from the base station a RRCReconfiguration.

At U300, UE receives from the base station a DCI that causes BWP switching.

At U400, UE determines symbols available for reception and symbols available for transmission. If the SBFD UL subband overlaps with the BWP, SBFD symbols are available for transmission. If the SBFD DL subband overlaps with the BWP, SBFD symbols are available for reception.

At U500, UE performs reception on symbols for reception and transmission on symbols for transmission. receives RAR based on the PDCCH.

Figure 29:
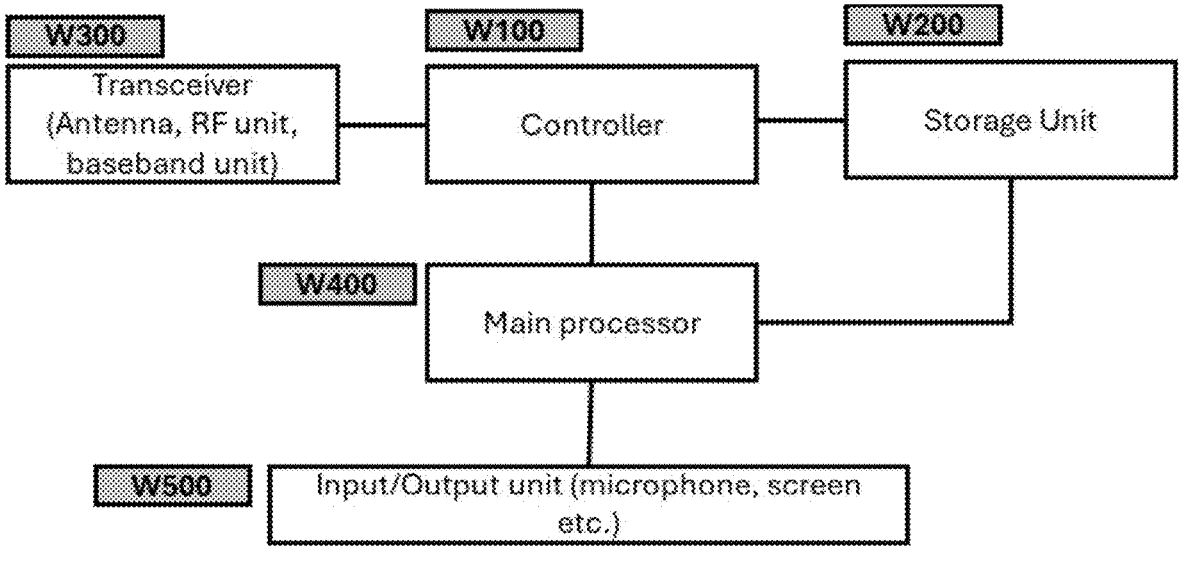
FIG. 29 is a block diagram illustrating the internal structure of a UE to which the disclosure is applied.

FIG. 29 is a block diagram illustrating the internal structure of a UE to which the disclosure is applied.

Referring to the diagram, the UE includes a controller W100, a storage unit W200, a transceiver W300, a main processor W400 and I/O unit W500.

The controller W100 controls the overall operations of the UE in terms of mobile communication. For example, the controller W100 receives/transmits signals through the transceiver W300. In addition, the controller W100 records and reads data in the storage unit W200. To this end, the controller W100 includes at least one processor. For example, the controller W100 may include a communication processor (CP) that performs control for communication and an application processor (AP) that controls the upper layer, such as an application program. The controller controls storage unit and transceiver such that UE operations in the present disclosure are performed.

The storage unit W200 stores data for operation of the UE, such as a basic program, an application program, and configuration information. The storage unit W200 provides stored data at a request of the controller W100.

The transceiver W300 consists of a RF processor, a baseband processor and one or more antennas. The RF processor performs functions for transmitting/receiving signals through a wireless channel, such as signal band conversion, amplification, and the like. Specifically, the RF processor up-converts a baseband signal provided from the baseband processor into an RF band signal, transmits the same through an antenna, and down-converts an RF band signal received through the antenna into a baseband signal. The RF processor may include a transmission filter, a reception filter, an amplifier, a mixer, an oscillator, a digital-to-analog converter (DAC), an analog-to-digital converter (ADC), and the like. The RF processor may perform MIMO and may receive multiple layers when performing the MIMO operation. The baseband processor performs a function of conversion between a baseband signal and a bit string according to the physical layer specification of the system. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The main processor W400 controls the overall operations other than mobile operation. The main processor W400 process user input received from I/O unit W500, stores data in the storage unit W200, controls the controller W100 for required mobile communication operations and forward user data to I/O unit W500.

I/O unit W500 consists of equipment for inputting user data and for outputting user data such as a microphone and a screen. I/O unit W500 performs inputting and outputting user data based on the main processor's instruction.

Figure 30:
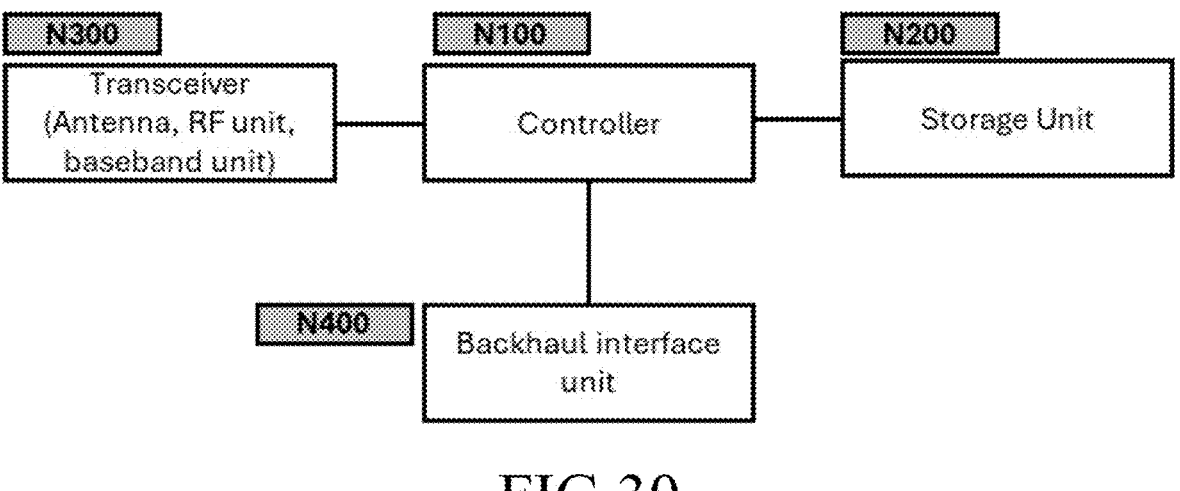
FIG. 30 is a block diagram illustrating the configuration of a base station according to the disclosure.
Figure 31:
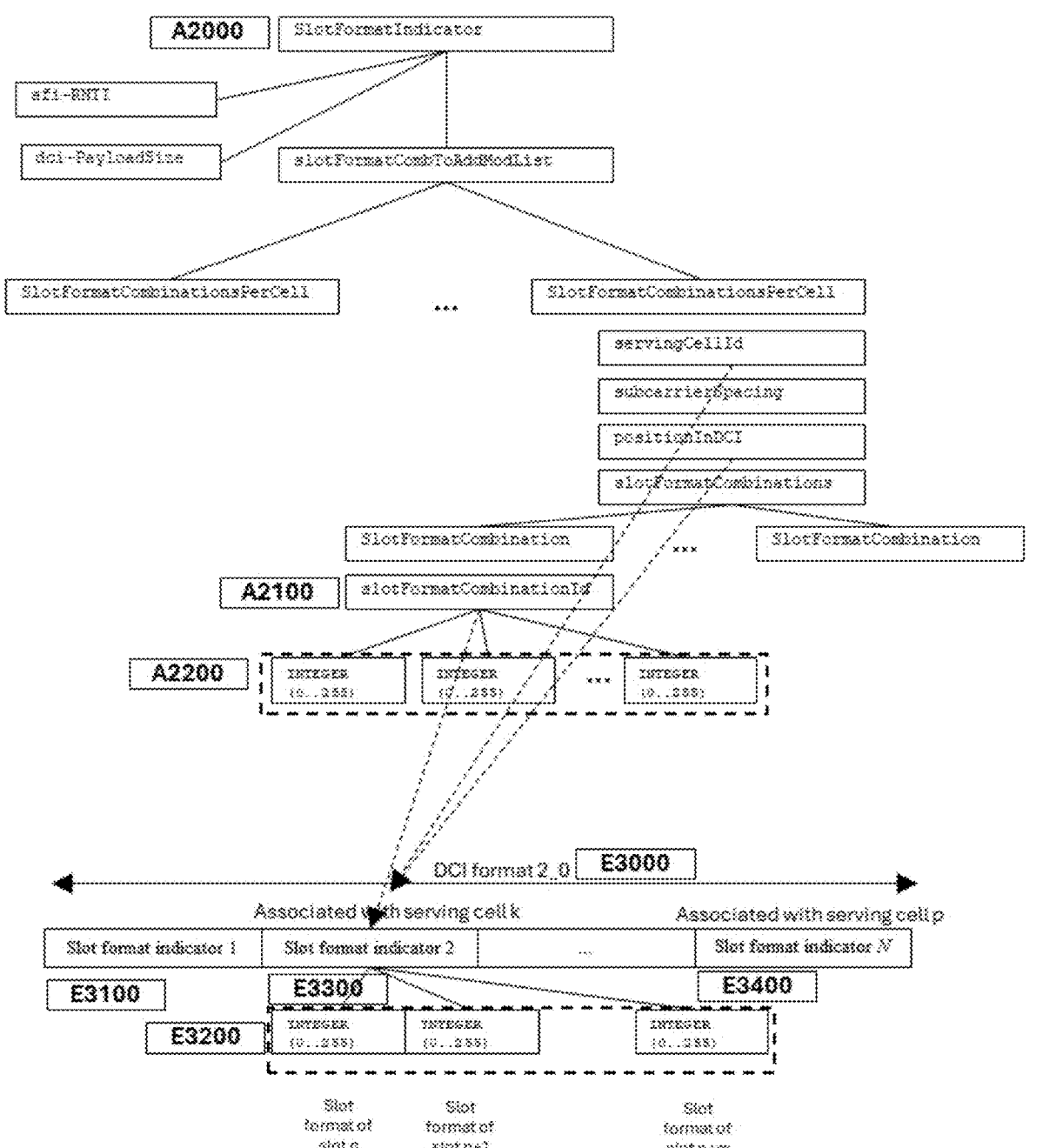
FIG. 31 is a diagram illustrating SFI configuration.
Figure 32:
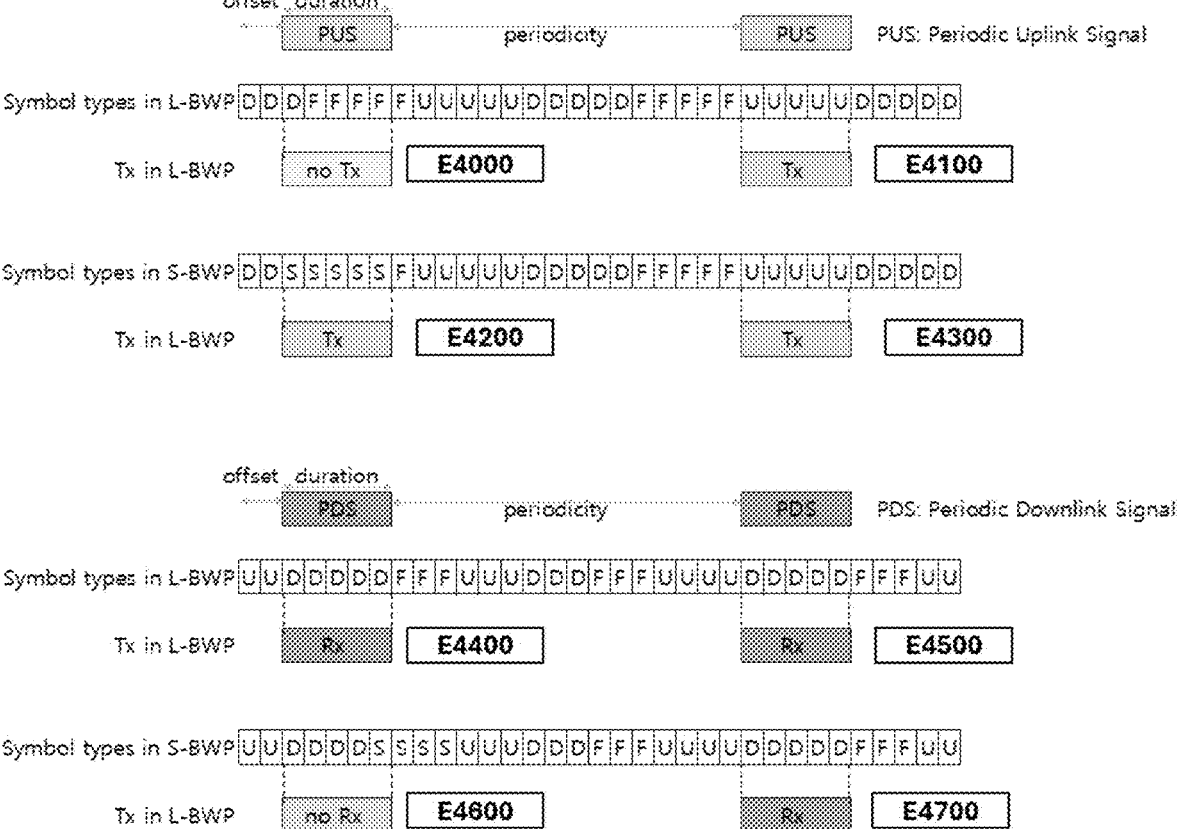
FIG. 32 is a diagram illustrating periodic uplink signal transmission and periodic downlink reception.
Figure 33:
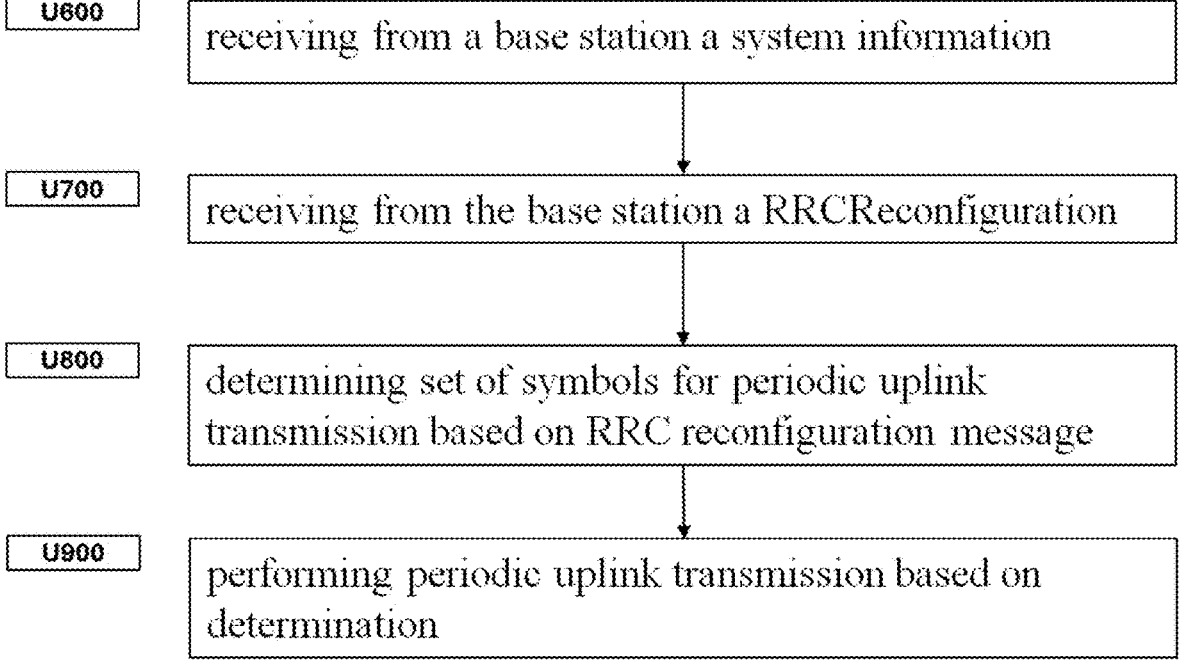
FIG. 33 is a flow diagram illustrating operation of a terminal.

FIG. 30 is a block diagram illustrating the configuration of a base station according to the disclosure.

As illustrated in the diagram, the base station includes a controller N100, a storage unit N200, a transceiver N300 and a backhaul interface unit N400.

The controller N100 controls the overall operations of the main base station. For example, the controller N100 receives/transmits signals through the transceiver N300, or through the backhaul interface unit N400. In addition, the controller N100 records and reads data in the storage unit N200. To this end, the controller N100 may include at least one processor. The controller controls transceiver, storage unit and backhaul interface such that base station operation in the present disclosure.

The storage unit N200 stores data for operation of the main base station, such as a basic program, an application program, and configuration information. Particularly, the storage unit N200 may store information regarding a bearer allocated to an accessed UE, a measurement result reported from the accessed UE, and the like. In addition, the storage unit N200 may store information serving as a criterion to deter mine whether to provide the UE with multi-connection or to discontinue the same. In addition, the storage unit N200 provides stored data at a request of the controller N100.

The transceiver N300 consists of a RF processor, a baseband processor and one or more antennas. The RF processor performs functions for transmitting/receiving signals through a wireless channel, such as signal band conversion, amplification, and the like. Specifically, the RF processor up-converts a baseband signal provided from the baseband processor into an RF band signal, transmits the same through an antenna, and down-converts an RF band signal received through the antenna into a baseband signal. The RF processor may include a transmission filter, a reception filter, an amplifier, a mixer, an oscillator, a DAC, an ADC, and the like. The RF processor may perform a down link MIMO operation by transmitting at least one layer. The baseband processor performs a function of conversion between a baseband signal and a bit string according to the physical layer specification of the first radio access technology. For example, during data transmission, the baseband processor encodes and modulates a transmission bit string, thereby generating complex symbols. In addition, during data reception, the baseband processor demodulates and decodes a baseband signal provided from the RF processor, thereby restoring a reception bit string.

The backhaul interface unit N400 provides an interface for communicating with other nodes inside the network. The backhaul interface unit N400 converts a bit string transmitted from the base station to another node, for example, another base station or a core network, into a physical signal, and converts a physical signal received from the other node into a bit string.

The IE SCS-SpecificCarrier provides parameters determining the location and width of the actual carrier or the carrier bandwidth. It is defined specifically for a numerology (subcarrier spacing (SCS)) and in relation (frequency offset) to Point A.

```
-- ASN1START
-- TAG-SCS-SPECIFICCARRIER-START
SCS-SpecificCarrier ::=                        SEQUENCE {
    offsetToCarrier                                INTEGER (0..2199),
    subcarrierSpacing                              SubcarrierSpacing,
    carrierBandwidth                                       INTEGER
(1..maxNrofPhysicalResourceBlocks),
    ...,
    [[
    txDirectCurrentLocation                     INTEGER (0..4095)
OPTIONAL      -- Need S
    ]]
    [[
    ul-subbandlocationAndBandwidth              INTEGER (0..37949)
OPTIONAL,      -- Need R
    firstDLsubbandlocationAndBandwidth          INTEGER (0..37949)
OPTIONAL,      -- Need R
    secondDLsubbandlocationAndBandwidth         INTEGER (0..37949)
OPTIONAL      -- Need R
    ]]
}
-- TAG-SCS-SPECIFICCARRIER-STOP
-- ASN1STOP
```

SCS-SpecificCarrier field descriptions: TxDirectCurrentLocation: Indicates the downlink Tx Direct Current location for the carrier. A value in the range 0..3299 indicates the subcarrier index within the carrier. The values in the value range 3301..4095 are reserved and ignored by the UE. If this field is absent for downlink within ServingCellConfigCommon and ServingCellConfigCommonSIB, the UE assumes the default value of 3300

SubcarrierSpacing: Subcarrier spacing of this carrier. It is used to convert the offsetToCarrier into an actual frequency.

ul-subbandlocationAndBandwidth: Configures frequency domain location and bandwidth of UL subband. The value of the field shall be interpreted as resource indicator value (RIV) with N_frequencyRegion_size equal to 275. The network does not configure this field for DL carriers.

FirstDLsubbandlocationAndBandwidth: Configures frequency domain location and bandwidth of the first DL subband. The value of the field shall be interpreted as resource indicator value (RIV) with N_frequency Region_size equal to 275. The network does not configure this field for UL carriers.

SecondDLsubbandlocationAndBandwidth: Configures frequency domain location and bandwidth of the second DL subband. The network does not configure this field for UL carriers.

The IE TDD-UL-DL-ConfigCommon determines the cell specific Uplink/Downlink TDD configuration.

TDD-UL-DL-ConfigCommon information element

```
-- ASN1START
-- TAG-TDD-UL-DL-CONFIGCOMMON-START
TDD-UL-DL-ConfigCommon ::=                 SEQUENCE {
    referenceSubcarrierSpacing                 SubcarrierSpacing,
    pattern1                                   TDD-UL-DL-Pattern,
    pattern2                                   TDD-UL-DL-Pattern
OPTIONAL, -- Need R
    ...
}
TDD-UL-DL-Pattern ::=                      SEQUENCE {
    dl-UL-TransmissionPeriodicity              ENUMERATED {ms0p5, ms0p625, ms1,
```

-continued

```
ms1p25, ms2, ms2p5, ms5, ms10},
    nrofDownlinkSlots                     INTEGER (0..maxNrofSlots),
    nrofDownlinkSymbols                    INTEGER (0..maxNrofSymbols-1),
    nrofUplinkSlots                       INTEGER (0..maxNrofSlots),
    nrofUplinkSymbols                      INTEGER (0..maxNrofSymbols-1),
    ...,
    [[
    dl-UL-TransmissionPeriodicity-v1530       ENUMERATED {ms3, ms4}
OPTIONAL -- Need R
    ]],
    [[
    sbfd-StartingSlotIndex-r19               INTEGER (0..maxNrofSlots-1)
OPTIONAL, -- Need R
    sbfd-StartingSymbolIndex-r19            INTEGER (0..maxNrofSymbols-1)
OPTIONAL, -- Need R
    sbfd-EndingSlotIndex-r19                INTEGER (0..maxNrofSlots-1)
OPTIONAL, -- Need R
    sbfd-EndingSymbolIndex-r19             INTEGER (0..maxNrofSymbols-1)
OPTIONAL -- Need R
    ]]
    }
    -- TAG-TDD-UL-DL-CONFIGCOMMON-STOP
    -- ASN1STOP
``` sbfd-StartingSlotIndex, sbfd-EndingSlotIndex: Configures the starting slot index and the ending slot index of SBFD subbands within a TDD-UL-DL period.

sbfd-StartingSymbolIndex, sbfd-EndingSymbolIndex: Configures the starting symbol index and the ending symbol index within the starting slot of SBFD subbands within a TDD-UL-DL period.

SBFD resource pool is uplink resource at UL subband in SBFD symbols.

Set of consecutive SBFD symbols are configured in pattern1 or in pattern2.

Set of consecutive SBFD symbols may be determined based on set of parameters for SBFD symbols.

The set of parameters for SBFD symbols may be sbfd-StartingSlotIndex, sbfd-EndingSlotIndex, StartingSymbolIndex and sbfd-EndingSymbolIndex.

The set of parameters for SBFD symbols may be determined based on offsetToFirstSBSymobol and nrOfSBSymbols.

UE determines that the set of consecutive SBFD symbols are configured in pattern1 in case that:
    >: the set of parameters for SBFD symbols is included in TDD-UL-DL-Config for pattern1; or
    >: associatedPattern indicates pattern1.

UE determines that the set of consecutive SBFD symbols are configured in pattern2 in case that:
    >: the set of parameters for SBFD symbols is included in TDD-UL-DL-Config for pattern2; or
    >: associatedPattern indicates pattern2.

The IE BWP-DownlinkDedicated is used to configure the dedicated (UE specific) parameters of a downlink BWP.

```
-- ASN1START
-- TAG-BWP-DOWNLINKDEDICATED-START
BWP-DownlinkDedicated ::=           SEQUENCE {
    pdcch-Config                              SetupRelease { PDCCH-Config }
OPTIONAL,    -- Need M
    pdsch-Config                              SetupRelease { PDSCH-Config }
OPTIONAL,    -- Need M
    sps-Config                                   SetupRelease { SPS-Config }
OPTIONAL,    -- Need M
    radioLinkMonitoringConfig                                      SetupRelease
{ RadioLinkMonitoringConfig }          OPTIONAL,    -- Need M
    ...,
    preConfGapStatus-r17                BIT STRING (SIZE (maxNrofGapId-r17))
OPTIONAL,    -- Cond PreConfigMG
    beamFailureRecoverySpCellConfig-r17                              SetupRelease { BeamFailureRecoveryRSConfig-r16}            OPTIONAL,       -- Cond
SpCellOnly
    harq-FeedbackEnablingforSPSactive-r17                              BOOLEAN
OPTIONAL,    -- Need R
    cfr-ConfigMulticast-r17              SetupRelease { CFR-ConfigMulticast-r17 }
OPTIONAL,    -- Need M
    dl-PPW-PreConfigToAddModList-r17          DL-PPW-PreConfigToAddModList-r17
OPTIONAL,    -- Need N
    dl-PPW-PreConfigToReleaseList-r17          DL-PPW-PreConfigToReleaseList-r17
OPTIONAL,    -- Need N
    nonCellDefiningSSB-r17                          NonCellDefiningSSB-r17
OPTIONAL,    -- Need R
    servingCellMO-r17                                       MeasObjectId
OPTIONAL -- Cond MeasObject-NCD-SSB
    ]],
    [[
```

-continued

```
    tci-InDCI-r18                                    SetupRelease {TCI-InDCI-r18}
OPTIONAL -- Need M
    ]],
    [[
    sbfd-Config2-Reception-r19                       ENUMERATED {enabled}
OPTIONAL    -- Need S
    ]]
}
-- TAG-BWP-DOWNLINKDEDICATED-STOP
-- ASN1STOP
``` pdcch-Config: UE specific PDCCH configuration for one BWP.

pdsch-Config: UE specific PDSCH configuration for one BWP.

sbfd-Config2-Reception: Indicates that the PDSCH receptions can be in SBFD symbols and non-SBFD symbols in different slots for the dedicated DL BWP, as specified in TS 38.214 [19], clause X. If not enabled, Configuration 1 is applied for PDSCH receptions in the given DL BWP.

sps-Config: UE specific SPS (Semi-Persistent Scheduling) configuration for one BWP. Except for reconfiguration with sync, the NW does not reconfigure sps-Config when there is an active configured downlink assignment (see TS 38.321 [3]). However, the NW may release the sps-Config at any time. Network can only configure SPS in one BWP using either this field or sps-ConfigToAddModList. Network does not configure SPS in one BWP using this field and sps-ConfigMulticastToAddModList-r17 simultaneously.

The IE BWP-UplinkCommon is used to configure the common parameters of an uplink BWP. They are "cell specific" and the network ensures the necessary alignment with corresponding parameters of other UEs. The common parameters of the initial bandwidth part of the PCell, excluding additionalRACH-perPCI-ToAddModList and additionalRACH-perPCI-ToReleaseList, are also provided via system information. For all other serving cells, the network provides the common parameters via dedicated signalling.

```
-- ASN1START
-- TAG-BWP-UPLINKCOMMON-START
BWP-UplinkCommon ::=                                 SEQUENCE {
    genericParameters                                BWP,
    rach-ConfigCommon                                        SetupRelease { RACH-
ConfigCommon }                                       OPTIONAL, -- Need M
    pusch-ConfigCommon                                       SetupRelease { PUSCH-
ConfigCommon }                                       OPTIONAL, -- Need M
    pucch-ConfigCommon                                       SetupRelease { PUCCH-
ConfigCommon }                                       OPTIONAL, -- Need M
    . . .
        additionalRACH-ConfigList-r17                SetupRelease { AdditionalRACH-
ConfigList-r17 }            OPTIONAL, -- Cond SpCellOnly2
        rsrp-ThresholdMsg3-r17                                                   RSRP-Range
OPTIONAL, -- Need R
        numberOfMsg3-RepetitionsList-r17             SEQUENCE (SIZE (4)) OF
NumberOfMsg3-Repetitions-r17                         OPTIONAL, -- Cond Msg3Rep
        mcs-Msg3-Repetitions-r17                     SEQUENCE (SIZE (8)) OF INTEGER
(0..31)                                 OPTIONAL -- Cond Msg3Rep
    . . .
        rsrp-ThresholdMsg1-RepetitionNum2-r18                                    RSRP-Range
OPTIONAL, -- Need R
        rsrp-ThresholdMsg1-RepetitionNum4-r18                                    RSRP-Range
OPTIONAL, -- Need R
        rsrp-ThresholdMsg1-RepetitionNum8-r18                                    RSRP-Range
OPTIONAL, -- Need R
        preambleTransMax-Msg1-Repetition-r18         ENUMERATED {n1, n2, n4, n6, n8,
n10, n20, n50, n100, n200}      OPTIONAL    -- Cond Msg1Rep1
        ]],
        [[
        sbfd-RSRP-ThresholdRO-Type-r19                                           RSRP-Range
OPTIONAL, -- Need R
        sbfd-RSRP-ThresholdRO-TypeUsage-r19                                      ENUMERATED
{above, below}                                       OPTIONAL, -- Need R
        sbfd-RSRP-ThresholdMsg1-RepetitionNum2-r19                               RSRP-Range
OPTIONAL, -- Need R
        sbfd-RSRP-ThresholdMsg1-RepetitionNum4-r19                               RSRP-Range
OPTIONAL, -- Need R
        sbfd-RSRP-ThresholdMsg1-RepetitionNum8-r19                               RSRP-Range
OPTIONAL, -- Need R
        rach-ConfigCommonSBFD-r19                            SetupRelease { RACH-
ConfigCommonSBFD-r19 }               OPTIONAL -- Need M
        ]]
    }
    AdditionalRACH-ConfigList-r17 ::=                                           SEQUENCE
(SIZE(1..maxAdditionalRACH-r17)) OF AdditionalRACH-Config-r17
    AdditionalRACH-Config-r17 ::=               SEQUENCE {
```

-continued

```
    rach-ConfigCommon-r17                                          RACH-ConfigCommon
OPTIONAL, -- Need R
    msgA-ConfigCommon-r17                                          MsgA-ConfigCommon-r16
OPTIONAL, -- Need R
    ...
    [[
    rach-ConfigCommonSBFD-r19                           SetupRelease { RACH-
ConfigCommonSBFD-r19 }              OPTIONAL    -- Need M
    ]]
    }
    NumberOfMsg3-Repetitions-r17 ::=           ENUMERATED {n1, n2, n3, n4, n7, n8,
n12, n16}
    RACH-ConfigCommonSBFD-r19 = SEQUENCE {
                              sbfd-RACH-SingleConfig-r19
ENUMERATED {enabled}                      OPTIONAL,    -- Need R
                          sbfd-RACH-DualConfig-r19                         SBFD-
RACH-DualConfig-r19                       OPTIONAL    -- Need R
    }
    SBFD-RACH-DualConfig-r19 ::=                    SEQUENCE {
                              sbfd-AdditionalRACH-Config-r19
RACH-ConfigCommon           OPTIONAL,    -- Need R
                              sbfd-RACH-DualConfig-
ValidROacrossSymbolTypes-r19      ENUMERATED {enabled}      OPTIONAL -- Need R
    }
    -- TAG-BWP-UPLINKCOMMON-STOP
    -- ASN1STOP
``` additionalRACH-ConfigList: List of feature or feature combination-specific RACH configurations, i.e. the RACH configurations configured in addition to the one configured by rach-ConfigCommon and by msgA-ConfigCommon. The network associates all possible preambles of an additional RACH configuration to one or more feature(s) or feature combination(s). The network does not configure this list to have more than 16 entries. If both rach-ConfigCommon and msgA-ConfigCommon are configured for a specific Feature-Combination, the network always provides them in the same additionalRACH-Config.

mcs-Msg3-Repetitions: Configuration of eight candidate MCS indexes for PUSCH transmission scheduled by RAR UL grant and DCI format 0_0 with CRC scrambled by TC-RNTI. Only the first 4 configured or default MCS indexes are used for PUSCH transmission scheduled by RAR UL grant. This field is only applicable when the UE selects Random Access resources indicating Msg3 repetition in this BWP. If this field is absent when the set(s) of Random Access resources with MSG3 repetition indication are configured in the BWP-UplinkCommon, the UE shall apply the values {0, 1, 2, 3, 4, 5, 6, 7} (see TS 38.214 [19], clause 6.1.4).

preambleTransMax-Msg1-Repetition: Max number of transmissions of MSG1 repetitions number (2, 4 and 8) performed before switching to higher repetition number (see TS 38.321 [3], clauses 5.1.1). This field is only applicable when more than one repetition numbers are configured in shared RO. If the field is absent, switching from lower repetition number to higher repetition number is not allowed.

pucch-ConfigCommon: Cell specific parameters for the PUCCH of this BWP.

pusch-ConfigCommon: Cell specific parameters for the PUSCH of this BWP.

rach-ConfigCommon: Configuration of cell specific random access parameters which the UE uses for contention based and contention free random access as well as for contention based beam failure recovery in this BWP. The NW configures SSB-based RA (and hence RACH-Config-Common) only for UL BWPs if the linked DL BWPs (same bwp-Id as UL-BWP) are the initial DL BWPs or DL BWPs containing the SSB associated to the initial DL BWP or DL BWPs associated with nonCellDefiningSSB or, for (e)Red-Cap UEs, the RedCap-specific initial downlink BWP. The network configures rach-ConfigCommon (without suffix) and/or rach-ConfigCommon-r17, whenever it configures contention free 4-step random access (e.g. for reconfiguration with sync or for beam failure recovery or PDCCH order), the UE then applies the corresponding configuration depending on the RACH resource set selected upon RACH initialization, as specified in TS 38.321 [3]. For RedCap-specific initial uplink BWP, rach-ConfigCommon is always configured when msgA-ConfigCommon is configured in this BWP.

rsrp-ThresholdMsg1-RepetitionNum2, rsrp-Threshold-Msg1-RepetitionNum4, rsrp-ThresholdMsg1-Repetition-Num8: Threshold used by the UE for determining whether to select resources indicating Msg1 repetition number 2, 4 or 8 in this BWP, as specified in TS 38.321 [3]. The value applies to all the BWPs and all RACH configurations. For a given MSG1 repetition number, this corresponding field is mandatory if both set(s) of Random Access resources with MSG1 repetition indication associated with this MSG1 repetition number and set(s) of Random Access resources without MSG1 repetition indication are configured in the BWP, or if the set(s) of Random Access resources with MSG1 repetition indication associated with this MSG1 repetition number and set(s) of Random Access resources with MSG1 repetition indication associated with a lower repetition number are configured in the BWP. It is absent otherwise.

rsrp-ThresholdMsg3: Threshold used by the UE for determining whether to select resources indicating Msg3 repetition in this BWP, as specified in TS 38.321 [3]. The field is mandatory if both set(s) of Random Access resources with MSG3 repetition indication and set(s) of Random Access resources without MSG3 repetition indication are configured in the BWP. It is absent otherwise.

sbfd-RACH-SingleConfig: Indicates whether RACH configuration Option 1 for SBFD random access operation is enabled or not, see clause x in TS 38.211 [16] and clause y in TS 38.213 [13].

sbfd-RACH-DualConfig: Used to configure dual RACH configurations and configure random access parameters in SBFD symbols by setting up one additional RACH configuration, see RACH configuration Option 2 for SBFD random access operation in clause x in TS 38.211 [16] and clause y in TS 38.213 [13].

sbfd-RACH-DualConfig-ValidROacrossSymbolTypes: Indicates whether a configured RO starting from SBFD symbol and ending in non-SBFD symbol either in the same slot or across different slots is valid for RACH configuration Option 2.

sbfd-RSRP-ThresholdMsg1-RepetitionNum2, sbfd-RSRP-ThresholdMsg1-RepetitionNum4, sbfd-RSRP-ThresholdMsg1-RepetitionNum8: Threshold used by the UE for determining whether to select resources indicating Msg1 repetition number 2, 4 or 8 within the SBFD ROs.

sbfd-RSRP-ThresholdRO-Type: Threshold used by the SBFD capable UE for choosing RACH occasion type.

sbfd-RSRP-ThresholdRO-TypeUsage: Indicate how the SBFD capable UE chooses RACH occasion type using sbfd-RSRP-ThresholdRO-Type. With value above, the SBFD capable UE chooses SBFD RACH occasion if the measured downlink pathloss reference RSRP is above sbfd-RSRP-ThresholdRO-Type and chooses non-SBFD RACH occasion if the measured downlink pathloss reference RSRP is not above sbfd-RSRP-ThresholdRO-Type. With value below, the SBFD capable UE chooses SBFD RACH occasion if the measured downlink pathloss reference RSRP is below sbfd-RSRP-ThresholdRO-Type and chooses non-SBFD RACH occasion if the measured downlink pathloss reference RSRP is not below sbfd-RSRP-ThresholdRO-Type.

The IE BWP-UplinkDedicated is used to configure the dedicated (UE specific) parameters of an uplink BWP.

BWP-UplinkDedicated information element pucch-Config: PUCCH configuration for one BWP of the normal UL or SUL of a serving cell. If the UE is configured with SUL, the network configures PUCCH only on the BWPs of one of the uplinks (normal UL or SUL). The network configures PUCCH-Config at least on non-initial BWP(s) for SpCell and on all BWP(s) for PUCCH SCell. If supported by the UE, the network may configure at most one additional SCell of a cell group with PUCCH-Config (i.e. PUCCH SCell). If PUCCH cell switching is supported by the UE, the network may configure two TDD serving cells with PUCCH-Config within each PUCCH group. For supporting PUCCH cell switching in the PUCCH group with the SpCell, the TDD SpCell and one TDD SCell shall have PUCCH-Config on their normal UL. For supporting PUCCH cell switching in the PUCCH group with only SCells, two TDD SCells shall have PUCCH-Config on their normal UL.

The NW may configure PUCCH for a BWP when setting up the BWP. The network may also add/remove the pucch-Config in an RRCReconfiguration with reconfiguration-WithSync (for SpCell or PUCCH SCell) or with SCell release and add (for PUCCH SCell) to move the PUCCH between the UL and SUL carrier of one serving cell. In other cases, only modifications of a previously configured pucch-Config are allowed.

If one (S)UL BWP of a serving cell is configured with PUCCH, all other (S)UL BWPs must be configured with PUCCH, too.

pusch-Config: PUSCH configuration for one BWP of the normal UL or SUL of a serving cell. If the UE is configured with SUL and if it has a PUSCH-Config for both UL and SUL, an UL/SUL indicator field in DCI indicates which of the two to use. See TS 38.212 [17], clause 7.3.1.

sbfd-Config2-Transmission: Indicates that the PUCCH and PUSCH transmissions can be in SBFD symbols and

```
-- ASN1START
-- TAG-BWP-UPLINKDEDICATED-START
BWP-UplinkDedicated ::=         SEQUENCE {
    pucch-Config                    SetupRelease { PUCCH-Config }
OPTIONAL,        -- Need M
    pusch-Config                    SetupRelease { PUSCH-Config }
OPTIONAL,        -- Need M
    configuredGrantConfig        SetupRelease { ConfiguredGrantConfig }
OPTIONAL,        -- Need M
    srs-Config                        SetupRelease { SRS-Config }
OPTIONAL,        -- Need M
    beamFailureRecoveryConfig            SetupRelease
{ BeamFailureRecoveryConfig }             OPTIONAL, -- Cond
SpCellOnly
    ...,
    ul-powerControl-r17            Uplink-powerControlId-r17
OPTIONAL, -- Cond NoTCI-PC
    sbfd-Config2-Transmission-r19        ENUMERATED { enabled }
OPTIONAL,        -- Need S
    sbfd-Config2-PUSCH-RBOffset-r19
INTEGER(0..maxNrofPhysicalResourceBlocks)
OPTIONAL        -- Need R
    -- TAG-BWP-UPLINKDEDICATED-STOP
    -- ASN1STOP
``` configuredGrantConfig: A Configured-Grant of type1 or type2. It may be configured for UL or SUL but in case of type1 not for both at a time. Except for reconfiguration with sync, the NW does not reconfigure configuredGrantConfig when there is an active configured uplink grant Type 2 (see TS 38.321 [3]). However, the NW may release the configuredGrantConfig at any time. Network can only configure configured grant in one BWP using either this field or configuredGrantConfigToAddModList.

non-SBFD symbols in different slots in a given UL BWP (see TS 38.213 [13], clause x and TS 38.214 [19], clause y). If not enabled, Configuration 1 is applied for PUCCH and PUSCH transmissions in the given UL BWP.

sbfd-Config2-PUSCH-RBOffset: Indicates the RB offset to determine the starting PRB for Type 2 configured grant and dynamic grant PUSCH transmissions in SBFD symbols for Configuration 2 (see TS 38.214 [19], clause y).

srs-Config: Uplink sounding reference signal configuration.

ul-powerControl: Configures power control parameters for PUCCH, PUSCH and SRS when UE is configured with unifiedTCI-StateType for this serving cell. For each serving cell, ul-powerControl is either configured in all BWP-UplinkDedicated or it is not configured in any BWP-UplinkDedicated. When unifiedTCI-StateRef in the BWP-UplinkDedicated or in the PDSCH-Config if the unifiedTCI-StateType is set to joint, of a serving cell refers to another serving cell, ul-powerControl is either configured in all BWP-UplinkDedicated of these two serving cells or it is not configured in any BWP-UplinkDedicated of these two serving cells.

The IE ConfiguredGrantConfig is used to configure uplink transmission without dynamic grant according to two possible schemes. The actual uplink grant may either be configured via RRC (type1) or provided via the PDCCH (addressed to CS-RNTI) (type2). Multiple Configured Grant configurations may be configured in one BWP of a serving cell.

```
-- ASN1START
-- TAG-CONFIGUREDGRANTCONFIG-START
ConfiguredGrantConfig ::=                     SEQUENCE {
    frequencyHopping                              ENUMERATED {intraSlot, interSlot}
OPTIONAL, -- Need S
    cg-DMRS-Configuration                         DMRS-UplinkConfig,
    mcs-Table                                     ENUMERATED {qam256,
qam64LowSE}                                        OPTIONAL, -- Need S
    mcs-Table TransformPrecoder                   ENUMERATED {qam256,
qam64LowSE}                                        OPTIONAL, -- Need S
    uci-OnPUSCH                                   SetupRelease { CG-UCI-OnPUSCH }
OPTIONAL, -- Need M
    resource Allocation                           ENUMERATED
{ resourceAllocationType0, resourceAllocationType1, dynamicSwitch },
    rbg-Size                                      ENUMERATED {config2}
OPTIONAL, -- Need S
    powerControlLoopToUse                         ENUMERATED {n0, n1},
    p0-PUSCH-Alpha                                P0-PUSCH-AlphaSetId,
    transformPrecoder                             ENUMERATED {enabled, disabled}
OPTIONAL, -- Need S
    nrofHARQ-Processes                            INTEGER(1..16),
    repK                                          ENUMERATED {n1, n2, n4, n8},
    repK-RV                                       ENUMERATED {s1-0231, s2-0303,
s3-0000}                                           OPTIONAL, -- Need R
    periodicity                                   ENUMERATED {
                                                      sym2, sym7,    sym1x14,
sym2x14, sym4x14, sym5x14, sym8x14, sym10x14, sym16x14, sym20x14,
                                                      sym32x14,      sym40x14,
sym64x14, sym80x14, sym128x14, sym160x14, sym256x14, sym320x14, sym512x14,
                                                      sym640x14,   sym1024x14,
sym1280x14, sym2560x14, sym5120x14, sym6, sym1x12, sym2x12,
sym4x12, sym5x12, sym8x12, sym10x12, sym16x12, sym20x12, sym32x12,
                                                      sym40x12,      sym64x12,
sym80x12, sym128x12, sym160x12, sym256x12, sym320x12, sym512x12, sym640x12,
                                                      sym1280x12, sym2560x12
    },
    configuredGrantTimer                          INTEGER(1..64),
OPTIONAL, -- Need R
    rrc-ConfiguredUplinkGrant                     SEQUENCE {
        timeDomainOffset                              INTEGER (0..5119),
        timeDomainAllocation                          INTEGER (0..15),
        frequencyDomainAllocation                     BIT STRING (SIZE(18)),
        antennaPort                                   INTEGER (0..31),
        dmrs-SeqInitialization                            INTEGER (0..1)
OPTIONAL, -- Need R
        precodingAndNumberOfLayers                    INTEGER (0..63),
        srs-ResourceIndicator                             INTEGER (0..15)
OPTIONAL, -- Need R
        mcsAndTBS                                     INTEGER (0..31),
        frequencyHoppingOffset                            INTEGER (1..
maxNrofPhysicalResourceBlocks-1)                  OPTIONAL, -- Need R
        pathlossReferenceIndex                        INTEGER (0..maxNrofPUSCH-
PathlossReferenceRSs-1),
        ...,
        [[
        pusch-RepTypeIndicator-r16                        ENUMERATED {pusch-
RepTypeA,pusch-RepTypeB }                          OPTIONAL, -- Need M
        frequencyHoppingPUSCH-RepTypeB-r16            ENUMERATED {interRepetition,
interSlot}                                         OPTIONAL, -- Cond RepTypeB
        timeReferenceSFN-r16                              ENUMERATED {sfn512}
OPTIONAL, -- Need S
        ]],
        [[
        pathlossReferenceIndex2-r17                       INTEGER (0..maxNrofPUSCH-
PathlossReferenceRSs-1)                            OPTIONAL, -- Need R
        srs-ResourceIndicator2-r17                        INTEGER (0..15)
```

-continued

```
OPTIONAL, -- Need R
        precodingAndNumberOfLayers2-r17                  INTEGER (0..63)
OPTIONAL, -- Need R
        timeDomainAllocation-v1710                       INTEGER (16..63)
OPTIONAL, -- Need M
        timeDomainOffset-r17                             INTEGER (0..40959)
OPTIONAL, -- Need R
        cg-SDT-Configuration-r17                         CG-SDT-Configuration-r17
OPTIONAL, -- Need M
        ]],
        [[
        srs-ResourceSetId-r18                                        SRS-ResourceSetId
OPTIONAL, -- Need R
        cg-LTM-Configuration-r18                         CG-RRC-Configuration-r18
OPTIONAL, -- Cond LTM
        cg-SDT-PeriodicityExt-r18                        ENUMERATED {
                                                         sym1x14x1280,
sym2x14x1280, sym4x14x1280 , sym8x14x1280, sym16x14x1280,
                                                         sym32x14x1280,
sym48x14x1280, sym64x14x1280 , sym96x14x1280, sym128x14x1280,
                                                         sym192x14x1280,
sym240x14x1280, sym256x14x1280, sym384x14x1280, sym472x14x1280,
                                                         sym480x14x1280,
sym512x14x1280, sym768x14x1280, sym944x14x1280, sym960x14x1280,
                                                         sym1408x14x1280,
sym1536x14x1280, sym1888x14x1280, sym1920x14x1280,
                                                         sym2816x14x1280,
sym3072x14x1280, sym3776x14x1280, sym5632x14x1280,
                                                         sym6144x14x1280,
sym7552x14x1280, sym7680x14x1280, sym11264x14x1280,
                                                         sym15104x14x1280,
sym15360x14x1280, sym22528x14x1280, sym30208x14x1280,
                                                         sym45056x14x1280,
sym60416x14x1280, sym90112x14x1280, sym180224x14x1280,
                                                         sym4x12x1280,
sym8x12x1280, sym16x12x1280, sym32x12x1280, sym192x12x1280,
                                                         sym384x12x1280,
sym960x12x1280, sym1888x12x1280, sym3776x12x1280,
                                                         sym5632x12x1280,
sym11264x12x1280, spare13, spare12, spare11, spare10, spare9,
                                                         spare8, spare7, spare6, spare5,
spare4, spare3, spare2, spare1
                                                         }
OPTIONAL, -- Cond CG-SDT1
        timeReferenceHyperSFN-r18                        INTEGER (0..1023)
OPTIONAL, -- Cond CG-SDT2
        cg-RRC-Configuration-r18                         CG-RRC-Configuration-r18
OPTIONAL, -- Cond RACH-LessHO
        applyIndicatedTCI-State-r18                      ENUMERATED {first, second, both,
spare 1}                                         OPTIONAL -- Need R
        ]],
        [[
        sbfd-Config2-PUSCH-RBoffset-r19                             INTEGER
(0..maxNrofPhysicalResourceBlocks)                      OPTIONAL, --
Need R
        symbolType-r19                                   ENUMERATED {sbfd, non-
sbfd}                                           OPTIONAL, -- Need R
        frequencyHoppingOffset-SBFD-r19                  INTEGER (1..
maxNrofPhysicalResourceBlocks-1)                OPTIONAL, -- Need R
        pusch-MutingResources-r19                        PUSCH-MutingResources-r19
OPTIONAL -- Need R
        ]]
    }
OPTIONAL, -- Need R
    ...,
}
-- TAG-CONFIGUREDGRANTCONFIG-STOP
-- ASN1STOP
``` cg-StartingOffsets: This field is not applicable for a UE which is allowed to operate as an initiating device in semi-static channel access mode, i.e., not applicable for a UE configured with UE FFP parameters (e.g. period, offset) regardless whether the UE would initiate its own COT or would share gNB's COT.

dmrs-SeqInitialization: The network configures this field if transformPrecoder is disabled or when the value of sdt-NrofDMRS-Sequences is set to 1. Otherwise, the field is absent.

frequencyDomainAllocation: Indicates the frequency domain resource allocation, see TS 38.214 [19], clause 6.1.2, and TS 38.212 [17], clause 7.3.1).

frequencyHopping: The value intraSlot enables 'Intra-slot frequency hopping' and the value interSlot enables 'Inter-slot frequency hopping'. If the field is absent, frequency hopping is not configured. The field frequencyHopping applies to configured grant for 'pusch-RepTypeA' (see TS 38.214 [19], clause 6.3.1).

frequencyHoppingOffset: Frequency hopping offset used when frequency hopping is enabled (see TS 38.214 [19], clause 6.1.2 and clause 6.3).

frequencyHoppingOffset-SBFD: Configures the frequency hopping offset for Type 1 configured grant PUSCH in SBFD symbols (see TS 38.214 [19]).

mcs-Table: Indicates the MCS table the UE shall use for PUSCH without transform precoding. If the field is absent the UE applies the value qam64.

p0-PUSCH-Alpha: Index of the P0-PUSCH-AlphaSet to be used for this configuration.

pusch-MutingResources: Used to configure the time location and frequency location of UL muting resources for Type 1 configured grant PUSCH transmission, see clause x in TS 38.211 [16] and clause y in TS 38.214 [19].

rbg-Size: Selection between configuration 1 and configuration 2 for RBG size for PUSCH. The UE does not apply this field if resourceAllocation is set to resourceAllocationType1. Otherwise, the UE applies the value config1 when the field is absent. Note: rbg-Size is used when the transformPrecoder parameter is disabled.

repK-RV: The redundancy version (RV) sequence to use. See TS 38.214 [19], clause 6.1.2. The network configures this field if repetitions are used, i.e., if repK is set to n2, n4 or n8. This field is not configured when cg-Retransmission-Timer is configured. Otherwise, the field is absent.

repK: Number of repetitions K, see TS 38.214 [19]. If the field repK-v1710 is present, the UE shall ignore the repK (without suffix).

resourceAllocation: Configuration of resource allocation type 0 and resource allocation type 1. For Type 1 UL data transmission without grant, resourceAllocation should be resourceAllocationType0 or resourceAllocationType1.

rrc-ConfiguredUplinkGrant: Configuration for "configured grant" transmission with fully RRC-configured UL grant (Type1). If this field is absent the UE uses UL grant configured by DCI addressed to CS-RNTI (Type2).

sbfd-Config2-PUSCH-RBoffset: Indicates the RB offset to determine the starting PRB for Type1 configured grant PUSCH transmissions in SBFD symbols for Configuration 2 (see TS 38.214 [19], clause y).

sequenceOffsetForRV: Configures the RV offset for the starting RV for the first repetition (first actual repetition in PUSCH repetition Type B) towards the second 'SRS resource set' for PUSCH configured in either srs-Resource-SetToAddModList or srs-ResourceSetToAddModListDCI-0-2 with usage 'codebook' or 'noncodebook'.

srs-ResourceSetId: Indicates the associated SRS resource set for PUSCH+PUSCH simultaneous uplink transmission for CG-type 1 PUSCH. Network does not configure this field if cg-RRC-Configuration is configured.

srs-ResourceIndicator, srs-ResourceIndicator-v1850: Indicates the SRS resource to be used (see TS 38.212 [17], clause 7.3.1.1.2, and TS 38.214 [19], clause 6.1.2.3). The network does not configure this for CG-SDT or if cg-RRC-Configuration is configured. Field srs-ResourceIndicator-v1850 is only configured when 8 antenna ports are configured (see TS 38.214 [19], clause 6.1.1.2). The network does not configure both srs-ResourceIndicator and srs-ResourceIndicator-v1850.

srs-ResourceIndicator2: Indicates the SRS resource to be used for the second SRS resource set. When this field is present, the srs-ResourceIndicator is used for the first SRS resource set. Network does not configure this field if cg-RRC-Configuration is configured.

startingFromRV0: This field is used to determine the initial transmission occasion of a transport block for a given RV sequence, see TS 38.214 [19], clause 6.1.2.3.1. The network does not configure this field if cg-Retransmission-Timer-r16 is configured for CG operation.

symbolType: Configures the valid symbol type for Type 1 CG PUSCH for SBFD Configuration 1. The network does not configure this field if SBFD Configuration 2 is enabled for the UL BWP. (see TS 38.214 [19], clause 6.1.3)

timeDomainAllocation, timeDomainAllocation-v1710: Indicates a combination of start symbol and length and PUSCH mapping type, see TS 38.214 [19], clause 6.1.2 and TS 38.212 [17], clause 7.3.1.

If the field timeDomainAllocation-v1710 is present, the UE shall ignore timeDomainAllocation field (without suffix).

timeDomainOffset: Offset related to the reference SFN indicated by timeReferenceSFN, see TS 38.321 [3], clause 5.8.2. timeDomainOffset-r17 is only applicable to 480 kHz and 960 kHz. If timeDomainOffset-r17 is present, the UE shall ignore timeDomainOffset (without suffix).

timeReferenceHyperSFN: Indicates H-SFN used for determination of the offset of a resource in time domain. The UE uses the closest H-SFN with the indicated number preceding the reception of the configured grant configuration, see TS 38.321 [3], clause 5.8.2. If the field timeReferenceHyperSFN is not present, the reference hyper SFN is 0.

timeReferenceSFN: Indicates SFN used for determination of the offset of a resource in time domain. The UE uses the closest SFN with the indicated number preceding the reception of the configured grant configuration, see TS 38.321 [3], clause 5.8.2. If the field timeReferenceSFN is not present, the reference SFN is 0.

transformPrecoder: Enables or disables transform precoding for type1 and type2. If the field is absent, the UE enables or disables transform precoding in accordance with the field msg3-transformPrecoder in RACH-ConfigCommon from rach-ConfigCommon included directly within BWP configuration (i.e., not included in additionalRACH-Config-List), see TS 38.214 [19], clause 6.1.3.

uci-OnPUSCH: Selection between and configuration of dynamic and semi-static beta-offset. For Type 1 UL data transmission without grant, uci-OnPUSCH should be set to semiStatic. The network does not configure this for CG-SDT.

The IE PUCCH-Config is used to configure UE specific PUCCH parameters (per BWP).

PUCCH-Config information element

```
-- ASN1START
-- TAG-PUCCH-CONFIG-START
PUCCH-Config ::=                                          SEQUENCE {
    resourceSetToAddModList                                  SEQUENCE (SIZE
(1..maxNrofPUCCH-ResourceSets)) OF PUCCH-ResourceSet        OPTIONAL, -- Need N
    resourceSetToReleaseList                                SEQUENCE (SIZE
(1..maxNrofPUCCH-ResourceSets)) OF PUCCH-ResourceSetId      OPTIONAL, -- Need N
    resource ToAddModList                                   SEQUENCE (SIZE
(1..maxNrofPUCCH-Resources)) OF PUCCH-Resource              OPTIONAL, -- Need N
    resourceToReleaseList                                   SEQUENCE (SIZE
(1..maxNrofPUCCH-Resources)) OF PUCCH-ResourceId            OPTIONAL, -- Need N
    format1                                                 SetupRelease { PUCCH-
FormatConfig }                                              OPTIONAL, -- Need M
    format2                                                 SetupRelease { PUCCH-
FormatConfig }                                              OPTIONAL, -- Need M
    format3                                                 SetupRelease { PUCCH-
FormatConfig }                                              OPTIONAL, -- Need M
    format4                                                 SetupRelease { PUCCH-
FormatConfig }                                              OPTIONAL, -- Need M
    schedulingRequestResourceToAddModList                   SEQUENCE (SIZE (1..maxNrofSR-
Resources)) OF SchedulingRequestResourceConfig             OPTIONAL, -- Need N
    schedulingRequestResource ToReleaseList                 SEQUENCE (SIZE (1..maxNrofSR-
Resources)) OF SchedulingRequestResourceId                 OPTIONAL, -- Need N
    multi-CSI-PUCCH-ResourceList                            SEQUENCE (SIZE (1..2) OF
PUCCH-ResourceId                                            OPTIONAL, -- Need M
    dl-DataToUL-ACK                                         SEQUENCE (SIZE (1..8)) OF
INTEGER (0..15)                                             OPTIONAL, -- Need M
    spatialRelationInfoToAddModList                         SEQUENCE (SIZE
(1..maxNrofSpatialRelationInfos)) OF PUCCH-SpatialRelationInfo  OPTIONAL, -- Need N
    spatialRelationInfoToReleaseList                        SEQUENCE (SIZE
(1..maxNrofSpatialRelationInfos)) OF PUCCH-SpatialRelationInfoId  OPTIONAL, -- Need N
    pucch-PowerControl                                      PUCCH-PowerControl
                                                            OPTIONAL, -- Need M
    ...,
    [[
    resourceToAddModListExt-v1610                           SEQUENCE (SIZE
(1..maxNrofPUCCH-Resources)) OF PUCCH-ResourceExt-v1610 OPTIONAL, -- Need N
    dl-DataToUL-ACK-r16                                     SetupRelease { DL-DataToUL-
ACK-r16 }                                                   OPTIONAL, -- Need M
    ul-AccessConfigListDCI-1-1-r16                          SetupRelease { UL-
AccessConfigListDCI-1-1-r16 }                               OPTIONAL, -- Need M
    subslotLengthForPUCCH-r16                               CHOICE {
        normalCP-r16                                            ENUMERATED {n2,n7},
        extendedCP-r16                                          ENUMERATED {n2,n6}
    }
                                                            OPTIONAL, -- Need R
    dl-DataToUL-ACK-DCI-1-2-r16                             SetupRelease { DL-DataToUL-
ACK-DCI-1-2-r16}                                            OPTIONAL, -- Need M
```

-continued

```
        numberOfBitsForPUCCH-ResourceIndicatorDCI-1-2-r16    INTEGER (0..3)
OPTIONAL, -- Need R
    dmrs-UplinkTransformPrecodingPUCCH-r16                   ENUMERATED {enabled}
OPTIONAL, -- Cond PI2-BPSK
    spatialRelationInfoToAddModListSizeExt-v1610             SEQUENCE (SIZE
(1..maxNrofSpatialRelationInfosDiff-r16)) OF PUCCH-SpatialRelationInfo
OPTIONAL, -- Need N
    spatialRelationInfoToReleaseListSizeExt-v1610            SEQUENCE (SIZE
(1..maxNrofSpatialRelationInfosDiff-r16)) OF PUCCH-SpatialRelationInfoId
OPTIONAL, -- Need N
    spatialRelationInfoToAddModListExt-v1610                 SEQUENCE (SIZE
(1..maxNrofSpatialRelationInfos-r16)) OF PUCCH-SpatialRelationInfoExt-r16
OPTIONAL, -- Need N
    spatialRelationInfoToReleaseListExt-v1610                SEQUENCE (SIZE
(1..maxNrofSpatialRelationInfos-r16)) OF
PUCCH-SpatialRelationInfoId-r16                  OPTIONAL, -- Need N
    resourceGroupToAddModList-r16                            SEQUENCE (SIZE
(1..maxNrofPUCCH-ResourceGroups-r16)) OF PUCCH-ResourceGroup-r16
OPTIONAL, -- Need N
    resourceGroupToReleaseList-r16                           SEQUENCE (SIZE
(1..maxNrofPUCCH-ResourceGroups-r16)) OF PUCCH-ResourceGroupId-r16
OPTIONAL, -- Need N
    sps-PUCCH-AN-List-r16                                    SetupRelease { SPS-PUCCH-AN-
List-r16 }                                       OPTIONAL, -- Need M
    schedulingRequestResourceToAddModListExt-v1610           SEQUENCE (SIZE
(1..maxNrofSR-Resources)) OF SchedulingRequestResourceConfigExt-v1610
OPTIONAL, -- Need N
    ]],
    [[
    schedulingRequestResourceToAddModListExt-v19xy           SEQUENCE (SIZE
(1..maxNrofSR-Resources)) OF SchedulingRequestResourceConfigExt-v19xy
OPTIONAL, -- Need N
    resourceToAddModListExt-v19xy                            SEQUENCE (SIZE
(1..maxNrofPUCCH-Resources)) OF PUCCH-ResourceExt-v19xy
OPTIONAL, -- Need N
    ]]
}
PUCCH-FormatConfig ::=                                       SEQUENCE {
    interslotFrequencyHopping                                ENUMERATED {enabled}
OPTIONAL, -- Need R
    additionalDMRS                                           ENUMERATED { true}
OPTIONAL, -- Need R
    maxCodeRate                                              PUCCH-MaxCodeRate
OPTIONAL, -- Need R
    nrofSlots                                                ENUMERATED {n2,n4,n8}
OPTIONAL, -- Need S
    pi2BPSK                                                  ENUMERATED {enabled}
OPTIONAL, -- Need R
    simultaneousHARQ-ACK-CSI                                 ENUMERATED { true}
OPTIONAL, -- Need R
}
-- A set with one or more PUCCH resources
PUCCH-ResourceSet ::=                                        SEQUENCE {
```

-continued

```
    pucch-ResourceSetId             PUCCH-ResourceSetId,
    resourceList                    SEQUENCE (SIZE
(1..maxNrofPUCCH-ResourcesPerSet)) OF PUCCH-ResourceId,
    maxPayloadSize                  INTEGER (4..256)
OPTIONAL, -- Need R
}

PUCCH-ResourceSetId ::=            INTEGER (0..maxNrofPUCCH-
ResourceSets-1)

PUCCH-Resource ::=                SEQUENCE {
    pucch-ResourceId                PUCCH-ResourceId,
    startingPRB                     PRB-Id,
    intraSlotFrequencyHopping       ENUMERATED { enabled }
OPTIONAL, -- Need R
    secondHopPRB                    PRB-Id
OPTIONAL, -- Need R
    format                          CHOICE {
        format0                       PUCCH-format0,
        format1                       PUCCH-format1,
        format2                       PUCCH-format2,
        format3                       PUCCH-format3,
        format4                       PUCCH-format4
    }
}

PUCCH-ResourceExt-v19xy ::=       SEQUENCE {
    startingPRB-SBFD-r19            PRB-Id
OPTIONAL, -- Need R
    secondHopPRB-SBFD-r19           PRB
Id
OPTIONAL, -- Need R
}

PUCCH-ResourceId ::=              INTEGER (0..maxNrofPUCCH-
Resources-1)
PUCCH-format0 ::=                 SEQUENCE {
    initialCyclicShift              INTEGER(0..11),
    nrofSymbols                     INTEGER (1..2),
    startingSymbolIndex             INTEGER(0..13)
}
PUCCH-format1 ::=                 SEQUENCE {
    initialCyclicShift              INTEGER(0..11),
    nrofSymbols                     INTEGER (4..14),
    startingSymbolIndex             INTEGER(0..10),
    timeDomainOCC                   INTEGER(0..6)
}
PUCCH-format2 ::=                 SEQUENCE {
    nrofPRBs                        INTEGER (1..16),
    nrofSymbols                     INTEGER (1..2),
    startingSymbolIndex             INTEGER(0..13)
}
PUCCH-format3 ::=                 SEQUENCE {
    nrofPRBs                        INTEGER (1..16),
    nrofSymbols                     INTEGER (4..14),
    startingSymbolIndex             INTEGER(0..10)
}
PUCCH-format4 ::=                 SEQUENCE {
```

```
                                           -continued nrofSymbols                    INTEGER (4..14),
    occ-Length                     ENUMERATED
{n2,n4},
    occ-Index                      ENUMERATED
{n0,n1,n2,n3},
    startingSymbolIndex            INTEGER(0..10)
}
DL-DataToUL-ACK-r16 ::=            SEQUENCE (SIZE (1..8)) OF
INTEGER (-1..15)
-- TAG-PUCCH-CONFIG-STOP
-- ASN1STOP
``` dl-DataToUL-ACK, dl-DataToUL-ACK-DCI-1-2: List of timing for given PDSCH to the DL ACK (see TS 38.213 [13], clause 9.1.2). The field dl-DataToUL-ACK applies to DCI format 1_1 and the field dl-DataToUL-ACK-DCI-1-2 applies to DCI format 1_2 (see TS 38.212 [17], clause 7.3.1 and TS 38.213 [13], clause 9.2.3). The dl-DataToUL-ACK-v1700 is applicable for NTN and dl-DataToUL-ACK-r17 is applicable for FR2-2. The dl-DataToUL-ACK-r18 is applicable for ATG. If dl-DataToUL-ACK-r16 or dl-DataToUL-ACK-r17 or dl-DataToUL-ACK-v1700 or dl-DataToUL-ACK-r18 is signalled, UE shall ignore the dl-DataToUL-ACK (without suffix). The value −1 corresponds to "inapplicable value" for the case where the A/N feedback timing is not explicitly included at the time of scheduling PDSCH. The fields dl-DataToUL-ACK-r17 and dl-DataToUL-ACK-DCI-1-2-r17 are only applicable for SCS of 480 kHz or 960 kHz. The field dl-DataToUL-ACK-r18 applies to DCI format 1_1 and the field dl-DataToUL-ACK-DCI-1-2-r18 applies to DCI format 1_2 (see TS 38.212 [17], clause 7.3.1 and TS 38.213 [13], clause 9.2.3).

format0: Parameters that are common for all PUCCH resources of format 0.

format1: Parameters that are common for all PUCCH resources of format 1.

format2: Parameters that are common for all PUCCH resources of format 2.

format3: Parameters that are common for all PUCCH resources of format 3.

format4: Parameters that are common for all PUCCH resources of format 4.

mappingPattern: Indicates whether the UE should follow Cyclical mapping pattern or Sequential mapping pattern for when a PUCCH resource used for repetitions of a PUCCH transmission includes first and second spatial settings for FR2, or first and second sets of power control parameters for FR1 (see TS 38.213 [13], clause 9.2.6).

pucch-PowerControl: Configures power control parameters PUCCH transmission.

resourceToAddModList, resourceToAddModListExt, resourceToReleaseList: Lists for adding and releasing PUCCH resources applicable for the UL BWP and serving cell in which the PUCCH-Config is defined. The resources defined herein are referred to from other parts of the configuration to determine which resource the UE shall use for which report. If the network includes of resourceToAddModListExt, it includes the same number of entries, and listed in the same order, as in resourceToAddModList.

sps-PUCCH-AN-List: Indicates a list of PUCCH resources for DL SPS HARQ ACK. The field maxPayloadSize is absent for the first and the last SPS-PUCCH-AN in the list. If configured, this overrides n1PUCCH-AN in SPS-config.

nrofSlots: Number of slots with the same PUCCH. When the field is absent the UE applies the value n1. See TS 38.213 [13], clause 9.2.6.

nrofPRBs: Indicates the number of PRBs used per PUCCH resource for the PUCCH format, see TS 38.213 [13], clause 9.2.1. This field is applicable for PUCCH format0, format1, and format4 in FR2-2. The supported values for format4 are 1, 2, 3, 4, 5, 6, 8, 9, 10, 12, 15 and 16.

pucch-ResourceId: Identifier of the PUCCH resource.

secondHopPRB-SBFD: Indicates the second hop PRB of the PUCCH resource in SBFD symbols.

startingPRB-SBFD: Indicates the starting PRB of the PUCCH resource in SBFD symbols.

The IE RACH-ConfigDedicated is used to specify the dedicated random access parameters.

```
-- ASN1START
-- TAG-RACH-CONFIGDEDICATED-START
RACH-ConfigDedicated ::=              SEQUENCE {
    cfra                                      CFRA
OPTIONAL, -- Need S
    ra-Prioritization                         RA-Prioritization
OPTIONAL, -- Need N ...,
    [[
    ra-PrioritizationTwoStep-r16              RA-Prioritization
OPTIONAL, -- Need N
    cfra-TwoStep-r16                          CFRA-TwoStep-r16
OPTIONAL -- Need S
    ]],
    [[
    ra-OccasionType-r19                       ENUMERATED {SBFD}
OPTIONAL -- Need S
    ]]
}
    CFRA ::=                      SEQUENCE {
        occasions                     SEQUENCE {
            rach-ConfigGeneric            RACH-ConfigGeneric,
            ssb-perRACH-Occasion              ENUMERATED {oneEighth,
oneFourth, oneHalf, one, two, four, eight, sixteen}
OPTIONAL -- Cond Mandatory
        }
OPTIONAL, -- Need S
        resources                     CHOICE {
            ssb                           SEQUENCE {
                ssb-ResourceList                  SEQUENCE (SIZE(1..maxRA-SSB-
Resources)) OF CFRA-SSB-Resource,
                ra-ssb-OccasionMaskIndex          INTEGER (0..15)
            },
            csirs                         SEQUENCE {
                csirs-ResourceList                SEQUENCE (SIZE(1..maxRA-
CSIRS-Resources)) OF CFRA-CSIRS-Resource,
                rsrp-ThresholdCSI-RS              RSRP-Range
            }
```

-continued

```
    },
    ...,
    [[
    totalNumberOfRA-Preambles           INTEGER              (1..63)
OPTIONAL -- Cond Occasions
    ]],
    [[
    msg1-RepetitionNum-r18              ENUMERATED {n2, n4, n8, spare1}
OPTIONAL -- Cond 4StepCFRArep
    ]]
    }
    CFRA-SSB-Resource ::=             SEQUENCE {
      ssb                              SSB-Index,
      ra-PreambleIndex                 INTEGER (0..63),
      ...,
      [[
      msgA-PUSCH-Resource-Index-r16    INTEGER (0..3071)   OPTIONAL --
Cond 2StepCFRA
      ]]
    }
    CFRA-CSIRS-Resource ::=          SEQUENCE {
      csi-RS                           CSI-RS-Index,
      ra-OccasionList                        SEQUENCE (SIZE(1..maxRA-
OccasionsPerCSIRS)) OF INTEGER (0..maxRA-Occasions-1),
      ra-PreambleIndex                 INTEGER (0..63),
      ...
    }
    -- TAG-RACH-CONFIGDEDICATED-STOP
    -- ASN1STOP
``` csi-RS: The ID of a CSI-RS resource defined in the measurement object associated with this serving cell.

ra-OccasionList: RA occasions that the UE shall use when performing CF-RA upon selecting the candidate beam identified by this CSI-RS. The network ensures that the RA occasion indexes provided herein are also configured by prach-ConfigurationIndex and msg1-FDM. Each RACH occasion is sequentially numbered, first, in increasing order of frequency resource indexes for frequency multiplexed PRACH occasions; second, in increasing order of time resource indexes for time multiplexed PRACH occasions within a PRACH slot and Third, in increasing order of indexes for PRACH slots.

ra-PreambleIndex: The RA preamble index to use in the RA occasions associated with this CSI-RS.

msg1-RepetitionNum: Indicates the MSG1 repetition number used for contention free 4-step random access type in TS 38.321 [3]. If this field is absent, the UE performs contention free 4-step random access without MSG1-Repetitions.

Occasions: RA occasions for contention free random access. If the field is absent, the UE uses the RA occasions configured in RACH-ConfigCommon in the first active UL BWP.

ra-ssb-OccasionMaskIndex: Explicitly signalled PRACH Mask Index for RA Resource selection in TS 38.321 [3]. The mask is valid for all SSB resources signalled in ssb-ResourceList. The UE shall ignore this field if the field msg1-RepetitionNum included in CFRA is configured.

rach-ConfigGeneric: Configuration of contention free random access occasions for CFRA. The UE shall ignore preambleReceivedTargetPower, preambleTransMax, power-RampingStep, ra-ResponseWindow signaled within this field and use the corresponding values provided in RACH-ConfigCommon.

ssb-perRACH-Occasion: Number of SSBs per RACH occasion.

totalNumberOfRA-Preambles: Total number of preambles used for contention free random access in the RACH resources defined in CFRA, excluding preambles used for other purposes (e.g. for SI request). If the field is absent but the field occasions is present, the UE may assume all the 64 preambles are for RA. The setting should be consistent with the setting of ssb-perRACH-Occasion, if present, i.e. it should be a multiple of the number of SSBs per RACH occasion.

ra-PreambleIndex: The preamble index that the UE shall use when performing CF-RA upon selecting the candidate beams identified by this SSB.

Ssb: The ID of an SSB transmitted by this serving cell.

Cfra: Parameters for contention free random access to a given target cell. If this field and cfra-TwoStep are absent, the UE performs contention based random access.

ra-OccasionType: Indicates the SBFD RACH occasion type for CFRA to be used by a SBFD capable UE. If absent, indicated the non-SBFD RACH occasion type to be used.

ra-prioritization: Parameters which apply for prioritized random access procedure to a given target cell (see TS 38.321 [3], clause 5.1.1).

The IE RACH-ConfigGeneric is used to specify the random-access parameters both for regular random access as well as for beam failure recovery.

RACH-ConfigGeneric information element

```
-- ASN1START
-- TAG-RACH-CONFIGGENERIC-START
RACH-ConfigGeneric ::=              SEQUENCE {
    prach-ConfigurationIndex         INTEGER (0..255),
    msg1-FDM                             ENUMERATED {one, two, four,
eight},
```

-continued

```
    msg1-FrequencyStart                    INTEGER
(0..maxNrofPhysicalResourceBlocks-1),
    zeroCorrelationZoneConfig              INTEGER(0..15),
    preambleReceivedTargetPower            INTEGER (-202..-60),
    preambleTransMax                         ENUMERATED {n3, n4, n5, n6, n7, n8,
n10, n20, n50, n100, n200},
    powerRampingStep                         ENUMERATED {dB0, dB2, dB4,
dB6},
    ra-Response Window                     ENUMERATED { sl1, sl2, sl4, sl8, sl10,
sl20, sl40, sl80},
    ...,
    [[
    prach-ConfigurationPeriodScaling-IAB-r16               ENUMERATED
{scf1,scf2,scf4,scf8,scf16,scf32,scf64}      OPTIONAL, -- Need R
    prach-ConfigurationFrameOffset-IAB-r16                  INTEGER (0..63)
OPTIONAL, -- Need R
    prach-ConfigurationSOffset-IAB-r16                       INTEGER (0..39)
OPTIONAL, -- Need R
    ra-Response Window-v1610                    ENUMERATED { sl60,
sl160}                                         OPTIONAL, -- Need R
    prach-ConfigurationIndex-v1610                  INTEGER (256..262)
OPTIONAL, -- Need R
    ]],
    [[
    ra-Response Window-v1700                    ENUMERATED {sl240,
sl320, sl640, sl960, sl1280, sl1920, sl2560}    OPTIONAL      -- Need R
    ]],
    [[
    sbfd-RACH-SingleConfig-preambleReceivedTargetPower-r19      INTEGER (-
202..-60)                                    OPTIONAL,      -- Need R
    ]]
}
    -- TAG-RACH-CONFIGGENERIC-STOP
    -- ASN1STOP
``` msg1-FDM: The number of PRACH transmission occasions FDMed in one time instance. (see TS 38.211 [16], clause 6.3.3.2).

msg1-FrequencyStart: Offset of lowest PRACH transmission occasion in frequency domain with respective to PRB 0. The value is configured so that the corresponding RACH resource is entirely within the bandwidth of the UL BWP. (see TS 38.211 [16], clause 6.3.3.2).

powerRampingStep: Power ramping steps for PRACH (see TS 38.321 [3],5.1.3). This field is set to the same value for different repetition numbers associated with a specific FeatureCombination.

prach-ConfigurationIndex: PRACH configuration index. For prach-ConfigurationIndex configured under beamFailureRecoveryConfig, the prach-ConfigurationIndex can only correspond to the short preamble format, (see TS 38.211 [16], clause 6.3.3.2). If the field prach-ConfigurationIndex-v1610 is present, the UE shall ignore the value provided in prach-ConfigurationIndex (without suffix).

preambleReceivedTargetPower: The target power level at the network receiver side (see TS 38.213 [13], clause 7.4, TS 38.321 [3], clauses 5.1.2, 5.1.3). Only multiples of 2 dBm may be chosen (e.g. -202, -200, -198, . . . ). This field is set to the same value for different repetition numbers associated with a specific FeatureCombination.

preambleTransMax: Max number of RA preamble transmission performed before declaring a failure (see TS 38.321 [3], clauses 5.1.4, 5.1.5). The UE shall ignore this field in case rach-ConfigGeneric is included within an EarlyUL-SyncConfig IE.

ra-ResponseWindow: Msg2 (RAR) window length in number of slots. The network configures a value lower than or equal to 10 ms when Msg2 is transmitted in licensed spectrum and a value lower than or equal to 40 ms when Msg2 is transmitted with shared spectrum channel access (see TS 38.321 [3], clause 5.1.4). UE ignores the field if included in SCellConfig. If ra-ResponseWindow-v1610 or ra-ResponseWindow-v1700 is signalled, UE shall ignore the ra-ResponseWindow (without suffix). The field ra-ResponseWindow-v1700 is applicable to SCS 480 kHz and SCS 960 kHz. The UE shall ignore this field in case rach-ConfigGeneric is included within an EarlyUL-SyncConfig IE.

sbfd-RACH-SingleConfig-preambleReceivedTargetPower: Configures preambleReceivedTargetPower for SBFD ROs for SBFD RACH configuration Option 1, see clause x in TS 38.211 [16] and clause y in TS 38.213 [13].

The IE SchedulingRequestResourceConfig determines physical layer resources on PUCCH where the UE may send the dedicated scheduling request (D-SR) (see TS 38.213 [13], clause 9.2.4).

```
    -- ASN1START
    -- TAG-SCHEDULINGREQUESTRESOURCECONFIG-START
    SchedulingRequestResourceConfig ::=            SEQUENCE {
        schedulingRequestResourceId                SchedulingRequestResourceId,
        schedulingRequestID                        SchedulingRequestId,
        periodicity AndOffset                      CHOICE {
            sym2                                       NULL,
            sym6or7                                    NULL,
            sl1                                            NULL,
```

-continued

```
-- Recurs in every slot
    sl2                                 INTEGER (0..1),
    sl4                                 INTEGER (0..3),
    sl5                                 INTEGER (0..4),
    sl8                                 INTEGER (0..7),
    sl10                                INTEGER (0..9),
    sl16                                INTEGER (0..15),
    sl20                                INTEGER (0..19),
    sl40                                INTEGER (0..39),
    sl80                                INTEGER (0..79),
    sl160                               INTEGER (0..159),
    sl320                               INTEGER (0..319),
    sl640                               INTEGER (0..639)
    }
OPTIONAL, -- Need M
    resource                            PUCCH-ResourceId
OPTIONAL, -- Need M
    }
    SchedulingRequestResourceConfigExt-v19xy ::=   SEQUENCE {
        symbolType-r19                          ENUMERATED {sbfd,
non-sbfd}                                OPTIONAL -- Need R
    }
    -- TAG-SCHEDULINGREQUESTRESOURCECONFIG-STOP
    -- ASN1STOP
``` periodicityAndOffset: SR periodicity and offset in number of symbols or slots resource: ID of the PUCCH resource in which the UE shall send the scheduling request. The actual PUCCH-Resource is configured in PUCCH-Config of the same UL BWP and serving cell as this SchedulingRequestResourceConfig. The network configures a PUCCH-Resource of PUCCH-format0 or PUCCH-format1 (other formats not supported) (see TS 38.213 [13], clause 9.2.4)

schedulingRequestID: The ID of the SchedulingRequestConfig that uses this scheduling request resource.

symbolType: Configures the valid symbol type for PUCCH configured for SR for SBFD Configuration 1. The network does not configure this field if SBFD Configuration 2 is enabled for the UL BWP. (see TS 38.214 [19], clause X)

The IE SRS-Config is used to configure sounding reference signal transmissions. The configuration defines a list of SRS-Resources, a list of SRS-PosResources, a list of SRS-PosResourceSets and a list of SRS-ResourceSets. Each resource set defines a set of SRS-Resources or SRS-PosResources. The network triggers the transmission of the set of SRS-Resources or SRS-PosResources using a configured aperiodicSRS-ResourceTrigger (L1 DCI). The network does not configure SRS specific power control parameters alpha (without suffix) or pathlossReferenceRS if unifiedTCI-StateType is configured for the serving cell.

```
-- ASN1START
-- TAG-SRS-CONFIG-START
SRS-Config ::=                          SEQUENCE {
        srs-ResourceSetToReleaseList            SEQUENCE (SIZE(1..maxNrofSRS-
ResourceSets)) OF SRS-ResourceSetId      OPTIONAL,  -- Need N
        srs-ResourceSetToAddModList                             SEQUENCE
(SIZE(1..maxNrofSRS-ResourceSets)) OF SRS-ResourceSet           OPTIONAL, --
Need N
        srs-ResourceToReleaseList               SEQUENCE (SIZE(1..maxNrofSRS-
Resources)) OF SRS-ResourceId            OPTIONAL,  -- Need N
        srs-ResourceToAddModList                                SEQUENCE
(SIZE(1..maxNrofSRS-Resources)) OF SRS-Resource                 OPTIONAL,  --
Need N
        tpc-Accumulation                        ENUMERATED {disabled}
OPTIONAL,    -- Need S
        ...,
        [[
        srs-RequestDCI-1-2-r16                                  INTEGER (1..2)
OPTIONAL, -- Need S
        srs-RequestDCI-0-2-r16                                  INTEGER (1..2)
OPTIONAL, -- Need S
        srs-ResourceSetToAddModListDCI-0-2-r16 SEQUENCE (SIZE(1..maxNrofSRS-
ResourceSets)) OF SRS-ResourceSet        OPTIONAL, -- Need N
        srs-ResourceSetToReleaseListDCI-0-2-r16   SEQUENCE (SIZE(1..maxNrofSRS-
ResourceSets)) OF SRS-ResourceSetId      OPTIONAL, -- Need N
        srs-PosResourceSetToReleaseList-r16       SEQUENCE (SIZE(1..maxNrofSRS-
PosResourceSets-r16)) OF SRS-PosResourceSetId-r16
OPTIONAL, -- Need N
        srs-PosResourceSetToAddModList-r16                      SEQUENCE
(SIZE(1..maxNrofSRS-PosResourceSets-r16))       OF      SRS-PosResourceSet-r16
OPTIONAL, -- Need N
        srs-PosResourceToReleaseList-r16        SEQUENCE (SIZE(1..maxNrofSRS-
PosResources-r16)) OF SRS-PosResourceId-r16      OPTIONAL, -- Need N
        srs-PosResourceToAddModList-r16                         SEQUENCE
```

-continued

```
(SIZE(1..maxNrofSRS-PosResources-r16)) OF SRS-PosResource-r16 OPTIONAL -- Need N
        ]],
        [[
        dci-TriggeringPosResourceSetLink-r18          ENUMERATED {  enabled  }
OPTIONAL   -- Need R
        ]]
    }
    SRS-ResourceSet ::=                      SEQUENCE
        srs-ResourceSetId                    SRS-ResourceSetId,
        srs-ResourceIdList                   SEQUENCE (SIZE(1..maxNrofSRS-
ResourcesPerSet)) OF SRS-ResourceId    OPTIONAL, -- Cond Setup
        resourceType                         CHOICE {
            aperiodic                        SEQUENCE {
                aperiodicSRS-ResourceTrigger              INTEGER
(1..maxNrofSRS-TriggerStates-1),
                csi-RS                                    NZP-CSI-RS-
ResourceId                           OPTIONAL, -- Cond NonCodebook
                slotOffset                                INTEGER (1..32)
OPTIONAL, -- Need S
                ...,
                [[
                aperiodicSRS-Resource TriggerList         SEQUENCE
(SIZE(1..maxNrofSRS-TriggerStates-2))
                                                             OF
INTEGER (1..maxNrofSRS-TriggerStates-1)     OPTIONAL   -- Need M
                ]]
            },
            semi-persistent                  SEQUENCE {
                associatedCSI-RS                          NZP-CSI-RS-ResourceId
OPTIONAL, -- Cond NonCodebook
                ...
            },
            periodic                         SEQUENCE {
                associatedCSI-RS                          NZP-CSI-RS-ResourceId
OPTIONAL, -- Cond NonCodebook
                ...
            }
        },
        usage                                ENUMERATED
{beamManagement, codebook, nonCodebook, antennaSwitching},
        alpha                                                 Alpha
OPTIONAL, -- Need S
        p0                                         INTEGER (-202..24)
OPTIONAL, -- Cond Setup
        pathlossReferenceRS                        PathlossReferenceRS-Config
OPTIONAL, -- Need M
        srs-PowerControlAdjustmentStates           ENUMERATED {  sameAsFci2,
separateClosedLoop}                  OPTIONAL, -- Need S
        ...,
        [[
        pathlossReferenceRSList-r16                           SetupRelease
{ PathlossReferenceRSList-r16}             OPTIONAL   -- Need M
        ]],
        [[
        usagePDC-r17                               ENUMERATED {true}
OPTIONAL, -- Need R
        availableSlotOffsetList-r17                SEQUENCE (SIZE(1..4)) OF
AvailableSlotOffset-r17              OPTIONAL, -- Need R
        followUnifiedTCI-StateSRS-r17              ENUMERATED {enabled}
OPTIONAL -- Need R
        ]],
        [[
        applyIndicatedTCI-State-r18                ENUMERATED {first, second}
OPTIONAL -- Cond FollowUTCI
        ]],
        [[
        symbolType-r19                             ENUMERATED {sbfd, non-sbfd}
OPTIONAL   -- Need R
        ]]
    }
    AvailableSlotOffset-r17 ::=   INTEGER (0..7)
    PathlossReferenceRS-Config ::=           CHOICE {
        ssb-Index                            SSB-Index,
        csi-RS-Index                         NZP-CSI-RS-ResourceId
    }
    PathlossReferenceRSList-r16 ::=          SEQUENCE (SIZE (1..maxNrofSRS-
PathlossReferenceRS-r16)) OF PathlossReferenceRS-r16
    PathlossReferenceRS-r16 ::=              SEQUENCE {
        srs-PathlossReferenceRS-Id-r16              SRS-PathlossReferenceRS-Id-r16,
```

-continued

```
        pathlossReferenceRS-r16                    PathlossReferenceRS-Config
    }
        SRS-PathlossReferenceRS-Id-r16 ::=            INTEGER (0..maxNrofSRS-
PathlossReferenceRS-1-r16)
        SRS-PosResourceSet-r16 ::=            SEQUENCE {
            srs-PosResourceSetId-r16                SRS-PosResourceSetId-r16,
            srs-PosResourceIdList-r16                        SEQUENCE
(SIZE(1..maxNrofSRS-ResourcesPerSet)) OF SRS-PosResourceId-r16
OPTIONAL, -- Cond Setup
            resourceType-r16                        CHOICE {
                aperiodic-r16                        SEQUENCE {
                    aperiodicSRS-ResourceTriggerList-r16            SEQUENCE
(SIZE(1..maxNrofSRS-TriggerStates-1))
                                                            OF
INTEGER (1..maxNrofSRS-TriggerStates-1)        OPTIONAL, -- Need M
                    ...
                },
                semi-persistent-r16                    SEQUENCE {
                    ...
                },
                periodic-r16                        SEQUENCE {
                    ...
                }
            },
            alpha-r16                                    Alpha
OPTIONAL, -- Need S
            p0-r16                                INTEGER (−202..24)
OPTIONAL, -- Cond Setup
            pathlossReferenceRS-Pos-r16                CHOICE {
                ssb-IndexServing-r16                    SSB-Index,
                ssb-Ncell-r16                        SSB-InfoNcell-r16,
                dl-PRS-r16                        DL-PRS-Info-r16
            }
OPTIONAL, -- Need M
            ...
        }
        SRS-ResourceSetId ::=                    INTEGER (0..maxNrofSRS-
ResourceSets-1)
        SRS-PosResourceSetId-r16 ::=                INTEGER (0..maxNrofSRS-
PosResourceSets-1-r16)
        SRS-Resource ::=                    SEQUENCE {
            srs-ResourceId                    SRS-ResourceId,
            nrofSRS-Ports                    ENUMERATED {port1, ports2,
ports4},
            ptrs-PortIndex                    ENUMERATED {n0, n1 }
OPTIONAL,     -- Need R
            transmissionComb                    CHOICE {
                n2                        SEQUENCE {
                    combOffset-n2                    INTEGER (0..1),
                    cyclicShift-n2                    INTEGER (0..7)
                },
                n4                        SEQUENCE {
                    combOffset-n4                    INTEGER (0..3),
                    cyclicShift-n4                    INTEGER (0..11)
                }
            },
            resourceMapping                    SEQUENCE {
                startPosition                    INTEGER (0..5),
                nrofSymbols                    ENUMERATED {n1, n2, n4},
                repetitionFactor                    ENUMERATED {n1, n2, n4}
            },
            freqDomainPosition                INTEGER (0..67),
            freqDomainShift                    INTEGER (0..268),
            freqHopping                    SEQUENCE {
                c-SRS                        INTEGER (0..63),
                b-SRS                        INTEGER (0..3),
                b-hop                        INTEGER (0..3)
            },
            groupOrSequenceHopping                    ENUMERATED { neither,
groupHopping, sequenceHopping },
            resourceType                    CHOICE {
                aperiodic                    SEQUENCE {
                    ...
                },
                semi-persistent                    SEQUENCE {
                    periodicityAndOffset-sp                        SRS-
Periodicity AndOffset,
                    ...
                },
```

-continued

```
            periodic                          SEQUENCE {
                periodicityAndOffset-p                            SRS-
Periodicity AndOffset,
                ...
            }
        },
        sequenceId                            INTEGER (0..1023),
        spatialRelationInfo                        SRS-SpatialRelationInfo
OPTIONAL,   -- Need R
        ...,
        [[
        resourceMapping-r16                   SEQUENCE {
            startPosition-r16                 INTEGER (0..13),
            nrofSymbols-r16                       ENUMERATED {n1, n2, n4},
            repetitionFactor-r16              ENUMERATED {n1, n2, n4}
        }
OPTIONAL    -- Need R
        ]],
        [[
        spatialRelationInfo-PDC-r17           SetupRelease { SpatialRelationInfo-
PDC-r17 }                  OPTIONAL,    -- Need M
        resourceMapping-r17                       SEQUENCE {
            startPosition-r17                 INTEGER (0..13),
            nrofSymbols-r17                       ENUMERATED {n1, n2, n4,
n8, n10, n12, n14},
            repetitionFactor-r17              ENUMERATED {n1, n2, n4, n5,
n6, n7, n8, n10, n12, n14
        }
OPTIONAL,    -- Need R
        partialFreqSounding-r17               SEQUENCE {
            startRBIndexFScaling-r17              CHOICE{
                startRBIndexAndFreqScalingFactor2-r17      INTEGER (0..1),
                startRBIndexAndFreqScalingFactor4-r17      INTEGER (0..3)
            },
            enableStartRBHopping-r17              ENUMERATED {enable}
OPTIONAL    -- Need R
        }
OPTIONAL,    -- Need R
        transmissionComb-n8-r17               SEQUENCE {
            combOffset-n8-r17                     INTEGER (0..7),
            cyclicShift-n8-r17                INTEGER (0..5)
        }
OPTIONAL,    -- Need R
        srs-TCI-State-r17                     CHOICE {
            srs-UL-TCI-State                      TCI-UL-StateId-r17,
            srs-DLorJointTCI-State                TCI-StateId
        }
OPTIONAL    -- Need R
        ]],
        [[
        repetitionFactor-v1730                            ENUMERATED {n3}
OPTIONAL,    -- Need R
        srs-DLorJointTCI-State-v1730          SEQUENCE {
            cellAndBWP-r17                        ServingCellAndBWP-Id-r17
        }
OPTIONAL -- Cond DLorJointTCI-SRS
        ]],
        [[
        nrofSRS-Ports-n8-r18                  ENUMERATED {ports8, ports8tdm}
OPTIONAL,    -- Need R
        combOffsetHopping-r18                 SEQUENCE {
            hoppingId-r18                         INTEGER (0..1023)
OPTIONAL,    -- Need R
            hoppingSubset-r18                     CHOICE {
                transmissionComb-n4                   BIT STRING (SIZE (4)),
                transmissionComb-n8                   BIT STRING (SIZE (8))
            }
OPTIONAL,    -- Need R
            hoppingWithRepetition-r18             ENUMERATED {symbol,
repetition}                         OPTIONAL    -- Need R
        }
OPTIONAL,    -- Need R
        cyclicShiftHopping-r18                SEQUENCE {
            hoppingId-r18                         INTEGER (0..1023)
OPTIONAL,    -- Need R
            hoppingSubset-r18                     CHOICE {
                transmissionComb-n2                   BIT STRING (SIZE (8)),
                transmissionComb-n4                   BIT STRING (SIZE (12)),
                transmissionComb-n8                   BIT STRING (SIZE (6))
```

-continued

```
            }
OPTIONAL,    -- Need R
            hoppingFinerGranularity-r18            ENUMERATED {enable}
OPTIONAL    -- Need R
            }
OPTIONAL    -- Need R
        ]]
    }
    SRS-SpatialRelationInfo ::=    SEQUENCE {
        servingCellId                                  ServCellIndex
OPTIONAL,    -- Need S
        referenceSignal                 CHOICE {
            ssb-Index                       SSB-Index,
            csi-RS-Index                    NZP-CSI-RS-ResourceId,
            srs                             SEQUENCE {
                resourceId                      SRS-ResourceId,
                uplinkBWP                       BWP-Id
            }
        }
    }
    SSB-Configuration-r16 ::=        SEQUENCE {
        ssb-Freq-r16                    ARFCN-ValueNR,
        halfFrameIndex-r16              ENUMERATED { zero, one},
        ssbSubcarrierSpacing-r16        SubcarrierSpacing,
        ssb-Periodicity-r16             ENUMERATED { ms5, ms 10, ms20, ms40,
ms80, ms 160, spare2, spare1 }    OPTIONAL, -- Need S
        sfn0-Offset-r16                 SEQUENCE {
            sfn-Offset-r16                  INTEGER (0..1023),
            integerSubframeOffset-r16           INTEGER (0.9)
OPTIONAL    -- Need R
            }
OPTIONAL,    -- Need R
        sfn-SSB-Offset-r16              INTEGER (0..15),
        ss-PBCH-BlockPower-r16              INTEGER (-60..50)
OPTIONAL -- Cond Pathloss
    }
    SSB-InfoNcell-r16 ::=            SEQUENCE {
        physicalCellId-r16              PhysCellId,
        ssb-IndexNcell-r16                          SSB-Index
OPTIONAL, -- Need S
        ssb-Configuration-r16                   SSB-Configuration-r16
OPTIONAL -- Need S
    }
    SRS-ResourceId ::=               INTEGER (0..maxNrofSRS-Resources-1)
    SRS-PosResourceId-r16 ::=                   INTEGER (0..maxNrofSRS-
PosResources-1-r16)
    SRS-PeriodicityAndOffset ::=     CHOICE {
        sl1                             NULL,
        sl2                             INTEGER(0..1),
        sl4                             INTEGER(0..3),
        sl5                             INTEGER(0..4),
        sl8                             INTEGER(0..7),
        sl10                            INTEGER(0..9),
        sl16                            INTEGER(0..15),
        sl20                            INTEGER(0..19),
        sl32                            INTEGER(0..31),
        sl40                            INTEGER(0..39),
        sl64                            INTEGER(0..63),
        sl80                            INTEGER(0..79),
        sl160                           INTEGER(0..159),
        sl320                           INTEGER(0..319),
        sl640                           INTEGER(0..639),
        sl1280                          INTEGER(0..1279),
        sl2560                          INTEGER(0..2559)
    }
}
-- TAG-SRS-CONFIG-STOP
-- ASNISTOP
``` dci-TriggeringPosResourceSetLink: Indicates whether the single DCI-triggering SRS positioning resource sets across the linked carriers is enabled or not for bandwidth aggregation.

tpc-Accumulation: If the field is absent, UE applies TPC commands via accumulation. If disabled, UE applies the TPC command without accumulation (this applies to SRS when a separate closed loop is configured for SRS) (see TS 38.213 [13], clause 7.3).

periodicityAndOffset-p, periodicityAndOffset-p-Ext: Periodicity and slot offset for this SRS resource. All values are in "number of slots". Value s11 corresponds to a periodicity of 1 slot, value s12 corresponds to a periodicity of 2 slots, and so on. For each periodicity the corresponding offset is given in number of slots. For periodicity s11 the offset is 0 slots (see TS 38.214 [19], clause 6.2.1). For CLI SRS-RSRP measurement, s11280 and s12560 cannot be configured. For SRS-PosResource, values s120480, s140960 and s181920 cannot be configured for SCS=15 kHz, values s140960 and s181920 cannot be configured for SCS=30 kHz, and value s181920 cannot be configured for SCS=60 kHz except when periodicity of 20480 ms is configured.

When periodicityAndOffset-p-Ext is present, periodicityAndOffset-p shall be ignored by the UE.

resourceMapping: OFDM symbol location of the SRS resource within a slot including nrofSymbols (number of OFDM symbols), startPosition (value 0 refers to the last symbol, value 1 refers to the second last symbol, and so on) and repetitionFactor (see TS 38.214 [19], clause 6.2.1 and TS 38.211 [16], clause 6.4.1.4). The configured SRS resource does not exceed the slot boundary. If resourceMapping-r16 is signalled, UE shall ignore the resourceMapping (without suffix). If resourceMapping-r17 is signalled, resourceMapping-r16 is not signalled and the UE shall ignore the resourceMapping (without suffix) and only the values of nrofSymbols which are integer multiples of the configured repetitionFactor can be configured. The network can only signal repetitionFactor-v1730 if resourceMapping-r17 is signalled. When repetitionFactor-v1730 is signalled, the UE shall ignore repetitionFactor-r17. For CLI SRS-RSRP measurement, the network always configures nrofSymbols and repetitionFactor to 'n1'. If srs-PosRRC-InactiveValidityAreaPreConfigList or srs-PosRRC-InactiveValidityAreaNonPreConfig is configured, the value of this field applies to all cells in the validity area. nrofSymbols is same for all the hops when TxHoppingConfig is configured.

resourceType: Periodicity and offset for semi-persistent and periodic SRS resource, or slot offset for aperiodic SRS resource for positioning (see TS 38.214 [19], clause 6.2.1). For CLI SRS-RSRP measurement, only 'periodic' is applicable for resourceType. If srs-PosRRC-InactiveValidityAreaPreConfigList or srs-PosRRC-InactiveValidityAreaNonPreConfig is configured, the value of this field applies to all cells in the validity area.

sequenceId: Sequence ID used to initialize pseudo random group and sequence hopping (see TS 38.214 [19], clause 6.2.1). If srs-PosRRC-InactiveValidityAreaPreConfigList or srs-PosRRC-InactiveValidityAreaNonPreConfig is configured, the value of this field applies to all cells in the validity area.

slotOffset: An offset in number of slots between the triggering DCI and the actual transmission of this SRS-PosResource. If the field is absent the UE applies no offset (value 0).

spatialRelationInfo: Configuration of the spatial relation between a reference RS and the target SRS. Reference RS can be SSB/CSI-RS/SRS (see TS 38.214 [19], clause 6.2.1). This parameter is not applicable to CLI SRS-RSRP measurement. This field is not configured if unifiedTCI-State-Type is configured for the serving cell.

Alpha: alpha value for SRS power control (see TS 38.213 [13], clause 7.3). When the field is absent the UE applies the value 1. If srs-PosRRC-InactiveValidityAreaPreConfigList or srs-PosRRC-InactiveValidityAreaNonPreConfig is configured, the value of this field applies to all cells in the validity area.

aperiodicSRS-ResourceTriggerList: An additional list of DCI "code points" upon which the UE shall transmit SRS according to this SRS resource set configuration (see TS 38.214 [19], clause 6). When the field is not included during a reconfiguration of SRS-ResourceSet of resourceType set to aperiodic, UE maintains this value based on the Need M; that is, this list is not considered as an extension of aperiodicSRS-ResourceTrigger for purpose of applying the general rule for extended list in clause 6.1.3.

aperiodicSRS-ResourceTrigger: The DCI "code point" upon which the UE shall transmit SRS according to this SRS resource set configuration (see TS 38.214 [19], clause 6).

applyIndicatedTCI-State: This field indicates, for an SRS-ResourceSet, if UE applies the first or the second "indicated" UL only TCI or joint TCI as specified in TS 38.214 [19], clause 6.2.1.

associatedCSI-RS: ID of CSI-RS resource associated with this SRS resource set in non-codebook based operation (see TS 38.214 [19], clause 6.1.1.2).

availableSlotOffsetList: Indicates a list of up to four different available slot offset values from slot n+k to the slot where the aperiodic SRS resource set is transmitted, where slot n is the slot with the triggering DCI, and k is the slotOffset (without suffix) as described in clause 6.2.1 of TS 38.214 [19].

csi-RS: ID of CSI-RS resource associated with this SRS resource set (see TS 38.214 [19], clause 6.1.1.2).

followUnifiedTCI-StateSRS: When set to enabled, for SRS resource Set, the UE applies the "indicated" UL only TCI or joint TCI as specified in TS 38.214 [19], clause 5.1.5. This parameter may be configured for aperiodic SRS for BM or SRS of any time-domain behavior for codebook, non-codebook, and antenna switching.

p0: P0 value for SRS power control. The value is in dBm. Only even values (step size 2) are allowed (see TS 38.213 [13], clause 7.3). If srs-PosRRC-InactiveValidityAreaPreConfigList or srs-PosRRC-InactiveValidityAreaNonPreConfig is configured, the value of this field applies to all cells in the validity area.

pathlossReferenceRS: A reference signal (e.g. a CSI-RS config or a SS block) to be used for SRS path loss estimation (see TS 38.213 [13], clause 7.3).

pathlossReferenceRS-Pos: A reference signal (e.g. a SS block or a DL-PRS config) to be used for SRS path loss estimation (see TS 38.213 [13], clause 7.3).

pathlossReferenceRSList: Multiple candidate pathloss reference RS(s) for SRS power control, where one candidate RS can be mapped to SRS Resource Set via MAC CE (clause 6.1.3.27 in TS 38.321 [3]). The network can only configure this field if pathlossReferenceRS is not configured in the same SRS-ResourceSet.

resourceType: Time domain behavior of SRS resource configuration, see TS 38.214 [19], clause 6.2.1. The network configures SRS resources in the same resource set with the same time domain behavior on periodic, aperiodic and semi-persistent SRS. The aperiodic SRS is not applicable for the UE in RRC_INACTIVE. If srs-PosRRC-InactiveValidityAreaPreConfigList or srs-PosRRC-InactiveValidityAreaNonPreConfig is configured, the value of this field applies to all cells in the validity area.

slotOffset: An offset in number of slots between the triggering DCI and the actual transmission of this SRS-ResourceSet. If the field is absent the UE applies no offset (value 0).

srs-PowerControlAdjustmentStates: Indicates whether hsrs,c(i)=fc(i,1) or hsrs,c(i)=fc(i,2) (if twoPUSCH-PC-AdjustmentStates are configured) or separate close loop is configured for SRS. This parameter is applicable only for UIs on which UE also transmits PUSCH. If absent or release, the UE applies the value same As-Fci1 (see TS 38.213 [13], clause 7.3).

srs-ResourceIdList, srs-PosResourceIdList: The IDs of the SRS-Resources/SRS-PosResource used in this SRS-ResourceSet/SRS-PosResourceSet. If this SRS-ResourceSet is configured with usage set to codebook, the srs-ResourceIdList contains at most 2 entries. If this SRS-ResourceSet is configured with usage set to nonCodebook, the srs-ResourceIdList contains at most 4 entries. If srs-PosRRC-InactiveValidityAreaPreConfigList or srs-PosRRC-InactiveValidityAreaNonPreConfig is configured, srs-PosResourceIdList is commonly configured across cells within the validity area.

srs-ResourceSetId, srs-PosResourceSetId: The ID of this resource set. It is unique in the context of the BWP in which the parent SRS-Config is defined. If srs-PosRRC-InactiveValidityAreaPreConfigList or srs-PosRRC-InactiveValidityAreaNonPreConfig is configured, srs-PosResourceSetId is commonly configured across cells within the validity area.

ssb-IndexServing: Indicates SSB index belonging to a serving cell where the SRS is configured.

ssb-Ncell: This field indicates a SSB configuration from neighboring cell.

symbolType: Configures the valid symbol type for SRS resources in the SRS resource set. The network does not configure this field if usage set to 'antennaSwitching' (see TS 38.214, clause X).

usage: Indicates if the SRS resource set is used for beam management, codebook based or non-codebook based transmission or antenna switching. See TS 38.214 [19], clause 6.2.1. Reconfiguration between codebook based and non-codebook based transmission is not supported.

physicalCellId: This field specifies the physical cell ID of the neighbour cell or NCD-SSB of the serving cell for which SSB configuration is provided.

ssb-IndexNcell: This field specifies the index of the SSB for a neighbour cell or NCD-SSB of the serving cell. See TS 38.213 [13]. If this field is absent, the UE determines the ssb-IndexNcell of the physicalCellId based on its SSB measurement from the cell.

ssb-Configuration: This field specifies the full configuration of the SSB. If this field is absent, the UE obtains the configuration for the SSB from nr-SSB-Config received as part of DL-PRS assistance data in LPP, see TS 37.355 [49], by looking up the corresponding SSB configuration using the field physicalCellId.

halfFrameIndex: Indicates whether SSB is in the first half or the second half of the frame. Value zero indicates the first half and value 1 indicates the second half.

integerSubframeOffset: Indicates the subframe boundary offset of the cell in which SSB is transmitted.

sfn0-Offset: Indicates the time offset of the SFN0 slot 0 for the cell with respect to SFN0 slot 0 of serving cell.

sfn-Offset: Specifies the SFN offset between the cell in which SSB is transmitted and serving cell. The offset corresponds to the number of full radio frames counted from the beginning of a radio frame #0 of serving cell to the beginning of the closest subsequent radio frame #0 of the cell in which SSB is transmitted.

sfn-SSB-Offset: Indicates the SFN offset of the transmitted SSB relative to the start of the SSB period. Value 0 indicates that the SSB is transmitted in the first system frame, value 1 indicates that SSB is transmitted in the second system frame and so on. The network configures this field according to the field ssb-Periodicity such that the indicated system frame does not exceed the configured SSB periodicity.

ssb-Freq: Indicates the frequency of the SSB.

ss-PBCH-BlockPower: Average EPRE of the resources elements that carry secondary synchronization signals in dBm that the NW used for SSB transmission, see TS 38.213 [13], clause 7.

ssb-Periodicity: Indicates the periodicity of the SSB. If the field is absent, the UE applies the value ms5. (see TS 38.213 [13], clause 4.1)

ssbSubcarrierSpacing: Subcarrier spacing of SSB.

Uplink-PowerControl

The IE Uplink-PowerControl is used to configure UE specific power control parameter for PUSCH, PUCCH and SRS.

Uplink-PowerControl Information Element

```
-- ASN1START
-- TAG-UPLINK-POWERCONTROL-START
Uplink-powerControl-r17 ::= SEQUENCE {
    ul-powercontrolId-r17        Uplink-powerControlId-r17,
    p0AlphaSetforPUSCH-r17                              P0AlphaSet-r17
OPTIONAL, -- Need R
    p0AlphaSetforPUCCH-r17                              P0AlphaSet-r17
OPTIONAL, -- Need R
    p0AlphaSetforSRS-r17                                P0AlphaSet-r17
OPTIONAL -- Need R
    }
    P0AlphaSet-r17 ::=          SEQUENCE {
        p0-r17                                  INTEGER (-16..15)
OPTIONAL, -- Need R
        alpha-r17                                        Alpha
OPTIONAL, -- Need S
        closedLoopIndex-r17       ENUMERATED { i0, i1 }
    }
    Uplink-powerControlId-r17 ::= INTEGER(1..maxUL-TCI-r17)
```

-continued

```
Uplink-powerControl-v19xy ::=   SEQUENCE {
        p0AlphaSetforPUSCH-SBFD-r19              P0AlphaSet-r17
OPTIONAL, -- Need R
        p0AlphaSetforPUCCH-SBFD-r19             P0AlphaSet-r17
OPTIONAL, -- Need R
        p0AlphaSetforSRS-SBFD-r19               P0AlphaSet-r17
OPTIONAL -- Need R
    }
    -- TAG-UPLINK-POWERCONTROL-STOP
    -- ASN1STOP
``` p0AlphaSetforPUSCH, p0AlphaSetforPUCCH, p0AlphaSetforSRS: Configures power control parameters for PUSCH, PUCCH and SRS (see TS 38.213 [13], clause 7.2). When the field alpha is absent in p0AlphaSetforPUSCH, the UE applies the value 1 for PUSCH power control. When the field alpha is absent in p0AlphaSetforSRS, the UE applies the value 1 for SRS power control. In p0AlphaSetForPUCCH, the field alpha is absent (not used).

p0AlphaSetforPUSCH-SBFD, p0AlphaSetforPUCCH-SBFD, p0AlphaSetforSRS-SBFD: Configures separate UL power control parameters for PUSCH, PUCCH and SRS transmissions in SBFD symbols (see TS 38.213 [13], clause x).

If a UE is provided tdd-UL-DL-ConfigurationCommon for a cell, a PRACH occasion for the cell in a PRACH slot is valid if >: it is only within UL symbols, or >: it is only within SBFD symbols, that include at least one SBFD symbol indicated as downlink by tdd-UL-DL-ConfigurationCommon, and in RBs that are both in the active UL BWP and in the UL sub-band if the UE is provided either sbfd-RACHSingleConfig or sbfd-RACHDualConfig, or it starts from an SBFD symbol and ends in a non-SBFD symbols and is in RBs that are both in the active UL BWP and in the UL sub-band if the UE is provided sbfd-RACHDualConfig and sbfd-RACHDualConfig-ValidROAcrossSymbolTypes, or >: it does not precede a SS/PBCH block in the PRACH slot and starts at least $N_{gap}$ symbols after a last downlink symbol and at least Ngap symbols after a last SS/PBCH block symbol, where Ngap is provided in Table 8.1-2, and if channelAccessMode="semiStatic" is provided, does not overlap with a set of consecutive symbols before the start of a next channel occupancy time where there shall not be any transmissions, as described in [15, TS 37.213]

>>: the candidate SS/PBCH block index of the SS/PBCH block corresponds to the SS/PBCH block index provided by ssb-PositionsInBurst in SIB1 or in ServingCellConfigCommon or in SSB-MTC-AdditionalPCI corresponding to the cell, as described in clause 4.1

A downlink or flexible symbol provided by tdd-UL-DL-ConfigurationCommon can include an UL sub-band provided by ulSubbandlocationAndBandwidth, a first DL sub-band provided byfirstdlSubbandlocationAndBandwidth and may additionally include a second DL sub-band provided by seconddlSubbandlocationAndBandwidth, for a SCS configuration y of any configured UL BWP or DL BWP, respectively, as provided by scs-SpecificCarrierList. The downlink or flexible symbol is then referred to as an SBFD symbol; otherwise, it is referred to as a non-SBFD symbol. Uplink symbols are non-SBFD symbols. An SBFD symbol or a non-SBFD symbol provided by tdd-UL-DL-ConfigurationCommon cannot change to a non-SBFD symbol or to an SBFD symbol, respectively, by other information. The UE is not provided coresetPoolIndex and is not configured to receive PDSCH according to more than one TCI states mapped to one TCI codepoint [6, TS 38.214] for a serving cell where the UE is provided SBFD symbols.

SBFD symbols are consecutive, start from a first slot provided by SBFD-StartingSlotIndex and from a first symbol in the first slot provided by SBFD-StartingSymbolInd, and end in a second slot provided by SBFD-EndingSlotIndex and in a second symbol in the second slot provided by SBFD-EndingSymbolIndex. SBFD symbols can be provided in any of pattern1 and, if provided, pattern2. A configuration period for SBFD symbols is P msec when only pattern1 is provided, or P+$P_2$ when pattern2 is additionally provided.

Except for a PRACH transmission in a PRACH occasion determined based on a second RACH configuration provided by sbfd-RACHDualConfig as described in clause 8, the UE transmits or receives a physical channel or signal either only in SBFD symbols or only in non-SBFD symbols.

When the UE is provided sbfd-Configuration2-Transmission, the UE can

>: transmit a first PUCCH or PUSCH or a first repetition of a PUCCH or PUSCH, or receive a first PDSCH or a first repetition of a PDSCH, in non-SBFD symbols, and >: transmit a second PUCCH or PUSCH or a second repetition of the PUCCH or PUSCH, or receive a second PDSCH or a second repetition of the PDSCH, in SBFD symbols When a UE is not provided sbfd-Configuration2-Transmission >: for a PUCCH or PUSCH transmission with repetitions, or for a PDSCH reception with repetitions, if the first repetition is either in SBFD symbols or in non-SBFD symbols, the remaining repetitions are also either in SBFD symbols or in non-SBFD symbols, respectively >: for a Type 2 CG PUSCH transmission, or for a PUSCH transmission with SP-CSI reports, or for a SPS PDSCH reception, if the first transmission or reception after a latest activation is either in SBFD symbols or in non-SBFD symbols, the remaining transmissions or receptions associated with the latest activation are also either in SBFD symbols or in non-SBFD symbols, respectively >: for a Type 1 CG PUSCH, or for a PUCCH transmission with SP-CSI reports, or for a PUCCH with SR, [LRR, UEIRI], or P-CSI, or SRS, all respective transmissions are either only in SBFD symbols or only in non-SBFD symbols as indicated by the respective configurations [12, TS 38.331]

In an SBFD symbol, and except for cross-link interference measurements [6, TS 38.214], the UE transmits or receives only in RBs that are both in the active UL BWP and in the UL sub-band, or both in the active DL BWP and the DL sub-band(s), respectively. The UE does not transmit in SBFD symbols indicated for presence of SS/PBCH blocks within the active DL BWP by ssb-PositionsInBurst in SIB1 or in ServingCellConfigCommon [or by NonCellDefining-SSB].

DCI format 1_0 is used for the scheduling of PDSCH in one DL cell.

The following information is transmitted by means of the DCI format 1_0 with CRC scrambled by C-RNTI or CS-RNTI or MCS-C-RNTI:

>: Identifier for DCI formats—1 bits

>>: The value of this bit field is always set to 1, indicating a DL DCI format

>: Frequency domain resource assignment—n bits

If the CRC of the DCI format 1_0 is scrambled by C-RNTI and the "Frequency domain resource assignment" field are of all ones, the DCI format 1_0 is for random access procedure initiated by a PDCCH order, with all remaining fields set as follows:

>: Random Access Preamble index—6 bits

>: UL/SUL indicator—1 bit.

>>: If the Cell indicator field is absent or the Cell indicator field indicates serving cell, if the value of the "Random Access Preamble index" is not all zeros and if the UE is configured with supplementary Uplink in Serving-CellConfig in the cell, this field indicates which UL carrier in the cell to transmit the PRACH;

>>: If the Cell indicator field indicates a candidate cell, if the value of the "Random Access Preamble index" is not all zeros and if the UE is configured with ltm-EarlyUL-SyncConfigSUL in LTM-Candidate for the candidate cell, this field indicates which UL carrier in the candidate cell to transmit the PRACH;

>>: Otherwise, this field is reserved.

>: SS/PBCH index—6 bits. If the value of the "Random Access Preamble index" is not all zeros, this field indicates the SS/PBCH that shall be used to determine the RACH occasion for the PRACH transmission; otherwise, this field is reserved.

>: PRACH Mask index—4 bits. If the value of the "Random Access Preamble index" is not all zeros, this field indicates the RACH occasion associated with the SS/PBCH indicated by "SS/PBCH index" for the PRACH transmission, according to Clause 5.1.1 of [8, TS38.321]; otherwise, this field is reserved >: Cell indicator—m bits indicating the cell for the corresponding PRACH transmission if the UE is configured with higher layer parameter EarlyUL-SyncConfig, where C is the number of candidate cells configured with higher layer parameter EarlyUL-SyncConfig; 0 bit otherwise. The bit field index 0 of the cell indicator field is mapped to the serving cell, and other bit field indexes are mapped to the candidate cells configured with higher layer parameter EarlyUL-SyncConfig according to an ascending order of a candidate identity configured by ltm-CandidateId, with the bit field index 1 mapped to the candidate cell with the smallest candidate identity.

>: PRACH association indicator—0 or 1 bit

>>: 1 bit if the UE is provided with tag2-Id, and the UE is not provided coresetPoolIndex or is provided coresetPoolIndex with value 0 for the first CORESETs and is provided coresetPoolIndex with value 1 for the second CORESETs. This field is reserved if the cell indicated by Cell indicator field is a candidate cell.

>>>: This field indicates the PCI associated with the PRACH transmission if the UE is provided SSB-MTC-AddtionalPCL. The bit field index 0 of this field is mapped to the PCI of the serving cell, and the bit field index 1 of this field is mapped to the additional PCI associated with active TCI states.

>>>: This field indicates the PL-RS for the PRACH transmission if the UE is not provided SSB-MTC-AddtionalPCL. The bit field index 0 of this field is mapped to the DL RS that the DM-RS of the PDCCH order is quasi-collocated with, and the bit field index 1 of this field is mapped to the SS/PBCH indicated by the SS/PBCH index field in this DCI format.

>>: 0 bit otherwise.

>: PRACH retransmission indicator—0 or 1 bit

>>: 1 bit if the UE is configured with higher layer parameter EarlyUL-SyncConfig. This field indicates initial transmission or retransmission of PRACH if the cell indicated by Cell indicator field is a candidate cell, and this field is reserved if the value of Cell indicator field is zero.

>>: 0 bit otherwise.

>: RACH occasion indicator—0 or 1 bit

>>: 1 bit if the UE is configured with higher layer parameter sbfd-RA CHSingleConfig or sbfd-RACH-DualConfig. If the value of the "Random Access Preamble index" is not all zeros, this field indicates the RACH occasion for PRACH transmission; otherwise, this field is reserved >>: 0 bit otherwise.

>>: 0: The RACH occasion for the PRACH transmission is from the first PRACH occasions >>: 1: The RACH occasion for the PRACH transmission is from the second PRACH occasions If a UE is configured with SBFD symbols, the UE does not receive a PDSCH that is mapped to both SBFD symbols and non-SBFD symbols within a slot. If the UE is scheduled with PDSCH receptions across SBFD symbols and non-SBFD symbols in different slots, >: If the UE is not configured with sbfd-Config2-Reception, the UE receives only the PDSCH receptions in a valid symbol type, where >>: for PDSCH receptions across different slots scheduled without corresponding PDCCH transmission using sps-Config and activated by DCI format 1_0, 1_1 or 1_2, the valid symbol type is the symbol type of the first PDSCH reception occasion associated with activation DCI, >>: for PDSCH receptions across different slots scheduled by a DCI using pdsch-TimeDomainAllocation-ListForMultiPDSCH in which one or more rows contain multiple SLIVs or using pdsch-AggregationFactor or using repetitionNumber, the valid symbol type is the symbol type of the first PDSCH reception occasion indicated by the scheduling DCI. The UE does not expect that the first PDSCH reception occasion indicated by the scheduling DCI is mapped to both SBFD symbols and non-SBFD symbols.

>: Otherwise, the UE receives the PDSCH receptions in SBFD symbols and in non-SBFD symbols after applying collision handling in clause 11.1 of [6, TS 38.213], if any.

If a UE is configured with sbfd-Config2-Reception, only the assigned PRBs that are both in the active DL BWP and in the DL sub-band(s) are used for a PDSCH reception in SBFD symbols scheduled without corresponding PDCCH transmission using sps-Config and activated by DCI format 1_0, 1_1 or 1_2, or PDSCH receptions in SBFD symbols across different slots scheduled by a DCI using pdsch-TimeDomainAllocationListForMultiPDSCH in which one or more rows contain multiple SLIVs or using pdsch-AggregationFactor or using repetitionNumber.

If a UE is configured with SBFD symbols, only the assigned PRBs that are both in the active DL BWP and in the DL sub-band(s) are used for a single PDSCH reception in SBFD symbol(s) within a slot or for PDSCH reception across different slots where the valid symbol type is SBFD symbol (Clause 5.1.2.1a) and the UE does not expect to be assigned with a RBG for PDSCH which is fully outside the PRBs that are both in the active DL BWP and in the DL sub-band(s).

For PDSCH reception in SBFD symbols, DM-RS sequence mapping is only applied to the assigned PRBs that are both in the active DL BWP and in the DL sub-band(s).

The UE does not expect to be configured with srs-ResourceSetId and srs-ResourceIndicator2 in rrc-ConfiguredUplinkGrant. If txConfig is set to 'codebook', the UE does not expect to be configured with precodingAndNumberOfLayers2 in rrc-ConfiguredUplinkGrant. If txConfig is set to 'nonCodebook', each SRS resource set is associated with an associated CSI-RS.

For Type 1 PUSCH transmissions with a configured grant,
>: if the UE is not configured with sbfd-Config2-Transmission, srs-ResourceIndicator is associated with the most recent transmission of SRS resource identified by the SRI in the SRS-ResourceSet where symbolType corresponds the same symbol type as the valid symbol type of PUSCH transmission. If txConfig is set to 'codebook', precodingAndNumberOfLayers corresponds to the SRS resource identified by the SRI in the SRS-ResourceSet where symbolType corresponds the same symbol type as the valid symbol type of PUSCH transmission.
>: if the UE is configured with sbfd-Config2-Transmission, srs-ResourceIndicator is applicable to both SRS resource sets where symbolType is set to 'non-sbfd' and SRS resource sets where symbolType is set to 'sbfd'. For PUSCH transmissions in SBFD symbols, the srs-ResourceIndicator is associated with the most recent transmission of SRS resource identified by the SRI in SBFD symbols. For PUSCH transmissions in non-SBFD symbols, the srs-ResourceIndicator is associated with the most recent transmission of SRS resource identified by the SRI in non-SBFD symbols. If txConfig is set to 'codebook', for PUSCH transmission in SBFD symbols, precodingAndNumberOfLayers corresponds to the SRS resource identified by the SRI in the SRS-ResourceSet where symbolType is set to 'sbfd'. For PUSCH transmission in non-SBFD symbols, precodingAndNumberOfLayers corresponds to the SRS resource identified by the SRI in the SRS-ResourceSet where symbolType is set to 'non-sbfd'.

For Type 2 PUSCH transmissions with a configured grant, or for PUSCH transmission occasions across SBFD symbols and non-SBFD symbols scheduled by DCI format 0_1, 0_2, or 0_3,
>: if the UE is not configured with sbfd-Config2-Transmission, the indicated SRI in slot n is associated with the most recent transmission of SRS resource identified by the SRI in the SRS-ResourceSet where symbolType corresponds the same symbol type as the valid symbol type of PUSCH transmission, where the SRS resource is prior to the PDCCH carrying the SRI. If txConfig is set to 'codebook', the precoding information and number of layers (TPMI) field in DCI corresponds to the SRS resource identified by the SRI in the SRS-ResourceSet where symbolType corresponds to the same symbol type as the valid symbol type of PUSCH transmission.
>: if the UE is configured with sbfd-Config2-Transmission, the SRS resource indicator is applicable to both SRS resource sets where symbolType is set to 'non-sbfd' and SRS resource sets where symbolType is set to 'sbfd'. For PUSCH transmissions in SBFD symbols, the indicated SRI in a slot is associated with the most recent transmission of SRS resource identified by the SRI in SBFD symbols, where the SRS resource is prior to the PDCCH carrying the SRI. For PUSCH transmissions in non-SBFD symbols, the indicated SRI in a slot is associated with the most recent transmission of SRS resource identified by the SRI in non-SBFD symbols, where the SRS resource is prior to the PDCCH carrying the SRI. If txConfig is set to 'codebook', for PUSCH transmission in SBFD symbols, the precoding information and number of layers (TPMI) field in DCI corresponds to the SRS resource identified by the SRI in the SRS-ResourceSet SRS resource sets where symbolType is set to 'sbfd'. For PUSCH transmission in non-SBFD symbols, the precoding information and number of layers (TPMI) field in DCI corresponds to the SRS resource identified by the SRI in the SRS-ResourceSet where symbolType is set to 'non-sbfd'. If only a single SRS resource is configured in both SRS resource sets where symbolType is set to 'non-sbfd' and SRS resource sets where symbolType is set to 'sbfd', the SRI field is absent from DCI.

For a PUSCH transmission without repetition scheduled by DCI format 0_1, 0_2, or 0_3, the indicated SRI in a slot is associated with the most recent transmission of SRS resource identified by the SRI in the SRS-ResourceSet where symbolType corresponds the same symbol type as that of PUSCH transmission, where the SRS resource is prior to the PDCCH carrying the SRI. If txConfig is set to 'codebook', the precoding information and number of layers (TPMI) field in DCI corresponds to the SRS resource identified by the SRI in the SRS-ResourceSet where symbolType corresponds to the same symbol type as that of PUSCH transmission.

For a UE scheduled with PUSCH transmission occasions across SBFD symbols and non-SBFD symbols in different slots,
>: if the UE is not configured with sbfd-Config2-Transmission,
>>: the UE transmits only the PUSCH in a valid symbol type.
>>>: For Type 1 PUSCH transmissions with a configured grant, the valid symbol type is provided by symbolType in rrc-ConfiguredUplinkGrant in ConfiguredGrantConfig.
>>>: For Type 2 PUSCH transmissions with a configured grant or PUSCH transmissions scheduled by DCI scrambled with SP-CSI-RNTI, the valid symbol type is the symbol type of the first PUSCH transmission occasion associated with activation DCI. For Type 2 PUSCH transmissions with a configured grant of PUSCH repetition type B, the valid symbol type is the symbol type of the first actual repetition associated with activation DCI.
>>>: For PUSCH transmissions scheduled by DCI format 0_1, 0_2, 0_3, 0_0 with CRC scrambled by TC-RNTI, RAR UL grant or fallbackRAR UL grant, the valid symbol type is the symbol type of the first PUSCH transmission occasion indicated by the scheduling DCI, the RAR UL grant or the fallbackRAR UL grant. For PUSCH repetition type B scheduled by DCI format 0_1 or 0_2, the valid symbol type is the symbol type of the first actual repetition occasion indicated by scheduling DCI. The UE does not expect that the first PUSCH transmission occasion indicated by scheduling DCI, the RAR UL grant or the fallbackRAR UL grant is mapped to both SBFD symbols and non-SBFD symbols, except for PUSCH repetition type B.

>>: For PUSCH repetition type A scheduled by DCI format 0_1, 0_2 or 0_3 when AvailableSlotCounting is enabled and K>1 or TB processing over multiple slots or PUSCH repetition type A scheduled by DCI format 0_0 with CRC scrambled by TC-RNTI, RAR UL grant or fallbackRAR UL grant, >>>: a slot containing the transmission occasion that is not in the valid symbol type is not counted in the number of N·K slots.

>>>: In case the valid symbol type is SBFD symbol, a slot is counted in the number of N·K slots if the symbols allocated for the transmission occasion in the slot are all SBFD symbols and not include a symbol of an SS/PBCH block with index provided by ssb-PositionsInBurst.

>>>: In case the valid symbol type is non-SBFD symbol, if the PUSCH repetition type A is scheduled by DCI format 0_0 with CRC scrambled by TC-RNTI, RAR UL grant or fallbackRAR UL grant, a slot is counted in the number of N·K slots if the symbols allocated for the transmission occasion in the slot are all non-SBFD symbols and not include a DL symbol indicated by tdd-UL-DL-ConfigurationCommon, if provided, or a symbol of an SS/PBCH block with index provided by ssb-PositionsInBurst. Otherwise, a slot is counted in the number of N·K slots if the symbols allocated for the transmission occasion in the slot are all non-SBFD symbols and not include a DL symbol indicated by tdd-UL-DL-ConfigurationCommon or tdd-UL-DL-ConfigurationDedicated, if provided, or a symbol of an SS/PBCH block with index provided by ssb-PositionsInBurst.

>: Otherwise, the UE transmits the PUSCH occasions in SBFD symbols and non-SBFD symbols after applying collision handling in clause 11.1 of [6, TS 38.213], if any. For PUSCH repetition type A scheduled by DCI format 0_1, 0_2 or 0_3 when AvailableSlotCounting is enabled and K>1 or TB processing over multiple slots, a slot is counted in the number of N·K slots if the symbols allocated for the transmission occasion in the slot are all SBFD symbols and not include a symbol of an SS/PBCH block with index provided by ssb-PositionsInBurst, or the symbols allocated for the transmission occasion in the slot are all non-SBFD symbols and not include a DL symbol indicated by tdd-UL-DL-ConfigurationCommon or tdd-UL-DL-ConfigurationDedicated, if provided, or a symbol of an SS/PBCH block with index provided by ssb-PositionsInBurst.

For a UE configured with SBFD symbols and scheduled with a PUSCH transmission occasion that is mapped to SBFD symbols and non-SBFD symbols within a slot, >: If the PUSCH transmission occasion is scheduled for PUSCH repetition type A with AvailableSlotCounting is enabled and K>1 or TB processing over multiple slots, the slot is not counted in the number of N·K slots.

>: If the PUSCH transmission occasion is a nominal repetition for PUSCH repetition type B, the nominal repetition is segmented into actual repetitions around boundary of SBFD symbols and non-SBFD symbols.

>: Otherwise, the UE does not transmit the PUSCH transmission occasion.

If a UE is configured with SBFD symbols,

>: only the resource blocks that are both in the active UL BWP and in the UL sub-band are used for PUSCH transmission in SBFD symbol(s). For a single PUSCH transmission in SBFD symbol(s) within a slot or for PUSCH transmission across different slots where the valid symbol type is SBFD symbol (Clause 5.1.2.1), the UE does not expect to be assigned with a RBG for PUSCH in SBFD symbol(s) which is fully outside the PRBs that are both in the active UL BWP and in the UL sub-band.

>: [If the UE is configured with sbfd-Config2-Transmission, if the UE is scheduled with PUSCH transmission occasions across SBFD and non-SBFD symbols in different slots or if the UE is scheduled with PUSCH transmission occasions across SBFD and non-SBFD symbols within a slot for PUSCH repetition type B, the resource allocation of type 0 for PUSCH transmission occasions in non-SBFD symbols is provided by the bitmap, while for each allocated RBG for PUSCH transmission occasions in SBFD symbols, >>: RBG size is the same as RBG size for PUSCH transmission occasions in non-SBFD symbols.

>>: The starting resource block of the RBG is defined by:

>>>: the starting PRB index of the PRBs that are both in the active UL BWP and in the UL sub-band with reference to the start of UL active BWP, >>>: the starting PRB index of the RBG.

>>>: the number of PRBs that are both in the active UL BWP and in the UL sub-band, The UE does not expect that the PRBs for PUSCH transmissions in SBFD symbols with $$RB_{start}^{SBFD}$$

to be overlapped with PRBs outside the PRBs that are both in the active UL BWP and in the UL sub-band.

For SRS resources in SRS resource set(s) provided in srs-ResourceSetToAddModList and srs-ResourceSetToAddModListDCI-0-2 where symbolType is set to 'sbfd', >: for a periodic or semi-persistent SRS resource, the UE is expected to transmit the SRS only in SBFD symbols, >: for an aperiodic SRS resource and when availableSlotOffsetList is not provided, the UE does not expect to be indicated to transmit SRS in the non-SBFD symbols, >: for an aperiodic SRS resource and when availableSlotOffsetList is provided, an available slot is a slot configured with SBFD symbol(s) for the time-domain location(s) for all the SRS resources in the resource set(s) and satisfies the minimum timing requirement between triggering PDCCH and all the SRS resources in the resource set(s).

For SRS resources in SRS resource set(s) provided in srs-ResourceSetToAddModList and srs-ResourceSetToAddModListDCI-0-2 where symbolType is set to 'non-sbfd', >: for a periodic or semi-persistent SRS resource, the UE is expected to transmit only the SRS that are in non-SBFD symbols, >: for an aperiodic SRS resource and when availableSlotOffsetList is not provided, the UE does not expect to be indicated to transmit SRS in the SBFD symbols, >: for an aperiodic SRS resource and when availableSlotOffsetList is provided, an available slot is a slot satisfying there are UL or flexible symbol(s) not configured as SBFD symbols for the time-domain location (s) for all the SRS resources in the resource set(s) and the minimum timing requirement between triggering PDCCH and all the SRS resources in the resource set(s).

For a same usage of 'codebook', 'noncodebook', or 'beamManagement', for the SRS resource sets provided in srs-ResourceSetToAddModList or srs-ResourceSetToAddModListDCI-0-2-SBFD, the number of SRS resources in a SRS resource set where symbolType is set to 'sbfd' is the same as the number of SRS resources in a SRS resource set where symbolType is set to 'non-sbfd'.

For SRS resource set(s) configured in srs-ResourceSetToAddModList and srs-ResourceSetToAddModListDCI-0-2 with a symbolType being configured, >: if the higher layer parameter usage in SRS-ResourceSet is set to 'noncodebook', the UE expects a single SRS port for each SRS resource being configured.

>: If the higher layer parameter usage in SRS-ResourceSet is set to 'codebook', except when higher layer parameter ul-FullPowerTransmission is set to 'fullpowerMode2', the numbers of SRS ports are the same for all the SRS resources in the SRS-ResourceSet(s) where symbolType is set to 'non-sbfd' and the SRS-ResourceSet(s) where symbolType is set to 'sbfd'. When higher layer parameter ul-FullPowerTransmission is set to 'fullpowerMode2', the numbers of SRS ports are the same for SRS resources with the same corresponding SRI values in the SRS-ResourceSet(s) where symbolType is set to 'non-sbfd' and the SRS-ResourceSet(s) where symbolType is set to 'sbfd'.

To further extend the ability of slot format adjustment, a specific DCI (e.g. DCI format 2_0) can be configured. DCI format 2_0 has following characteristics.

>: DCI format 2_0 is a group common Physical Downlink Control Channel (PDCCH) that can be detected by a group of UEs (User Equipment);

>: DCI format 2_0 comprises one or more SFIs (E3100-E3400);

>: Each SFI indicates slot formats of upcoming slots of a specific cell;

>: When a UE is configured with the Slot Format Indicator (SFI) (A2000) through higher layer signaling, it can detect DCI format 2_0. UE determines slot formats of slots of a specific serving cell based on a specific slot format indicator;

>: The slot format indicator (SFI-index) (E3300) indicates a slotFormatCombinationId (A2100) which is associated with combination/series of integers (lowest value is 0 and highest value is 255) (A2200). Each integer is format index. Each format index is shown in FIG.AB, where 'D' denotes a downlink symbol, 'U' denotes an uplink symbol, and 'F' denotes a flexible symbol; and >: A SFI-index field value in a DCI format 2_0 indicates to a UE a slot format for each slot in a number of slots for each DL BWP or each UL BWP starting from a slot where the UE detects the DCI format 2_0.

For a serving cell, symbols are classified as downlink or uplink or flexible or SBFD based on tdd-UL-DL-ConfigurationCommon and tdd-UL-DL-ConfigurationDedicated and SBFD-time-resource-config and DCIF format 2_0.

For L-BWP, UE determines the type of a symbol based on a cell specific static slot configuration (TDD-UL-DL-ConfigCommon) and then on UE specific static slot configuration (TDD-UL-DL-ConfigDedicated) and then on cell specific dynamic slot configuration (DCI format 2_0) in order. More specifically, if a symbol is indicated as either an uplink or a downlink by indication with higher priority, the symbol is uplink or downlink regardless of the type indicated by lower indication. If the symbol is indicated as flexible by higher priority indication, the next highest priority indication is taken into consideration.

For S-BWP, UE determines the type of a symbol based on a cell specific sbfd configuration (SBFD-time-resource-config) and then a cell specific static slot configuration (TDD-UL-DL-ConfigCommon) and then on UE specific static slot configuration (TDD-UL-DL-ConfigDedicated) and then on cell specific dynamic slot configuration (DCI format 2_0) in order. More specifically, if a symbol is first determined whether it is SBFD symbol or non-SBFD symbol based on the cell specific sbfd configuration. Then in case that the symbol is non-SBFD symbol, the type of symbol is further determined based on remaining indications.

For an example in case 15, when a symbol indicated as:

>: downlink by tdd-UL-DL-ConfigCommon;

>: flexible by tdd-UL-DL-ConfigDedicate;

>: uplink by DCI format 2_0; and

>: non sbfd symbol by SBFD-time-resource-config,

UE consider the symbol downlink symbol for both L-BWP and S-BWP.

For another example in case 54, when a symbol indicated as:

>: flexible by tdd-UL-DL-ConfigCommon;

>: flexible by tdd-UL-DL-ConfigDedicate;

>: uplink by DCI format 2_0; and

>: sbfd symbol by SBFD-time-resource-config,

L-BWP is equivalent to PRBs in non-SBFD symbol.

L-BWP is equivalent to second specific PRBs in SBFD symbol.

S-BWP is equivalent to specific PRBs in SBFD symbol.

The specific PRB is PRB in UL sub-band. The UL sub-band is configured by scs-SpecificCarrierList. The UL sub-band is sub-band for FD (Full Duplex). The UL sub-band is configured by FrequencyDomainResourceParameters in SbfdConfigCommon. The UL sub-band is configured by ul-subbandlocationAndBandwidth.

The second specific PRB is PRB in DL sub-band. The DL sub-band is configured by dl-subbandlocationAndBandwidth.

L-BWP is equivalent to BWP that does not contain none of the specific PRBs.

S-BWP is equivalent to BWP that contains at least one PRB of specific PRBs.

UE consider the symbol uplink symbol for L-BWP and sbfd symbol for S-BWP.

Table below lists the cases.

TABLE 9

| CASE | Comm | Ded | DCI | SBFD | L-BWP | S-BWP |
|------|------|-----|-----|------|-------|-------|
| 1 | D | D | D | N | D | D |
| 2 | D | D | F | N | D | D |
| 3 | D | D | U | N | D | D |
| 4 | D | D | D | Y | D | sbfd |
| 5 | D | D | F | Y | D | sbfd |
| 6 | D | D | U | Y | D | sbfd |
| 7 | D | U | D | N | D | D |
| 8 | D | U | F | N | D | D |

TABLE 9-continued

| CASE | Comm | Ded | DCI | SBFD | L-BWP | S-BWP |
|------|------|-----|-----|------|-------|-------|
| 9 | D | U | U | N | D | D |
| 10 | D | U | D | Y | D | sbfd |
| 11 | D | U | F | Y | D | sbfd |
| 12 | D | U | U | Y | D | sbfd |
| 13 | D | F | D | N | D | D |
| 14 | D | F | F | N | D | D |
| 15 | D | F | U | N | D | D |
| 16 | D | F | D | Y | D | sbfd |
| 17 | D | F | F | Y | D | sbfd |
| 18 | D | F | U | Y | D | sbfd |
| 19 | U | D | D | N | U | U |
| 20 | U | D | F | N | U | U |
| 21 | U | D | U | N | U | U |
| 22 | U | D | D | Y | U | sbfd |
| 23 | U | D | F | Y | U | sbfd |
| 24 | U | D | U | Y | U | sbfd |
| 25 | U | U | D | N | U | U |
| 26 | U | U | F | N | U | U |
| 27 | U | U | U | N | U | U |
| 28 | U | U | D | Y | U | sbfd |
| 29 | U | U | F | Y | U | sbfd |
| 30 | U | U | U | Y | U | sbfd |
| 31 | U | F | D | N | U | U |
| 32 | U | F | F | N | U | U |
| 33 | U | F | U | N | U | U |
| 34 | U | F | D | Y | U | sbfd |
| 35 | U | F | F | Y | U | sbfd |
| 36 | U | F | U | Y | U | sbfd |
| 37 | F | D | D | N | D | D |
| 38 | F | D | F | N | D | D |
| 39 | F | D | U | N | D | D |
| 40 | F | D | D | Y | D | sbfd |
| 41 | F | D | F | Y | D | sbfd |
| 42 | F | D | U | Y | D | sbfd |
| 43 | F | U | D | N | U | U |
| 44 | F | U | F | N | U | U |
| 45 | F | U | U | N | U | U |
| 46 | F | U | D | Y | U | sbfd |
| 47 | F | U | F | Y | U | sbfd |
| 48 | F | U | U | Y | U | sbfd |
| 49 | F | F | D | N | D | D |
| 50 | F | F | F | N | F | F |
| 51 | F | F | U | N | U | U |
| 52 | F | F | D | Y | D | sbfd |
| 53 | F | F | F | Y | F | sbfd |
| 54 | F | F | U | Y | U | sbfd |

D: Downlink;
U: Uplink;
F: Flexible;
Y: SBFD symbol;
N: non-SBFD symbol;
sbfd: SBFD symbol
Comm: TDD-UL-DL-ConfigCommon;
Ded: TDD-UL-DL-ConofigDedicated
SBFD: SBFD-time-resource-config;
DCI: DCI format 2_0

If a UL is not configured by higher layers with parameter SlotFormatIndicator, UL performs followings.

For L-BWP:

>: for a set of symbols of a slot that are indicated to a UL as uplink by tdd-UL-DL-ConfigurationCommon, or tdd-UL-DL-ConfigurationDedicated:

>: the UL does not receive PDCCH, PDSCH, or CSJ-RS when the PDCCH, PDSCH, or CSJ-RS overlaps, even partially, with the set of symbols of the slot; and >>: the UE receives PDCCH, PDSCH, or CSI-RS when the PDCCH, PDSCH, or CSI-RS overlaps with none of the set of symbols of the slot; and >: for a set of symbols of a slot that are indicated to a UE as uplink by tdd-UL-DL-ConfigurationCommon, or tdd-UL-DL-ConfigurationDedicated:

>>: the UE does not receive DL PRS in the set of symbols of the slot, if the UE is not provided with a measurement gap; and >>: the UE receives DL PRS in the set of symbols of the slot, if the UE is provided with a measurement gap; and >: for a set of symbols of a slot that are indicated to a UE as downlink by tdd-UL-DL-ConfigurationCommon, or tdd-UL-DL-ConfigurationDedicated:

>>: the UE does not transmit PUSCH, PUCCH, PRACH, or SRS when the PUSCH, PUCCH, PRACH, or SRS overlaps, even partially, with the set of symbols of the slot; and >>: the UE transmits PUSCH, PUCCH, PRACH, or SRS when the PUSCH, PUCCH, PRACH, or SRS overlaps with none of the set of symbols of the slot; and >: for a set of symbols of a slot indicated to a UE for reception of SS/PBCH blocks by ssb-PositionsInBurst in SIB1 or by ssb-PositionsInBurst in ServingCellConfigCommon:

>>: the UE does not transmit PUSCH, PUCCH, PRACH in the slot if a transmission would overlap with any symbol from the set of symbols; and >>: the UE transmits PUSCH, PUCCH, PRACH in the slot if a transmission would overlap with no symbol from the set of symbols; and >>: the UE does not transmit SRS in the set of symbols of the slot; and >>: the UE transmits SRS in the set of symbols of the slot; and >>: the UE does not expect (the GNB does not configure) the set of symbols of the slot to be indicated as uplink by tdd-UL-DL-ConfigurationCommon, or tdd-UL-DL-ConfigurationDedicated, when provided to the UE.

For S-BWP:

(for downlink reception)

>: for a set of symbols of a slot that are indicated to a UE as uplink by tdd-UL-DL-ConfigurationCommon, or tdd-UL-DL-ConfigurationDedicated; or >: for a set of symbols of a slot that are indicated to a UE as downlink by tdd-UL-DL-ConfigurationCommon, or tdd-UL-DL-ConfigurationDedicated, and as sbfd-symbol by SBFD-time-resource-config;

>>: the UE does not receive PDCCH, PDSCH, or CSI-RS when the PDCCH, PDSCH, or CSI-RS overlaps, even partially, with the set of symbols of the slot; and >>: the UE receives PDCCH, PDSCH, or CSI-RS when the PDCCH, PDSCH, or CSI-RS overlaps with none of the set of symbols of the slot; and (for DL PRS)

>: for a set of symbols of a slot that are indicated to a UE as uplink by tdd-UL-DL-ConfigurationCommon, or tdd-UL-DL-ConfigurationDedicated: or >: for a set of symbols of a slot that are indicated to a UE as downlink by tdd-UL-DL-ConfigurationCommon, or tdd-UL-DL-ConfigurationDedicated, and as sbfd-symbol by SBFD-time-resource-config;

>>: the UE does not receive DL PRS in the set of symbols of the slot, if the UE is not provided with a measurement gap; and >>: the UE receives DL PRS in the set of symbols of the slot, if the UE is provided with a measurement gap; and (for uplink transmission)

>: for a set of symbols of a slot that are indicated to a UE as downlink by tdd-UL-DL-ConfigurationCommon, or tdd-UL-DL-ConfigurationDedicated and not as SBFD symbol by SBFD-time-resource-config:

>>: the UE does not transmit PUSCH, PUCCH, PRACH, or SRS when the PUSCH, PUCCH, PRACH, or SRS overlaps, even partially, with the set of symbols of the slot; and >>: the UE transmits PUSCH, PUCCH, PRACH, or SRS when the PUSCH, PUCCH, PRACH, or SRS overlaps with none of the set of symbols of the slot; and >: for a set of symbols of a slot that are indicated to a UE as downlink by tdd-UL-DL-ConfigurationCommon, or tdd-UL-DL-ConfigurationDedicated and as SBFD symbol by SBFD-time-resource-config:

>>: the UE transmits PUSCH, PUCCH, PRACH, or SRS on the set of symbols of the slot; and (w.r.t SSB)

>: for a set of symbols of a slot indicated to a UE for reception of SS/PBCH blocks by ssb-PositionsInBurst in SIB1 and indicated as non-SBFD symbol by SBFD-time-resource-config:

>>: the UE does not transmit PUSCH, PUCCH, PRACH in the slot; and

>>: the UE does not transmit SRS in the set of symbols of the slot.

>: for a set of symbols of a slot indicated to a UE for reception of SS/PBCH blocks by ssb-PositionsInBurst in SIB1 and indicated as SBFD symbol by SBFD-time-resource-config:

>>: the UE transmits PUSCH, PUCCH, PRACH in the slot; and

>>: the UE transmits SRS in the set of symbols of the slot.

If a UE is configured by higher layers with parameter SlotFormatIndicator, the UE is provided an SFI-RNTI by sfi-RNTI and with a payload size of DCI format 2_0 by dci-PayloadSize. UE performs followings.

For L-BWP,

>: for a set of symbols of a slot indicated to a UE as flexible by tdd-UL-DL-ConfigurationCommon and tdd-UL-DL-ConfigurationDedicated, and if the UE detects a DCI format 2_0 providing a format for the slot using a slot format value other than 255:

>>: if one or more symbols from the set of symbols are symbols in a CORESET configured to the UE for PDCCH monitoring, the UE receives PDCCH in the CORESET only if an SFI-index field value in DCI format 2_0 indicates that the one or more symbols are downlink symbols;

>>: if an SFI-index field value in DCI format 2_0 indicates the set of symbols of the slot as flexible and the UE detects a DCI format indicating to the UE to receive PDSCH or CSI-RS in the set of symbols of the slot, the UE receives PDSCH or CSI-RS in the set of symbols of the slot;

>>: if an SFI-index field value in DCI format 2_0 indicates the set of symbols of the slot as flexible and the UE detects a DCI format, a RAR UL grant, fallbackRAR UL grant, or successRAR indicating to the UE to transmit PUSCH, PUCCH, PRACH, or SRS in the set of symbols of the slot the UE transmits the PUSCH, PUCCH, PRACH, or SRS in the set of symbols of the slot;

>>: if an SFI-index field value in DCI format 2_0 indicates the set of symbols of the slot as flexible, and the UE does not detect a DCI format indicating to the UE to receive PDSCH or CSI-RS, or the UE does not detect a DCI format, a RAR UL grant, fallbackRAR UL grant, or successRAR indicating to the UE to transmit PUSCH, PUCCH, PRACH, or SRS in the set of symbols of the slot, the UE does not transmit or receive in the set of symbols of the slot;

>>: if the UE is configured by higher layers to receive PDSCH or CSI-RS in the set of symbols of the slot, the UE receives the PDSCH or the CSI-RS in the set of symbols of the slot only if an SFI-index field value in DCI format 2_0 indicates the set of symbols of the slot as downlink and, if applicable, the set of symbols is within remaining channel occupancy duration;

>>: if the UE is configured by higher layers to receive DL PRS in the set of symbols of the slot, the UE receives the DL PRS in the set of symbols of the slot only if an SFI-index field value in DCI format 2_0 indicates the set of symbols of the slot as downlink or flexible;

>>: if the UE is configured by higher layers to transmit PUCCH, or PUSCH, or PRACH in the set of symbols of the slot, the UE transmits the PUCCH, or the PUSCH, or the PRACH in the slot only if an SFI-index field value in DCI format 2_0 indicates the set of symbols of the slot as uplink;

>>: if the UE is configured by higher layers to transmit SRS in the set of symbols of the slot, the UE transmits the SRS only in a subset of symbols from the set of symbols of the slot indicated as uplink symbols by an SFI-index field value in DCI format 2_0;

>>: a UE does not expect to detect an SFI-index field value in DCI format 2_0 indicating the set of symbols of the slot as downlink and also detect a DCI format, a RAR UL grant, fallbackRAR UL grant, or successRAR indicating to the UE to transmit SRS, PUSCH, PUCCH, or PRACH, in one or more symbols from the set of symbols of the slot;

>>: a UE does not expect to detect an SFI-index field value in DCI format 2_0 indicating the set of symbols of the slot as downlink or flexible if the set of symbols of the slot includes symbols corresponding to any repetition of a PUSCH transmission activated by an UL Type 2 grant PDCCH as described in clause 10.2;

>>: a UE does not expect to detect an SFI-index field value in DCI format 2_0 indicating the set of symbols of the slot as uplink and also detect a DCI format indicating to the UE to receive PDSCH or CSI-RS in one or more symbols from the set of symbols of the slot.

For S-BWP,

>: for a set of symbols of a slot indicated to a UE as flexible by tdd-UL-DL-ConfigurationCommon and tdd-UL-DL-ConfigurationDedicated, and indicated to the UE as non-SBFD symbol by SBFD-time-resource-config, and if the UE detects a DCI format 2_0 providing a format for the slot using a slot format value other than 255:

>>: if one or more symbols from the set of symbols are symbols in a CORESET configured to the UE for PDCCH monitoring, the UE receives PDCCH in the CORESET only if an SFI-index field value in DCI format 2_0 indicates that the one or more symbols are downlink symbols;

>>: if an SFI-index field value in DCI format 2_0 indicates the set of symbols of the slot as flexible and the UE detects a DCI format indicating to the UE to receive PDSCH or CSI-RS in the set of symbols of the slot, the UE receives PDSCH or CSI-RS in the set of symbols of the slot;

>>: if an SFI-index field value in DCI format 2_0 indicates the set of symbols of the slot as flexible and the UE detects a DCI format, a RAR UL grant, fallbackRAR UL grant, or successRAR indicating to the UE to transmit PUSCH, PUCCH, PRACH, or SRS in the set of symbols of the slot the UE transmits the PUSCH, PUCCH, PRACH, or SRS in the set of symbols of the slot;

>>: if an SFI-index field value in DCI format 2_0 indicates the set of symbols of the slot as flexible, and the UE does not detect a DCI format indicating to the UE to receive PDSCH or CSI-RS, or the UE does not detect a DCI format, a RAR UL grant, fallbackRAR UL grant, or successRAR indicating to the UE to transmit PUSCH, PUCCH, PRACH, or SRS in the set of symbols of the slot, the UE does not transmit or receive in the set of symbols of the slot;

>>: if the UE is configured by higher layers to receive PDSCH or CSI-RS in the set of symbols of the slot, the UE receives the PDSCH or the CSI-RS in the set of symbols of the slot only if an SFI-index field value in DCI format 2_0 indicates the set of symbols of the slot as downlink and, if applicable, the set of symbols is within remaining channel occupancy duration;

>>: if the UE is configured by higher layers to receive DL PRS in the set of symbols of the slot, the UE receives the DL PRS in the set of symbols of the slot only if an SFI-index field value in DCI format 2_0 indicates the set of symbols of the slot as downlink or flexible;

>>: if the UE is configured by higher layers to transmit PUCCH, or PUSCH, or PRACH in the set of symbols of the slot, the UE transmits the PUCCH, or the PUSCH, or the PRACH in the slot only if an SFI-index field value in DCI format 2_0 indicates the set of symbols of the slot as uplink;

>>: if the UE is configured by higher layers to transmit SRS in the set of symbols of the slot, the UE transmits the SRS only in a subset of symbols from the set of symbols of the slot indicated as uplink symbols by an SFI-index field value in DCI format 2_0;

>>: a UE does not expect to detect an SFI-index field value in DCI format 2_0 indicating the set of symbols of the slot as downlink and also detect a DCI format, a RAR UL grant, fallbackRAR UL grant, or successRAR indicating to the UE to transmit SRS, PUSCH, PUCCH, or PRACH, in one or more symbols from the set of symbols of the slot;

>>: a UE does not expect to detect an SFI-index field value in DCI format 2_0 indicating the set of symbols of the slot as downlink or flexible if the set of symbols of the slot includes symbols corresponding to any repetition of a PUSCH transmission activated by an UL Type 2 grant PDCCH as described in clause 10.2;

>>: a UE does not expect to detect an SFI-index field value in DCI format 2_0 indicating the set of symbols of the slot as uplink and also detect a DCI format indicating to the UE to receive PDSCH or CSI-RS in one or more symbols from the set of symbols of the slot.

>: For a set of symbols of a slot indicated to a UE as flexible by tdd-UL-DL-ConfigurationCommon and tdd-UL-DL-ConfigurationDedicated, and indicated to the UE as SBFD symbol by SBFD-time-resource-config, and if the UE detects a DCI format 2_0 providing a format for the slot using a slot format value other than 255:

>>: if one or more symbols from the set of symbols are symbols in a CORESET configured to the UE for PDCCH monitoring, the UE does not receive PDCCH in the CORESET regardless of whether SFI-index field value in DCI format 2_0 indicates the set of symbols of the slot as uplink or downlink or flexible;

>>: if the UE detects a DCI format indicating to the UE to receive PDSCH or CSI-RS in the set of symbols of the slot, the UE does not receive PDSCH or CSI-RS in the set of symbols of the slot regardless of whether SFI-index field value in DCI format 2_0 indicates the set of symbols of the slot as uplink or downlink or flexible;

>>: if he UE detects a DCI format, a RAR UL grant, fallbackRAR UL grant, or successRAR indicating to the UE to transmit PUSCH, PUCCH, PRACH, or SRS in the set of symbols of the slot the UE transmits the PUSCH, PUCCH, PRACH, or SRS in the set of symbols of the slot regardless of whether SFI-index field value in DCI format 2_0 indicates the set of symbols of the slot as uplink or downlink or flexible;

>>: if the UE does not detect a DCI format, a RAR UL grant, fallbackRAR UL grant, or successRAR indicating to the UE to transmit PUSCH, PUCCH, PRACH, or SRS in the set of symbols of the slot, the UE does not transmit or receive in the set of symbols of the slot regardless of whether SFI-index field value in DCI format 2_0 indicates the set of symbols of the slot as uplink or downlink or flexible;

>>: if the UE is configured by higher layers to receive PDSCH or CSI-RS in the set of symbols of the slot, the UE does not receive the PDSCH or the CSI-RS in the set of symbols of the slot regardless of whether SFI-index field value in DCI format 2_0 indicates the set of symbols of the slot as uplink or downlink or flexible;

>>: if the UE is configured by higher layers to receive DL PRS in the set of symbols of the slot, the UE does not receive the DL PRS in the set of symbols regardless of whether SFI-index field value in DCI format 2_0 indicates the set of symbols of the slot as uplink or downlink or flexible;

>>: if the UE is configured by higher layers to transmit PUCCH, or PUSCH, or PRACH in the set of symbols of the slot, the UE transmits the PUCCH, or the PUSCH, or the PRACH in the slot regardless of whether SFI-index field value in DCI format 2_0 indicates the set of symbols of the slot as uplink or downlink or flexible;

>>: if the UE is configured by higher layers to transmit SRS in the set of symbols of the slot, the UE transmits the SRS regardless of whether SFI-index field value in DCI format 2_0 indicates the set of symbols of the slot as uplink or downlink or flexible;

>>: if a UE detects an SFI-index field value in DCI format 2_0 indicating the set of symbols of the slot as downlink and detect a DCI format, a RAR UL grant, fallbackRAR UL grant, or successRAR indicating to the UE to transmit SRS, PUSCH, PUCCH, or PRACH, in one or more symbols from the set of symbols of the slot, UE transmits SRS, PUSCH, PUCCH or PRACH in the one or more symbols from the set of symbols of the slot;

>>: a UE does not expect to detect an SFI-index field value in DCI format 2_0 indicating the set of symbols of the slot as uplink and also detect a DCI format indicating to the UE to receive PDSCH or CSI-RS in one or more symbols from the set of symbols of the slot.

GNB may configure UE with periodic transmission and/or reception for various purpose. For example:

>: periodic CSI-RS is configured in a BWP for the UE to measure the CSI-RS;

>: periodic DL PRS is configured for the UE to perform positioning measurement;

>: configured assignment based on semi-persistent sched-
uling is configured in a BWP for the UE to receive
PDSCH without dynamic scheduling;

>: PUCCH (HARQ feedback/CSI-RS report/SR) is con-
figured in a BWP for the UE to perform PUCCH
(HARQ feedback/CSI-RS report/SR) transmission;

>: configured grant is configured in a BWP for the UE to
transmit PUSCH without dynamic scheduling; and >: SRS is configured in a BWP for the UE to transmit
SRS.

Time pattern information of such periodic transmission/
reception indicate set of symbols that occurs periodically.
When the set of symbols for periodic transmission/reception
are not aligned with the direction of periodic transmission/
reception, UE and GNB determines whether to perform
periodic transmission/reception based on classification of
the symbol.

For an example in case 4, when a symbol indicated as:

>: downlink by tdd-UL-DL-ConfigCommon;

>: downlink by tdd-UL-DL-ConfigDedicate;

>: downlink by DCI format 2_0; and

>: sbfd symbol by SBFD-time-resource-config, and if the symbol is configured with CSI-RS in L-BWP, the
UE receives the CSI-RS in the symbol;

if the symbol is configured with CSI-RS in S-BWP, the
UE does not receive the CSI-RS in the symbol;

if the symbol is configured with PUCCH resource for SR
in L-BWP, the UE does not transmit the SR on PUCCH
in the symbol; and if the symbol is configured with PUCCH resource for SR
in S-BWP, the UE transmits the SR on PUCCH in the
symbol.

TABLE 10

| CASE | indication | | | | classification | | PDSCH/ CSI-RS/DL-PRS | | PUCCH/ PUSCH/PRACH/SRS | |
| | Comm | Ded | DCI | SBFD | L-BWP | S-BWP | L-BWP | S-BWP | L-BWP | S-BWP |
| --- | --- | --- | --- | --- | --- | --- | --- | --- | --- | --- |
| 1 | D | D | D | N | D | D | rx | rx | no tx | no tx |
| 2 | D | D | F | N | D | D | rx | rx | no tx | no tx |
| 3 | D | D | U | N | D | D | rx | rx | no tx | no tx |
| 4 | D | D | D | Y | D | sbfd | rx | no rx | no tx | tx |
| 5 | D | D | F | Y | D | sbfd | rx | no rx | no tx | tx |
| 6 | D | D | U | Y | D | sbfd | rx | no rx | no tx | tx |
| 7 | D | U | D | N | D | D | rx | rx | no tx | no tx |
| 8 | D | U | F | N | D | D | rx | rx | no tx | no tx |
| 9 | D | U | U | N | D | D | rx | rx | no tx | no tx |
| 10 | D | U | D | Y | D | sbfd | rx | no rx | no tx | tx |
| 11 | D | U | F | Y | D | sbfd | rx | no rx | no tx | tx |
| 12 | D | U | U | Y | D | sbfd | rx | no rx | no tx | tx |
| 13 | D | F | D | N | D | D | rx | rx | no tx | no tx |
| 14 | D | F | F | N | D | D | rx | rx | no tx | no tx |
| 15 | D | F | U | N | D | D | rx | rx | no tx | no tx |
| 16 | D | F | D | Y | D | sbfd | rx | no rx | no tx | tx |
| 17 | D | F | F | Y | D | sbfd | rx | no rx | no tx | tx |
| 18 | D | F | U | Y | D | sbfd | rx | no rx | no tx | tx |
| 19 | U | D | D | N | U | U | no rx | no rx | tx | tx |
| 20 | U | D | F | N | U | U | no rx | no rx | tx | tx |
| 21 | U | D | U | N | U | U | no rx | no rx | tx | tx |
| 22 | U | D | D | Y | U | sbfd | no rx | no rx | tx | tx |
| 23 | U | D | F | Y | U | sbfd | no rx | no rx | tx | tx |
| 24 | U | D | U | Y | U | sbfd | no rx | no rx | tx | tx |
| 25 | U | U | D | N | U | U | no rx | no rx | tx | tx |
| 26 | U | U | F | N | U | U | no rx | no rx | tx | tx |
| 27 | U | U | U | N | U | U | no rx | no rx | tx | tx |
| 28 | U | U | D | Y | U | sbfd | no rx | no rx | tx | tx |
| 29 | U | U | F | Y | U | sbfd | no rx | no rx | tx | tx |
| 30 | U | U | U | Y | U | sbfd | no rx | no rx | tx | tx |
| 31 | U | F | D | N | U | U | no rx | no rx | tx | tx |
| 32 | U | F | F | N | U | U | no rx | no rx | tx | tx |
| 33 | U | F | U | N | U | U | no rx | no rx | tx | tx |
| 34 | U | F | D | Y | U | sbfd | no rx | no rx | tx | tx |
| 35 | U | F | F | Y | U | sbfd | no rx | no rx | tx | tx |
| 36 | U | F | U | Y | U | sbfd | no rx | no rx | tx | tx |

TABLE 10-continued

| | indication | | | | classification | | PDSCH/ CSI-RS/DL-PRS | | PUCCH/ PUSCH/PRACH/SRS | |
|---|---|---|---|---|---|---|---|---|---|---|
| CASE | Comm | Ded | DCI | SBFD | L-BWP | S-BWP | L-BWP | S-BWP | L-BWP | S-BWP |
| 37 | F | D | D | N | D | D | rx | rx | no tx | no tx |
| 38 | F | D | F | N | D | D | rx | rx | no tx | no tx |
| 39 | F | D | U | N | D | D | rx | rx | no tx | no tx |
| 40 | F | D | D | Y | D | sbfd | rx | no rx | no tx | tx |
| 41 | F | D | F | Y | D | sbfd | rx | no rx | no tx | tx |
| 42 | F | D | U | Y | D | sbfd | rx | no rx | no tx | tx |
| 43 | F | U | D | N | U | U | no rx | no rx | tx | tx |
| 44 | F | U | F | N | U | U | no rx | no rx | tx | tx |
| 45 | F | U | U | N | U | U | no rx | no rx | tx | tx |
| 46 | F | U | D | Y | U | sbfd | no rx | no rx | tx | tx |
| 47 | F | U | F | Y | U | sbfd | no rx | no rx | tx | tx |
| 48 | F | U | U | Y | U | sbfd | no rx | no rx | tx | tx |
| 49 | F | F | D | N | D | D | rx | rx | no tx | no tx |
| 50 | F | F | F | N | F | F | no rx | no rx | no tx | no tx |
| 51 | F | F | U | N | U | U | no rx | no rx | tx | tx |
| 52 | F | F | D | Y | D | sbfd | rx | no rx | no tx | tx |
| 53 | F | F | F | Y | F | sbfd | no rx | no rx | no tx | tx |
| 54 | F | F | U | Y | U | sbfd | no rx | no rx | tx | tx |

Time pattern information is summarized in the table below.

TABLE 11

| periodic signal | time pattern parameters |
|---|---|
| CSI-RS | ServingCellConfig/CSI-MeasConfig/CSI-ResourceConfig/NZP-CSI-RS-Resource/CSI-ResourcePeriodicityAndOffset AND CSI-RS-ResourceMapping |
| DL-PRS | NR-DL-PRS-Info-r16/dl-PRS-Periodicity-and-ResourceSetSlotOffset AND dl-PRS-NumSymbols |
| SPS | ServingCellConfig/BWP-DownlinkDedicated/SPS-Config/periodicity; AND DCI 1_1 in Time Domain Resource Allocation |
| PUCCH for CSI-RS | ServingCellConfig/CSI-MeasConfig/CSI-ReportConfig/CSI-Report PeriodicityAndOffset ServingCellConfig/BWP-UplinkDedicated/PUCCH-Config/PUCCH Resource/startingPRB |

TABLE 11-continued

| periodic signal | time pattern parameters |
|---|---|
| PUCCH for A/N | ServingCellConfig/BWP-UplinkDedicated/PUCCH-Config/PUCCH-format_n/nrofSymbols ServingCellConfig/BWP-UplinkDedicated/PUCCH-Config/dl-Data ToUL-ACK-DCI; AND DCI 1_x/PDSCH-to-HARQ_feedback timing indicator in DCI 1_x; x = 0, 1, 2 or 3 |
| PUCCH for SR | ServingCellConfig/BWP-UplinkDedicated/PUCCH-Config/SchedulingRequestResourceConfig/periodicityAndOffset |
| SRS | ServingCellConfig/BWP-UplinkDedicated/SRS-Config/SRS-Resource/resourceMapping AND SRS-PeriodicityAndOffset |
| Configured Grant | ServingCellConfig/BWP-UplinkDedicated/ConfiguredGrantConfig/timeDomainOffset AND timeDomainAllocation AND periodicity |

TABLE 12

| periodic signal | parameter for starting point | parameter for duration | parameter for periodicity |
|---|---|---|---|
| CSI-RS | CSI-ResourcePeriodicityAndOffset | CSI-RS-ResourceMapping | CSI-ResourcePeriodicityAndOffset |
| DL-PRS | dl-PRS-Periodicity-and-ResourceSetSlot Offset | dl-PRS-NumSymbols | dl-PRS-Periodicity-and-ResourceSetSlot Offset |
| SPS | Time Domain Resource Allocation | Time Domain Resource Allocation | periodicity |
| PUCCH for CSI report | CSI-ReportPeriodicityAndOffset startingPRB | nrofSymbols | CSI-ReportPeriodicityAndOffset |
| PUCCH for SR | periodicityAndOffset | | periodicityAndOffset |

TABLE 12-continued

| periodic signal | parameter for starting point | parameter for duration | parameter for periodicity |
|---|---|---|---|
| SRS | SRS-PeriodicityAndOffset resourceMapping/ startPosition | resourceMapping/ nrofSymbols | SRS-PeriodicityAndOffset |
| Configured Grant | timeDomainOffset | timeDomainAllocation | periodicity |

TABLE 13

| periodic signal | parameter for transmission on SBFD symbols |
|---|---|
| CSI-RS | N/A |
| DL-PRS | N/A |
| SPS | N/A |
| PUCCH for CSI report | ServingCellConfig/CSI-MeasConfig/ CSI-ReportConfig/CSI-reportOnSBFD or ServingCellConfig/CSI-MeasConfig/ CSI-reportOnSBFD; or ServingCellConfig/ BWP-UplinkDedicated/PUCCH-Config/ PUCCH-Resource/PUCCHonSBFD or CSI-reportOnSBFD |
| PUCCH for SR | MAC-CellGroupConfig/ SchedulingRequestConfig/Scheduling RequestToAddMod/SRonSBFD; or ServingCellConfig/BWP- UplinkDedicated/PUCCH-Config/ SchedulingRequestResourceConfig/ SRonSBFD; or ServingCellConfig/BWP- UplinkDedicated/PUCCH-Config/ PUCCH-Resource/PUCCHonSBFD or SRonSBFD |
| SRS | ServingCellConfig/BWP- UplinkDedicated/SRS-Config/SRS- Resource/SRSonSBFD; or ServingCellConfig/BWP- UplinkDedicated/SRS-Config/ SRSonSBFD |
| Configured Grant | ServingCellConfig/BWP-UplinkDedicated/ ConfiguredGrantConfig/CGonSBFD |

CSI-reportOnSBFD indicates that:

the CSI report assocaited with the CSI-ReportConfig is allowed to be transmitted on the SBFD symbol/resource in the serving cell (associated with the ServingCellConfig); or the CSI report assocaited with all/any CSI-ReportConfig is allowed to be transmitted on the SBFD symbol/resource in the serving cell (associated with the ServingCellConfig);

SRonSBFD indicates that:

the SR assocaited with SR configuration (associated with the SchedulingRequestToAdd-Mod) is allowed to be transmitted on the SBFD symbol/resource in a specific serving cell of set of serving cells (associated with the MAC-CellGroupConfig); or the SR assocaited with SR configuration (associated with the SchedulingRequestRe-sourceConfig) is allowed to be transmitted on the SBFD symbol/resource in a specfiic serving cell of set of serving cells (associated with the MAC-CellGroupConfig);

the specific serving cell is the serving cell where corresponding PUCCH-resource is configured;

SRSonSBFD indicates that:

the SRS assocaited with the SRS-Resource is allowed to be transmitted on the SBFD symbol/resource in the BWP (associated with the BWP-UplinkDedicated); or the SRS assocaited with all/any SRS-Resource of the BWP is allowed to be transmitted on the SBFD symbol/resource in the BWP;

PUCCHonSBFD indicates that:

PUCCH transmission (e.g. for SR or for CSI-report)associated with the PUCCH-Resource is allowed to be transmitted on the SBFD symbol/resource in the BWP (associated with the BWP-UplinkDedicated)

CGonSBFD indicates that:

the CG associated with the ConfiguredGrantConfig is allowed to be transmitted on the SBFD symbol/resource in the BWP (associated with the BWP-UplinkDedicated); or the CG associated with all/any ConfiguredGrantConfig of the BWP is allowed to be transmitted on the SBFD symbol/resource in the BWP;

xxx is allowed to be transmitted on the SBFD symbol/resource means that transmission of xxx on the SBFD symbol/resource is enabled.

UE determines whether to perform transmission of periodic uplink signal during a set of symbols in L-BWP of a first serving cell based on:

>: TDD-UL-DL-ConfigCommon in the first serving cell configuration;

>: TDD-UL-DL-ConfigDedicated in the first serving cell configuration;

>: SlotFormatIndicator in a second serving cell configuration, wherein the SlotFormatIndicator comprises A SlotFormatCombinationPerCell for the first serving cell;

>: SFI-index received in the second serving cell;

>: parameter for starting point of the periodic signal in the first serving cell configuration;

>: parameter for duration of the periodic signal in the first serving cell configuration; and >: parameter for periodicity of the periodic signal in the first serving cell configuration.

UE determines, based on the following, set of symbols for periodic uplink signal:

>: parameter for starting point of the periodic signal in the first serving cell configuration;

>: parameter for duration of the periodic signal in the first serving cell configuration; and >: parameter for periodicity of the periodic signal in the first serving cell configuration, and UE determines the types of the set of symbols based on:

>: TDD-UL-DL-ConfigCommon in the first serving cell configuration;

>: TDD-UL-DL-ConfigDedicated in the first serving cell configuration;

>: SlotFormatIndicator in a second serving cell configuration, wherein the SlotFormatIndicator comprises A SlotFormatCombinationPerCell for the first serving cell; and >: SFI-index received in the second serving cell, and UE determines to:

>: perform transmission of uplink signal in case that the set of symbols are uplink symbols E4100; and >: not perform transmission of uplink signal in case that at least one symbol of the set of symbols are either downlink symbol or flexible symbol E4000.

UE determines type of symbols as in table 10.

UE determines whether to perform transmission of periodic uplink signal during a set of symbols in S-BWP of a first serving cell based on:

>: TDD-UL-DL-ConfigCommon in the first serving cell configuration;

>: TDD-UL-DL-ConfigDedicated in the first serving cell configuration;

>: SlotFormatIndicator in a second serving cell configuration, wherein the SlotFormatIndicator comprises A SlotFormatCombinationPerCell for the first serving cell;

>: SFI-index received in the second serving cell;

>: SBFD-time-resource-config in the first serving cell configuration;

>: parameter for starting point of the periodic signal in the first serving cell configuration;

>: parameter for duration of the periodic signal in the first serving cell configuration; and >: parameter for periodicity of the periodic signal in the first serving cell configuration.

UE determines, based on the following, set of symbols for periodic uplink signal:

>: parameter for starting point of the periodic signal in the first serving cell configuration;

>: parameter for duration of the periodic signal in the first serving cell configuration; and >: parameter for periodicity of the periodic signal in the first serving cell configuration, and UE determines the types of the set of symbols based on:

>: TDD-UL-DL-ConfigCommon in the first serving cell configuration;

>: TDD-UL-DL-ConfigDedicated in the first serving cell configuration;

>: SlotFormatIndicator in a second serving cell configuration, wherein the SlotFormatIndicator comprises A SlotFormatCombinationPerCell for the first serving cell;

>: SFI-index received in the second serving cell; and

>: SBFD-time-resource-config in the first serving cell configuration, and

UE determines to:

>: perform transmission of uplink signal in case that the set of symbols are uplink symbols E4300 or SBFD symbols E4200 or combination of uplink symbols and SBFD-symbols; and >: not perform transmission of uplink signal in case that at least one symbol of the set of symbols are either downlink symbol or flexible symbol.

UE determines type of symbols as in table 10.

UE determines whether to perform reception of periodic downlink signal during a set of symbols in L-BWP of a first serving cell based on:

>: TDD-UL-DL-ConfigCommon in the first serving cell configuration;

>: TDD-UL-DL-ConfigDedicated in the first serving cell configuration;

>: SlotFormatIndicator in a second serving cell configuration, wherein the SlotFormatIndicator comprises A SlotFormatCombinationPerCell for the first serving cell;

>: SFI-index received in the second serving cell;

>: parameter for starting point of the periodic signal in the first serving cell configuration;

>: parameter for duration of the periodic signal in the first serving cell configuration; and >: parameter for periodicity of the periodic signal in the first serving cell configuration.

UE determines, based on the following, set of symbols for periodic downlink signal:

>: parameter for starting point of the periodic signal in the first serving cell configuration;

>: parameter for duration of the periodic signal in the first serving cell configuration; and >: parameter for periodicity of the periodic signal in the first serving cell configuration, and UE determines the types of the set of symbols based on:

>: TDD-UL-DL-ConfigCommon in the first serving cell configuration;

>: TDD-UL-DL-ConfigDedicated in the first serving cell configuration;

>: SlotFormatIndicator in a second serving cell configuration, wherein the SlotFormatIndicator comprises A SlotFormatCombinationPerCell for the first serving cell; and >: SFI-index received in the second serving cell, and UE determines to:

>: perform reception of downlink signal in case that the set of symbols are downlink symbols E4400 and E4500; and >: not perform reception of downlink signal in case that at least one symbol of the set of symbols are either uplink symbol or flexible symbol.

UE determines type of symbols as in table 10.

UE determines, based on the following, set of symbols for periodic downlink signal:

>: parameter for starting point of the periodic signal in the first serving cell configuration;

>: parameter for duration of the periodic signal in the first serving cell configuration; and >: parameter for periodicity of the periodic signal in the first serving cell configuration, and UE determines the types of the set of symbols based on:

>: TDD-UL-DL-ConfigCommon in the first serving cell configuration;

>: TDD-UL-DL-ConfigDedicated in the first serving cell configuration;

>: SlotFormatIndicator in a second serving cell configuration, wherein the SlotFormatIndicator comprises A SlotFormatCombinationPerCell for the first serving cell;

>: SFI-index received in the second serving cell; and

>: SBFD-time-resource-config in the first serving cell configuration, and

UE determines to:

>: perform reception of downlink signal in case that the set of symbols are downlink symbols E4700; and >: not perform reception of downlink signal in case that at least one symbol of the set of symbols are either uplink symbol or SBFD-symbol 4C-71.

UE determines type of symbols as in table 10.

When UE is configured with a SR configuration, UE determines whether to perform SR transmission on a symbol with consideration of whether the BWP is L-BWP or S-BWP.

For a UE, SR is configured with:

>: MAC-CellGroupConfig/SchedulingRequestConfig/ one or more SchedulingRequestToAddMod IEs, each comprises:

>>: SchedulingRequestId;

>>: sr-ProhibitTimer field; and

>2: sr-TransMax;

>: ServingCellConfig/BWP-Uplink/PUCCH-Config/one or more SchedulingRequestResourceConfig IEs, each comprises:

>>: SchedulingRequestResourceId;

>>: SchedulingRequestId;

>>: periodicityAndOffset field; and

>>: PUCCH-ResourceId;

>: ServingCellConfig/BWP-Uplink/PUCCH-Config/one or more PUCCH-Resource IEs, each comprises:

>>: PUCCH-ResourceId;

>>: startingPRB field; and

>>: format field, that comprises:

>>>: nrofPRBs fields; and

>>>: nrofSymbols field.

SR is triggered for various purposes such as transmission of regular BSR and transmission of specific MAC CEs. The specific MAC CEs comprises MAC CE for BFR and Positioning Measurement Gap Activation/Deactivation Request MAC CE.

When SR is triggered, UE determines the SR configuration associated with the triggered SR. a SR configuration corresponds to a SchedulingRequestConfig IE and one or more SchedulingRequestResourceConfig IEs.

UE determines a SR configuration for a triggered SR based on why/how the SR is triggered. If the SR is triggered. For example, if the SR is triggered for beam failure recovery, a SR configuration configured for beam failure recovery is used for the triggered SR.

SR configuration is associated one or more SchedulingRequestResource IEs. Each SchedulingRequestResource IE is associated with a BWP. Hence, A SR configuration is associated with one or more BWPs.

If:

a SR is triggered; and the corresponding SR configuration is associated with the current active BWP, UE determines to signal/transmit SR on one valid PUCCH resource for the SR (configuration).

If the current active BPW is L-BWP, the valid PUCCH resource for the SR (configuration) occurs at UL symbol determined as in table 10.

If the current active BPW is S-BWP, the valid PUCCH resource for the SR (configuration) occurs at:

UL symbol determined as in table 10 in case that SRon-SBFD (an indication that SR is allowed on SBFD symbols or on SBFD resource) is not comprised in a specific IE; and UL symbol and SBFD-symbol determined as in table 10 in case that SRonSBFD (an indication that SR is allowed on SBFD symbols or on SBFD resource) is comprised in the specific IE.

The specific IE is either SchedulingRequestConfig IE, SchedulingRequestResourceConfig IE or PUCCH-Resource IE.

Valid PUCCH resource for the SR is defined by:

for frequency location/region, startingPRB field and nrof-PRBs fields; and for time location/region, nrofSymbols field and period-icityAndOffset field and relevant field/parameters (see table 10 and other relevant parts).

UE performs followings for periodic uplink transmission on SBFD symbols.

At U600, UE receives system information, wherein the system information comprises various information elements/fields including SBFD configuration.

At U700, UE receives RRC reconfiguration message, wherein the RRC reconfiguration message comprises various information elements/fields including configuration information for periodic uplink transmission.

At U800, UE determines set of symbols for periodic uplink transmission based on RRC reconfiguration message (table 11 and table 12 and table 13), wherein the set of symbols consists with one or more uplink symbols and one or more downlink symbols and one or more flexible symbols and one or more SBFD symbols.

At U700, UE performs periodic uplink transmission for a BWP on:

>>: the uplink symbols in case that the BWP is L-BWP;

>>: the first symbols in case that the BWP is S-BWP and a specific indication (table 13) is not configured for the periodic uplink transmission; and reception based on the determination; and >>: the uplink symbols and the SBFD symbols in case that the BWP is S-BWP and a specific indication (table 13) is configured for the periodic uplink transmission.

UE performs followings for periodic downlink receptions on SBFD symbols.

>: receiving system information, wherein the system information comprises various information elements/fields;

>: receiving RRC reconfiguration message, wherein the RRC reconfiguration message comprises various information elements/fields;

>: determining set of symbols for periodic downlink reception based on RRC reconfiguration message (table AB and table AC and table AD), wherein the set of symbols consists with one or more uplink symbols and one or more downlink/non-SBFD symbols and one or more flexible/non-SBFD symbols and one or more downlink/SBFD symbols and one or more flexible/SBFD symbols;

>: performing periodic downlink reception for a BWP on:

>>: the downlink/non-SBFD symbols and downlink/SBFD symbols in case that the BWP is L-BWP; and >>: the downlink/non-SBFD symbols in case that the BWP is S-BWP.

UE performs followings for SR transmission.

>: receiving system information, wherein the system information comprises various information elements/fields;

>: receiving RRC reconfiguration message, wherein the RRC reconfiguration message comprises various information elements/fields;

>: determining that a SR is triggered;

>: determining a SR configuration for the triggered SR;

>: determining valid PUCCH resource for the SR configuration; and t>: transmitting SR on the valid PUCCH resource, wherein the valid PUCCH resource is determined with consideration on whether or not the current active BWP is S-BWP.

Figure 34:
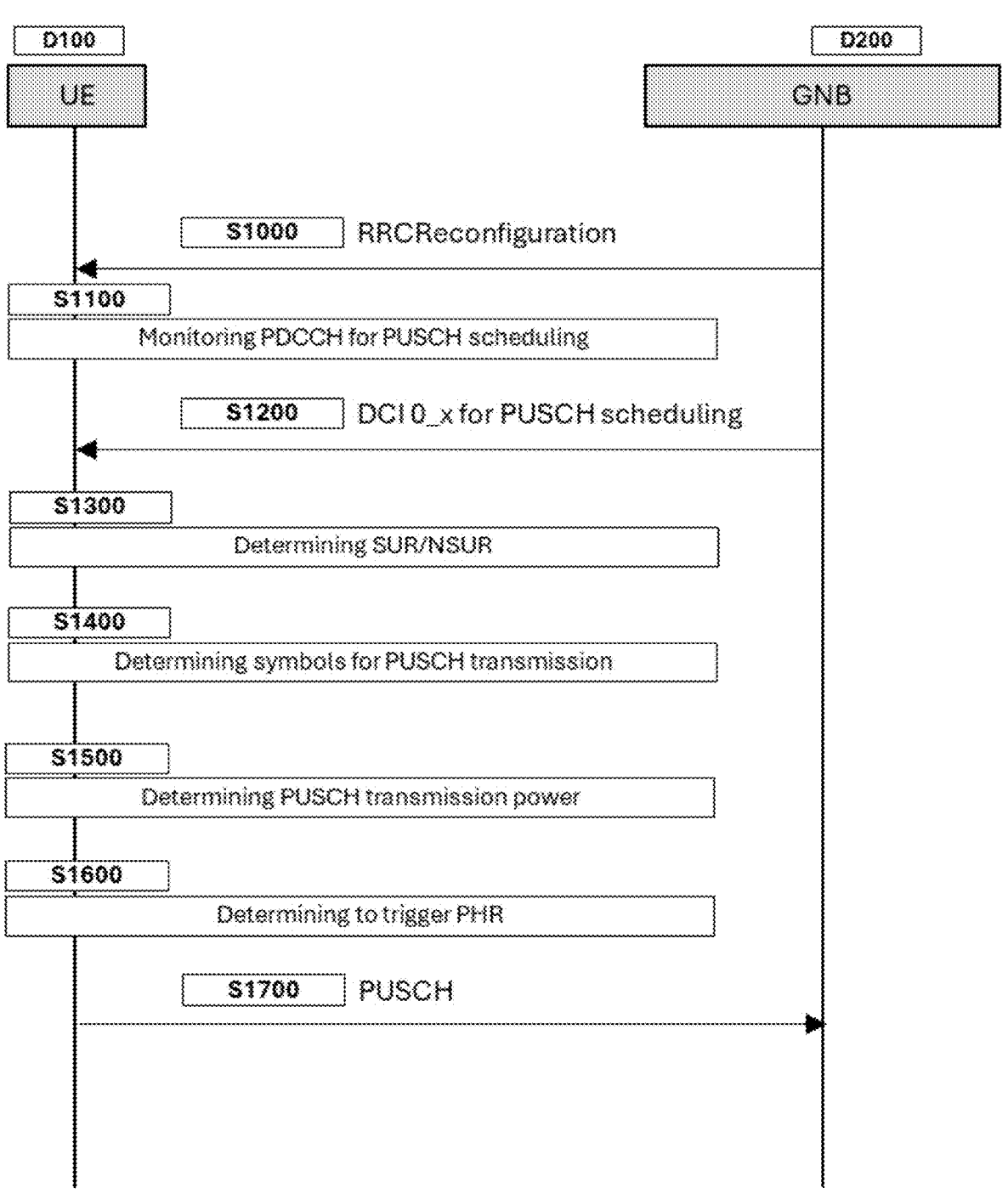
FIG. 34 illustrates operations of UE and GNB for power headroom reporting.

FIG. 34 illustrates operations of UE and GNB for power headroom reporting.

At S1000, UE receive from GNB a RRCReconfiguration message that comprises various configuration information.

SBFD configuration comprises cell-specific UL subband configuration, cell-specific DL subband configuration and SBFD symbol configuration.

SBFD Symbol Configuration is Per Serving Cell (and Applied Only to NUL)

Cell-specific DL sub-band configuration and Cell-specific UL sub-band configuration are per uplink per serving cell.

Cell-specific DL sub-band configuration and Cell-specific UL sub-band configuration are comprised in SCS-Specific-Carrier in FrequencyInfoDL.

SBFD Symbol Configuration is Comprised in SBFD-Symbol-Configuration

SBFD-Symbol-Configuration comprises following fields.

>: offsetToFirstSBSymobol

>: nrOfSBSymbols

>: associatedPattern

For each SCS-SpecificCarrier IE for downlink, following fields are added in extended part.

>: For Cell-specific UL sub-band configuration:

>>: BandwidthSbfd field indicates width of the SBFD UL-subband (e.g. subband for opposite direction) in number of PRBs (using the subcarrierSpacing defined for this carrier). One PBR occupies 180 KHz in 15 KHz SCS, 360 in 30, 720 in 60 and 1440 in 120.

>>: offsetToSbfd field indicates offset in frequency domain between the lowest usable subcarrier on this carrier and the lowest usable subcarrier of the SBFD UL-subband in number of PRBs (using the subcarrier-Spacing defined for this carrier).

\>: For Cell-specific DL sub-band configuration:

\>\>: Bandwidth-dl-subband field indicates width of the SBFD DL-subband (e.g. subband for downlink direction) in number of PRBs (using the subcarrierSpacing defined for this carrier). One PBR occupies 180 KHz in 15 KHz SCS, 360 in 30, 720 in 60 and 1440 in 120.

\>\>: offsetToDl-subband field indicates offset in frequency domain between the lowest usable subcarrier on this carrier and the lowest usable subcarrier of the SBFD DL-subband in number of PRBs (using the subcarrier-Spacing defined for this carrier).

\>: For both Cell-specific UL sub-band configuration and Cell-specific DL sub-band configuration:

\>: sbfdSCSInd field indicates that SCS corresponding to this SCS-SpecificCarrier IE is the SCS for SBFD subbands.

At SBFD/non-SSB symbol, UE performs either:

\>: uplink transmission in cell-specific UL subband (e.g. SBFD UL-subband); or

\>: downlink reception in cell-specific DL subband.

At SBFD/SSB symbol, UE performs downlink reception in cell-specific DL subband.

At non-SBFD/DL symbol, UE performs downlink reception in the currently active DL BWP.

At non-SBFD/UL symbol, UE performs uplink transmission in the currently active UL BWP.

At non-SBFD/SSB symbol, UE performs downlink reception in the currently active DL BWP.

UL usable PRBs at SBFD symbol are determined as intersection between cell-specific UL subband and the UL BWP in SBFD symbols. DL usable PRBs at SBFD symbol are determined as intersection between cell-specific DL subband(s) and the DL BWP in SBFD symbols.

UE performs uplink transmission and downlink reception as below.

At SBFD symbol, UE performs PUSCH transmission (e.g. for configured grant) in specific UL PRBs for PUSCH.

The specific UL PRBs for PUSCH are PRBs that are intersection of:

\>: PRBs of cell-specific UL subband;

\>: PRBs of currently active UL BWP; and

\>: PRBs indicated in DCI or PRBs of activated configured grant of currently active UL BWP.

At SBFD symbol, UE performs PDSCH reception (e.g. for configured assignment) in specific DL PRBs for PDSCH The specific DL PRBs for PDSCH are PRBs that are intersection of:

\>: PRBs of cell-specific DL subband;

\>: PRBs of currently active DL BWP; and

\>: PRBs indicated in DCI or PRBs of activated configured assignment of currently active DL BWP.

At SBFD symbol, UE performs SRS transmission in specific UL PRBs for SRS.

The specific UL PRBs for SRS are PRBs that are intersection of:

\>: PRBs of cell-specific UL subband;

\>: PRBs of currently active UL BWP; and

\>: PRBs of activated SP SRS of currently active UL BWP or PRBs of P-SRS of currently active UL BWP.

At SBFD symbol, UE performs PDCCH monitoring in specific DL PRBs for PDCCH.

The specific DL PRBs for PDCCH are PRBs that are intersection of:

\>: PRBs of cell-specific DL subband;

\>: PRBs of currently active DL BWP; and

\>: PRBs of CORESET configured for the currently active DL BWP.

SUR PUSCH transmission is PUSCH transmission performed in a specific time/frequency resource. The specific frequency resource is the specific UL PRBs for PUSCH. The specific time resource is SBFD symbol.

NSUR PUSCH transmission is PUSCH transmission performed in a second specific time/frequency resource. The second specific frequency resource is UL PRBs of active BWP. The specific time resource is non-SBFD/UL symbol.

Separate power control (PC) is applied to NSUR PUSCH transmission and SUR PUSCH transmission. Relevant parameters are signaled as below.

CellGroupConfig > spCellConfig or SCellConfig > ServingCellConfigCommon> UplinkConfigCommon > FrequencyInfoUL > p-Max AND p-Max-SUR.

CellGroupConfig > spCellConfig or SCellConfig > ServingCellConfigCommon> supplementaryUplinkConfig > FrequencyInfoUL > p-Max.

CellGroupConfig > spCellConfig or SCellConfig > ServingCellConfig > uplinkConfig > uplinkBWP-ToAddMod-List > BWP-Uplink > BWP-UplinkDedicated > PUSCH-Config > PUSCH-PowerControl AND PUSCH-PowerControl-SUR.

CellGroupConfig > spCellConfig or SCellConfig > ServingCellConfig > supplementaryUplink > uplinkBWP-ToAddModList > BWP-Uplink > BWP-UplinkDedicated > PUSCH-Config > PUSCH-PowerControl.

For PUSCH/PUCCH power control, DCI 2_2 and DCI 2_3 can be used. Relevant parameters are signaled as below.

CellGroupConfig > PhysicalCellGroupConfig > tpc-PUCCH-RNTI AND tpc-PUSCH-RNTI AND tpc-PUCCH-RNTI-SUR AND tpc-PUSCH-RNTI-SUR.

CellGroupConfig > spCellConfig or SCellConfig > ServingCellConfig > downlinkBWP-ToAddModList > BWP-Downlink > BWP-DownlinkDedicated > PDCCH-Config > PUCCH-TPC-CommandConfig > tpc-IndexPCell AND tpc-IndexPCell-SUR.

CellGroupConfig > spCellConfig or SCellConfig > ServingCellConfig > downlinkBWP-ToAddModList > BWP-Downlink > BWP-DownlinkDedicated > PDCCH-Config > PUSCH-TPC-CommandConfig > tpc-Index AND tpc-IndexSUL AND targetCell AND tpc-Index-SUR AND tpc-IndexSUL-SUR AND targetCell-SUR.

At S1100, UE monitors PDCCH for PUSCH scheduling.

At S1200, UE receives DCI 0_x for PUSCH scheduling.

At S1300, UE determines SUR/NSUR for PUSCH transmission.

To perform PUSCH transmission based on DCI 0_x (DCI 0_0 and DCI 0_1 and DCI 0_2 and DCI 03), UE determines whether it is SUR PUSCH transmission or NSUR PUSCH transmission. Either alternative 1 or alternative 2 is applied.

\<Alternative 1: Based on TDRA in DCI\>

In case that the first/starting symbol for the PUSCH transmission is SBFD/non-SSB symbol, UE determines the transmission is SUR PUSCH transmission.

In case that the first/starting symbol for the PUSCH transmission is non-SBFD symbol, UE determines the transmission is NSUR PUSCH transmission.

The UE determines the first/starting symbol for the PUSCH transmission based on K2/S/L values indicated by the value indicated in TDRA field.

\<Alternative 2: Based on SUR Flag\>

In case that SUR flag in the DCI is set to a first value, UE determines the transmission is SUR PUSCH transmission.

In case that SUR flag in the DCI is set to a second value or that SBFD flag is not present in the DCI, UE determines the transmission is NSUR PUSCH transmission.

The SUR flag is present in the DCI 0_x in case that:

>: the DCI is for a specific UL BWP of a specific serving cell;

>: the specific serving cell is configured with cell specific UL sub-band; and

>: UL sub-band is usable for the specific UL BWP (e.g. at least one PRB belongs to both the specific UL BWP and the cell-specific UL sub-band.).

Alternatively, the SUR flag is present in the DIC 0_0 and DCI 0_1 and DCI 0_2 and DCI 0_3 in case that:

>: the DCI is a specific serving cell; and

>: the specific serving cell is configured with cell specific UL sub-band.

At S1400, UE determines symbols for PUSCH transmission.

When AvailableSymbolCounting is enabled, the UE determines L symbols for a PUSCH transmission by DCI format 0_1, 0_2 or 0_3, based on tdd-UL-DL-ConfigurationCommon, tdd-UL-DL-ConfigurationDedicated, ssb-PositionsInBurst and SBFD-symbol-configuration, and the TDRA information field value in the DCI format 0_1, 0_2 or 0_3.

In case of SUR PUSCH transmission, only SBFD/non-SSB symbols are counted for L symbols. Non-SBFD symbols and SBFD/SSB symbols are not counted for L symbols.

In case of NSUR PUSCH transmission, only non-SBFD/non-SSB symbols are counted for L symbols. SBFD symbols and non-SBFD/SSB symbols are not counted for L symbols.

AvailableSymbolCounting is configured in PUSCH-Config of the corresponding UL BWP.

availableSymbolCounting ENUMERATED { enabled}

The type of symbols is determined as below.

A symbol is a SSB symbol in case that the symbol is indicated for SSB transmission in ssb-PositionsInBurst.

A symbol indicated to the UE for reception of SS/PBCH block by ssb-PositionsInBurst is SSB symbol.

ServingCellConfigCommon > ssb-PositionsInBurst

```
ssb-PositionsInBurst          CHOICE {
      shortBitmap                   BIT STRING (SIZE (4)),
      mediumBitmap                  BIT STRING (SIZE (8)),
      longBitmap   BIT STRING (SIZE (64))
}          OPTIONAL, -- Cond AbsFreqSSB
``` ssb-PositionsInBurst: For operation in licensed spectrum, this field indicates the time domain positions of the transmitted SS-blocks in a half frame with SS/PBCH blocks as defined in TS 38.213 [13], clause 4.1. The first/leftmost bit corresponds to SS/PBCH block index 0, the second bit corresponds to SS/PBCH block index 1, and so on. Value 0 in the bitmap indicates that the corresponding SS/PBCH block is not transmitted while value 1 indicates that the corresponding SS/PBCH block is transmitted. The network configures the same pattern in this field as in the corresponding field in ServingCellConfigCommonSIB.

A UE assumes that reception occasions of a physical broadcast channel (PBCH), PSS, and SSS are in consecutive symbols, as defined in [4, TS 38.211], and form a SS/PBCH block.

For a half frame with SS/PBCH blocks, the first symbol indexes for candidate SS/PBCH blocks are determined according to the SCS of SS/PBCH blocks as follows, where index 0 corresponds to the first symbol of the first slot in a half-frame.

>: Case A—15 kHz SCS: the first symbols of the candidate SS/PBCH blocks have indexes of $\{2,8\}+n$.

>>: For operation without shared spectrum channel access:

>>>: For carrier frequencies smaller than or equal to 3 GHz, n=0,1.

>>>: For carrier frequencies within FR1 larger than 3 GHz, n=0, 1, 2, 3.

>>: For operation with shared spectrum channel access, as described in [15, TS 37.213], n=0, 1, 2, 3, 4.

>: Case B—30 kHz SCS: the first symbols of the candidate SS/PBCH blocks have indexes $\{4,8,16,20\}+28\cdot n$. For carrier frequencies smaller than or equal to 3 GHz, n=0. For carrier frequencies within FR1 larger than 3 GHz, n=0,1.

>: Case C—30 kHz SCS: the first symbols of the candidate SS/PBCH blocks have indexes $\{2,8\}+14\cdot n$.

>>: For operation without shared spectrum channel access

>>>: For paired spectrum operation

>>>: For carrier frequencies smaller than or equal to 3 GHz, n=0,1. For carrier frequencies within FR1 larger than 3 GHz, n=0, 1, 2, 3.

>>: For unpaired spectrum operation

>>>: For carrier frequencies smaller than 1.88 GHz, n=0,1. For carrier frequencies within FR1 equal to or larger than 1.88 GHz, n=0, 1, 2, 3.

>>: For operation with shared spectrum channel access, n=0, 1, 2, 3, 4, 5, 6, 7, 8, 9.

>: Case D—120 kHz SCS: the first symbols of the candidate SS/PBCH blocks have indexes $\{4,8,16,20\}+28\cdot n$. For carrier frequencies within FR2 and FR2-NTN, n=0, 1, 2, 3, 5, 6, 7, 8, 10, 11, 12, 13, 15, 16, 17, 18.

>: Case E—240 kHz SCS: the first symbols of the candidate SS/PBCH blocks have indexes $\{8,12,16,20, 32,36,40,44\}+56\cdot n$. For carrier frequencies within FR2-1 and FR2-NTN, n=0, 1, 2, 3, 5, 6, 7, 8.

Symbol that is not SSB symbol is either uplink symbol or downlink symbol or flexible symbol or SBFD symbol.

UE determines types of symbols as below.

>: UE determines SSB symbols and non-SSB symbols, based on ssb-PositionsInBurst:

>>: a symbol indicated as SSB-symbol by ssb-PositionsInBurst is SSB-symbol;

>>: a symbol not indicated as SSB-symbol by ssb-PositionsInBurst is non-SSB-symbol;

>: UE determines SBFD symbols and non-SBFD symbols from non-SSB-symbols based on SBFD-symbol-config:

>>: a symbol indicated as SBFD-symbol by SBFD-symbol-config is SBFD-symbol;

>>: a symbol not indicated as SBFD-symbol by SBFD-symbol-config is non-SBFD-symbol;

>: UE determines downlink symbols and uplink symbols and flexible symbols from non-SBFD-symbols, based on TDD-UL-DL-ConfigCommon and TDD-UL-DL-ConofigDedicated and DCI format 2_0:

>>: in case that TDD-UL-DL-ConofigDedicated and DCI format 2_0 are configured:

>>>: a symbol indicated as DLsymbol by TDD-UL-DL-ConfigCommon is DLsymbol;

>>>: a symbol indicated as flexible symbol by TDD-UL-DL-ConfigCommon and as DLsymbol by TDD-UL-DL-ConofigDedicated is DLsymbol;

>>>: a symbol indicated as flexible symbol by TDD-UL-DL-ConfigCommon and as flexible symbol by TDD-UL-DL-ConofigDedicated and as DLsymbol by DCI 2_0 is DLsymbol;

>>>: a symbol indicated as ULsymbol by TDD-UL-DL-ConfigCommon is ULsymbol;

>>>: a symbol indicated as flexible symbol by TDD-UL-DL-ConfigCommon and as ULsymbol by TDD-UL-DL-ConofigDedicated is ULsymbol;

>>>: a symbol indicated as flexible symbol by TDD-UL-DL-ConfigCommon and as flexible symbol by TDD-UL-DL-ConofigDedicated and as ULsymbol by DCI 2_0 is ULsymbol;

>>>: a symbol indicated as flexible symbol by TDD-UL-DL-ConfigCommon and as flexible symbol by TDD-UL-DL-ConofigDedicated and as flexible symbol by DCI 2_0 is flexible symbol;

>>: in case that TDD-UL-DL-ConofigDedicated is configured and DCI format 2_0 is not configured:

>>>: a symbol indicated as DLsymbol by TDD-UL-DL-ConfigCommon is DLsymbol;

>>>: a symbol indicated as flexible symbol by TDD-UL-DL-ConfigCommon and as DLsymbol by TDD-UL-DL-ConofigDedicated is DLsymbol;

>>>: a symbol indicated as ULsymbol by TDD-UL-DL-ConfigCommon is ULsymbol;

>>>: a symbol indicated as flexible symbol by TDD-UL-DL-ConfigCommon and as ULsymbol by TDD-UL-DL-ConofigDedicated is ULsymbol;

>>>: a symbol indicated as flexible symbol by TDD-UL-DL-ConfigCommon and as flexible symbol by TDD-UL-DL-ConofigDedicated is flexible symbol;

>>: in case that neither TDD-UL-DL-ConofigDedicated nor DCI format 2_0 is configured:

>>>: a symbol indicated as DLsymbol by TDD-UL-DL-ConfigCommon is DLsymbol;

>>>: a symbol indicated as ULsymbol by TDD-UL-DL-ConfigCommon is ULsymbol;

>>>: a symbol indicated as flexible symbol by TDD-UL-DL-ConfigCommon is flexible symbol.

TABLE 14

| CASE | A | B | C | D | Symbol type |
|---|---|---|---|---|---|
| 1 | D | | | Non-SBFD | D |
| 2 | F | D | | Non-SBFD | D |
| 3 | F | F | D | Non-SBFD | D |
| 4 | U | | | Non-SBFD | U |
| 5 | F | U | | Non-SBFD | U |
| 6 | F | F | U | Non-SBFD | U |
| 7 | F | F | F | Non-SBFD | F |
| 8 | D | | | SBFD | SBFD |
| 9 | F | D | | SBFD | SBFD |
| 10 | F | F | D | SBFD | SBFD |
| 11 | U | | | N/A | U |
| 12 | F | U | | SBFD | SBFD |
| 13 | F | F | U | SBFD | SBFD |
| 14 | F | F | F | SBFD | SBFD |

A: TDD-UL-DL-ConfigCommon, B:TDD-UL-DL-ConofigDedicated, C: DCI format 2_0, D: SBFD-symbol -config
In case that,
>: TDD-UL-DL-ConfigCommon is DLsymbol or FLsymbol; and
>: SBFD-symbol-config is SBFD,
>>: the corresponding symbol is SBFD symbol (TDD-UL-DL-ConofigDedicated/DCI format 2_0 is override by SBFD-symbol-config).
>: TDD-UL-DL-ConfigCommon is DLsymbol; and >: SBFD-symbol-config is non-SBFD,
>>: the corresponding symbol is DLsymbol
>: TDD-UL-DL-ConfigCommon is FLsymbol; and
>: SBFD-symbol-config is non-SBFD,
>>: the corresponding symbol is DLsymbol or FLsymbol or ULsymbol depending onTDD-UL-DL-ConfigDedicated.

UE overrides cell-specific configuration (TDD-UL-DL-ConfigCommon and SBFD-symbol-config) with dedicate configuration (TDD-UL-DL-ConofigDedicated and SFI in DCI format 2_0) in determining symbol type of a symbol in case that the symbol is indicated as non-SBFD symbol. E.g. UE determines the symbol type based on dedicated configuration.

UE overrides dedicate configuration (TDD-UL-DL-ConofigDedicated and SFI in DCI format 2_0) with cell-specific configuration (TDD-UL-DL-ConfigCommon and SBFD-symbol-config) in determining symbol type of a symbol in case that the symbol is indicated as SBFD symbol. E.g. UE determines the symbol type based on cell-specific configuration.

In case that TDD-UL-DL-ConfigCommon and SBFD-symbol-config are contradicting (e.g. UL symbol is indicated in TDD-UL-DL-ConfigCommon and SBFD is indicated in SBFD-symbol-config), UE considers the cell as barred and performs reselection to other cell.

In case that TDD-UL-DL-ConofigDedicated and SBFD-symbol-config are contradicting (e.g. UL symbol is indicated in TDD-UL-DL-ConfigDedicated and SBFD is indicated in SBFD-symbol-config), UE prioritize/follow the SBFD-symbol-config and ignores the other (e.g. when configuration indicated in system information and configuration indicated in dedicate signaling are contradicting, configuration indicated in the system information is applied).

In case that SFI and SBFD-symbol-config are contradicting (e.g. UL symbol is indicated in SFI and SBFD is indicated in SBFD-symbol-config), UE prioritize/follow the SBFD-symbol-config and ignore the other (e.g. when configuration indicated in system information and configuration indicated in DCI are contradicting, configuration indicated in the system information is applied).

At S1500, UE determines PUSCH transmission power.

Transmission power of PUSCH on active UL BWP b of carrier f of serving cell c using parameter set configuration with index j and PUSCH power control adjustment state with index 1:

$$P_(PUSCH,b,f,c)\_(i,j,qd,1)=\min\{P_(CMAX,f,c),X\};$$

$$X=[P_(O\_PUSCH,b,f,c(i))+10*\log\ Y+alpha\_(b,f,c(i))*PL\_(b,f,c(qd))+delta\_(TF,b,f,c(i))+f(b,f,c(i))];$$

$$Y=SCS\_Coefficient*M\_PUSCH\_(RB,b,f,c(i));$$

TABLE 15

| SCS | SCS_Coefficient | SCS | SCS_Coefficient |
|---|---|---|---|
| 15 KHz | 1 | 60 KHz | 4 |
| 30 KHz | 2 | 120 KHz | 8 |

PUSCH transmission on SUR
>: PUSCH transmission at SBFD symbols in NUL PUSCH transmission on NSUR
>: PUSCH transmission at non-SBFD symbols in NUL;
>: PUSCH transmission at SBFD symbols in SUL; and
>: PUSCH transmission at non-SBFD symbols in SUL.

SBFD symbols in SUL means symbols in SUL that have same symbol number and same slot number and same SFN with any of SBFD symbols in NUL.

Non-SBFD symbols in SUL means symbols in SUL that have same symbol number and same slot number and same SFN with any of non-SBFD symbols in NUL.

>: P_(CMAX,f,c) is determined based on:

>>: if PUSCH transmission is on the SUR (e.g. at SBFD symbols and in NUL);

>>>: a PEMAX for SUR (p-Max-SUR);

>>>: P_PowerClass_CA determined based on power-Class of the given band combination;

>>>: MPR (maximum power reduction that is predefined based on power class of the terminal and modulation applied to the uplink transmission and resource block allocation for the uplink transmission);

>>>: A-MPR (additional maximum power reduction) for SUR that is determined based on additionalSpectrumEmission-SUR >>>: PEMAX_CA that is determined based on by p-NR-FR1 or by p-UE-FR1.

>>: if PUSCH transmission is on the NSUR (e.g. at any symbols in SUL or at non-SBFD symbols in NUL);

>>>: a PEMAX for NSUR (p-Max for the corresponding uplink);

>>>: P_PowerClass_CA determined based on power-Class of the given band combination;

>>>: MPR (maximum power reduction that is predefined based on power class of the terminal and modulation applied to the uplink transmission and resource block allocation for the uplink transmission);

>>>: A-MPR (additional maximum power reduction) that is determined based on additionalSpectrumEmission >>>: PEMAX_CA that is determined based on by p-NR-FR1 or by p-UE-FR1.

UE applies first set of parameters and third set of parameters in determining configured maximum transmission power for SUR PUSCH transmission; and UE applies second set of parameters and third set of parameters in determining configured maximum transmission power for NSUR PUSCH transmission.

The first set of parameters comprises parameters that are applied only to SUR PUSCH transmission.

The first set of parameters comprises:

>: PEMAX for SUR of the serving cell; and

>: A-MPR for SUR of the serving cell.

The second set of parameters comprises parameters that are applied only to NSUR PUSCH transmission.

The second set of parameters comprises:

>: PEMAX for uplink of the serving cell or PEMAX for supplementary uplink of the serving cell; and >: A-MPR for uplink of the serving cell or A-MPR for supplementary uplink of the serving cell.

The third set of parameters comprises parameters that are applied both to SUR PUSCH transmission and NSUR PUSCH transmission.

The third set of parameters comprises:

>: powerClass for the given band combination;

>: MPR for the given conditions (e.g. UE powerClass, RB allocation etc)

>: PEMAX_CA for the cell group (e.g. MCG or SCG)

Followings are configured by RRCReconfiguration message.

>: p-Max per uplink per serving cell, p-Max-SUR per serving cell;

CellGroupConfig > spCellConfig or SCellConfig > ServingCellConfigCommon> UplinkConfigCommon > FrequencyInfoUL > p-Max; p-Max-SUR CellGroupConfig > spCellConfig or SCellConfig > ServingCellConfigCommon> supplementaryUplinkConfig > FrequencyInfoUL > p-Max >: p-NR-FR1 and/or p-UE-FR1 per cell group PhysicalCellGroupConfig > p-NR-FR1 or p-UE-FR1

>: powerClass is defined per band combination and reported to the base station in UECapabilityInformation.

>: AdditionalSpectrumEmission is per uplink per serving cell; AdditionalSpectrumEmission-SUR is per serving cell CellGroupConfig > spCellConfig or SCellConfig > ServingCellConfigCommon> UplinkConfigCommon > FrequencyInfoUL > FrequencyInfoUL > AdditionalSpectrumEmission; AdditionalSpectrumEmission-SUR CellGroupConfig > spCellConfig or SCellConfig > ServingCellConfigCommon> supplementaryUplinkConfig > FrequencyInfoUL > AdditionalSpectrumEmission The IE AdditionalSpectrumEmission is used to indicate emission requirements to be fulfilled by the UE (see TS 38.101-1 [15], clause 6.2.3/6.2A.3, TS 38.101-2 [39], clause 6.2.3/6.2A.3, and TS 38.101-5 [75], clause 6.2.3). If an extension is signalled using the extended value range (as defined by the IE AdditionalSpectrumEmission-v1760), the corresponding original field, using the value range as defined by the IE AdditionalSpectrumEmission (without suffix) shall be set to value 7.

```
-- ASN1START
-- TAG-ADDITIONALSPECTRUMEMISSION-START
AdditionalSpectrumEmission ::=            INTEGER (0..7)
AdditionalSpectrumEmission-v1760 ::=      INTEGER (8..39)
AdditionalSpectrumEmission-r18 ::=        INTEGER (0..39)
-- TAG-ADDITIONALSPECTRUMEMISSION-STOP
-- ASN1STOP
```

>: P_(O_PUSCH, b, f, c(i)) is a parameter composed of the sum of a component P_(O_NOMINAL, PUSCH, f, c(i)) and a component P_(O_UE_PUSCH,b, f, c(i)).

> for PUSCH transmission on NSUR in NUL:

>>: For a PUSCH (re)transmission on NSUR configured by ConfiguredGrantConfig for NUL:

>>>: P_(O_NOMINAL, PUSCH, f, c(i)) is provided by p0-NominalWithoutGrant for NUL >>>: P_(O_UE_PUSCH,b, f, c(i)) is provided by p0 obtained from p0-PUSCH-Alpha in ConfiguredGrantConfig for NUL CellGroupConfig > spCellConfig or SCellConfig > ServingCellConfig > uplinkConfig > uplinkBWP-ToAddModList > BWP-Uplink > BWP-UplinkDedicated > PUSCH-Config > PUSCH-PowerControl > p0-NominalWithoutGrant CellGroupConfig > spCellConfig or SCellConfig > ServingCellConfig > uplinkConfig > uplinkBWP-ToAddModList > BWP-Uplink > BWP-UplinkDedicated > configuredGrantConfigToAddModList> ConfiguredGrantConfig > p0-PUSCH-Alpha [P0-PUSCH-AlphaSetId]

>>: For a PUSCH (re)transmission on NSUR based on DCI in NUL:

>>>: P_(O_NOMINAL, PUSCH, f, c(i)) is provided by p0-NominalWithGrant for NUL

>>>: P_(O_UE_PUSCH,b, f, c(i)) is determined from the value of the first P0-PUSCH-AlphaSet in p0-AlphaSets for NUL CellGroupConfig > spCellConfig or SCellConfig > ServingCellConfig > uplinkConfig > uplinkBWP-ToAddModList > BWP-Uplink > BWP-UplinkCommon > PUSCH-ConfigCommon > p0-NominalWithGrant CellGroupConfig > spCellConfig or SCellConfig > ServingCellConfig > uplinkConfig > uplinkBWP-ToAddModList > BWP-Uplink > BWP-UplinkDedicated > PUSCH-Config > PUSCH-PowerControl > p0-AlphaSets > for PUSCH transmission on NSUR in SUL:

>>: For a PUSCH (re)transmission on NSUR configured by ConfiguredGrantConfig for SUL:

>>>: P_(O_NOMINAL, PUSCH, f, c(i)) is provided by p0-NominalWithoutGrant for SUL >>>: P_(O_UE_PUSCH,b, f, c(i)) is provided by p0 obtained from p0-PUSCH-Alpha in ConfiguredGrantConfig for SUL CellGroupConfig > spCellConfig or SCellConfig > ServingCellConfig > supplementaryUplink > uplinkBWP-ToAddModList > BWP-Uplink > BWP-UplinkDedicated > PUSCH-Config > PUSCH-PowerControl > p0-NominalWithoutGrant CellGroupConfig > spCellConfig or SCellConfig > ServingCellConfig > supplementaryUplink > uplinkBWP-ToAddModList > BWP-Uplink > BWP-UplinkDedicated > configuredGrantConfigToAddModList> ConfiguredGrantConfig > p0-PUSCH-Alpha [P0-PUSCH-AlphaSetId]

>>: For a PUSCH (re)transmission on NSUR based on DCI in NUL:

>>>: P_(O_NOMINAL, PUSCH, f, c(i)) is provided by p0-NominalWithGrant for NUL

>>>: P_(O_UE_PUSCH,b, f, c(i)) is determined from the value of the first P0-PUSCH-AlphaSet in p0-AlphaSets for NUL CellGroupConfig > spCellConfig or SCellConfig > ServingCellConfig > supplementaryUplink > uplinkBWP-ToAddModList > BWP-Uplink > BWP-UplinkCommon > PUSCH-ConfigCommon > p0-NominalWithGrant CellGroupConfig > spCellConfig or SCellConfig > ServingCellConfig > supplementaryUplink > uplinkBWP-ToAddModList > BWP-Uplink > BWP-UplinkDedicated > PUSCH-Config > PUSCH-PowerControl > p0-AlphaSets > for PUSCH transmission on SUR in NUL:

>>: For a PUSCH (re)transmission on SUR configured by ConfiguredGrantConfig for NUL:

>>>: P_(O_NOMINAL, PUSCH, f, c(i)) is provided by p0-NominalWithoutGrant-SUR for NUL >>>: P_(O_UE_PUSCH,b, f, c(i)) is provided by p0 obtained from p0-PUSCH-Alpha in ConfiguredGrantConfig for NUL (ConfiguredGrantConfig configures grant either in SBFD symbols only or in non-SBFD symbols only. Hence there is no need to configure separate parameters for SUR and NSUR)

CellGroupConfig > spCellConfig or SCellConfig > ServingCellConfig > uplinkConfig > uplinkBWP-ToAddModList > BWP-Uplink > BWP-UplinkDedicated > PUSCH-Config > PUSCH-PowerControl-SUR > p0-NominalWithoutGrant-SUR CellGroupConfig > spCellConfig or SCellConfig > ServingCellConfig > uplinkConfig > uplinkBWP-ToAddModList > BWP-Uplink > BWP-UplinkDedicated > configuredGrantConfigToAddModList>Configured GrantConfig >10-PUSCH-Alpha [P0-PUSCH-Alpha-SetId]

>>: For a PUSCH (re)transmission on SUR based on DCI in NUL:

>>>: P_(O_NOMINAL, PUSCH, f, c(i)) is provided by p0-NominalWithGrant-SUR for NUL >>>: P_(O_UE_PUSCH,b, f, c(i)) is determined from the value of the first P0-PUSCH-AlphaSet in p0-Alpha-Sets-SUR for NUL CellGroupConfig > spCellConfig or SCellConfig > ServingCellConfig > uplinkConfig > uplinkBWP-ToAddModList > BWP-Uplink > BWP-UplinkCommon > PUSCH-ConfigCommon > p0-NominalWithGrant-SUR CellGroupConfig > spCellConfig or SCellConfig > ServingCellConfig > uplinkConfig > uplinkBWP-ToAddModList > BWP-Uplink > BWP-UplinkDedicated > PUSCH-Config > PUSCH-PowerControl > p0-Alpha-Sets-SUR >: alpha_(b, f, c(i)) is determined based on:

>>: P0-PUSCH-AlphaSet in case of NSUR transmission; and

>>: P0-PUSCH-AlphaSet-SUR in case of SUR transmission.

>: For PL_(b, f, c(qd))

>>: UE determines PL for PUSCH transmission.

>>: UE applies the same PL reference for PUSCH transmission on NSUR and PUSCH transmission on SUR.

>>: UE determines PL reference based on PUSCH-PathlossReferenceRS.

delta_(TF, b, f, c(i)) is determined based on deltaMCS and number of transmitted code blocks and size for code block and number of resource elements.

UE applies same deltaMCS for PUSCH transmission on NSUR and PUSCH transmission on SUR in case that deltaMCS-SUR is not comprised in PUSCH-PowerControl-SUR (or PUSCH-PowerControl is not present).

f_(b, f, c(i,l)) is the PUSCH power control adjustment for active UL BWP b of carrier f of serving cell c in PUSCH transmission occasion.

UE manages separate f_(b, f, c(i,l)) for SUR and for NSUR.

f_(b, f, c(i,l)) for SUR is updated based on:

>: TPC command in DCI for PUSCH transmission on SUR; and

>: DCI format 2_2 addressed by tpc-PUSCH-RNTI-SUR.

f_(b, f, c(i,l)) for NSUR is updated based on:

>: TPC command in DCI for PUSCH transmission on NSUR; and

>: DCI format 2_2 addressed by tpc-PUSCH-RNTI.

PUSCH Transmission Power Determination

When SUR PUSCH transmission is performed, UE determines PUSCH transmission power based on:

>: first offset;

>: a pathloss reference; and

>: an indication related to deltaMCS

When NSUR PUSCH transmission is performed, UE determines PUSCH transmission power based on:

>: second offset;

>: a pathloss reference; and

>: an indication related to deltaMCS

The indication related to deltaMCS used for SUR PUSCH transmission and the indication related to deltaMCS used for NSUR PUSCH transmission are same.

The pathloss reference used for SUR PUSCH transmission and the pathloss reference used for NSUR PUSCH transmission are determined based on the same parameter.

The first offset is determined based on:

>: p0-NominalWithoutGrant-SUR; and

>: p0-PUSCH-Alpha

The second offset is determined based on:

>: p0-NominalWithoutGrant; and

>: p0-PUSCH-Alpha p0-PUSCH-Alpha for the first offset and p0-PUSCH-Alpha for the second offset are same.

At S1600, UE performs PUSCH transmission based on the determination above.

At S1700, UE determines to trigger a PHR to report power headroom to the terminal.

RRC controls Power Headroom reporting by configuring the following parameters:

>: dpc-Reporting-FR1;

132

>: phr-AssumedPUSCH-Reporting;

>: phr-PeriodicTimer;

>: phr-PeriodicTimer-SUR;

>: phr-ProhibitTimer;

>: phr-ProhibitTimer-SUR;

>: phr-Tx-PowerFactorChange;

>: phr-Type2OtherCell;

>: phr-ModeOtherCG;

>: multiplePHR;

>: mpe-Reporting-FR2;

>: mpe-ProhibitTimer;

>: mpe-Threshold;

>: numberOfN;

>: mpe-ResourcePoolToAddModList;

>: twoPHRMode;

>: PHR-on-SUR;

>: PHR-reference-format-of-SUR;

The IE PHR-Config is used to configure parameters for power headroom reporting.

```
-- ASN1START
-- TAG-PHR-CONFIG-START
PHR-Config ::=                          SEQUENCE {
        phr-PeriodicTimer                       ENUMERATED {sf10, sf20, sf50, sf100,
sf200,sf500, sf1000, infinity},
        phr-ProhibitTimer                       ENUMERATED {sf0, sf10, sf20, sf50,
sf100,sf200, sf500, sf1000},
        phr-PeriodicTimer-SUR                   ENUMERATED {sf10, sf20, sf50, sf100,
sf200,sf500, sf1000, infinity},
        phr-ProhibitTimer-SUR                   ENUMERATED {sf0, sf10, sf20, sf50,
sf100,sf200, sf500, sf1000},
        phr-on-sur                              ENUMERATED
{enabled}            OPTIONAL        -- Need R
/        //This field indicates which uplink resoure between SUR and NSUR the triggered PHR
shall be transmitted. if set to enabled, triggered PHR due to first trigger type is transmitted on SUR
PUSCH. If this field is absent, triggered PHR due to first trigger type is transmitted on NSUR
PUSCH///
        SUR-reference-format                    ENUMERATED      {enabled},
OPTIONAL     -- Need R
        /// This field indicates how PH for virtual/reference PUSCH transmission is to be
calculated. if set to enabled, PH for virtual PUSCH transmission (V field set to 1) is determined
based on first reference format and second reference P_CMAX. If this field is absent, PH for virtual
PUSCH transmission is determined based on first reference format and first reference P_CMAX.
///
        phr-Tx-PowerFactorChange                ENUMERATED {dB1, dB3, dB6,
infinity},
        multiplePHR                             BOOLEAN,
        dummy           BOOLEAN,
        phr-Type2OtherCell              BOOLEAN,
        phr-ModeOtherCG                 ENUMERATED {real, virtual},
        ...,
        [[
        mpe-Reporting-FR2-r16           SetupRelease { MPE-Config-FR2-r16 }
OPTIONAL        -- Need M
        ]],
        [[
        mpe-Reporting-FR2-r17           SetupRelease { MPE-Config-FR2-r17 }
OPTIONAL,       -- Need M
        twoPHRMode-r17                          ENUMERATED {enabled}
OPTIONAL        -- Need R
        ]],
        [[
        phr-AssumedPUSCH-Reporting-r18          ENUMERATED {enabled}
OPTIONAL,       -- Need R
        dpc-Reporting-FR1-r18                   ENUMERATED {enabled}
OPTIONAL        -- Need R
        ]]
        }
        MPE-Config-FR2-r16 ::=          SEQUENCE {
        mpe-ProhibitTimer-r16                   ENUMERATED {sf0, sf10, sf20, sf50,
sf100, sf200, sf500, sf1000}
        mpe-Threshold-r16                       ENUMERATED {dB3, dB6, dB9, dB12}
        }
        MPE-Config-FR2-r17 ::=          SEQUENCE {
        mpe-ProhibitTimer-r17                   ENUMERATED {sf0, sf10, sf20, sf50,
sf100, sf200, sf500, sf1000}
        mpe-Threshold-r17                               ENUMERATED {dB3, dB6, dB9,
```

-continued

```
dB12}
            numberOfN-r17                    INTEGER(1..4),
            ...
        }
        -- TAG-PHR-CONFIG-STOP
        -- ASN1STOP
``` dpc-Reporting-FR1: Indicates if the delta power class (DPC) is reported, as specified in TS 38.321 [3].

mpe-ProhibitTimer: Value in number of subframes for MPE reporting, as specified in TS 38.321 [3]. Value sf10 corresponds to 10 subframes, and so on.

mpe-Reporting-FR2: Indicates whether the UE shall report MPE P-MPR in the PHR MAC control element, as specified in TS 38.321 [3].

mpe-Threshold: Value of the P-MPR threshold in dB for reporting MPE P-MPR when FR2 is configured, as specified in TS 38.321 [3]. The same value applies for each serving cell (although the associated functionality is performed independently for each cell).

multiplePHR: Indicates if power headroom shall be reported using the Single Entry PHR MAC control element or Multiple Entry PHR MAC control element defined in TS 38.321 [3]. True means to use Multiple Entry PHR MAC control element and False means to use the Single Entry PHR MAC control element defined in TS 38.321 [3]. The network configures this field to true for MR-DC and UL CA for NR, and to false in all other cases.

numberOfN: Number of reported P-MPR values in a PHR MAC CE.

phr-AssumedPUSCH-Reporting: Indicates if the PHR with an assumed PUSCH is reported, as specified in TS 38.321 [3]. The network ensures phr-AssumedPUSCH-Reporting-r18 and twoPHRMode-r17 are not configured at the same time for a UE.

phr-ModeOtherCG: Indicates the mode (i.e. real or virtual) used for the PHR of the activated cells that are part of the other Cell Group (i.e. MCG or SCG), when DC is configured. If the UE is configured with only one cell group (no DC), it ignores the field.

phr-PeriodicTimer, phr-PeriodicTimer-SUR: Value in number of subframes for PHR reporting as specified in TS 38.321 [3]. Value sf10 corresponds to 10 subframes, value sf20 corresponds to 20 subframes, and so on. phr-PeriodicTimer is applied to PHR reporting on NSUR. phr-PeriodicTimer-SUR is applied to PHR reporting on SUR.

phr-ProhibitTimer, phr-ProhibitTimer-SUR: Value in number of subframes for PHR reporting as specified in TS 38.321 [3]. Value sf0 corresponds to 0 subframe, value sf10 corresponds to 10 subframes, value sf20 corresponds to 20 subframes, and so on. phr-ProhibitTimer is applied to PHR reporting on NSUR. phr-ProhibitTimer-SUR is applied to PHR reporting on SUR.

phr-Tx-PowerFactorChange: Value in dB for PHR reporting as specified in TS 38.321 [3]. Value dB1 corresponds to 1 dB, dB3 corresponds to 3 dB and so on. The same value applies for each serving cell (although the associated functionality is performed independently for each cell).

phr-Type2OtherCell: If set to true, the UE shall report a PHR type 2 for the SpCell of the other MAC entity. See TS 38.321 [3], clause 5.4.6. Network sets this field to false if the UE is not configured with an E-UTRA MAC entity.

twoPHRMode: Indicates if the power headroom shall be reported as two PHRs (each PHR associated with a SRS resource set) is enabled or not. The network ensures phr-AssumedPUSCH-Reporting-r18 and twoPHRMode-r17 are not configured at the same time for a UE.

PHR Triggering Condition

UE triggers a Power Headroom Report (PHR) if any of the following events occur:

>: phr-ProhibitTimer expires or has expired and the path loss has changed more than phr-Tx-PowerFactorChange dB for at least one RS used as pathloss reference for one activated Serving Cell of any MAC entity of which the active DL BWP is not dormant BWP since the last transmission of a PHR in the NSUR in this MAC entity when the MAC entity has UL resources for new transmission in NSUR; or >: phr-ProhibitTimer-SUR expires or has expired and the path loss has changed more than phr-Tx-PowerFactorChange dB for at least one RS used as pathloss reference for one activated Serving Cell of any MAC entity of which the active DL BWP is not dormant BWP since the last transmission of a PHR in the SUR in this MAC entity when the MAC entity has UL resources for new transmission in SUR;

The path loss variation for one cell assessed above is between the pathloss measured at present time on the current pathloss reference and the pathloss measured at the transmission time of the last transmission of PHR on the pathloss reference in use at that time, irrespective of whether the pathloss reference has changed in between. The current pathloss reference for this purpose does not include any pathloss reference configured using pathlossReferenceRS-Pos in TS 38.331 [5].

>: phr-PeriodicTimer expires (PHR MAC CE is transmitted only in NSUR if PHR is triggered due to this);

>: phr-PeriodicTimer-SUR expires (PHR MAC CE is transmitted only in SUR if PHR is triggered due to this);

>: upon configuration or reconfiguration of the power headroom reporting functionality by upper layers, which is not used to disable the function (PHR MAC CE is transmitted either in NSUR or in SUR depending on PHR-on-SUR, if PHR is triggered due to this);

>: activation of an SCell of any MAC entity with configured uplink of which firstActiveDownlinkBWP-Id is not set to dormant BWP (PHR MAC CE is transmitted either in NSUR or in SUR depending on PHR-on-SUR);

>: activation of an SCG (PHR MAC CE is transmitted either in NSUR or in SUR depending on PHR-on-SUR);

>: addition of the PSCell except if the SCG is deactivated (i.e. PSCell is newly added or changed) (PHR MAC CE is transmitted either in NSUR or in SUR depending on PHR-on-SUR);

>: phr-ProhibitTimer expires or has expired, when the MAC entity has UL resources for new transmission in NSUR, and the following is true for any of the activated Serving Cells of any MAC entity with configured uplink:

>>: there are UL resources allocated for transmission or there is a PUCCH transmission in NSUR on this cell, and the required power backoff due to power management (as allowed by P-MPR$_c$ as specified in TS 38.101-1 [14], TS 38.101-2 [15], and TS 38.101-3 [16]) for this cell has changed more than phr-Tx-PowerFactorChange dB since the last transmission of a PHR in NSUR on this cell when the MAC entity had UL resources allocated for transmission or PUCCH transmission in NSUR on this cell.

>: phr-ProhibitTimer-SUR expires or has expired, when the MAC entity has UL resources for new transmission in SUR, and the following is true for any of the activated Serving Cells of any MAC entity with configured uplink:

>>: there are UL resources allocated for transmission or there is a PUCCH transmission in NSUR on this cell, and the required power backoff due to power management (as allowed by P-MPR$_c$ as specified in TS 38.101-1 [14], TS 38.101-2 [15], and TS 38.101-3 [16]) for this cell has changed more than phr-Tx-PowerFactorChange dB since the last transmission of a PHR in SUR on this cell when the MAC entity had UL resources allocated for transmission or PUCCH transmission in SUR on this cell.

>: Upon switching of activated BWP from dormant BWP to non-dormant DL BWP of an SCell of any MAC entity with configured uplink;

>: if dpc-Reporting-FR1 is configured, $\Delta P_{PowerClass}$/ $\Delta P_{PowerClass}$, $_{CA}$/$\Delta P_{PowerClass}$, $_{EN\text{-}DC}$/ $\Delta P_{PowerClass, NR\text{-}DC}$ reporting is triggered upon uplink duty cycle exceedance or upon return to the power class after the duty cycle exceedance, as specified in TS 38.101-1 [14] and TS 38.101-3 [16]).

>: if mpe-Reporting-FR2 is configured, and mpe-ProhibitTimer is not running:

>>: the measured P-MPR applied to meet FR2 MPE requirements as specified in TS 38.101-2 [15] is equal to or larger than mpe-Threshold for at least one activated FR2 Serving Cell since the last transmission of a PHR in this MAC entity; or >>: the measured P-MPR applied to meet FR2 MPE requirements as specified in TS 38.101-2 [15] has changed more than phr-Tx-PowerFactorChange dB for at least one activated FR2 Serving Cell since the last transmission of a PHR due to the measured P-MPR applied to meet MPE requirements being equal to or larger than mpe-Threshold in this MAC entity.

in which case the PHR is referred below to as 'MPE P-MPR report'.

The MAC entity should avoid triggering a PHR when the required power backoff due to power management decreases only temporarily (e.g. for up to a few tens of milliseconds) and it should avoid reflecting such temporary decrease in the values of $P_{CMAX,f,c}$/PH when a PHR is triggered by other triggering conditions.

If a HARQ process is configured with cg-Retransmission-Timer and if the PHR is already included in a MAC PDU for transmission on configured grant by this HARQ process, but not yet transmitted by lower layers, it is up to UE implementation how to handle the PHR content.

PHR is triggered for various reasons. Since PHR transmitted on NSUR and PHR transmitted on SUR contain different pieces of information, network controls UE to transmit PHR in specific uplink resource when the PHR is triggered by specific/predefined triggers.

When a PHR is triggered by a specific trigger (type 1 PHR trigger):

>: if phr-on-sur is configured, UE transmits the PHR in SUR;

>: if phr-on-sur is not configured, UE transmits the PHR in NSUR.

Type 1 PHR trigger comprises:

>: triggering PHR upon configuration or reconfiguration of the power headroom reporting functionality >: triggering PHR upon activation of an SCell of any MAC entity with configured uplink of which firstActiveDownlinkBWP-Id is not set to dormant BWP >: triggering PHR upon activation of an SCG >: triggering PHR upon addition of the PSCell except if the SCG is deactivated In some cases, it may be more important to provide PHR as soon as possible than to provide PHR with more valuable information. Network controls UE to transmit PHR either in NSUR or on SUR whichever comes first.

When a PHR is triggered by a second specific trigger (type 2 PHR trigger):

>: if SUR PUSCH transmission is available earlier, UE transmits the PHR in SUR;

>: if NSUR PUSCH transmission is available earlier, UE transmits the PHR in NSUR; Type 2 PHR trigger comprises:

>: triggering PHR upon switching of activated BWP from dormant BWP to non-dormant DL BWP of an SCell of any MAC entity with configured uplink;

>: triggering PHR upon uplink duty cycle exceedance or upon return to the power class after the duty cycle exceedance, if dpc-Reporting-FR1 is configured, ΔPPowerClass /ΔPPowerClass, CA/ΔPPowerClass, EN-DC/ΔPPowerClass;

>: triggering PHR upon the measured P-MPR applied to meet FR2 MPE requirements as specified in TS 38.101-2 [15] is equal to or larger than mpe-Threshold for at least one activated FR2 Serving Cell since the last transmission of a PHR in this MAC entity >: triggering PHR upon the measured P-MPR applied to meet FR2 MPE requirements as specified in TS 38.101-2 [15] has changed more than phr-Tx-PowerFactorChange dB for at least one activated FR2 Serving Cell since the last transmission of a PHR due to the measured P-MPR applied to meet MPE requirements being equal to or larger than mpe-Threshold in this MAC entity PHR Format Determination UE determines PHR format as below.

TABLE 16

| Condition check 1 based on a first MAC entity specific parameter: multiplePHR with value true is configured | Condition check 2 based on second set of MAC entity specific parameter: if this MAC entity is configured with | Condition check 3 based on third set of serving cell specific parameter: | PHR format |
| --- | --- | --- | --- |
| Yes | mpe-Reporting-FR2-r17 | No check | Enhanced Multiple entry PHR |
| Yes | twoPHRMode | any associated Serving Cell is configured with | Enhanced Multiple Entry |

TABLE 16-continued

| Condition check 1 based on a first MAC entity specific parameter: multiplePHR with value true is configured | Condition check 2 based on second set of MAC entity specific parameter: if this MAC entity is configured with | Condition check 3 based on third set of serving cell specific parameter: | PHR format |
|---|---|---|---|
|  |  | multipanel SchemeSDM or multipanel SchemeSFN | PHR for multiple TRP STx2P MAC CE |
| Yes | twoPHRMode | any associated Serving Cell is configured with multiple TRP PUSCH repetition | Enhanced Multiple Entry PHR for multiple TRP MAC CE |
| Yes | phr-AssumedPUSCH-Reporting | No check | Multiple Entry PHR with assumed PUSCH MAC CE |
| Yes | none | No check | Multiple Entry PHR MAC CE |
| No | mpe-Reporting-FR2-r17 | No check | Enhanced Single entry PHR |
| No | twoPHRMode | any associated Serving Cell is configured with multipanel SchemeSDM or multipanel SchemeSFN | Enhanced Single Entry PHR for multiple TRP STx2P MAC CE |
| No | twoPHRMode | any associated Serving Cell is configured with multiple TRP PUSCH repetition | Enhanced Single Entry PHR for multiple TRP MAC CE |
| No | phr-AssumedPUSCH-Reporting | No check | Single Entry PHR with assumed PUSCH MAC CE |
| No | none | No check | Single Entry PHR MAC CE |

PHR Format

The first $P\_CMAX\_f\_c$ is $P\_CMAX\_f\_c$ for SUR PUSCH transmission and determined from the first set of parameters and the third set of parameters.

The second $P\_CMAX\_f\_c$ is $P\_CMAX\_f\_c$ for NSUR PUSCH transmission and determined from the second set of parameters and the third set of parameters.

The first PUSCH transmission power is PUSCH transmission power for SUR PUSCH transmission and determined based on first offset and an indication related to delta MCS.

The second PUSCH transmission power is PUSCH transmission power for NSUR PUSCH transmission and determined based on second offset and the indication related to delta MCS.

The first reference PUSCH format is set of reference/predefined parameter values that are used for calculating PUSCH transmission power when there is neither real NSUR PUSCH transmission nor SUR PUSCH transmission.

The first reference $P\_CMAX\_f\_c$ is $P\_CMAX\_f\_c$ determined based on reference/predefined parameter values that are used for calculating PH when there is neither real NSUR PUSCH transmission nor SUR PUSCH transmission and when SUR-reference-format is configured. The first reference $P\_CMAX\_f\_c$ is determined based on PEMAX for SUR.

The second reference $P\_CMAX\_f\_c$ is $P\_CMAX\_f\_c$ determined based on reference/predefined parameter values that are used for calculating PH when there is neither real NSUR PUSCH transmission nor SUR PUSCH transmission and when SUR-reference-format is not configured. The second reference $P\_CMAX\_f\_c$ is determined based on PEMAX for NSUR.

For first type PHR MAC CEs (Single Entry PHR MAC CE, Enhanced Single Entry PHR MAC CE, Single Entry PHR with assumed PUSCH MAC CE; the PHR MAC CE that contains PH only for real transmission; PHR MAC CE with multiplePHR set to false; PHR MAC CE for a single serving cell), >: the value for PH field is determined based on:

>>: second $P\_CMAX\_f\_c$ and second PUSCH transmission power if PH is reported for NSUR PUSCH transmission (e.g. the first type PHR MAC CE is transmitted on NSUR; NSUR PUSCH transmission is performed); and >>: first $P\_CMAX\_f\_c$ and first PUSCH transmission power if PH is reported for SUR PUSCH transmission (e.g. the first type PHR MAC CE is transmitted on SUR; SUR PUSH transmission is performed);

>: the value for $P\_CMAX\_f\_c$ field is determined based on:

>>: second $P\_CMAX\_f\_c$ if PH is reported for NSUR PUSCH transmission (e.g. the first type PHR MAC CE is transmitted on NSUR); and >>: first $P\_CMAX\_f\_c$ if PH is reported for SUR PUSCH transmission (e.g. the first type PHR MAC CE is transmitted on SUR).

For second type PHR MAC CEs (Multiple Entry PHR MAC CE; Enhanced Multiple Entry PHR MAC CE; Enhanced Single Entry PHR for multiple TRP MAC CE; Enhanced Multiple Entry PHR for multiple TRP MAC CE; Multiple Entry PHR with assumed PUSCH MAC CE; the PHR MAC CE with multiplePHR set to true; the PHR MAC CE that contains at least one PH for real transmission and in addition one or more PHs for virtual/reference transmission; PHR MAC CE for two or more serving cells), >: V field for a serving cell is:

>>: set to 0 if either NSUR PUSCH transmission or SUR PUSCH transmission is performed in the serving cell when PUSCH transmission for the second type PHR MAC CE is performed (e.g. PH is reported for real PUSCH transmission);

>>: set to 1 if neither NSUR PUSCH transmission nor SUR PUSCH transmission is performed in the serving cell when PUSCH transmission for the second type PHR MAC CE is performed (e.g. PH is reported for virtual PUSCH transmission with reference PUSCH format and reference $P\_CMAX\_c\_f$);

>: value to be set in PH field for the serving cell is determined based on:

>>: second $P\_CMAX\_f\_c$ and second PUSCH transmission power in case that:

>>>: NSUR PUSCH transmission is performed in the serving cell; and

>>>: V field for the serving cell is set to 0;

>>: first $P\_CMAX\_f\_c$ and first PUSCH transmission power in case that:

>>>: SUR PUSCH transmission is performed in the serving cell; and

>>>: V field for the serving cell is set to 0;

>>: second reference P_CMAX_f_c and first reference PUSCH format in case that:

>>>: the V field is set to 1 (neither NSUR PUSCH transmission nor SUR PUSCH transmission); and >>>: SUR-reference-format is not configured;

>>: first reference P_CMAX_f_c and first reference PUSCH format in case that:

>>>: the V field is set to 1 (neither NSUR PUSCH transmission nor SUR PUSCH transmission); and >>>: SUR-reference-format is configured;

>: value to be set in P_CMAX_f_c field for the serving cell is determined based on:

>>: first P_CMAX_f_c in case that SUR PUSCH transmission is performed in the serving cell when PUSCH transmission for the type 2 PHR MAC CE is performed; and >>: second P_CMAX_f_c in case that NSUR PUSCH transmission is performed in the serving cell when PUSCH transmission for the type 2 PHR MAC CE is performed.

Alternatively, since in CA scenario, TDD configurations of all serving cells are aligned each other. Then it would be such that all PUSCH transmissions of serving cells at a given time is only SUR PUSCH transmission or only NSUR PUSCH transmission.

>: V field for a serving cell is: (same as above)

>: PH fields of the serving cells with real PUSCH transmission (e.g. V=0) are determined based on:

>>: second P_CMAX_f_c of the corresponding serving cell and second PUSCH transmission power of the corresponding serving cell in case that type 2 PHR MAC CE is transmitted in NSUR;

>>: first P_CMAX_f_c of the corresponding serving cell and first PUSCH transmission power of the corresponding serving cell in case that type 2 PHR MAC CE is transmitted in SUR;

>: PH fields of the serving cell without real PUSCH transmission (e.g. V=1) is determined based on:

>>: second reference P_CMAX_f_c and first reference PUSCH format in case that type 2 PHR MAC CE is transmitted in NSUR; and >>: first reference P_CMAX_f_c and first reference PUSCH format in case that type 2 PHR MAC CE is transmitted in SUR.

>: P_CMAX_f_c fields for the serving cells are determined based on:

>>: first P_CMAX_f_c in case that type 2 PHR MAC CE is transmitted in SUR; and

>>: second P_CMAX_f_c in case that type 2 PHR MAC CE is transmitted in NSUR.

Reference PUSCH Format and Reference P_CMAX_f_c

The (assumed parameter values for) reference PUSCH format are common for SUR and NSUR. The reference P_CMAX for SUR and the reference P_CMAX for NSUR are different. They are determined based on corresponding P_EMAX and specific power reduction values (e.g. A-MPR, MPR, P-MPR are equal to zero).

That RRC configures which reference PUSCH formats (between reference format for SUR or for NSUR) to be used is equivalent to which P_EMAX (between P_EMAX for SUR or P_EMAX for NSUR) to be used.

First reference PUSCH format (common for SUR PUSCH transmission and NSUR PUSCH transmission) is determined as below:

>: $P_{O\_PUSCH,b,f,c}(j)$ and $\alpha_{b,f,c}(j)$ are obtained using $P_{O\_NOMINAL,PUSCH,f,c}(0)$ and p0-PUSCH-Alpha- SetId=0, $PL_{b,f,c}(q_d)$ is obtained using pusch-Pathloss-ReferenceRS-Id=0, and l=0.

First reference P_CMAX_f_c is P_CMAX_f_c for SUR computed assuming MPR=0 dB, A-MPR=0 dB, P-MPR=0 dB, $\Box T_C$=0 dB.

>: P_CMAX_f_c for SUR is determined based on:

>>: p-Max-SUR

>>: p-NR-FR1 or by p-UE-FR1

>>: powerClass of the given band combination

Second reference P_CMAX_f_c is P_CMAX_f_c for NSUR computed assuming MPR=0 dB, A-MPR=0 dB, P-MPR=0 dB, $\Box T_C$=0 dB.

>: P_CMAX_f_c for NSUR is determined based on:

>>: p-Max

>>: p-NR-FR1 or by p-UE-FR1

>>: powerClass of the given band combination

If the UE determines that a Type 1 power headroom report for an activated serving cell is based on a reference PUSCH transmission then, for PUSCH transmission occasion i on active UL BWP b of carrier f of serving cell c, >: if for the active UL BWP b of carrier f of serving cell c, the UE is provided >>: twoPHRMode, >>: two SRS resource sets in srs-ResourceSetToAddMod-List or srs-ResourceSetToAddModListDCI-0-2 with usage set to 'codebook' or 'nonCodebook', >>: dl-OrJointTCI-StateList or TCI-UL-State and is indicated a first TCI-State or TCI-UL-State and a second TCI-State or TCI-UL-State, and >>: multipanelSchemeSDM or multipanelSchemeSFN >: the UE computes the Type 1 power headroom report associated with the k-th TCI-State or TCI-UL-State as EQ100

>: else, the UE computes the Type 1 power headroom report as EQ200 where $\tilde{P}_{("CMAX",f,c)}(i)$ and $\tilde{P}_{(CMAX,f,c,k)}(i)$ are computed assuming MPR=0 dB, A-MPR=0 dB, P-MPR=0 dB. Delta_TC=0 dB. MPR, A-MPR, P-MPR and $\Box TC$ are defined in [8-1, TS 38.101-1], [8-2, TS 38.101-2], [8-3, TS 38.101-3] and [8-5, TS 38.101-5]. The remaining parameters are defined in clause 7.1.1 and, if ul-powerControl is not provided, $P_{("O\_PUSCH",b,f,c)}(j)$ and $\alpha_{(b,f,c)}(j)$ are obtained using $P_{("O\_NOMINAL,PUSCH",f,c)}(0)$ and p0-PUSCH-AlphaSetId=0, $\llbracket PL \rrbracket\_{(b,f,c)}(q\_d)$ is obtained using pusch-PathlossReferenceRS-Id=0, and 1=0. If ul-powerControl is provided and the UE is indicated one TCI-State or TCI-UL-State, $P_{("\_PUSCH",b,f,c)}(j)$, $\alpha\_{(b,f,c)}(j)$ and 1 are obtained by p0AlphaSetforPUSCH associated with the indicated TCI-State or TCI-UL-State, $\llbracket PL \rrbracket\_{(b,f,c)}(q\_d)$ is obtained by PL-RS associated with the indicated TCI-State or TCI-UL-State. If ul-powerControl is provided and the UE is indicated a first TCI-State or TCI-UL-State and a second TCI-State or TCI-UL-State, $P_{("O\_PUSCH",b,f,c)}(j)$, $\alpha\_{(b,f,c)}(j)$ and 1 for $\llbracket PH \rrbracket\_{("type1",b,f,c,k)}(i,j,q\_d,l)$ are obtained by p0AlphaSetforPUSCH associated with the k-th indicated TCI-State or TCI-UL-State, $\llbracket PL \rrbracket (b,f,c)(q\_d)$ is obtained by PL-RS associated with the k-th indicated TCI-State or TCI-UL-State. If ul-powerControl is provided, and if UE is indicated a first TCI-State or TCI-UL-State and a second TCI-State or TCI-UL-State, and if UE is not provided twoPHRmode, $P_{("O\_PUSCH",b,f,c)}(j)$, $\alpha\_{(b,f,c)}(j)$ and 1 for $\llbracket PH$ ]_("type1",b,f,c) (i,j,q_d,l) are obtained by p0AlphaSetforPUSCH associated with the first indicated TCI-State or TCI-UL-State, [ PL ]_(b,f,c) (q_d) is obtained by PL-RS associated with the first indicated TCI-State or TCI-UL-State.

<Single Entry PHR MAC CE (F1000)>

The Single Entry PHR MAC CE is identified by a MAC subheader with LCID.

It has a fixed size and consists of two octets defined as follows (F1000):

>: R: Reserved bit, set to 0;

>: Power Headroom (PH): This field indicates the power headroom level. The length of the field is 6 bits. The reported PH and the corresponding power headroom levels are shown in T1000 below (the corresponding measured values in dB are specified in TS 38.133 [11]);

>: P: If mpe-Reporting-FR2 is configured and the Serving Cell operates on FR2, the MAC entity shall set this field to 0 if the applied P-MPR value, to meet MPE requirements, as specified in TS 38.101-2 [15], is less than P-MPR_00 as specified in TS 38.133 [11] and to 1 otherwise. If mpe-Reporting-FR2 is not configured or the Serving Cell operates on FR1, this field indicates whether power backoff is applied due to power management (as allowed by P-MPR$_c$ as specified in TS 38.101-1 [14], TS 38.101-2 [15], and TS 38.101-3 [16]). The MAC entity shall set the P field to 1 if the corresponding $P_{CMAX,f,c}$ field would have had a different value if no power backoff due to power management had been applied;

>: $P_{CMAX,f,c}$: This field indicates the $P_{CMAX,f,c}$ (as specified in TS 38.213 [6]) used for calculation of the preceding PH field. The reported $P_{CMAX,f,c}$ and the corresponding nominal UE transmit power levels are shown in T1100 (the corresponding measured values in dBm are specified in TS 38.133 [11]); If the uplink transmission is performed in NSUR, P_CMAX_f_c determined based on P_EMAX of NSUR is indicated. If the uplink transmission is performed in SUR, P_CMAX_f_c determined based on P_EMAX of SUR is indicated;

>: MPE: If mpe-Reporting-FR2 is configured, and the Serving Cell operates on FR2, and if the P field is set to 1, this field indicates the applied power backoff to meet MPE requirements, as specified in TS 38.101-2 [15]. This field indicates an index to T1200 and the corresponding measured values of P-MPR levels in dB are specified in TS 38.133 [11]. The length of the field is 2 bits. If mpe-Reporting-FR2 is not configured, or if the Serving Cell operates on FR1, or if the P field is set to 0, R bits or DPC is present instead;

>: DPC: If dpc-Reporting-FR1 is configured, and the Serving Cell operates on FR1, this field indicates the $\Delta P_{PowerClass}$, as specified in TS 38.101-1[14] and TS 38.101-3 [16]. This field indicates an index to T1300 and the corresponding measured values of DPC levels in dB are specified in TS 38.133 [11], the DPC field is set to 0 if the criteria to report DPC is not met. The length of the field is 2 bits. If the Serving Cell operates on FR2, R bits or MPE is present instead.

<Multiple Entry PHR MAC CE (F1100)>

The Multiple Entry PHR MAC CE is identified by a MAC subheader with LCID.

It has a variable size, and includes the bitmap, a Type 2 PH field and an octet containing the associated $P_{CMAX,f,c}$ field (if reported) for SpCell of the other MAC entity, a Type 1 PH field and an octet containing the associated $P_{CMAX,f,c}$ field (if reported) for the PCell. It further includes, in ascending order based on the ServCellIndex, one or multiple of Type X PH fields and octets containing the associated $P_{CMAX,f,c}$ fields (if reported) for Serving Cells other than PCell indicated in the bitmap. X is either 1 or 3 according to TS 38.213 [6] and TS 36.213 [17].

The presence of Type 2 PH field for SpCell of the other MAC entity is configured by phr-Type2OtherCell with value true.

A single octet bitmap is used for indicating the presence of PH per Serving Cell when the highest ServCellIndex of Serving Cell with configured uplink is less than 8, otherwise four octets are used.

The MAC entity determines whether PH value for an activated Serving Cell is based on real transmission or a reference format by considering the configured grant(s) and downlink control information which has been received until and including the PDCCH occasion in which the first UL grant for a new transmission that can accommodate the MAC CE for PHR as a result of LCP as defined in clause 5.4.3.1 is received since a PHR has been triggered if the PHR MAC CE is reported on an uplink grant received on the PDCCH or until the first uplink symbol of PUSCH transmission minus PUSCH preparation time as defined in clause 7.7 of TS 38.213 [6] if the PHR MAC CE is reported on a configured grant.

For a band combination in which the UE does not support dynamic power sharing, the UE may omit the octets containing Power Headroom field and $P_{CMAX,f,c}$ field for Serving Cells in the other MAC entity except for the PCell in the other MAC entity and the reported values of Power Headroom and $P_{CMAX,f,c}$ for the PCell are up to UE implementation.

The PHR MAC CEs are defined as follows:

>: $C_i$: This field indicates the presence of a PH field for the Serving Cell with ServCellIndex i as specified in TS 38.331 [5]. The $C_i$ field set to 1 indicates that a PH field for the Serving Cell with ServCellIndex i is reported. The $C_i$ field set to 0 indicates that a PH field for the Serving Cell with ServCellIndex i is not reported;

>: R: Reserved bit, set to 0;

>: $DPC_{BC}$: If dpc-Reporting-FR1 is configured and at least one DPC field is not set to 0, this field indicates the $\Delta P_{PowerClass,\ CA}/\Delta P_{PowerClass,\ EN-DC}/\Delta P_{PowerClass,\ NR-DC}$, as specified in TS 38.101-1[14] and TS 38.101-3 [16], this field set to 0 indicates the delta power class for band combination is 0 dB, this field set to 1 indicates the delta power class for band combination is same or larger than 3 dB. Otherwise, R bit is present, set to 0;

>: V: This field indicates if the PH value is based on a real transmission or a reference format. For Type 1 PH, the V field set to 0 indicates real transmission on PUSCH and the V field set to 1 indicates that a PUSCH reference format is used. For Type 2 PH, the V field set to 0 indicates real transmission on PUCCH and the V field set to 1 indicates that a PUCCH reference format is used. For Type 3 PH, the V field set to 0 indicates real transmission on SRS and the V field set to 1 indicates that an SRS reference format is used. Furthermore, for Type 1, Type 2, and Type 3 PH, the V field set to 0 indicates the presence of the octet containing the associated $P_{CMAX,f,c}$ field and the MPE or DPC field, and the V field set to 1 indicates that the octet containing the associated $P_{CMAX,f,c}$ field and the MPE or DPC field is omitted;

>: Power Headroom (PH): This field indicates the power headroom level. The length of the field is 6 bits. The reported PH and the corresponding power headroom levels are shown in T1000 (the corresponding measured values in dB for the NR Serving Cell are specified in TS 38.133 [11] while the corresponding measured values in dB for the E-UTRA Serving Cell are specified in TS 36.133 [12]);

>: P: If mpe-Reporting-FR2 is configured and the Serving Cell operates on FR2, the MAC entity shall set this field to 0 if the applied P-MPR value, to meet MPE requirements, as specified in TS 38.101-2 [15], is less than P-MPR_00 as specified in TS 38.133 [11] and to 1 otherwise. If mpe-Reporting-FR2 is not configured or the Serving Cell operates on FR1, this field indicates whether power backoff is applied due to power management (as allowed by P-MPR$_c$ as specified in TS 38.101-1 [14], TS 38.101-2 [15], and TS 38.101-3 [16]). The MAC entity shall set the P field to 1 if the corresponding P$_{CMAX,f,c}$ field would have had a different value if no power backoff due to power management had been applied;

>: P$_{CMAX,f,c}$: If present, this field indicates the P$_{CMAX,f,c}$ (as specified in TS 38.213 [6]) for the NR Serving Cell and the P$_{CMAX,c}$ or P̌$_{CMAX,c}$ (as specified in TS 36.213 [17]) for the E-UTRA Serving Cell used for calculation of the preceding PH field. The reported P$_{CMAX,f,c}$ and the corresponding nominal UE transmit power levels are shown in T1100 (the corresponding measured values in dBm for the NR Serving Cell are specified in TS 38.133 [11] while the corresponding measured values in dBm for the E-UTRA Serving Cell are specified in TS 36.133 [12]); If the uplink transmission is performed in NSUR, P_CMAX_f_c determined based on P_EMAX of NSUR is indicated. If the uplink transmission is performed in SUR, P_CMAX_f_c determined based on P_EMAX of SUR is indicated;

>: MPE: If mpe-Reporting-FR2 is configured, and the Serving Cell operates on FR2, and if the P field is set to 1, this field indicates the applied power backoff to meet MPE requirements, as specified in TS 38.101-2 [15]. This field indicates an index to T1200 and the corresponding measured values of P-MPR levels in dB are specified in TS 38.133 [11]. The length of the field is 2 bits. If mpe-Reporting-FR2 is not configured, or if the Serving Cell operates on FR1, or if the P field is set to 0, R bits or DPC is present instead.

>: DPC: If dpc-Reporting-FR1 is configured, and the Serving Cell operates on FR1, this field indicates the ΔP$_{PowerClass}$, as specified in TS 38.101-1[14] and TS 38.101-3 [16]. This field indicates an index to T1300 and the corresponding measured values of DPC levels in dB are specified in TS 38.133 [11], the DPC field is set to 0 if the criteria to report DPC is not met. The length of the field is 2 bits. If the Serving Cell operates on FR2, R bits or MPE is present instead.

<Enhanced Single Entry PHR MAC CE (F1200)>

The Enhanced Single Entry PHR MAC CE is identified by a MAC subheader with eLCID. It has a variable size with following fields:

>: R: Reserved bit, set to 0;

>: Power Headroom (PH): This field indicates the power headroom level. The length of the field is 6 bits. The reported PH and the corresponding power headroom levels are shown in T1000 (the corresponding measured values in dB are specified in TS 38.133 [11]);

>: P: If mpe-Reporting-FR2 is configured and the Serving Cell operates on FR2, the MAC entity shall set this field to 0 if the applied P-MPR value, to meet MPE requirements, as specified in TS 38.101-2 [15], is less than P-MPR_00 as specified in TS 38.133 [11] and to 1 otherwise. If mpe-Reporting-FR2 is not configured or the Serving Cell operates on FR1, this field indicates whether power backoff is applied due to power management (as allowed by P-MPR$_c$ as specified in TS 38.101-1 [14], TS 38.101-2 [15], and TS 38.101-3 [16]). The MAC entity shall set the P field to 1 if the corresponding P$_{CMAX,f,c}$ field would have had a different value if no power backoff due to power management had been applied;

>: P$_{CMAX,f,c}$: This field indicates the P$_{CMAX,f,c}$ (as specified in TS 38.213 [6]) used for calculation of the preceding PH field. The reported P$_{CMAX,f,c}$ and the corresponding nominal UE transmit power levels are shown in T1100 (the corresponding measured values in dBm are specified in TS 38.133 [11]). If the uplink transmission is performed in NSUR, P_CMAX_f_c determined based on P_EMAX of NSUR is indicated. If the uplink transmission is performed in SUR, P_CMAX_f_c determined based on P_EMAX of SUR is indicated;

>: MPE: If mpe-Reporting-FR2 is configured, and the Serving Cell operates on FR2, and if the P field is set to 1, this field indicates the applied power backoff to meet MPE requirements, as specified in TS 38.101-2 [15]. This field indicates an index to T1200 and the corresponding measured values of P-MPR levels in dB are specified in TS 38.133 [11]. The length of the field is 2 bits. If mpe-Reporting-FR2 is not configured, or if the Serving Cell operates on FR1, or if the P field is set to 0, R bits are present instead;

>: B$_i$: This field indicates whether the candidate beam information identified by Resource$_i$ is present or not. If the B$_i$ field is set to 1, the first octet containing Resource$_i$ is present and if the B$_2$ field is set to 1, the second octet containing Resource$_2$ is present, and so on;

>: P$_i$: If mpe-Reporting-FR2-r17 is configured and the Serving Cell operates on FR2, the MAC entity shall set this field to 0 if the applied P-MPR value, to meet MPE requirements, as specified in TS 38.101-2 [15], is less than P-MPR_00 as specified in TS 38.133 [11] and to 1 otherwise;

>: MPE$_i$: If mpe-Reporting-FR2-r17 is configured, and the Serving Cell operates on FR2, and if the corresponding P$_i$ field is set to 1, this field indicates the applied power backoff to meet MPE requirements, as specified in TS 38.101-2 [15]. This field indicates an index to T1200 and the corresponding measured values of P-MPR levels in dB are specified in TS 38.133 [11]. The length of the field is 2 bits. If mpe-Reporting-FR2-r17 is not configured, or if the Serving Cell operates on FR1, or if the P$_i$ field is set to 0, R bits are present instead;

>: Resource$_i$: This field indicates the candidate beam identified by the number of entries in the corresponding mpe-ResourcePoolToAddModList as specified in TS 38.331 [5]. The length of this field 6 bits;

>: R: Reserved bit, set to 0.

6.1.3.49 Enhanced Multiple Entry PHR MAC CE (F1300)

The Enhanced Multiple Entry PHR MAC CE is identified by a MAC subheader with eLCID. It has a variable size with following fields:

>: $C_i$: This field indicates the presence of PH field(s) for the Serving Cell with ServCellIndex i as specified in TS 38.331 [5]. The $C_i$ field set to 1 indicates that PH field(s) for the Serving Cell with ServCellIndex i is reported. The $C_i$ field set to 0 indicates that a PH field for the Serving Cell with ServCellIndex i is not reported;

>: R: Reserved bit, set to 0;

>: V: This field indicates if the PH value is based on a real transmission or a reference format. For Type 1 PH, the V field set to 0 indicates real transmission on PUSCH and the V field set to 1 indicates that a PUSCH reference format is used. For Type 2 PH, the V field set to 0 indicates real transmission on PUCCH and the V field set to 1 indicates that a PUCCH reference format is used. For Type 3 PH, the V field set to 0 indicates real transmission on SRS and the V field set to 1 indicates that an SRS reference format is used. Furthermore, for Type 1, Type 2, and Type 3 PH, the V field set to 0 indicates the presence of the octet containing the associated $P_{CMAX,f,c}$ field and the MPE field, and the V field set to 1 indicates that the octet containing the associated $P_{CMAX,f,c}$ field and the MPE field is omitted;

>: Power Headroom (PH): This field indicates the power headroom level. The length of the field is 6 bits. The reported PH and the corresponding power headroom levels are shown in T1000 (the corresponding measured values in dB for the NR Serving Cell are specified in TS 38.133 [11] while the corresponding measured values in dB for the E-UTRA Serving Cell are specified in TS 36.133 [12]);

>: P: If mpe-Reporting-FR2 is configured and the Serving Cell operates on FR2, the MAC entity shall set this field to 0 if the applied P-MPR value, to meet MPE requirements, as specified in TS 38.101-2 [15], is less than P-MPR_00 as specified in TS 38.133 [11] and to 1 otherwise. If mpe-Reporting-FR2 is not configured or the Serving Cell operates on FR1, this field indicates whether power backoff is applied due to power management (as allowed by P-MPR$_c$ as specified in TS 38.101-1 [14], TS 38.101-2 [15], and TS 38.101-3 [16]). The MAC entity shall set the P field to 1 if the corresponding $P_{CMAX,f,c}$ field would have had a different value if no power backoff due to power management had been applied If the uplink transmission is performed in NSUR, P_CMAX_f_c determined based on P_EMAX of NSUR is indicated. If the uplink transmission is performed in SUR, P_CMAX_f_c determined based on P_EMAX of SUR is indicated;

>: $P_{CMAX,f,c}$: If present, this field indicates the $P_{CMAX,f,c}$ (as specified in TS 38.213 [6]) for the NR Serving Cell and the $P_{CMAX,c}$ or $P_{CMAX,c}$ (as specified in TS 36.213 [17]) for the E-UTRA Serving Cell used for calculation of the preceding PH field. The reported $P_{CMAX,f,c}$ and the corresponding nominal UE transmit power levels are shown in T1100 (the corresponding measured values in dBm for the NR Serving Cell are specified in TS 38.133 [11] while the corresponding measured values in dBm for the E-UTRA Serving Cell are specified in TS 36.133 [12]);

>: MPE: If mpe-Reporting-FR2 is configured, and the Serving Cell operates on FR2, and if the P field is set to 1, this field indicates the applied power backoff to meet MPE requirements, as specified in TS 38.101-2 [15]. This field indicates an index to T1200 and the corresponding measured values of P-MPR levels in dB are specified in TS 38.133 [11]. The length of the field is 2 bits. If mpe-Reporting-FR2 is not configured, or if the Serving Cell operates on FR1, or if the P field is set to 0, R bits are present instead;

>: $B_i$: This field indicates whether the candidate beam information identified by either Resource$_i$ is present or not. If the $B_1$ field is set to 1, the first octet containing Resource$_i$ is present and if the $B_2$ field is set to 1, the second octet containing Resource$_2$ is present, and so on.

>: $P_i$: If mpe-Reporting-FR2-r17 is configured and the Serving Cell operates on FR2, the MAC entity shall set this field to 0 if the applied P-MPR value, to meet MPE requirements, as specified in TS 38.101-2 [15], is less than P-MPR_00 as specified in TS 38.133 [11] and to 1 otherwise;

>: MPE$_i$: If mpe-Reporting-FR2-r17 is configured, and the Serving Cell operates on FR2, and if the corresponding P i field is set to 1, this field indicates the applied power backoff to meet MPE requirements, as specified in TS 38.101-2 [15]. This field indicates an index to T1200 and the corresponding measured values of P-MPR levels in dB are specified in TS 38.133 [11]. The length of the field is 2 bits. If mpe-Reporting-FR2-r17 is not configured, or if the Serving Cell operates on FR1, or if the $P_i$ field is set to 0, R bits are present instead;

>: Resource$_i$: This field indicates the candidate beam identified by the number of entries in the corresponding mpe-ResourcePoolToAddModList as specified in TS 38.331 [5]. The length of this field 6 bits.

>: R: Reserved bit, set to 0.

<Enhanced Single Entry PHR for Multiple TRP MAC CE (F1400)>

The Enhanced Single Entry PHR for multiple TRP MAC CE is identified by a MAC subheader with eLCID.

The two PHs together with one $P_{CMAX,f,c}$ for the Serving Cell are reported if UE is configured with twoPHRMode with the multiple TRP PUSCH repetition feature is configured.

It has a fixed size and consists of three octets defined as follows (Figure 6.1.3.50-1):

>: R: Reserved bit, set to 0;

>: Power Headroom i (PH i): This field indicates the power headroom level, where PH 1 is associated with the SRS-ResourceSet with a lower srs-ResourceSetId and PH 2 is associated with the SRS-ResourceSet with a higher srs-ResourceSetId. PH fields for a Serving Cell are included in ascending order based on i. The length of the field is 6 bits. The reported PH and the corresponding power headroom levels are shown in T1000 (the corresponding measured values in dB are specified in TS 38.133 [11]);

>: P: If mpe-Reporting-FR2 is configured and the Serving Cell operates on FR2, the MAC entity shall set this field to 0 if the applied P-MPR value, to meet MPE requirements, as specified in TS 38.101-2 [15], is less than P-MPR_00 as specified in TS 38.133 [11] and to 1 otherwise. If mpe-Reporting-FR2 is not configured or the Serving Cell operates on FR1, this field indicates whether power backoff is applied due to power management (as allowed by P-MPRc as specified in TS 38.101-1 [14], TS 38.101-2 [15], and TS 38.101-3 [16]). The MAC entity shall set the P field to 1 if the corresponding $P_{CMAX,f,c}$ field would have had a different value if no power backoff due to power management had been applied;

>: V: This field indicates if the PH value for the corresponding TRP is based on a real transmission or a reference format. For Type 1 PH, the V field set to 0 indicates real transmission on PUSCH and the V field set to 1 indicates that a PUSCH reference format is used;

>: $P_{CMAX,f,c}$: This field indicates the $P_{CMAX,f,c}$ (as specified in TS 38.213 [6]) used for calculation of the preceding PH fields. The reported $P_{CMAX,f,c}$ and the corresponding nominal UE transmit power levels are shown in T1100 (the corresponding measured values in dBm are specified in TS 38.133 [11]) If the uplink transmission is performed in NSUR, P_CMAX_f_c determined based on P_EMAX of NSUR is indicated. If the uplink transmission is performed in SUR, P_CMAX_f_c determined based on P_EMAX of SUR is indicated;

>: MPE: If mpe-Reporting-FR2 is configured, and the Serving Cell operates on FR2, and if the P field is set to 1, this field indicates the applied power backoff to meet MPE requirements, as specified in TS 38.101-2 [15]. This field indicates an index to T1200 and the corresponding measured values of P-MPR levels in dB are specified in TS 38.133 [11]. The length of the field is 2 bits. If mpe-Reporting-FR2 is not configured, or if the Serving Cell operates on FR1, or if the P field is set to 0, R bits are present instead.

6.1.3.51 Enhanced Multiple Entry PHR for Multiple TRP MAC CE (F1500)

The Enhanced Multiple Entry PHR for multiple TRP MAC CE is identified by a MAC subheader with eLCID.

It has a variable size, and includes the bitmaps, a Type 2 PH field and an octet containing the associated $P_{CMAX,f,c}$ field (if reported) for SpCell of the other MAC entity, one or multiple Type 1 PH field and an octet containing the associated $P_{CMAX,f,c}$ field (if reported) for the PCell. It further includes, in ascending order based on the ServCellIndex, one or multiple of Type X PH fields and octets containing the associated $P_{CMAX,f,c}$ fields (if reported) for Serving Cells other than PCell indicated in the bitmap for indicating the presence of PH(s). X is either 1 or 3 according to TS 38.213 [6] and TS 36.213 [17].

The presence of Type 2 PH field for SpCell of the other MAC entity is configured by phr-Type2OtherCell with value true.

A single octet bitmap is used for indicating the presence of PH(s) per Serving Cell when the highest ServCellIndex of Serving Cell with configured uplink is less than 8, otherwise four octets are used.

The MAC entity determines whether PH value for an activated Serving Cell is based on real transmission or a reference format by considering the configured grant(s) and downlink control information which has been received until and including the PDCCH occasion in which the first UL grant for a new transmission that can accommodate the MAC CE for PHR as a result of LCP as defined in clause 5.4.3.1 is received since a PHR has been triggered if the PHR MAC CE is reported on an uplink grant received on the PDCCH or until the first uplink symbol of PUSCH transmission minus PUSCH preparation time as defined in clause 7.7 of TS 38.213 [6] if the PHR MAC CE is reported on a configured grant.

For a band combination in which the UE does not support dynamic power sharing, the UE may omit the octets containing Power Headroom field and $P_{CMAX,f,c}$ field for Serving Cells in the other MAC entity except for the PCell in the other MAC entity and the reported values of Power Headroom and $P_{CMAX,f,c}$ for the PCell are up to UE implementation.

The two PHs together with one $P_{CMAX,f,c}$ for the Serving Cell configured with the multiple TRP PUSCH repetition feature are reported as specified in clause 5.4.6.

The Enhanced Multiple Entry PHR for multiple TRP MAC CEs are defined as follows:

>: $C_i$: This field indicates the presence of PH field(s) for the Serving Cell with ServCellIndex i as specified in TS 38.331 [5]. The $C_i$ field set to 1 indicates that PH field(s) for the Serving Cell with ServCellIndex i is reported. The $C_i$ field set to 0 indicates that a PH field for the Serving Cell with ServCellIndex i is not reported;

>: R: Reserved bit, set to 0;

>: V: This field indicates if the PH value is based on a real transmission or a reference format. For Type 1 PH, the V field set to 0 indicates real transmission on PUSCH and the V field set to 1 indicates that a PUSCH reference format is used. For Type 2 PH, the V field set to 0 indicates real transmission on PUCCH and the V field set to 1 indicates that a PUCCH reference format is used. For Type 3 PH, the V field set to 0 indicates real transmission on SRS and the V field set to 1 indicates that an SRS reference format is used. Furthermore, for Type 1, Type 2, and Type 3 PH, the V field set to 0 indicates the presence of the octet containing the associated $P_{CMAX,f,c}$ field and the MPE field, and all of the V field(s) for the Serving Cell set to 1 indicates that the octet containing the associated $P_{CMAX,f,c}$ field and the MPE field is omitted;

>: Power Headroom i (PH i): This field indicates the power headroom level, where PH 1 is associated with the SRS-ResourceSet with a lower srs-ResourceSetId and PH 2 is associated with the SRS-ResourceSet with a higher srs-ResourceSetId. PH fields for a Serving Cell are included in ascending order based on i. The length of the field is 6 bits. The reported PH and the corresponding power headroom levels are shown in T1000 (the corresponding measured values in dB for the NR Serving Cell are specified in TS 38.133 [11] while the corresponding measured values in dB for the E-UTRA Serving Cell are specified in TS 36.133 [12]);

>: P: If mpe-Reporting-FR2 is configured and the Serving Cell operates on FR2, the MAC entity shall set this field to 0 if the applied P-MPR value, to meet MPE requirements, as specified in TS 38.101-2 [15], is less than P-MPR_00 as specified in TS 38.133 [11] and to 1 otherwise. If mpe-Reporting-FR2 is not configured or the Serving Cell operates on FR1, this field indicates whether power backoff is applied due to power management (as allowed by P-MPRc as specified in TS 38.101-1 [14], TS 38.101-2 [15], and TS 38.101-3 [16]). The MAC entity shall set the P field to 1 if the corresponding $P_{CMAX,f,c}$ field would have had a different value if no power backoff due to power management had been applied;

>: $P_{CMAX,f,c}$: If present, this field indicates the $P_{CMAX,f,c}$ (as specified in TS 38.213 [6]) for the NR Serving Cell and the $P_{CMAX,c}$ or $\tilde{P}_{CMAX,c}$ (as specified in TS 36.213 [17]) for the E-UTRA Serving Cell used for calculation of the preceding PH field. The reported $P_{CMAX,f,c}$ and the corresponding nominal UE transmit power levels are shown in T1100 (the corresponding measured values in dBm for the NR Serving Cell are specified in TS 38.133 [11] while the corresponding measured values in dBm for the E-UTRA Serving Cell are specified in TS 36.133 [12]). If the uplink transmission is performed in NSUR, P_CMAX_f_c determined based on P_EMAX of NSUR is indicated. If the uplink transmission is performed in SUR, P_CMAX_f_c determined based on P_EMAX of SUR is indicated;

>: MPE: If mpe-Reporting-FR2 is configured, and the Serving Cell operates on FR2, and if the P field is set to 1, this field indicates the applied power backoff to meet MPE requirements, as specified in TS 38.101-2 [15]. This field indicates an index to T1200 and the corresponding measured values of P-MPR levels in dB are specified in TS 38.133 [11]. The length of the field is 2 bits. If mpe-Reporting-FR2 is not configured, or if the Serving Cell operates on FR1, or if the P field is set to 0, R bits are present instead <Single Entry PHR with Assumed PUSCH MAC CE (F1600)>

The Single Entry PHR with assumed PUSCH MAC CE is identified by a MAC subheader with eLCID.

It has a variable size and consists of two or three octets defined as follows:

>: R: Reserved bit, set to 0;

>: Power Headroom (PH): This field indicates the power headroom level. The length of the field is 6 bits. The reported PH and the corresponding power headroom levels are shown in T1000 (the corresponding measured values in dB are specified in TS 38.133 [11]);

>: E: This field indicates the presence of a $P_{CMAX,f,c}$ for assumed PUSCH field for PCell. The E field set to 1 indicates that a $P_{CMAX,f,c}$ for assumed PUSCH field for PCell is reported. The E field set to 0 indicates that a $P_{CMAX,f,c}$ for assumed PUSCH field for PCell is not reported;

>: P: If mpe-Reporting-FR2 is configured and the Serving Cell operates on FR2, the MAC entity shall set this field to 0 if the applied P-MPR value, to meet MPE requirements, as specified in TS 38.101-2 [15], is less than P-MPR_00 as specified in TS 38.133 [11] and to 1 otherwise. If mpe-Reporting-FR2 is not configured or the Serving Cell operates on FR1, this field indicates whether power backoff is applied due to power management (as allowed by $P\text{-}MPR_c$ as specified in TS 38.101-1 [14], TS 38.101-2 [15], and TS 38.101-3 [16]). The MAC entity shall set the P field to 1 if the corresponding $P_{CMAX,f,c}$ field would have had a different value if no power backoff due to power management had been applied;

>: $P_{CMAX,f,c}$: This field indicates the $P_{CMAX,f,c}$ (as specified in TS 38.213 [6]) used for calculation of the preceding PH field. The reported $P_{CMAX,f,c}$ and the corresponding nominal UE transmit power levels are shown in T1100 (the corresponding measured values in dBm are specified in TS 38.133 [11]). If the uplink transmission is performed in NSUR, P_CMAX_f_c determined based on P_EMAX of NSUR is indicated. If the uplink transmission is performed in SUR, P_CMAX_f_c determined based on P_EMAX of SUR is indicated;

>: $P_{CMAX,f,c}$ for assumed PUSCH: This field indicates the $P_{CMAX,f,c}$ for assumed PUSCH (as specified in TS 38.213 [6]). The reported $P_{CMAX,f,c}$ and the corresponding nominal UE transmit power levels are shown in [T1100](the corresponding measured values in dBm are specified in TS 38.133 [11]). If the uplink transmission is assumed in NSUR, P_CMAX_f_c determined based on P_EMAX of NSUR is indicated. If the uplink transmission is assumed in SUR, P_CMAX_f_c determined based on P_EMAX of SUR is indicated;

>: MPE: If mpe-Reporting-FR2 is configured, and the Serving Cell operates on FR2, and if the P field is set to 1, this field indicates the applied power backoff to meet MPE requirements, as specified in TS 38.101-2 [15]. This field indicates an index to T1200 and the corresponding measured values of P-MPR levels in dB are specified in TS 38.133 [11]. The length of the field is 2 bits. If mpe-Reporting-FR2 is not configured, or if the Serving Cell operates on FR1, or if the P field is set to 0, R bits are present instead.

<Multiple Entry PHR with Assumed PUSCH MAC CE (F1700)>

The Multiple Entry PHR with assumed PUSCH MAC CE is identified by a MAC subheader with eLCID.

It has a variable size, and includes the bitmap, a Type 2 PH field, an octet containing the associated $P_{CMAX,f,c}$ field (if reported) and an octet containing the associated $P_{CMAX,f,c}$ field for assumed PUSCH (if reported) for SpCell of the other MAC entity; a Type 1 PH field, an octet containing the associated $P_{CMAX,f,c}$ field (if reported) and an octet containing the associated $P_{CMAX,f,c}$ field for assumed PUSCH (if reported) for the PCell. It further includes, in ascending order based on the ServCellIndex, one or multiple of Type X PH fields, octets containing the associated $P_{CMAX,f,c}$ fields (if reported) and octets containing the associated $P_{CMAX,f,c}$ fields for assumed PUSCH (if reported) for Serving Cells other than PCell indicated in the bitmap. X is either 1 or 3 according to TS 38.213 [6] and TS 36.213 [17].

The presence of Type 2 PH field for SpCell of the other MAC entity is configured by phr-Type2OtherCell with value true.

A single octet $C_i$ bitmap is used for indicating the presence of PH per Serving Cell when the highest ServCellIndex of Serving Cell with configured uplink is less than 8, otherwise four octets are used.

The length of the $E_k$ bitmap is based on the total number of Serving Cells, i.e. Serving Cells for which $C_i$ field set to 1 and PCell. A single octet $E_k$ bitmap is included if the total number of Serving Cells is greater than 0 and less than 9; a two octets $E_k$ bitmap is included if the total number of Serving Cells is greater than 8 and less than 17; a three octets $E_k$ bitmap is included if the total number of Serving Cells is greater than 16 and less than 25; a four octets $E_k$ bitmap is included if the total number of Serving Cells is greater than 24; $E_k$ bitmap is not included if the total number of Serving Cells is zero.

The MAC entity determines whether PH value for an activated Serving Cell is based on real transmission or a reference format by considering the configured grant(s) and downlink control information which has been received until and including the PDCCH occasion in which the first UL grant for a new transmission that can accommodate the MAC CE for PHR as a result of LCP as defined in clause 5.4.3.1 is received since a PHR has been triggered if the PHR MAC CE is reported on an uplink grant received on the PDCCH or until the first uplink symbol of PUSCH transmission minus PUSCH preparation time as defined in clause 7.7 of TS 38.213 [6] if the PHR MAC CE is reported on a configured grant.

For a band combination in which the UE does not support dynamic power sharing, the UE may omit the octets containing Power Headroom field and $P_{CMAX,f,c}$ field for Serving Cells in the other MAC entity except for the PCell in the other MAC entity and the reported values of Power Headroom and $P_{CMAX,f,c}$ for the PCell are up to UE implementation.

The PHR MAC CEs are defined as follows:

>: $C_i$: This field indicates the presence of a PH field for the Serving Cell with ServCellIndex i as specified in TS 38.331 [5]. The $C_i$ field set to 1 indicates that a PH field for the Serving Cell with ServCellIndex i is reported. The $C_i$ field set to 0 indicates that a PH field for the Serving Cell with ServCellIndex i is not reported;

>: $E_k$: This field indicates the presence of a $P_{CMAX,f,c}$ for assumed PUSCH field of the $k^{th}$ Serving Cell. The Serving Cells for which $C_i$ field is set to 1 and PCell are indexed sequentially starting with PCell and followed by other Serving cells in ascending order of ServCellIndex i as specified in TS 38.331 [5]. The $E_k$ field set to 1 indicates that a $P_{CMAX,f,c}$ for assumed PUSCH field for the $k^{th}$ Serving Cell is reported. The $E_k$ field set to 0 indicates that a $P_{CMAX,f,c}$ for assumed PUSCH field for the $k^{th}$ Serving Cell is not reported. For the E-UTRA Serving Cell, the corresponding $E_k$ field is set to 0;

>: R: Reserved bit, set to 0;

>: V: This field indicates if the PH value is based on a real transmission or a reference format. For Type 1 PH, the V field set to 0 indicates real transmission on PUSCH and the V field set to 1 indicates that a PUSCH reference format is used. For Type 2 PH, the V field set to 0 indicates real transmission on PUCCH and the V field set to 1 indicates that a PUCCH reference format is used. For Type 3 PH, the V field set to 0 indicates real transmission on SRS and the V field set to 1 indicates that an SRS reference format is used. Furthermore, for Type 1, Type 2, and Type 3 PH, the V field set to 0 indicates the presence of the octet containing the associated $P_{CMAX,f,c}$ field and the MPE field, and the V field set to 1 indicates that the octet containing the associated $P_{CMAX,f,c}$ field and the MPE field is omitted;

>: Power Headroom (PH): This field indicates the power headroom level. The length of the field is 6 bits. The reported PH and the corresponding power headroom levels are shown in T1000 (the corresponding measured values in dB for the NR Serving Cell are specified in TS 38.133 [11] while the corresponding measured values in dB for the E-UTRA Serving Cell are specified in TS 36.133 [12]);

>: P: If mpe-Reporting-FR2 is configured and the Serving Cell operates on FR2, the MAC entity shall set this field to 0 if the applied P-MPR value, to meet MPE requirements, as specified in TS 38.101-2 [15], is less than P-MPR_00 as specified in TS 38.133 [11] and to 1 otherwise. If mpe-Reporting-FR2 is not configured or the Serving Cell operates on FR1, this field indicates whether power backoff is applied due to power management (as allowed by P-MPR$_c$ as specified in TS 38.101-1 [14], TS 38.101-2 [15], and TS 38.101-3 [16]). The MAC entity shall set the P field to 1 if the corresponding $P_{CMAX,f,c}$ field would have had a different value if no power backoff due to power management had been applied;

>: $P_{CMAX,f,c}$: If present, this field indicates the $P_{CMAX,f,c}$ (as specified in TS 38.213 [6]) for the NR Serving Cell and the $P_{CMAX,c}$ or $P_{CMAX,c}$ (as specified in TS 36.213 [17]) for the E-UTRA Serving Cell used for calculation of the preceding PH field. The reported $P_{CMAX,f,c}$ and the corresponding nominal UE transmit power levels are shown in T1100 (the corresponding measured values in dBm for the NR Serving Cell are specified in TS 38.133 [11] while the corresponding measured values in dBm for the E-UTRA Serving Cell are specified in TS 36.133 [12]). If the uplink transmission is performed in NSUR, P_CMAX_f_c determined based on P_EMAX of NSUR is indicated. If the uplink transmission is performed in SUR, P_CMAX_f_c determined based on P_EMAX of SUR is indicated;

>: $P_{CMAX,f,c}$ for assumed PUSCH: If present, this field indicates the $P_{CMAX,f,c}$ for assumed PUSCH (as specified in TS 38.213 [6]) for the NR Serving Cell. The reported $P_{CMAX,f,c}$ and the corresponding nominal UE transmit power levels are shown in [T1100](the corresponding measured values in dBm for the NR Serving Cell are specified in TS 38.133 [11];

>: MPE: If mpe-Reporting-FR2 is configured, and the Serving Cell operates on FR2, and if the P field is set to 1, this field indicates the applied power backoff to meet MPE requirements, as specified in TS 38.101-2 [15]. This field indicates an index to T1200 and the corresponding measured values of P-MPR levels in dB are specified in TS 38.133 [11]. The length of the field is 2 bits. If mpe-Reporting-FR2 is not configured, or if the Serving Cell operates on FR1, or if the P field is set to 0, R bits are present instead.

<Enhanced Single Entry PHR for Multiple TRP STx2P MAC CE (F1800)>

The Enhanced Single Entry PHR for multiple TRP STx2P MAC CE is identified by a MAC subheader with eLCID.

The two PHs together with two $P_{CMAX,f,c,k}$ for the Serving Cell are reported if UE is configured with twoPHRMode and multipanelSchemeSDM or multipanelSchemeSFN, as specified in clause 5.4.6.

It has a fixed size and consists of four octets defined as follows (Figure 6.1.3.81-1):

>: R: Reserved bit, set to 0;

>: Power Headroom k (PH k): This field indicates the power headroom level for k=1, 2, where PH 1 is associated with the first TCI-State or TCI-UL-State for a real or reference PUSCH transmission and PH 2 is associated with the second TCI-State or TCI-UL-State for a real or reference PUSCH transmission, as specified in TS 38.213 clause 7.7.1 [6]. PH fields for a Serving Cell are included in ascending order based on k. The length of the field is 6 bits. The reported PH and the corresponding power headroom levels are shown in T1000 (the corresponding measured values in dB are specified in TS 38.133 [11]);

>: $P_k$: If mpe-Reporting-FR2 is configured and the Serving Cell operates on FR2, the MAC entity shall set this field to 0 if the applied P-MPR value associated with $P_{CMAX,f,c,k}$, to meet MPE requirements, as specified in TS 38.101-2 [15], is less than P-MPR_00 as specified in TS 38.133 [11] and to 1 otherwise. If mpe-Reporting-FR2 is not configured or the Serving Cell operates on FR1, this field indicates whether power backoff is applied due to power management (as allowed by P-MPRc as specified in TS 38.101-1 [14], TS 38.101-2 [15], and TS 38.101-3 [16]). The MAC entity shall set the $P_k$ field to 1 if the corresponding $P_{CMAX,f,c,k}$ field would have had a different value if no power backoff due to power management had been applied;

>: $V_k$: This field indicates if the PH k value is based on a real transmission or a reference format for k=1, 2. For Type 1 PH, the $V_k$ field set to 0 indicates real transmission on PUSCH and the $V_k$ field set to 1 indicates that a PUSCH reference format is used;

>: $P_{CMAX,f,c,k}$: This field indicates the configured transmitted power $P_{CMAX,f,c,k}$ (as specified in TS 38.213 [6]) used for calculation of the preceding PH k field. The reported $P_{CMAX,f,c,k}$ and the corresponding nominal UE transmit power levels are shown in T1100 (the corresponding measured values in dBm are specified in TS 38.133 [11]); If the uplink transmission is performed in NSUR, P_CMAX_f_c determined based on P_EMAX of NSUR is indicated. If the uplink transmission is performed in SUR, P_CMAX_f_c determined based on P_EMAX of SUR is indicated;

>: $MPE_k$: If mpe-Reporting-FR2 is configured, and the Serving Cell operates on FR2, and if the $P_k$ field is set to 1, this field indicates the applied power backoff to meet MPE requirements, as specified in TS 38.101-2 [15]. This field indicates an index to T1200 and the corresponding measured values of P-MPR levels in dB are specified in TS 38.133 [11]. The length of the field is 2 bits. If mpe-Reporting-FR2 is not configured, or if the Serving Cell operates on FR1, or if the $P_k$ field is set to 0, R bits are present instead.

<Enhanced Multiple Entry PHR for Multiple TRP STx2P MAC CE (F1900)>

The Enhanced Multiple Entry PHR for multiple TRP STx2P MAC CE is identified by a MAC subheader with eLCID.

It has a variable size, and includes the bitmaps, a Type 2 PH field and an octet containing the associated $P_{CMAX,f,c}$ field (if reported) for SpCell of the other MAC entity, one or multiple Type 1 PH fields and one or multiple octets containing the associated $P_{CMAX,f,c,k}$ fields (if reported) for the PCell. It further includes, in ascending order based on the ServCellIndex, one or multiple of Type 1 PH fields and one or multiple octets containing the associated $P_{CMAX,f,c,k}$ fields (if reported) or one Type 3 PH field with one octet containing the associated $P_{CMAX,f,c}$ field (if reported) for Serving Cells other than PCell indicated in the bitmap for indicating the presence of PH(s).

The presence of Type 2 PH field for SpCell of the other MAC entity is configured by phr-Type2OtherCell with value true.

A single octet bitmap is used for indicating the presence of PH(s) per Serving Cell when the highest ServCellIndex of Serving Cell with configured uplink is less than 8, otherwise four octets are used.

The MAC entity determines whether PH value for an activated Serving Cell is based on real transmission or a reference format by considering the configured grant(s) and downlink control information which has been received until and including the PDCCH occasion in which the first UL grant for a new transmission that can accommodate the MAC CE for PHR as a result of LCP as defined in clause 5.4.3.1 is received since a PHR has been triggered if the PHR MAC CE is reported on an uplink grant received on the PDCCH or until the first uplink symbol of PUSCH transmission minus PUSCH preparation time as defined in clause 7.7 of TS 38.213 [6] if the PHR MAC CE is reported on a configured grant.

For a band combination in which the UE does not support dynamic power sharing, the UE may omit the octets containing Power Headroom field and $P_{CMAX,f,c,k}$ field for Serving Cells in the other MAC entity except for the PCell in the other MAC entity and the reported values of Power Headroom and $P_{CMAX,f,c,k}$ for the PCell are up to UE implementation.

The two PHs together with two $P_{CMAX,f,c,k}$ for the Serving Cell configured with multipanelSchemeSDM or multipanelSchemeSFN are reported if the MAC entity is configured with twoPHRMode, as specified in clause 5.4.6.

The Enhanced Multiple Entry PHR for multiple TRP STx2P MAC CEs are defined as follows:

>: $C_i$: This field indicates the presence of PH field(s) for the Serving Cell with ServCellIndex i as specified in TS 38.331 [5]. The $C_i$ field set to 1 indicates that PH field(s) for the Serving Cell with ServCellIndex i is reported. The $C_i$ field set to 0 indicates that a PH field for the Serving Cell with ServCellIndex i is not reported;

>: R: Reserved bit, set to 0;

>: $V_k$: This field indicates if the PH k value is based on a real transmission or a reference format for k=1, 2. For Type 1 PH, the $V_k$ field set to 0 indicates real transmission on PUSCH and the $V_k$ field set to 1 indicates that a PUSCH reference format is used. For Type 2 PH, the $V_k$ field set to 0 indicates real transmission on PUCCH and the $V_k$ field set to 1 indicates that a PUCCH reference format is used. For Type 3 PH, the $V_k$ field set to 0 indicates real transmission on SRS and the $V_k$ field set to 1 indicates that an SRS reference format is used. Furthermore, for type 1 PH of a reported Serving Cell not configured with multipanel-SchemeSDM or multipanelSchemeSFN, the $V_k$ field set to 0 indicates the presence of the octet containing the associated $P_{CMAX,f,c,k}$ field and the $MPE_k$ field, and the $V_k$ field set to 1 indicates that the octet containing the associated $P_{CMAX,f,c,k}$ field and $MPE_k$ field is omitted; for Type 2, and Type 3 PH, the $V_k$ field set to 0 indicates the presence of the octet containing the associated $P_{CMAX,f,c,k}$ field and the $MPE_k$ field, and the $V_k$ field for the Serving Cell set to 1 indicates that the octet containing the associated $P_{CMAX,f,c,k}$ field and the $MPE_k$ field is omitted;

>: Power Headroom k (PH k): This field indicates the power headroom level. For PHR with twoPHRmode, if the Serving cell is configured with multipanel-SchemeSFN or multipanelSchemeSDM, PH 1 is associated with the first TCI-State or TCI-UL-State for a real or reference PUSCH transmission and PH 2 is associated with the second TCI-State or TCI-UL-State for a real or reference PUSCH transmission, as specified in TS 38.213 clause 7.7.1 [6]; if the Serving cell is configured with multiple TRP PUSCH repetition, PH 1 is associated with the SRS-ResourceSet with a lower srs-ResourceSetId and PH 2 is associated with the SRS-ResourceSet with a higher srs-ResourceSetId. PH fields for a Serving Cell are included in ascending order based on k. The length of the field is 6 bits. The reported PH and the corresponding power headroom levels are shown in T1000 (the corresponding measured values in dB for the NR Serving Cell are specified in TS 38.133 [11] while the corresponding measured values in dB for the E-UTRA Serving Cell are specified in TS 36.133 [12]);

>: $P_k$: If mpe-Reporting-FR2 is configured and the Serving Cell operates on FR2, the MAC entity shall set this field to 0 if the applied P-MPR value associated with $P_{CMAX,f,c,k}$, to meet MPE requirements, as specified in TS 38.101-2 [15], is less than P-MPR_00 as specified in TS 38.133 [11] and to 1 otherwise. If mpe-Reporting-FR2 is not configured or the Serving Cell operates on FR1, this field indicates whether power backoff is applied due to power management (as allowed by P-MPRc as specified in TS 38.101-1 [14], TS 38.101-2 [15], and TS 38.101-3 [16]). The MAC entity shall set the $P_k$ field to 1 if the corresponding $P_{CMAX,f,c,k}$ field would have had a different value if no power backoff due to power management had been applied;

>: $P_{CMAX,f,c}$, $P_{CMAX,f,c,k}$: If present, this field indicates the configured transmitted power $P_{CMAX,f,c,k}$ (as specified in TS 38.213 [6]) for the NR Serving Cell and the $P_{CMAX,c}$ or $\tilde{P}_{CMAX,c}$ (as specified in TS 36.213 [17]) for the E-UTRA Serving Cell used for calculation of the preceding PH k field. For the SpCell of the other MAC entity and a reported Serving Cell not configured with multipanelSchemeSDM or multipanelSchemeSFN, $P_{CMAX,f,c}$ is presented (i.e., the index k is omitted). The reported $P_{CMAX,f,c,k}$ and the corresponding nominal UE transmit power levels are shown in T1100 (the corresponding measured values in dBm for the NR Serving Cell are specified in TS 38.133 [11] while the corresponding measured values in dBm for the E-UTRA Serving Cell are specified in TS 36.133 [12]); If the uplink transmission is performed in NSUR, P_CMAX_f_c determined based on P_EMAX of NSUR is indicated. If the uplink transmission is performed in SUR, P_CMAX_f_c determined based on P_EMAX of SUR is indicated;

>: $MPE_k$: If mpe-Reporting-FR2 is configured, and the Serving Cell operates on FR2, and if the $P_k$ field is set to 1, this field indicates the applied power backoff to meet MPE requirements, as specified in TS 38.101-2 [15]. This field indicates an index to T1200 and the corresponding measured values of P-MPR levels in dB are specified in TS 38.133 [11]. The length of the field is 2 bits. If mpe-Reporting-FR2 is not configured, or if the Serving Cell operates on FR1, or if the $P_k$ field is set to 0, R bits are present instead.

TDRA

Time domain resource assignment in DCI –0_x is 4 bit. It indicates an entry of pusch-TimeDomainAllocationList provided in pusch-ConfigCommon.

else

SLIV=14·(14−L+1)+(14−1−S)

where 0<L≤14−S

<Format 2_2>

DCI format 2_2 is used for the transmission of TPC commands for PUCCH and PUSCH.

The following information is transmitted by means of the DCI format 2_2 with CRC scrambled by TPC-PUSCH-RNTI or TPC-PUCCH-RNTI:

>: block number 1, block number 2, . . . , block number N

The parameter tpc-PUSCH or tpc-PUCCH provided by higher layers determines the index to the block number for an UL of a cell, with the following fields defined for each block:

>: Closed loop indicator—0 or 1 bit. It can indicates whether corresponding TPC command is for NSUR or for SUR. If it is 0, TPC command is for NSUR. If it is 1, TPC command is for SUR.

>>: For DCI format 2_2 with TPC-PUSCH-RNTI, 0 bit if the UE is not configured with high layer parameter twoPUSCH-PC-AdjustmentStates, in which case UE assumes each block in the DCI format 2_2 is of 2 bits; 1 bit otherwise, in which case UE assumes each block in the DCI format 2_2 is of 3 bits;

>>: For DCI format 2_2 with TPC-PUCCH-RNTI, 0 bit if the UE is not configured with high layer parameter twoPUCCH-PC-AdjustmentStates, in which case UE assumes each block in the DCI format 2_2 is of 2 bits;

```
PUSCH-TimeDomainResourceAllocation ::= SEQUENCE {
    k2                  INTEGER(0..32)              OPTIONAL, -- Need S
    mappingType         ENUMERATED {typeA, typeB},
    startSymbolAndLength                            INTEGER (0..127)
}
``` k2: Corresponds to L1 parameter 'K2' (see TS 38.214 [19], clause 6.1.2.1). When the field is absent the UE applies the value 1 when PUSCH SCS is 15/30 kHz; the value 2 when PUSCH SCS is 60 kHz, and the value 3 when PUSCH SCS is 120 kHz. k2 is absent/ignored if extended K2 is present.

startSymbolAndLength: An index giving valid combinations of start symbol and length (jointly encoded) as start and length indicator (SLIV).

For PUSCH repetition Type A and TB processing over multiple slots, the starting symbol S relative to the start of the slot, and the number of consecutive symbols L counting from the symbol S allocated for the PUSCH are determined from the start and length indicator SLIV of the indexed row:

1 bit otherwise, in which case UE assumes each block in the DCI format 2_2 is of 3 bits;

>: TPC command –2 bits

The number of information bits in format 2_2 shall be equal to or less than the payload size of format 1_0 monitored in common search space in the same serving cell. If the number of information bits in format 2_2 is less than the payload size of format 1_0 monitored in common search space in the same serving cell, zeros shall be appended to format 2_2 until the payload size equals that of format 1_0 monitored in common search space in the same serving cell.

TPC-PUSCH-RNTI and TPC-PUCCH-RNTI are configured by RRCReconfiguration message.

| tpc-PUCCH-RNTI | RNTI-Value | OPTIONAL, | -- Need R |
|---|---|---|---|
| tpc-PUSCH-RNTI | RNTI-Value | OPTIONAL, | -- Need R | if ((L−1)≤7 then

SLIV=14·(L−1)+S

The IE RNTI-Value represents a Radio Network Temporary Identity.

```
RNTI-Value ::=                          INTEGER (0..65535)
tpc-PUSCH or tpc-PUCCH are configured by RRCReconfiguration message.
    tpc-PUSCH               SetupRelease   {   PUSCH-TPC-CommandConfig   }
OPTIONAL,       -- Need M
```

-continued

```
    tpc-PUCCH          SetupRelease      {    PUCCH-TPC-CommandConfig      }
OPTIONAL,      -- Need M
```

The IE PUSCH-TPC-CommandConfig is used to config-ure the UE for extracting TPC commands for PUSCH from a group-TPC messages on DCI.

```
PUSCH-TPC-CommandConfig ::=            SEQUENCE {
    tpc-Index      INTEGER (1..15)      OPTIONAL,      -- Cond SUL
    tpc-IndexSUL INTEGER (1..15)        OPTIONAL,      -- Cond SUL-Only
    targetCell      ServCellIndex      OPTIONAL,      -- Need S
    tpc-Index-SUR      INTEGER (1..15)        OPTIONAL,      -- Cond SUR-only
    ...
    }
``` targetCell: The serving cell to which the acquired power control commands are applicable. If the value is absent, the UE applies the TPC commands to the serving cell on which the command has been received.

tpc-Index: An index determining the position of the first bit of TPC command for NSUR inside the DCI format 2-2 payload.

tpc-IndexSUL: An index determining the position of the first bit of TPC command for NSUR inside the DCI format 2-2 payload.

tpc-Index-SUR: An index determining the position of the first bit of TPC command for SNSUR inside the DCI format 2-2 payload.

The IE PUCCH-TPC-CommandConfig is used to config-ure the UE for extracting TPC commands for PUCCH from a group-TPC messages on DCI.

```
PUCCH-TPC-CommandConfig ::=            SEQUENCE {
    tpc-IndexPCell                            INTEGER (1..15)
    tpc-IndexPUCCH-SCell                      INTEGER (1..15)
    tpc-IndexPUCCH-sSCell-r17          INTEGER (1..15)
    tpc-IndexPUCCH-sScellSecondaryPUCCHgroup-r17      INTEGER (1..15)
    tpc-IndexPCell-SUR                        INTEGER (1..15)
    tpc-IndexPUCCH-SCell-SUR                      INTEGER (1..15)
    tpc-IndexPUCCH-sSCell-SUR          INTEGER (1..15)
    tpc-IndexPUCCH-sScellSecondaryPUCCHgroup-SUR      INTEGER (1..15)
``` tpc-IndexPUCCH-sScellSecondaryPUCCHgroup-SUR INTEGER (1..15)

tpc-IndexPCell: An index determining the position of the first bit of TPC command (applicable to the SpCell) for NSUR inside the DCI format 2-2 payload.

tpc-IndexPUCCH-Scell: An index determining the posi-tion of the first bit of TPC command (applicable to the PUCCH SCell) for NSUR inside the DCI format 2-2 pay-load.

tpc-IndexPUCCH-sSCell, tpc-IndexPUCCH-sSCellSec-ondaryPUCCHgroup: An index determining the position of the first bit of TPC command for NSUR (applicable to the alternative PUCCH cell for PUCCH cell switching) inside the DCI format 2-2 payload, for the primary PUCCH group and the secondary PUCCH group respectively.

tpc-IndexPCell-SUR: An index determining the position of the first bit of TPC command (applicable to the SpCell) for SUR inside the DCI format 2-2 payload.

tpc-IndexPUCCH-Scell-SUR: An index determining the position of the first bit of TPC command (applicable to the PUCCH SCell) for SUR inside the DCI format 2-2 payload.

tpc-IndexPUCCH-sSCell-SUR, tpc-IndexPUCCH-sS-CellSecondaryPUCCHgroup-SUR: An index determining the position of the first bit of TPC command for SUR (applicable to the alternative PUCCH cell for PUCCH cell switching) inside the DCI format 2-2 payload, for the primary PUCCH group and the secondary PUCCH group respectively.

PUSCH PC Adjustment

>: For the PUSCH power control adjustment state $f\_(b, f,c)$ $(i,l)$ for active UL BWP b of carrier f of serving cell c in PUSCH transmission occasion i >: $\delta\_(PUSCH,b,f,c)$ $(i,l)$ is a TPC command value included in a DCI format that schedules the PUSCH transmission occasion i on active UL BWP b of carrier f of serving cell c or jointly coded with other TPC commands in a DCI format 2_2 with CRC scrambled by TPC-PUSCH-RNTI, as described in clause 11.3

>>: EQ300 is the PUSCH power control adjustment state 1 for active UL BWP b of carrier f of serving cell c and PUSCH transmission occasion i if the UE is not pro-vided tpc-Accumulation, where >>>: The $\delta\_(PUSCH,b,f,c)$ values are given in Table 17

>>>: EQ400 is a sum of TPC command values in a set D_i of TPC command values with cardinality "C" (D_i) that the UE receives between K_PUSCH $(i-i\_0)-1$ symbols before PUSCH transmission occasion i-i_0 and K_PUSCH (i) symbols before PUSCH transmis-sion occasion i on active UL BWP b of carrier f of serving cell c for PUSCH power control adjustment state 1, where i_0>0 is the smallest integer for which K_PUSCH $(i-i\_0)$ symbols before PUSCH transmis-sion occasion i-i_0 is earlier than K_PUSCH (i) sym-bols before PUSCH transmission occasion i >>>: If a PUSCH transmission is scheduled by a DCI format, K_PUSCH (i) is a number of symbols for active UL BWP b of carrier f of serving cell c after a last symbol of a corresponding PDCCH reception and before a first symbol of the PUSCH transmission >>>: If a PUSCH transmission is configured by Config-uredGrantConfig, K_PUSCH (i) is a number of K_(PUSCH,min) symbols equal to the product of a number of symbols per slot, N_symb^slot, and the minimum of the values provided by k2 in PUSCH-ConfigCommon for active UL BWP b of carrier f of serving cell c >>: A UE resets accumulation of a PUSCH power control adjustment state 1 for active UL BWP b of carrier f of serving cell c to f (b,f,c) (k,l)=0,k=0, 1, . . . , i >>>: If a configuration for a corresponding P_(O_UE_PUSCH,b,f,c) (j) value is provided by higher layers >>>: If a configuration for a corresponding α_(b,f,c) (j) value is provided by higher layers f_(b,f,c) (i,l)=δ_(PUSCH,b,f,c) (i,l) is the PUSCH power control adjustment state for active UL BWP b of carrier f of serving cell c and PUSCH transmission occasion if the UE is provided tpc-Accumulation, where δ_(PUSCH,b,f,c) Absolute Values are Given in Table 17

If the UE obtains one TPC command from a DCI format 2_2 with CRC scrambled by a TPC-PUSCH-RNTI, the 1 value is provided by the closed loop indicator field in DCI format 2_2

TABLE 17

| TPC Command Field | Accumulated $\delta_{PUSCH,b,f,c}$ or $\delta_{SRS,b,f,c}$ [dB] | Absolute $\delta_{PUSCH,b,f,c}$ or $\delta_{SRS,b,f,c}$ [dB] |
|---|---|---|
| 0 | −1 | −4 |
| 1 | 0 | −1 |
| 2 | 1 | 1 |
| 3 | 3 | 4 |

Figure 40:
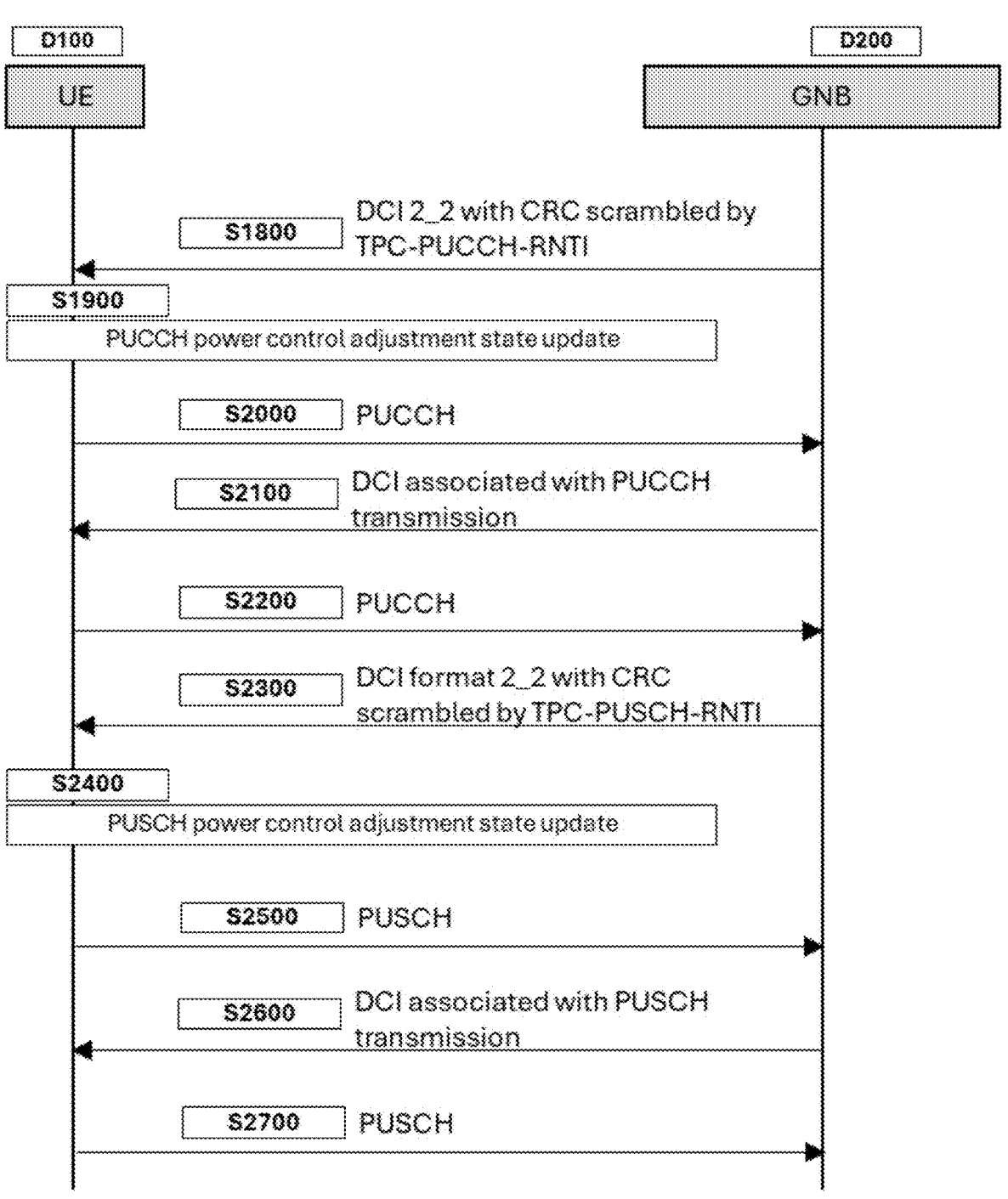
FIG. 40 illustrates operations of UE and GNB for updating power control adjustment states.

FIG. 40 illustrates operations of UE and GNB for PUCCH/PUSCH transmission

At S1800, UE receives from the GNB a DCI format 2_2 with CRC scrambled by TPC-PUCCH-RNTI.

At S1900, UE performs PUCCH power control adjustment state update based on the received DCI format 2_2.

UE determines one or two relevant blocks from the blocks included in the DCI format 2_2 scrambled by TPC-PUCCH-RNTI.

UE adjust PUCCH power control adjustment state for NSUR based on the first relevant block.

UE adjust PUCCH power control adjustment state for SUR based on the second relevant block.

The first relevant block is determined based on tpc-IndexPCell (in case that the DCI is received in PCell) or tpc-IndexPUCCH-SCell (in case that the DCI is received in PUCCH-SCell).

The second relevant block is determined based on tpc-IndexPCell-SUR (in case that the DCI is received in PCell) or tpc-IndexPUCCH-SCell-SUR (in case that the DCI is received in PUCCH-SCell).

At S2000, UE performs PUCCH transmission on NSUR based on PUCCH power control adjustment state for NSUR.

UE performs PUCCH transmission on SUR based on PUCCH power control adjustment state for SUR.

At S2100, UE receives from the GNB a DCI format associated with PUCCH transmission.

UE adjusts PUCCH power control adjustment state for NSUR based on TPC command in the DCI format in case that the DCI format is received in NSDR (or during downlink symbols or in DL BWP).

UE adjusts PUCCH power control adjustment state for SUR based on TPC command in the DCI format in case that the DCI format is received in SDR (or during SBFD symbols or in cell-specific DL sub-band).

SDR (SBFD downlink resource) is a specific frequency resource at SBFD symbol. The specific frequency resource is the specific DRBs for PDCCH (intersection of PRBs of cell-specific DL subband and PRBs of currently active DL BWP and PRBs of CORESET configured for the currently active DL BWP).

NSDR is a second specific frequency resource at non-SBFD symbol. The second specific frequency resource is PRBs of DL BWP.

At S2200, UE performs PUCCH transmission on NSUR based on PUCCH power control adjustment state for NSUR.

UE performs PUCCH transmission on SUR based on PUCCH power control adjustment state for SUR.

At S2300, UE receives from the GNB a DCI format 2_2 with CRC scrambled by TPC-PUSCH-RNTI.

At S2400, UE performs PUSCH power control adjustment state update based on the received DCI format 2_2.

UE determines one or two relevant blocks from blocks included in the DCI format 2_2 scrambled by TPC-PUSCH-RNTI.

UE adjust PUSCH power control adjustment state for NSUR for a serving cell based on the third relevant block.

UE adjust PUSCH power control adjustment state for SUR based for the serving cell on the fourth relevant block.

The serving cell is indicated by targetCell or the serving cell where the DCI format 2_2 is received.

The third relevant block is determined based on tpc-Index.

The fourth relevant block is determined based on tpc-Index-SUR.

At S2500, UE performs PUSCH transmission on NSUR based on PUSCH power control adjustment state for NSUR.

UE performs PUSCH transmission on SUR based on PUSCH power control adjustment state for SUR.

At S2600, UE receives from the GNB a DCI format associated with PUSCH transmission (that contains the TPC command for PUSCH transmission).

UE adjusts PUSCH power control adjustment state for NSUR based on TPC command in the DCI format in case that the DCI format schedules PUSCH in NSUR.

UE adjusts PUSCH power control adjustment state for SUR based on TPC command in the DCI format in case that the DCI format schedules PUSCH in SUR.

At S2700, UE performs PUSCH transmission on NSUR based on PUSCH power control adjustment state for NSUR.

UE performs PUSCH transmission on SUR based on PUSCH power control adjustment state for SUR.

Figure 41:
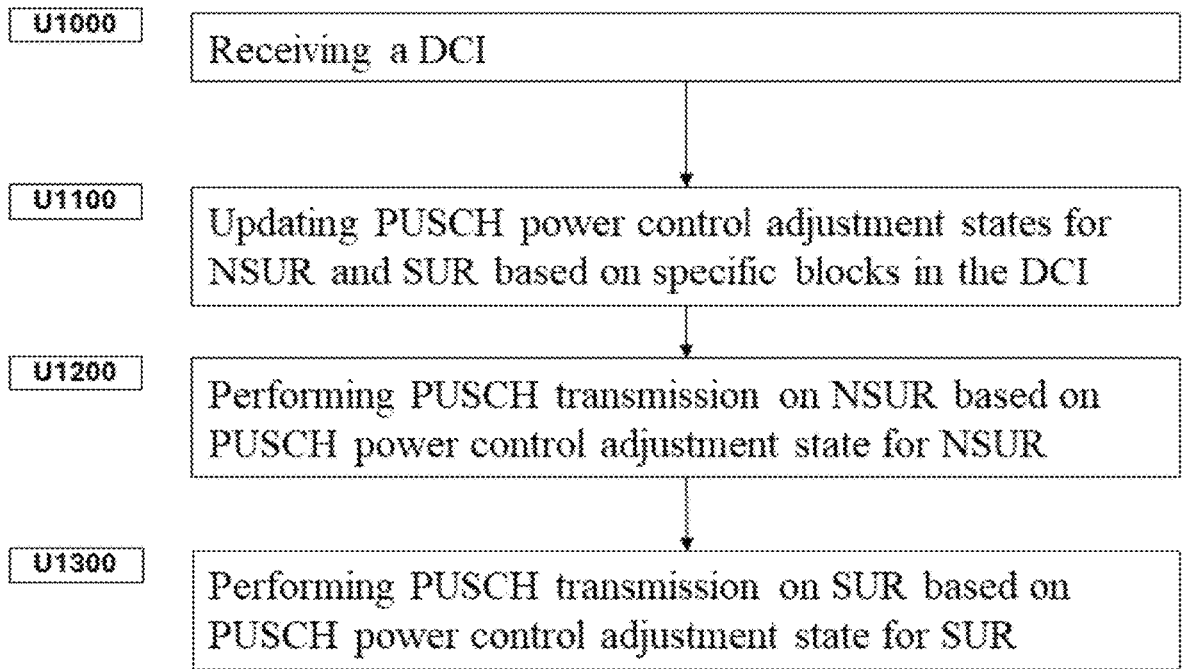
FIG. 41 is a flow diagram illustrating operation of UE.

FIG. 41 is a flow diagram illustrating UE operation.

At U1000, UE receives a DCI scrambled with TPC RNTI.

At U1100, UE updates PUSCH power control adjustment state for NSUR based on a specific block and PUSCH power control adjustment state for SUR based on a second specific block.

At U1200, UE performs PUSCH transmission on NSUR based on PUSCH power control adjustment state for NSUR.

At U1300, UE performs PUSCH transmission on SUR based on PUSCH power control adjustment state for NSUR.

What is claimed is:

1. A method performed by a terminal, the method comprising:

receiving, by the terminal from a base station, system information, wherein the system information comprises:

a parameter for a frequency-domain portion of uplink bandwidth for Sub-band Full Duplex (SBFD);

a set of parameters for a time-domain portion for SBFD; and a set of parameters for cell-specific time division duplex (TDD) configuration;

receiving, by the terminal from the base station, a radio resource control (RRC) message, wherein the RRC message comprises:

at least one set of parameters for configured grant;

a parameter for a power offset related to configured grant;

a parameter for an alpha set specific to SBFD; and a parameter for an alpha set specific to Physical Uplink Shared Channel (PUSCH); and performing, by the terminal, a PUSCH transmission, based on the at least one set of parameters for configured grant, wherein:

transmission power of the PUSCH is determined based on a pathloss term and a power offset term, the power offset term consists of a first component and a second component; and the first component is determined from the power offset related to configured grant; and wherein the second component is determined from:

the alpha set specific to SBFD in case that the PUSCH transmission is performed in a set of SBFD symbols; and the alpha set specific to PUSCH in case that the PUSCH transmission is performed in a set of non-SBFD symbols.

2. The method of claim 1, wherein:

the SBFD symbol is indicated as a downlink symbol in the set of parameters for cell-specific TDD configuration and belongs to the time-domain portion for SBFD; and the non-SBFD symbol is indicated as a flexible symbol in the set of parameters for cell-specific TDD configuration and does not belong to the time-domain portion for SBFD.

3. The method of claim 2, wherein:

the time-domain portion for SBFD consists of consecutive symbols; and a starting symbol and an ending symbol of the time-domain portion for SBFD are determined based on the set of parameters for the time-domain portion for SBFD.

4. The method of claim 1, wherein the parameter for the alpha set specific to SBFD comprises:

a parameter for a first power offset;

a parameter for a first adjustment factor for pathloss; and a parameter for a first closed-loop index, and wherein the parameter for alpha set specific to PUSCH comprises:

a parameter for a second power offset;

a parameter for a second adjustment factor for pathloss; and a parameter for a second closed-loop index.

5. The method of claim 4, wherein the pathloss term is determined based on a product of a pathloss of a pathloss reference and:

the first adjustment factor for pathloss in case that the PUSCH transmission is performed in the set of SBFD symbols; and the second adjustment factor for pathloss in case that the PUSCH transmission is performed in the set of non-SBFD symbols.

6. A terminal in a wireless communication system, the terminal comprising:

a transceiver configured to transmit and receive a signal; and a controller configured to control the transceiver to:

receive, from a base station, system information, wherein the system information comprises:

a parameter for a frequency-domain portion of uplink bandwidth for Sub-band Full Duplex (SBFD);

a set of parameters for a time-domain portion for SBFD; and a set of parameters for cell-specific time division duplex (TDD) configuration;

receive, from the base station, a radio resource control (RRC) message, wherein the RRC message comprises:

at least one set of parameters for configured grant;

a parameter for a power offset related to configured grant;

a parameter for an alpha set specific to SBFD; and a parameter for an alpha set specific to Physical Uplink Shared Channel (PUSCH); and perform a PUSCH transmission based on the at least one set of parameters for configured grant, wherein:

transmission power of the PUSCH is determined based on a pathloss term and a power offset term, the power offset term consists of a first component and a second component; and the first component is determined from the power offset related to configured grant; and wherein the second component is determined from:

the alpha set specific to SBFD in case that the PUSCH transmission is performed in a set of SBFD symbols; and the alpha set specific to PUSCH in case that the PUSCH transmission is performed in a set of non-SBFD symbols.

7. A base station in a wireless communication system, the base station comprising:

a transceiver configured to transmit and receive a signal; and a controller configured to control the transceiver to:

transmit, to a terminal, system information, wherein the system information comprises:

a parameter for a frequency-domain portion of uplink bandwidth for Sub-band Full Duplex (SBFD);

a set of parameters for a time-domain portion for SBFD; and a set of parameters for cell-specific time division duplex (TDD) configuration;

transmit, to the terminal, a radio resource control (RRC) message, wherein the RRC message comprises:

at least one set of parameters for configured grant;

a parameter for a power offset related to configured grant;

a parameter for an alpha set specific to SBFD; and a parameter for an alpha set specific to Physical Uplink Shared Channel (PUSCH); and perform a PUSCH reception based on the at least one set of parameters for configured grant, wherein:

transmission power of the PUSCH is determined based on a pathloss term and a power offset term, the power offset term consists of a first component and a second component; and the first component is determined from the power offset related to configured grant; and wherein the second component is determined from:

the alpha set specific to SBFD in case that the PUSCH reception is performed in a set of SBFD symbols; and the alpha set specific to PUSCH in case that the PUSCH reception is performed in a set of non-SBFD symbols.

\* \* \* \* \*